(12) United States Patent
Ishida

(10) Patent No.: US 9,071,753 B2
(45) Date of Patent: Jun. 30, 2015

(54) IMAGING APPARATUS INCLUDING A FIRST IMAGING SYSTEM AND A SECOND IMAGING SYSTEM

(71) Applicant: Sony Corporation, Tokyo (JP)

(72) Inventor: Minoru Ishida, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 14/036,741

(22) Filed: Sep. 25, 2013

(65) Prior Publication Data

US 2014/0028790 A1    Jan. 30, 2014

Related U.S. Application Data

(63) Continuation of application No. 12/858,062, filed on Aug. 17, 2010, now Pat. No. 8,576,321.

(30) Foreign Application Priority Data

Aug. 20, 2009    (JP) ................. 2009-190659

(51) Int. Cl.
*H04N 5/222* (2006.01)
*H04N 7/18* (2006.01)
*H04N 5/225* (2006.01)
*H04N 5/232* (2006.01)
*H04N 5/247* (2006.01)
(Continued)

(52) U.S. Cl.
CPC ........... *H04N 5/23238* (2013.01); *H04N 5/247* (2013.01); *H04N 5/3765* (2013.01); *H04N 5/378* (2013.01)

(58) Field of Classification Search
None
See application file for complete search history.

(56) References Cited

U.S. PATENT DOCUMENTS 6,693,524 B1    2/2004    Payne
7,406,213 B2    7/2008    Hasegawa
(Continued)

FOREIGN PATENT DOCUMENTS

JP    2000-209469 A    7/2000
JP    2002-232754        8/2002
(Continued)

OTHER PUBLICATIONS

Office Action issued on Jul. 16, 2013 in corresponding Japanese Patent Application No. 2009-190659.
(Continued)

*Primary Examiner* — Aung S Moe
*Assistant Examiner* — Euel Cowan
(74) *Attorney, Agent, or Firm* — Sony Corporation

(57) ABSTRACT

An imaging apparatus includes: an imaging unit that respectively generates, with imaging devices different from one another, a first captured image with a specific direction of a subject set in a longitudinal direction, a second captured image with an orthogonal direction orthogonal to the specific direction set in a longitudinal direction and including a subject adjacent to one side of the orthogonal direction of the subject included in the first captured image, and a third captured image with the orthogonal direction set in a longitudinal direction and including a subject adjacent to the other side of the orthogonal direction of the subject included in the first captured image; a detecting unit that detects a state of the imaging apparatus; and a control unit that determines, based on the detected state, a range of a target image as a target of display or recording among the first to third captured images.

8 Claims, 72 Drawing Sheets

(51) Int. Cl.
*H04N 5/376* (2011.01)
*H04N 5/378* (2011.01)

(56) References Cited

U.S. PATENT DOCUMENTS

| | | | | |
|---|---|---|---|---|
| 2005/0008257 | A1* | 1/2005 | Tsukihara | 382/293 |
| 2007/0132863 | A1 | 6/2007 | Deguchi | |
| 2007/0282501 | A1 | 12/2007 | Kano et al. | |
| 2009/0174765 | A1* | 7/2009 | Namba et al. | 348/46 |
| 2010/0097442 | A1* | 4/2010 | Lablans | 348/36 |

FOREIGN PATENT DOCUMENTS

| | | |
|---|---|---|
| JP | 2003-333425 A | 11/2003 |
| JP | 2004-96258 A | 3/2004 |
| JP | 2004-159014 A | 6/2004 |
| JP | 2006-338566 | 12/2006 |
| JP | 2007-166317 | 6/2007 |
| JP | 2008-249782 | 10/2008 |

OTHER PUBLICATIONS

Office Action issued on Jul. 10, 2013 in Chinese Application No. 201010256083.2 with its English translation.
Office Action issued Sep. 9, 2014 in Japanese Patent Application No. 2013-244927.
Japese Office Action issued on Apr. 14, 2015 in patent application No. 2013-244927.

* cited by examiner

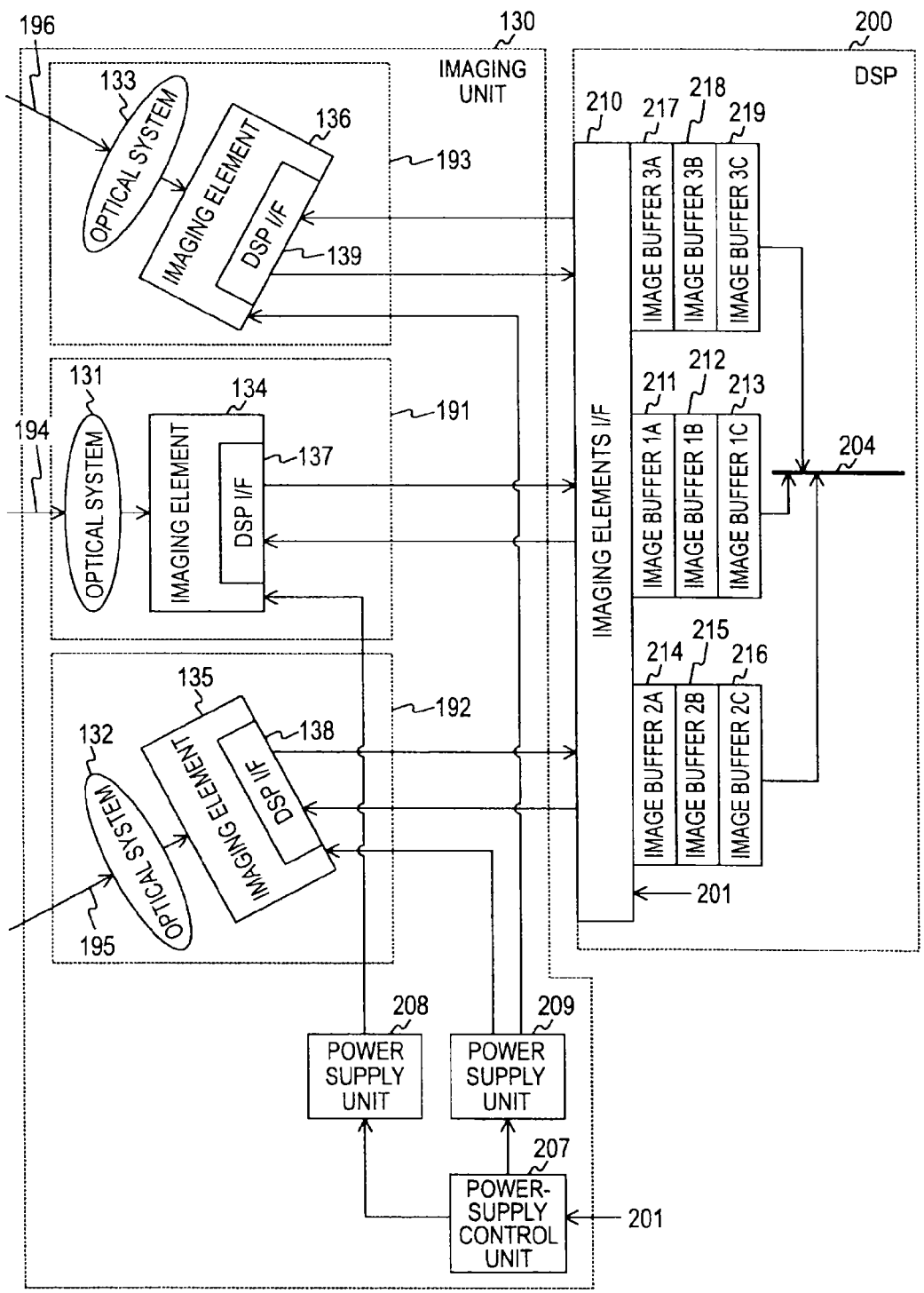

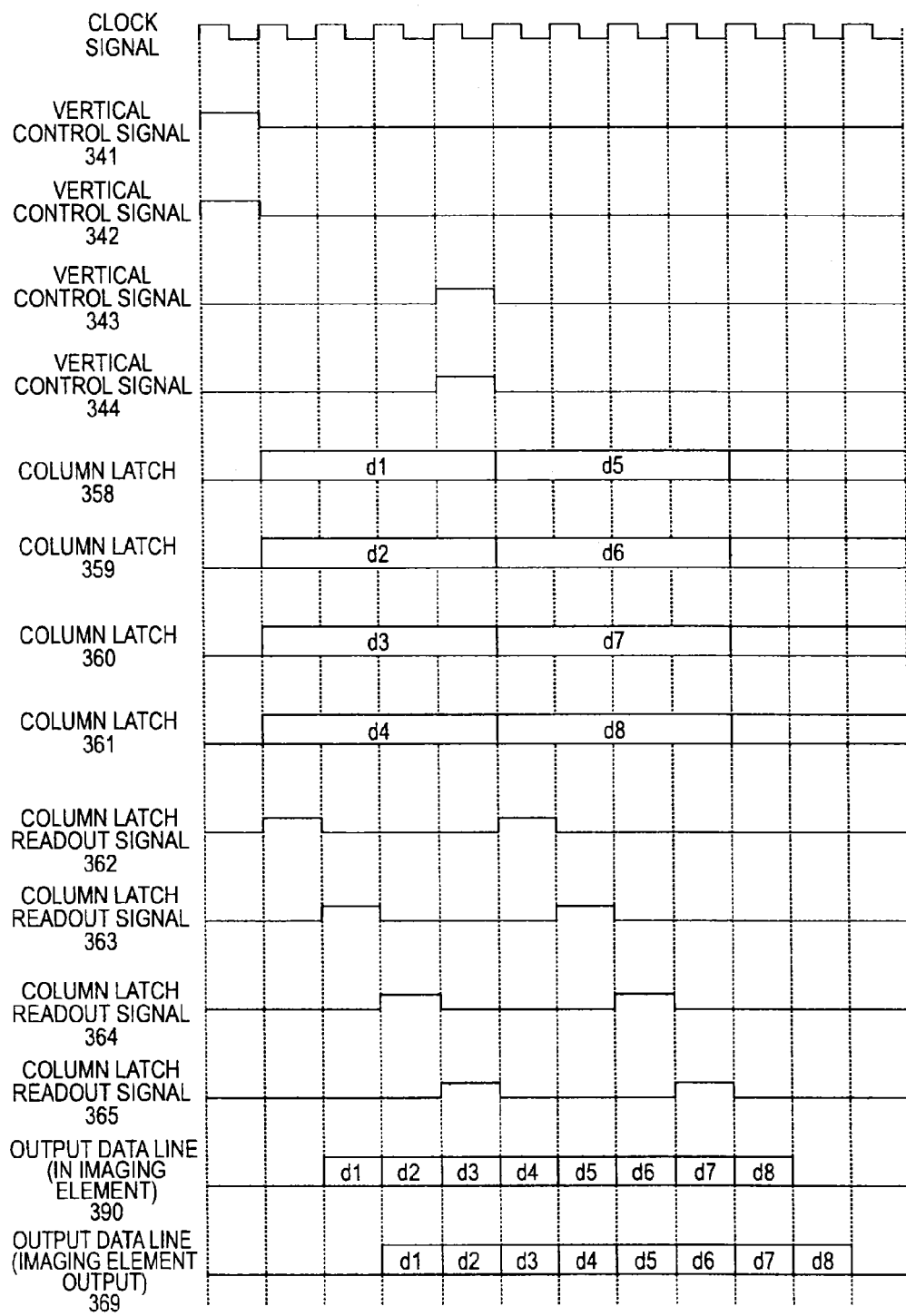

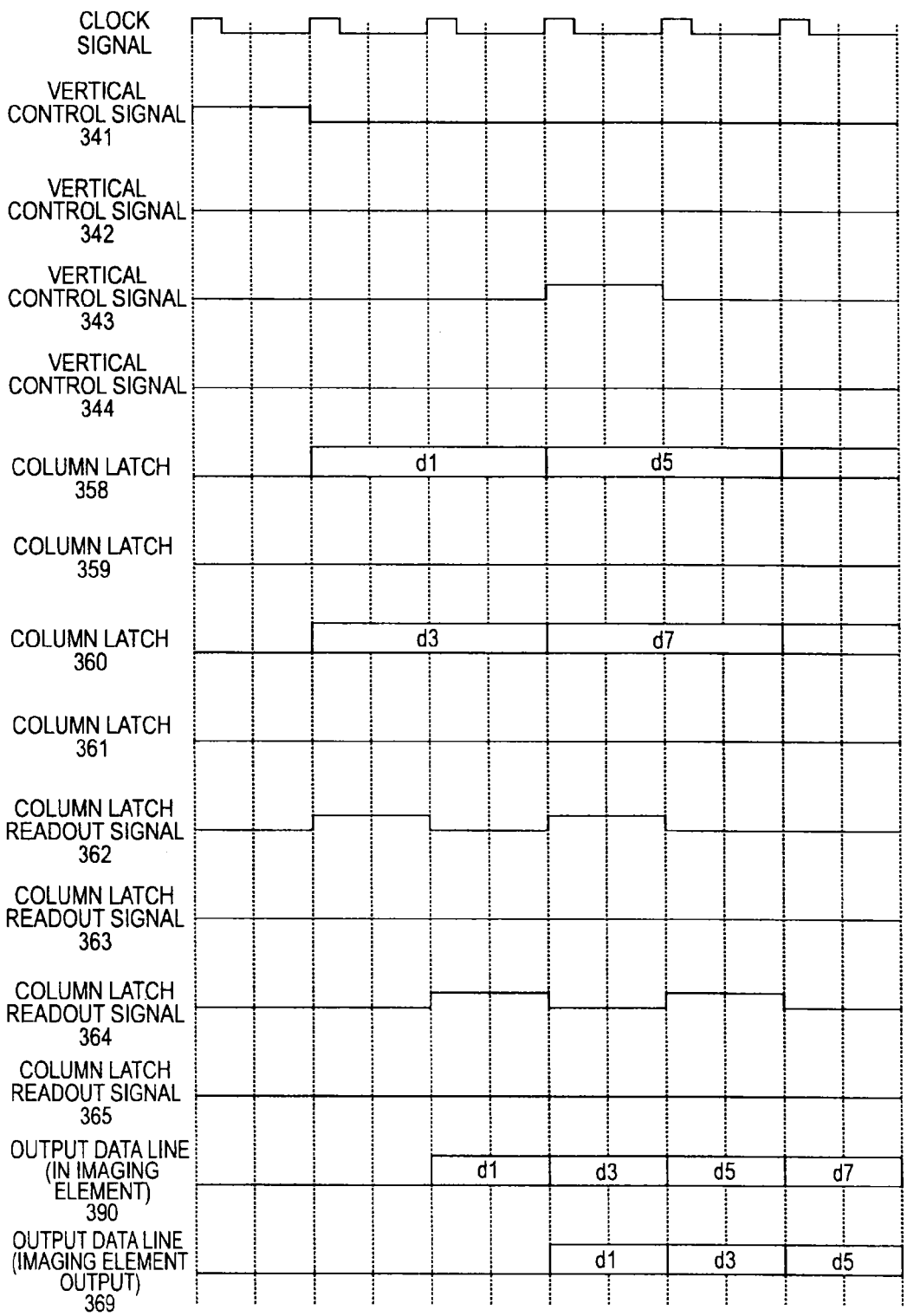

FIG.50

| NAME OF CONTROL LINE | CONTROL TARGET | CONTROL METHOD 1 | CONTROL METHOD 2 | CONTROL METHOD 3 | CONTROL METHOD 4 | CONTROL METHOD 5 |
|---|---|---|---|---|---|---|
| POWER ON/OFF CONTROL LINE | IMAGING SYSTEM IN CENTER | ON | ON | ON | ON | ON |
| | IMAGING SYSTEMS ON LEFT AND RIGHT | OFF | ON | ON | ON | ON |
| CLOCK SIGNAL LINE | IMAGING SYSTEM IN CENTER | | SUPPLY | SUPPLY | SUPPLY | SUPPLY |
| | IMAGING SYSTEMS ON LEFT AND RIGHT | | NOT SUPPLY | SUPPLY | SUPPLY | SUPPLY |
| RESET SIGNAL LINE | IMAGING SYSTEM IN CENTER | | | RELEASE | RELEASE | RELEASE |
| | IMAGING SYSTEMS ON LEFT AND RIGHT | | | NOT RELEASE | RELEASE | RELEASE |
| PHOTOGRAPHING OPERATION ON/OFF CONTROL LINE | IMAGING SYSTEM IN CENTER | | | | ON | ON |
| | IMAGING SYSTEMS ON LEFT AND RIGHT | | | | OFF | ON |
| VERTICAL SYNCHRONIZATION SIGNAL HORIZONTAL SYNCHRONIZATION SIGNAL | IMAGING SYSTEM IN CENTER | | | | | TOGGLE |
| | IMAGING SYSTEMS ON LEFT AND RIGHT | | | | | H FIXED OR L FIXED |

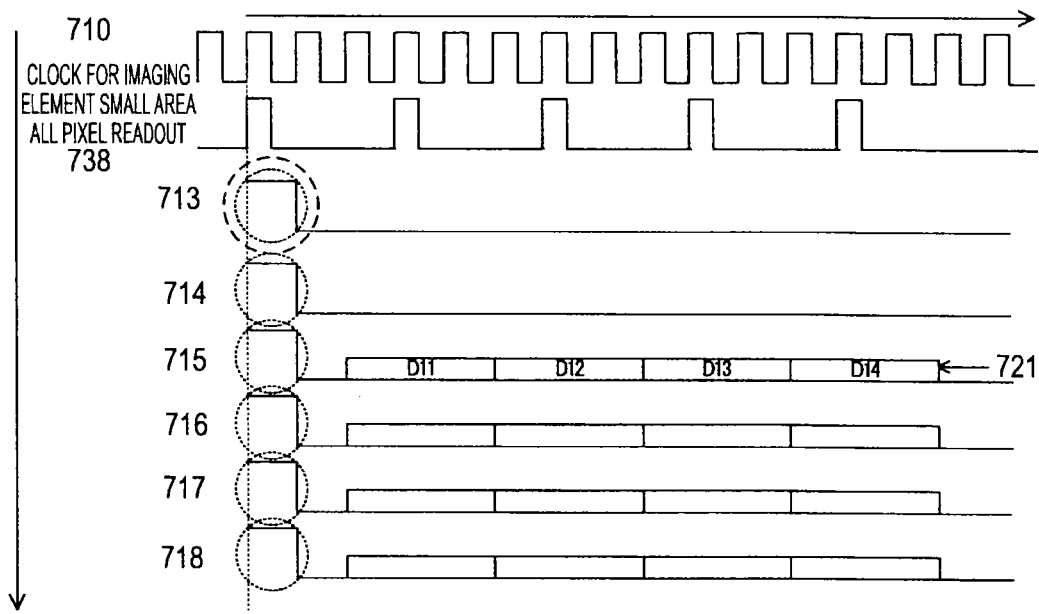
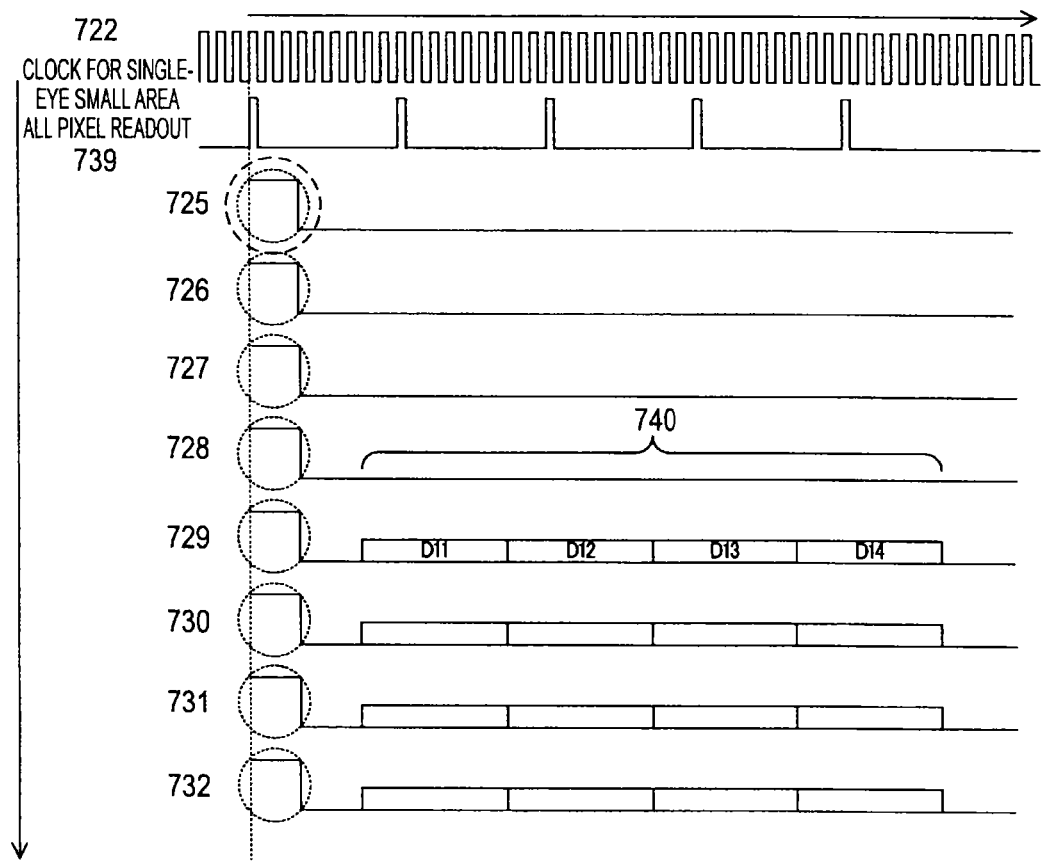

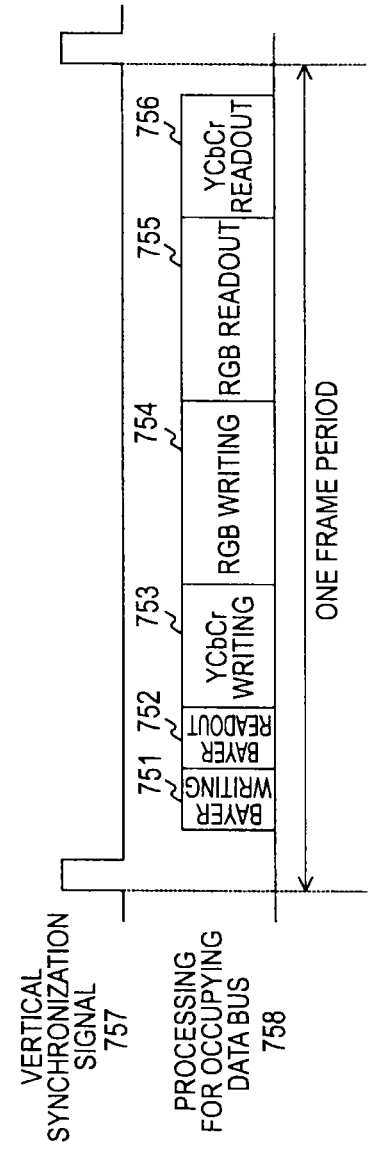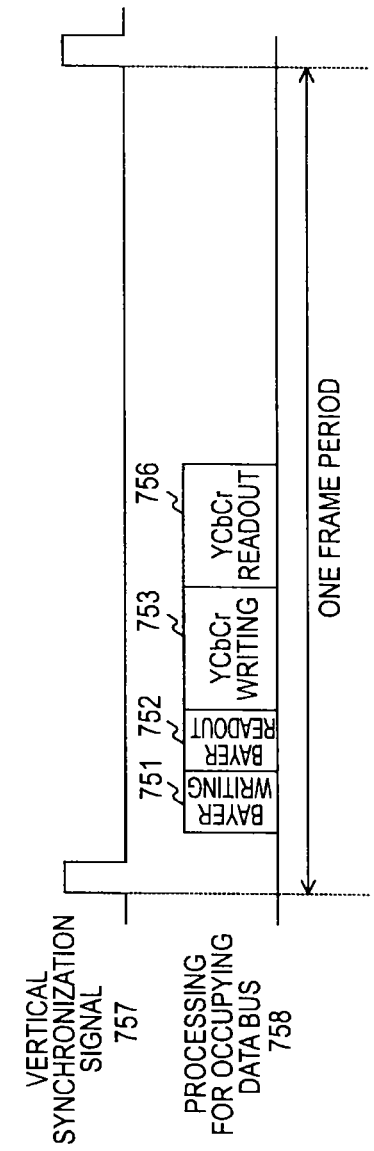

FIG. 57

| DISPLAY DEVICE DIRECTION | PHOTOGRAPHING OPERATION | IMAGE SIZE | BEFORE H (PIXELS) THINNING-OUT | BEFORE V (PIXELS) THINNING-OUT | R | B (bit) | F (fps) | K | D (bit) | Fclk min | Fclk max |
|---|---|---|---|---|---|---|---|---|---|---|---|
| LATERAL | IMAGE RECORDING OPERATION | THREE-EYE LANDSCAPE WIDE ANGLE | H1sr | V1sr | R1sr | B1sr | F1sr | K1sr | D1sr | Fclk_min=(H×V×R×B×F×K×1.0)/(D-Dmoolβ) | Fclk_max=(H×V×R×B×F×K×2.0)/(D-Dmoolβ) |
| | | THREE-EYE LANDSCAPE NARROW ANGLE | H2sr | V2sr | R2sr | B2sr | F2sr | K2sr | D2sr | | |
| | | SINGLE-EYE LANDSCAPE | H3sr | V3sr | R3sr | B3sr | F3sr | K3sr | D3sr | | |
| | | SINGLE-EYE LONGITUDINAL LARGE AREA | H4sr | V4sr | R4sr | B4sr | F4sr | K4sr | D4sr | | |
| | | SINGLE-EYE LONGITUDINAL SMALL AREA | H5sr | V5sr | R5sr | B5sr | F5sr | K5sr | D5sr | | |
| | MONITORING OPERATION | THREE-EYE LANDSCAPE WIDE ANGLE | H1sm | V1sm | R1sm | B1sm | F1sm | K1sm | D1sm | | |
| | | THREE-EYE LANDSCAPE NARROW ANGLE | H2sm | V2sm | R2sm | B2sm | F2sm | K2sm | D2sm | | |
| | | SINGLE-EYE LANDSCAPE | H3sm | V3sm | R3sm | B3sm | F3sm | K3sm | D3sm | | |
| | | SINGLE-EYE LONGITUDINAL LARGE AREA | H4sm | V4sm | R4sm | B4sm | F4sm | K4sm | D4sm | | |
| | | SINGLE-EYE LONGITUDINAL SMALL AREA | H5sm | V5sm | R5sm | B5sm | F5sm | K5sm | D5sm | | |
| LONGITUDINAL | IMAGE RECORDING OPERATION | THREE-EYE LANDSCAPE NARROW ANGLE | H6sr | V6sr | R6sr | B6sr | F6sr | K6sr | D6sr | | |
| | | SINGLE-EYE LANDSCAPE | H7sr | V7sr | R7sr | B7sr | F7sr | K7sr | D7sr | | |
| | | SINGLE-EYE LONGITUDINAL LARGE AREA | H8sr | V8sr | R8sr | B8sr | F8sr | K8sr | D8sr | | |
| | | SINGLE-EYE LONGITUDINAL SMALL AREA | H9sr | V9sr | R9sr | B9sr | F9sr | K9sr | D9sr | | |
| | MONITORING OPERATION | THREE-EYE LANDSCAPE NARROW ANGLE | H6sm | V6sm | R6sm | B6sm | F6sm | K6sm | D6sm | | |
| | | SINGLE-EYE LANDSCAPE | H7sm | V7sm | R7sm | B7sm | F7sm | K7sm | D7sm | | |
| | | SINGLE-EYE LONGITUDINAL LARGE AREA | H8sm | V8sm | R8sm | B8sm | F8sm | K8sm | D8sm | | |
| | | SINGLE-EYE LONGITUDINAL SMALL AREA | H9sm | V9sm | R9sm | B9sm | F9sm | K9sm | D9sm | | |

FIG.58

| DISPLAY DEVICE DIRECTION | PHOTOGRAPHING OPERATION | IMAGE SIZE | BEFORE H (PIXELS) THINNING-OUT | BEFORE V (PIXELS) THINNING-OUT | BEFORE NUMBER OF PIXELS (M PIXELS) THINNING-OUT | R | AFTER H (PIXELS) THINNING-OUT | AFTER V (PIXELS) THINNING-OUT | AFTER NUMBER OF PIXELS (M PIXELS) THINNING-OUT | B (bit) | F (fps) | K | D (bit) | Fclk min | Fclk max |
|---|---|---|---|---|---|---|---|---|---|---|---|---|---|---|---|
| LATERAL | IMAGE RECORDING OPERATION | THREE-EYE LANDSCAPE WIDE ANGLE | 5280 | 1440 | 7.60 | 1 | 5760 | 1440 | 7.60 | 12 | 30 | 12 | 128 | 273.7 | 547.4 |
| | | THREE-EYE LANDSCAPE NARROW ANGLE | 1920 | 1440 | 2.76 | 1 | 1920 | 1440 | 2.76 | 12 | 30 | 12 | 128 | 99.5 | 199.1 |
| | | SINGLE-EYE LANDSCAPE | 1440 | 1080 | 1.56 | 1 | 1920 | 1440 | 1.56 | 12 | 30 | 12 | 128 | 56.0 | 112.0 |
| | | SINGLE-EYE LONGITUDINAL LARGE AREA | 1440 | 1920 | 2.76 | 1 | 1080 | 1440 | 2.76 | 12 | 30 | 12 | 128 | 99.5 | 199.1 |
| | | SINGLE-EYE LONGITUDINAL SMALL AREA | 480 | 640 | 0.31 | 1 | 480 | 640 | 0.31 | 12 | 30 | 12 | 128 | 11.1 | 22.1 |
| | MONITORING OPERATION | THREE-EYE LANDSCAPE WIDE ANGLE | 5280 | 1440 | 7.60 | 0.0313 | 660 | 360 | 0.24 | 10 | 30 | 6 | 128 | 3.4 | 6.8 |
| | | THREE-EYE LANDSCAPE NARROW ANGLE | 1920 | 1440 | 2.76 | 0.0625 | 480 | 360 | 0.17 | 10 | 30 | 6 | 128 | 2.5 | 4.9 |
| | | SINGLE-EYE LANDSCAPE | 1440 | 1080 | 1.56 | 0.0625 | 360 | 270 | 0.10 | 10 | 30 | 6 | 128 | 1.4 | 2.8 |
| | | SINGLE-EYE LONGITUDINAL LARGE AREA | 1440 | 1920 | 2.76 | 0.125 | 720 | 480 | 0.35 | 10 | 30 | 6 | 128 | 4.9 | 9.9 |
| | | SINGLE-EYE LONGITUDINAL SMALL AREA | 480 | 640 | 0.31 | 1 | 480 | 640 | 0.31 | 10 | 30 | 6 | 128 | 4.4 | 8.8 |
| LONGITUDINAL | IMAGE RECORDING OPERATION | THREE-EYE LANDSCAPE NARROW ANGLE | 1920 | 1440 | 2.76 | 1 | 1920 | 1440 | 2.76 | 12 | 30 | 12 | 128 | 99.5 | 199.1 |
| | | SINGLE-EYE LANDSCAPE | 1440 | 1080 | 1.56 | 1 | 1920 | 1440 | 1.56 | 12 | 30 | 12 | 128 | 56.0 | 112.0 |
| | | SINGLE-EYE LONGITUDINAL LARGE AREA | 1440 | 1920 | 2.76 | 1 | 1080 | 1440 | 2.76 | 12 | 30 | 12 | 128 | 99.5 | 199.1 |
| | | SINGLE-EYE LONGITUDINAL SMALL AREA | 480 | 640 | 0.31 | 1 | 480 | 640 | 0.31 | 12 | 30 | 12 | 128 | 11.1 | 22.1 |
| | MONITORING OPERATION | THREE-EYE LANDSCAPE NARROW ANGLE | 1920 | 1440 | 2.76 | 0.0625 | 480 | 360 | 0.17 | 10 | 30 | 6 | 128 | 2.5 | 4.9 |
| | | SINGLE-EYE LANDSCAPE | 1440 | 1080 | 1.56 | 0.25 | 720 | 540 | 0.39 | 10 | 30 | 6 | 128 | 5.6 | 11.1 |
| | | SINGLE-EYE LONGITUDINAL LARGE AREA | 1440 | 1920 | 2.76 | 0.25 | 720 | 960 | 0.69 | 10 | 30 | 6 | 128 | 9.9 | 19.7 |
| | | SINGLE-EYE LONGITUDINAL SMALL AREA | 480 | 640 | 0.31 | 1 | 480 | 640 | 0.31 | 10 | 30 | 6 | 128 | 4.4 | 8.8 |

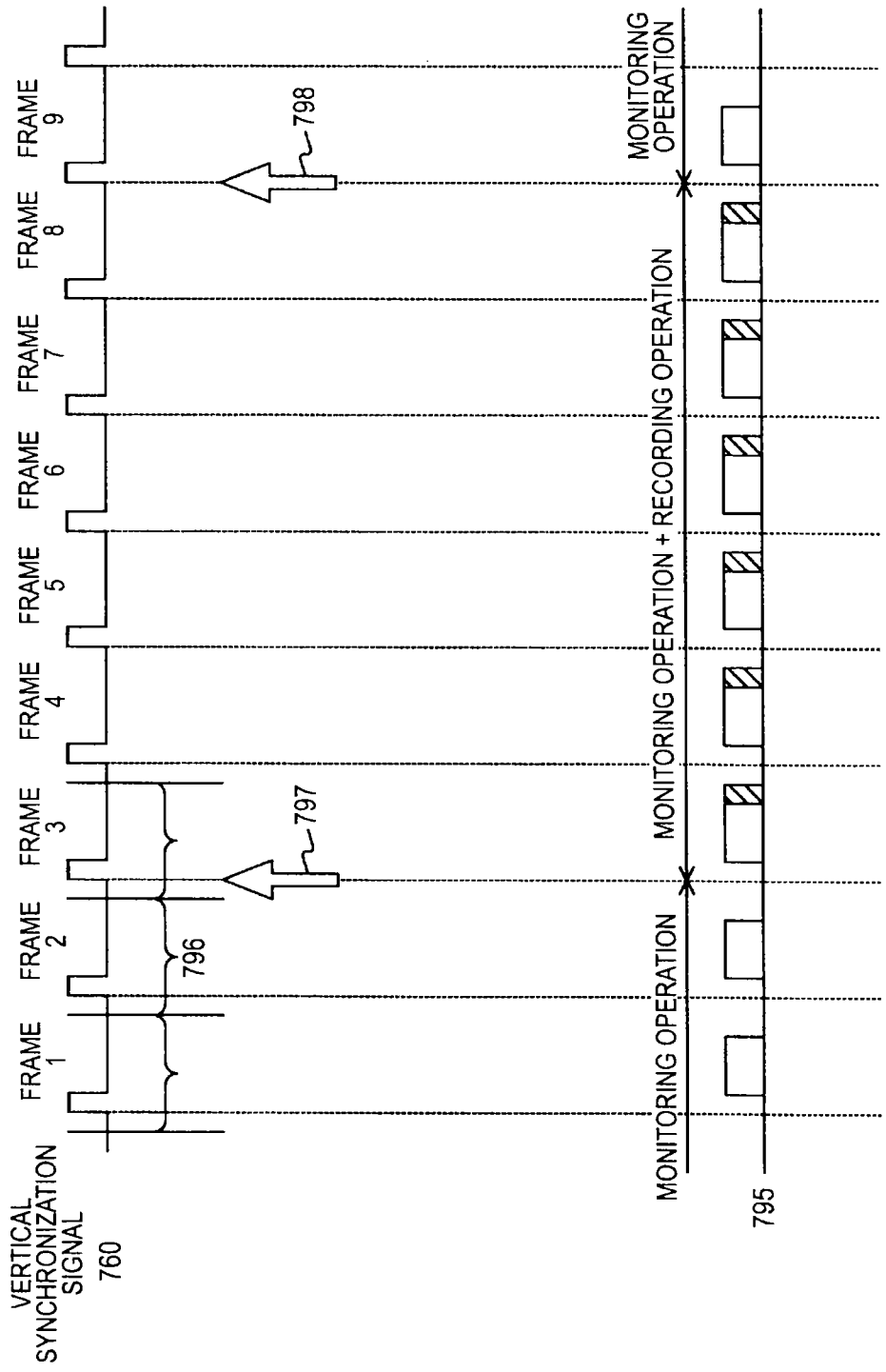

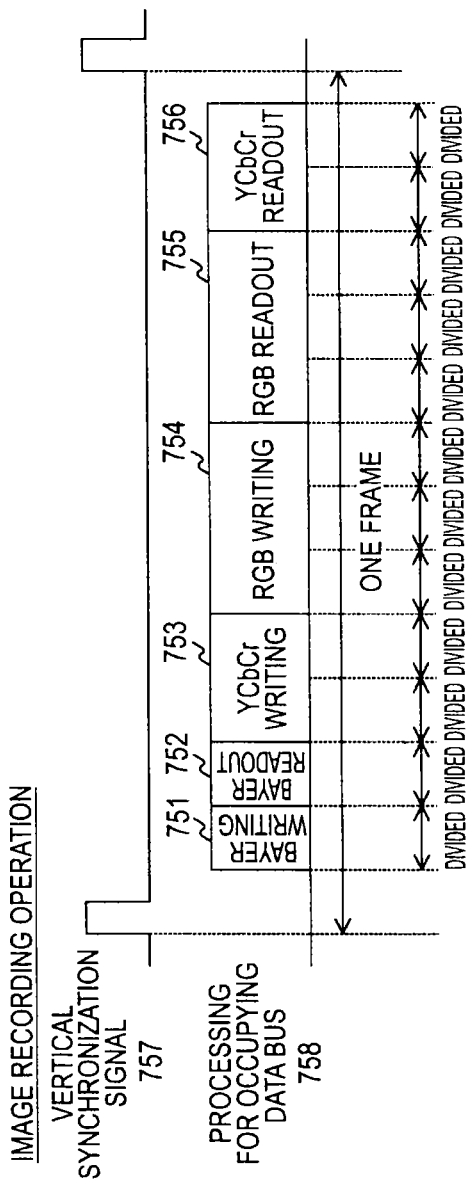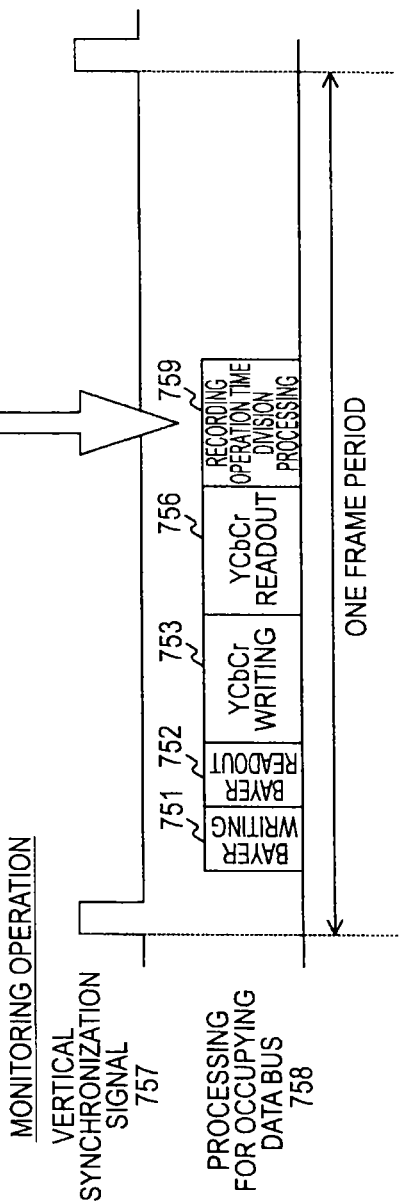

FIG.61

| DISPLAY DEVICE DIRECTION | PHOTOGRAPHING OPERATION | | IMAGE SIZE | BEFORE H (PIXELS) THINNING-OUT | BEFORE V (PIXELS) THINNING-OUT | BEFORE NUMBER OF PIXELS (M PIXELS) THINNING-OUT | R | AFTER H (PIXELS) THINNING-OUT | AFTER V (PIXELS) THINNING-OUT | AFTER NUMBER OF PIXELS (M PIXELS) THINNING-OUT | B (bit) | F (fps) | K | D (bit) | Fclk min | Fclk max |
|---|---|---|---|---|---|---|---|---|---|---|---|---|---|---|---|---|
| LATERAL | STILL IMAGE RECORDING OPERATION | | THREE-EYE LANDSCAPE WIDE ANGLE | 5280 | 1440 | 7.60 | 1 | 5760 | 1440 | 7.60 | 12 | 1 | 12 | 128 | 9.1 | 18.2 |
| | | | THREE-EYE LANDSCAPE NARROW ANGLE | 1920 | 1440 | 2.76 | 1 | 1920 | 1440 | 2.76 | 12 | 1 | 12 | 128 | 3.3 | 6.6 |
| | | | SINGLE-EYE LANDSCAPE | 1440 | 1080 | 1.56 | 1 | 1920 | 1440 | 1.56 | 12 | 1 | 12 | 128 | 1.9 | 3.7 |
| | | | SINGLE-EYE LONGITUDINAL LARGE AREA | 1440 | 1920 | 2.76 | 1 | 1080 | 1440 | 2.76 | 12 | 1 | 12 | 128 | 3.3 | 6.6 |
| | | | SINGLE-EYE LONGITUDINAL SMALL AREA | 480 | 640 | 0.31 | 1 | 480 | 640 | 0.31 | 12 | 1 | 12 | 128 | 0.4 | 0.7 |
| | MONITORING OPERATION | | THREE-EYE LANDSCAPE WIDE ANGLE | 5280 | 1440 | 7.60 | 0.0313 | 660 | 360 | 0.24 | 10 | 30 | 6 | 128 | 3.4 | 6.8 |
| | | | THREE-EYE LANDSCAPE NARROW ANGLE | 1920 | 1440 | 2.76 | 0.0625 | 480 | 360 | 0.17 | 10 | 30 | 6 | 128 | 2.5 | 4.9 |
| | | | SINGLE-EYE LANDSCAPE | 1440 | 1080 | 1.56 | 0.0625 | 360 | 270 | 0.10 | 10 | 30 | 6 | 128 | 1.4 | 2.8 |
| | | | SINGLE-EYE LONGITUDINAL LARGE AREA | 1440 | 1920 | 2.76 | 0.125 | 720 | 480 | 0.35 | 10 | 30 | 6 | 128 | 4.9 | 9.9 |
| | | | SINGLE-EYE LONGITUDINAL SMALL AREA | 480 | 640 | 0.31 | 1 | 480 | 640 | 0.31 | 10 | 30 | 6 | 128 | 4.4 | 8.8 |
| LONGITUDINAL | STILL IMAGE RECORDING OPERATION | | THREE-EYE LANDSCAPE NARROW ANGLE | 1920 | 1440 | 2.76 | 1 | 1920 | 1440 | 2.76 | 12 | 1 | 12 | 128 | 3.3 | 6.6 |
| | | | SINGLE-EYE LANDSCAPE | 1440 | 1080 | 1.56 | 1 | 1920 | 1440 | 1.56 | 12 | 1 | 12 | 128 | 1.9 | 3.7 |
| | | | SINGLE-EYE LONGITUDINAL LARGE AREA | 1440 | 1920 | 2.76 | 1 | 1080 | 1440 | 2.76 | 12 | 1 | 12 | 128 | 3.3 | 6.6 |
| | | | SINGLE-EYE LONGITUDINAL SMALL AREA | 480 | 640 | 0.31 | 1 | 480 | 640 | 0.31 | 12 | 1 | 12 | 128 | 0.4 | 0.7 |
| | MONITORING OPERATION | | THREE-EYE LANDSCAPE NARROW ANGLE | 1920 | 1440 | 2.76 | 0.0625 | 480 | 360 | 0.17 | 10 | 30 | 6 | 128 | 2.5 | 4.9 |
| | | | SINGLE-EYE LANDSCAPE | 1440 | 1080 | 1.56 | 0.25 | 720 | 540 | 0.39 | 10 | 30 | 6 | 128 | 5.6 | 11.1 |
| | | | SINGLE-EYE LONGITUDINAL LARGE AREA | 1440 | 1920 | 2.76 | 0.25 | 720 | 960 | 0.69 | 10 | 30 | 6 | 128 | 9.9 | 19.7 |
| | | | SINGLE-EYE LONGITUDINAL SMALL AREA | 480 | 640 | 0.31 | 1 | 480 | 640 | 0.31 | 10 | 30 | 6 | 128 | 4.4 | 8.8 |

FIG.62

| DISPLAY DEVICE DIRECTION | PHOTOGRAPHING OPERATION | IMAGE SIZE | BEFORE H (PIXELS) THINNING-OUT | BEFORE V (PIXELS) THINNING-OUT | BEFORE NUMBER OF PIXELS (M.PIXELS) THINNING-OUT | R | AFTER H (PIXELS) THINNING-OUT | AFTER V (PIXELS) THINNING-OUT | AFTER NUMBER OF PIXELS (M.PIXELS) THINNING-OUT | B (bit) | F (fps) | K | D (bit) | Fclk min | Fclk max |
|---|---|---|---|---|---|---|---|---|---|---|---|---|---|---|---|
| LATERAL | MOVING IMAGE RECORDING OPERATION | THREE-EYE LANDSCAPE WIDE ANGLE | 5280 | 1440 | 7.60 | 0.25 | 2640 | 720 | 1.90 | 10 | 30 | 12 | 128 | 57.0 | 114.0 |
| | | THREE-EYE LANDSCAPE NARROW ANGLE | 1920 | 1440 | 2.76 | 1 | 1920 | 1440 | 2.76 | 10 | 30 | 12 | 128 | 82.9 | 165.9 |
| | | SINGLE-EYE LANDSCAPE | 1440 | 1080 | 1.56 | 1 | 1440 | 1080 | 1.56 | 10 | 30 | 12 | 128 | 46.7 | 93.3 |
| | | SINGLE-EYE LONGITUDINAL LARGE AREA | 1440 | 1920 | 2.76 | 1 | 1080 | 1440 | 2.76 | 10 | 30 | 12 | 128 | 82.9 | 165.9 |
| | | SINGLE-EYE LONGITUDINAL SMALL AREA | 480 | 640 | 0.31 | 1 | 480 | 640 | 0.31 | 10 | 30 | 12 | 128 | 9.2 | 18.4 |
| | MONITORING OPERATION | THREE-EYE LANDSCAPE WIDE ANGLE | 5280 | 1440 | 7.60 | 0.0313 | 660 | 360 | 0.24 | 10 | 30 | 6 | 128 | 3.4 | 6.8 |
| | | THREE-EYE LANDSCAPE NARROW ANGLE | 1920 | 1440 | 2.76 | 0.0625 | 480 | 360 | 0.17 | 10 | 30 | 6 | 128 | 2.5 | 4.9 |
| | | SINGLE-EYE LANDSCAPE | 1440 | 1080 | 1.56 | 0.0625 | 360 | 270 | 0.10 | 10 | 30 | 6 | 128 | 1.4 | 2.8 |
| | | SINGLE-EYE LONGITUDINAL LARGE AREA | 1440 | 1920 | 2.76 | 0.125 | 720 | 480 | 0.35 | 10 | 30 | 6 | 128 | 4.9 | 9.9 |
| | | SINGLE-EYE LONGITUDINAL SMALL AREA | 480 | 640 | 0.31 | 1 | 480 | 640 | 0.31 | 10 | 30 | 6 | 128 | 4.4 | 8.8 |
| LONGITUDINAL | MOVING IMAGE RECORDING OPERATION | THREE-EYE LANDSCAPE NARROW ANGLE | 1920 | 1440 | 2.76 | 1 | 1920 | 1440 | 2.76 | 10 | 30 | 12 | 128 | 82.9 | 165.9 |
| | | SINGLE-EYE LANDSCAPE | 1440 | 1080 | 1.56 | 1 | 1920 | 1440 | 1.56 | 10 | 30 | 12 | 128 | 46.7 | 93.3 |
| | | SINGLE-EYE LONGITUDINAL LARGE AREA | 1440 | 1920 | 2.76 | 1 | 1080 | 1440 | 2.76 | 10 | 30 | 12 | 128 | 82.9 | 165.9 |
| | | SINGLE-EYE LONGITUDINAL SMALL AREA | 480 | 640 | 0.31 | 1 | 480 | 640 | 0.31 | 10 | 30 | 12 | 128 | 9.2 | 18.4 |
| | MONITORING OPERATION | THREE-EYE LANDSCAPE NARROW ANGLE | 1920 | 1440 | 2.76 | 0.0625 | 480 | 360 | 0.17 | 10 | 30 | 6 | 128 | 2.5 | 4.9 |
| | | SINGLE-EYE LANDSCAPE | 1440 | 1080 | 1.56 | 0.25 | 720 | 540 | 0.39 | 10 | 30 | 6 | 128 | 5.6 | 11.1 |
| | | SINGLE-EYE LONGITUDINAL LARGE AREA | 1440 | 1920 | 2.76 | 0.25 | 720 | 960 | 0.69 | 10 | 30 | 6 | 128 | 9.9 | 19.7 |
| | | SINGLE-EYE LONGITUDINAL SMALL AREA | 480 | 640 | 0.31 | 1 | 480 | 640 | 0.31 | 10 | 30 | 6 | 128 | 4.4 | 8.8 |

*FIG.70A* *FIG.70B*
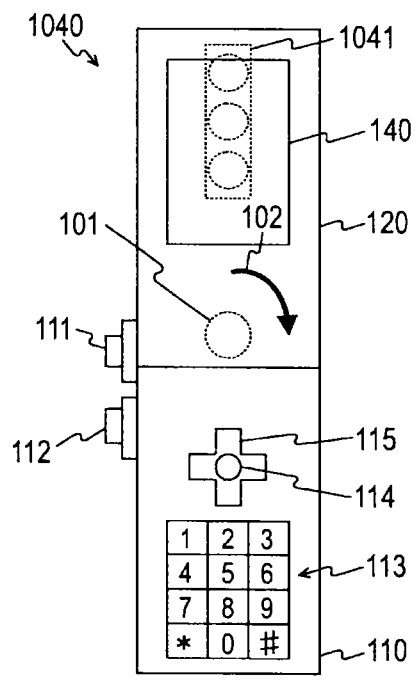 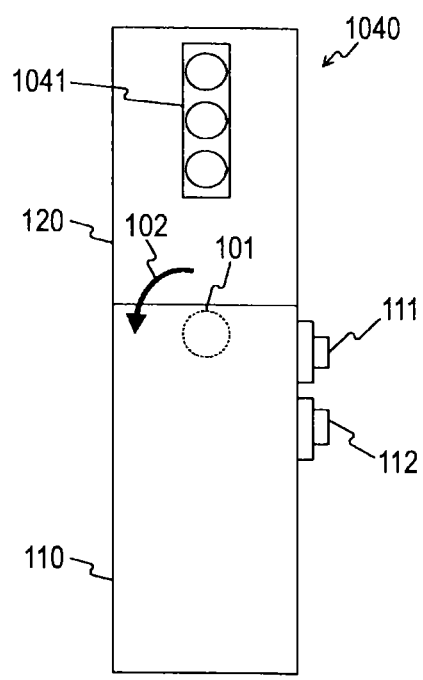
*FIG.70C* *FIG.70D*
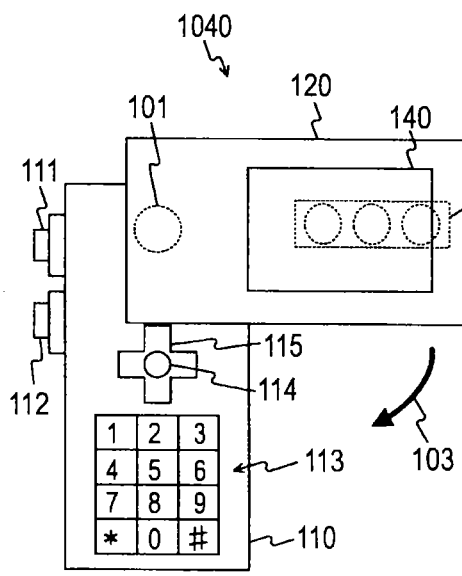 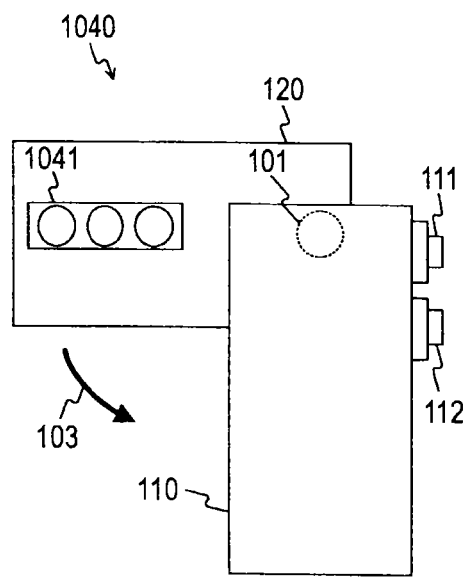

IMAGING APPARATUS INCLUDING A FIRST IMAGING SYSTEM AND A SECOND IMAGING SYSTEM

CROSS REFERENCE TO RELATED APPLICATIONS

This application is a continuation of U.S. application Ser. No. 12/858,062, filed Aug. 17, 2010, the entire content of which is incorporated herein by reference.

BACKGROUND OF THE INVENTION

1. Field of the Invention

The present invention relates to an imaging apparatus and, more particularly, to an imaging apparatus including plural imaging systems, a method of controlling the imaging apparatus, and a computer program for causing a computer to execute the method.

2. Description of the Related Art

In recent years, an imaging apparatus such as a digital still camera or a digital video camera (e.g., a recorder integrated with a camera) including an imaging system that images a subject such as a person and configured to record, as an image file, an image generated by the imaging system (a captured image) is widespread.

There is proposed an imaging apparatus including plural imaging systems and capable of generating a panorama image by combining images generated by the imaging system. For example, there is proposed an imaging apparatus including three imaging systems and configured to generate a panorama image by arranging and combining images output from the imaging systems (see, for example, JP-A-2007-166317 (FIG. 6)).

SUMMARY OF THE INVENTION

According to the related art, it is possible to easily photograph a panorama image. Therefore, for example, even when a state in which plural people dot with a famous building in the background is photographed as a composition in a sightseeing spot during a trip, it is possible to easily photograph a panorama image including the people. For example, there is assumed to be a user who desires to photograph an image with a composition including, among subjects included in the panorama image, a person located near the center and a high building present in the background of the person. In this case, it is possible to perform photographing with the desired composition by, for example, rotating the imaging apparatus 90 degrees around an optical axis such that an image long in the vertical direction is obtained.

It is assumed that the panorama image and the image long in the vertical direction are photographed. In this case, it is possible to photograph the image long in the vertical direction by, for example, rotating the imaging apparatus 90 degrees after photographing the panorama image. However, for example, for a person unaccustomed to treatment of the imaging apparatus, it is assumed to be difficult to rotate the imaging apparatus 90 degrees after photographing the panorama image to set a desired composition. For example, as explained above, when the photographing is performed in a sightseeing spot during a trip, photographing timing is important because the people move in some case. However, if time for setting the desired composition after rotating the imaging apparatus is long, it is likely that the photographing timing is missed.

Therefore, it is desirable to easily photograph a user's favorite image.

According to an embodiment of the present invention, there is proposed an imaging apparatus including: an imaging unit that respectively generates, with imaging devices different from one another, a first captured image with a specific direction of a subject set in a longitudinal direction, a second captured image with an orthogonal direction orthogonal to the specific direction set in a longitudinal direction and including a subject adjacent to one side of the orthogonal direction of the subject included in the first captured image, and a third captured image with the orthogonal direction set in a longitudinal direction and including a subject adjacent to the other side of the orthogonal direction of the subject included in the first captured image; a detecting unit that detects a state of the imaging apparatus; and a control unit that determines, on the basis of the detected state, a range of a target image as a target of display or recording among the first to third captured images generated by the imaging unit, a method of controlling the imaging apparatus, and a computer program for causing a computer to execute the method. Therefore, there is an action that the range of the target image as the target of display or recording among the first to third captured images generated by the imaging unit is determined on the basis of the detected state of the imaging apparatus.

The embodiment may be configured such that the imaging apparatus further includes: a first housing including the imaging unit; a second housing including a display unit that displays the target image; and a pivoting member that pivotably couples the first housing and the second housing, and the detecting unit detects, as the state of the imaging apparatus, a pivoting state of the second housing with respect to the first housing. Therefore, there is an action that the pivoting state of the second housing with respect to the first housing is detected as the state of the imaging apparatus.

The embodiment may be configured such that the detecting unit detects, as the state of the imaging apparatus, a first specific state in which the longitudinal direction of the display unit and a longitudinal direction of a first imaging device that generates the first captured image are substantially parallel to each other, and the control unit determines that, when the first specific state is detected, only the first captured image is used as the target image. Therefore, there is an action that it is determined that, when the first specific state is detected, only the first captured image is used as the target image.

The embodiment may be configured such that the control unit determines that, when the first specific state is detected, the entire first captured image is used as the target image. Therefore, there is an action that, when the first specific state is detected, the entire first captured image is used as the target image.

The embodiment may be configured such that the detecting unit detects, as the state of the imaging apparatus, a second specific state in which the orthogonal direction orthogonal to the longitudinal direction of the display unit and a longitudinal direction of a first imaging device that generates the first captured image are substantially parallel to each other, and the control unit determines that, when the second specific state is detected, the first to third captured images are used as the target image. Therefore, there is an action that it is determined that, when the second specific state is detected, the first to third captured images are used as the target image.

The embodiment may be configured such that the control unit determines that, when the second specific state is detected, a combined image generated by combining parts of the first captured image and the second and third captured images is used as the target image. Therefore, there is an action that it is determined that, when the second specific state is detected, the combined image generated by combining parts of the first captured image and the second and third captured images is used as the target image.

The embodiment may be configured such that the pivoting member couples the first housing and the second housing such that one surface of the first housing and one surface of the second housing are opposed to each other, a group of lenses respectively corresponding to the imaging devices included in the imaging unit are arranged side by side on a surface on the opposite side of the one surface of the first housing, and the display unit is provided on a surface on the opposite side of the one surface of the second housing. Therefore, there is an action that the control unit causes the display unit provided on the surface on the opposite side to display a captured image generated by the imaging unit.

The embodiment may be configured such that the pivoting member couples the first housing and the second housing such that a display surface in the display unit and an optical axis direction of the group of lenses corresponding to the first imaging device that generates the first captured image are substantially perpendicular. Therefore, there is an action that the first captured image including the subject present in the optical axis direction substantially perpendicular to the display unit is generated.

The embodiment may be configured such that the imaging apparatus further includes an image combining unit that combines parts of the first captured image and the second and third captured images to generate a combined image, and the control unit determines that, when the detected state is the specific state, the combined image is used as the target image. Therefore, there is an action that it is determined that, when the detected state of the imaging apparatus is the specific state, the combined image is used as the target image.

The embodiment may be configured such that the image combining unit generates a substantially rectangular image as the combined image. Therefore, there is an action that a substantially rectangular image is generated as the combined image.

The embodiment may be configured such that the control unit switches, on the basis of the detected state, compound-eye imaging operation performed by using the plural imaging devices included in the imaging unit and single-eye imaging operation performed by using only a first imaging device, which generates the first captured image, and determines a range of the target image. Therefore, there is an action that the compound-eye imaging operation and the single-eye imaging operation are switched on the basis of the detected state of the imaging apparatus to determine a range of the target image.

The embodiment may be configured such that the control unit stops, when the compound-eye imaging operation is switched to the single-eye imaging operation, operation of imaging devices that generate the second and third captured images. Therefore, there is an action that, when the compound-eye imaging operation is switched to the single-eye imaging operation, the operation of the imaging devices that generate the second and third captured images is stopped.

The embodiment may be configured such that the control unit determines that, when the single-eye imaging operation is switched to the compound-eye imaging operation, a clock of a predetermined frequency is used for the compound-eye imaging operation and, when the compound-eye imaging operation is switched to the single-eye imaging operation, a clock of a frequency lower than the predetermined frequency is used for the single-eye imaging operation. Therefore, there is an action that it is determined that, when the single-eye imaging operation is switched to the compound-eye imaging operation, the clock of the predetermined frequency is used for the compound-eye imaging operation and, when the compound-eye imaging operation is switched to the single-eye imaging operation, the clock of the frequency lower than the predetermined frequency is used for the single-eye imaging operation.

The embodiment may be configured such that the control unit subjects, when a pivoting state of the second housing with respect to the first housing is a specific state, the target image to rotation processing and causes the display unit to display the target image. Therefore, there is an action that, when a pivoting state of the second housing with respect to the first housing is the specific state, the target image is subjected to rotation processing and displayed on the display unit.

According to another embodiment of the present invention, there is provided an imaging apparatus including: an imaging unit that respectively generates, with imaging devices different from one another, a first captured image with a specific direction of a subject set in a longitudinal direction, a second captured image with an orthogonal direction orthogonal to the specific direction set in a longitudinal direction and including a subject adjacent to one side of the orthogonal direction of the subject included in the first captured image, and a third captured image with the orthogonal direction set in a longitudinal direction and including a subject adjacent to the other side of the orthogonal direction of the subject included in the first captured image; an operation receiving unit that receives instruction operation for instructing a change of an imaging range; and a control unit that determines, on the basis of the received instruction operation, a range of a target image as a target of display or recording among the first to third captured images generated by the imaging unit, a method of controlling the imaging apparatus, and a computer program for causing a computer to execute the method. Therefore, there is an action that the range of the target image as the target of display or recording among the first to third captured images generated by the imaging unit is determined on the basis of the received instruction operation.

According to the embodiments of the present invention, it is possible to realize an excellent effect that it is possible to easily photograph a user's favorite image.

BRIEF DESCRIPTION OF THE DRAWINGS

FIG. 3 is a diagram of an internal configuration example of an imaging unit in the first embodiment;

FIG. 14 is a schematic timing chart of states of control signals to pixels in the imaging device and data output from the pixels in the first embodiment;

FIG. 15 is a schematic timing chart of states of control signals to the pixels of the imaging device and data output from the pixels in the first embodiment;

FIG. 50 is a diagram of a relation between control methods for stopping the operation of the imaging systems and signal lines in the first embodiment;

FIGS. 54A and 54B are diagrams of a relation between a clock frequency for readout of pixels in the imaging devices and writing in the image buffers and a clock frequency for reading out image data from the image buffer in the first embodiment;

FIGS. 56A and 56B are schematic diagrams of a relation between processing for occupying a data bus and time in the first embodiment;

FIG. 57 is a diagram of an example of parameters for determining operation frequencies of the data bus 204 concerning respective kinds of imaging operation of the cellular phone apparatus 100 in the first embodiment;

FIG. 58 is a diagram of an example of parameters for determining operation frequencies of the data bus concerning the respective kinds of imaging operation of the cellular phone apparatus in the first embodiment;

FIG. 59 is a schematic diagram of time division processing performed by the image-signal processing unit in the first embodiment;

FIGS. 60A and 60B are schematic diagrams of the time division processing performed by the image-signal processing unit in the first embodiment;

FIG. 61 is a diagram of an example of parameters for determining operation frequencies of the data bus concerning still image recording operation of the cellular phone apparatus in the first embodiment;

FIG. 62 is a diagram of an example of parameters for determining operation frequencies of the data bus concerning the moving image recording operation of the cellular phone apparatus in the first embodiment;

FIGS. 70A to 70D are diagrams of a modification of the cellular phone apparatus in the first embodiment;

DESCRIPTION OF THE PREFERRED EMBODIMENTS

Modes for carrying out the present invention (hereinafter referred to as embodiments) are explained below. The embodiments are explained in the following order.

1. First embodiment (imaging control: example in which single-eye imaging operation and composite-eye imaging operation are performed in cellular phone apparatus); and
2. Second embodiment (imaging control: example in which single-eye imaging operation and composite-eye imaging operation are performed in imaging apparatus).

1. First Embodiment

External Configuration Example of Cellular Phone Apparatus

Figure 1A:
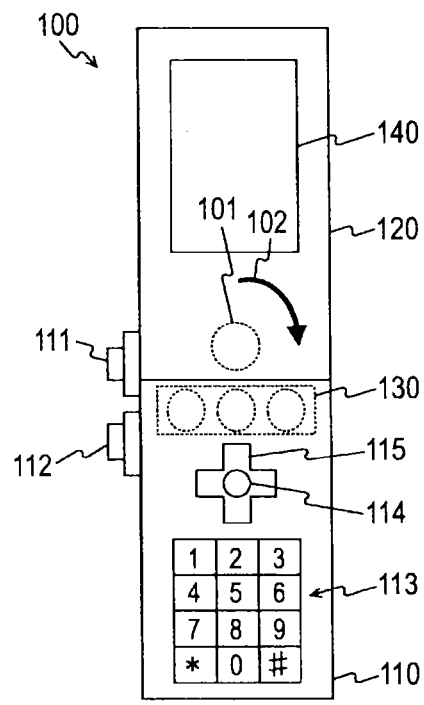
FIGS. 1A to 1D are diagrams of an external configuration example of a cellular phone apparatus in a first embodiment of the present invention.
Figure 1B:
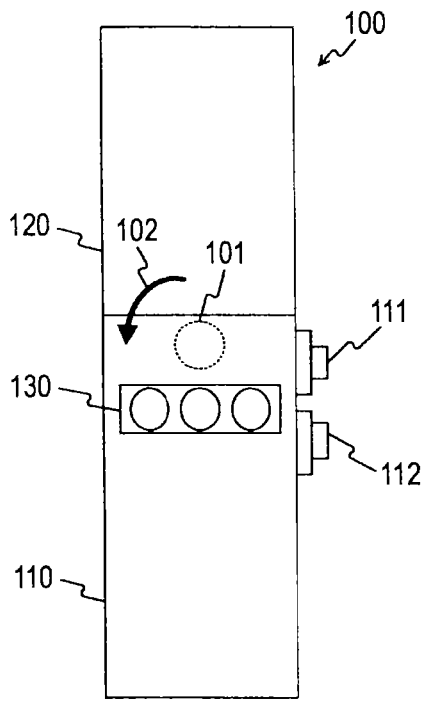
Figure 1C:
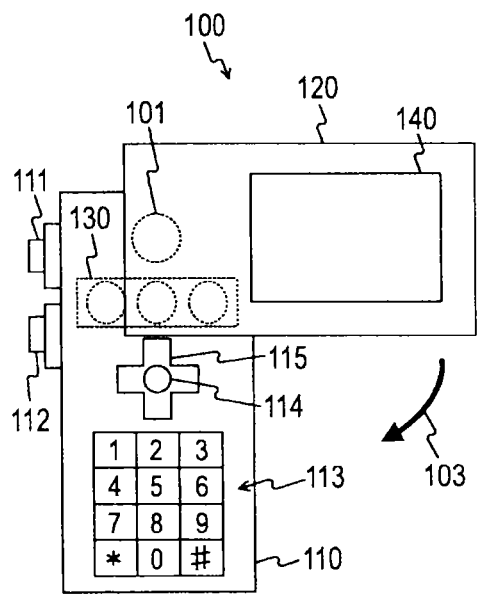
Figure 1D:
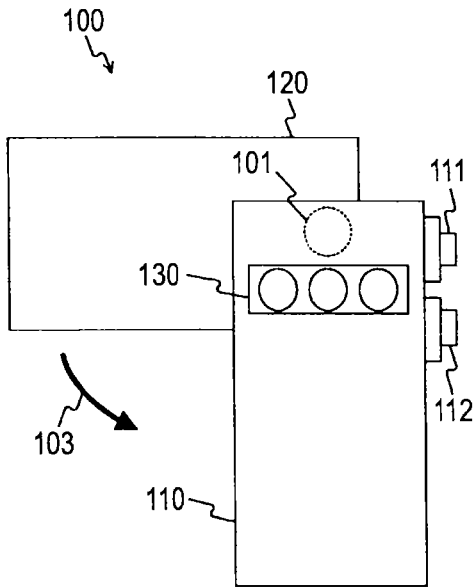

FIGS. 1A to 1D are diagrams of an external configuration example of a cellular phone apparatus 100 according to a first embodiment of the present invention. In FIG. 1A, a front side of a form in using the cellular phone apparatus 100 is shown. In FIG. 1B, a rear side of the form is shown. In FIG. 1C, a front side of another form in using the cellular phone apparatus 100 is shown. In FIG. 1D, a rear side of the form is shown.

The cellular phone apparatus 100 includes a first housing 110 and a second housing 120. The first housing 110 and the second housing 120 are pivotably coupled with a pivoting member 101 as a pivotal reference. The cellular phone apparatus 100 is realized by, for example, a cellular phone apparatus (so-called cellular phone apparatus with camera) having plural imaging functions. In FIGS. 1A to 1D, for ease of explanation, the cellular phone apparatus 100 is shown in a simplified form. A power switch and the like provided on the outer surface of the cellular phone apparatus 100 are not shown.

The first housing 110 includes an imaging range changeover switch 111, a still image/moving image changeover switch 112, a ten key 113, a determination key 114, a cross key 115, and an imaging unit 130. When a user holds and uses the cellular phone apparatus 100, the user needs to grip some part of the cellular phone apparatus 100 with the hand. For example, during normal use, the cellular phone apparatus 100 is often used in a state in which the user grips some part of the first housing 110 (so-called main body housing) with the hand.

The imaging range changeover switch 111 is an operation member for switching an imaging range in generating image data with the imaging unit 130. Every time the imaging range changeover switch 111 is depressed by user operation, the imaging range is sequentially switched. The switching of the imaging range is explained in detail later with reference to FIGS. 28A and 28B to FIGS. 42A and 42B. The imaging range changeover switch 111 is an example of an operation receiving unit described in the appended claims.

The still image/moving image changeover switch 112 is an operation member used in switching an imaging mode to a still image imaging mode for recording a still image and a moving image imaging mode for recording a moving image. The imaging range changeover switch 111 and the still image/moving image changeover switch 112 are so-called toggle switches.

The ten key 113 is an operation member for inputting numbers, signs, and the like.

The determination key 114 is an operation member depressed by the user in setting various functions. For example, when the determination key 114 is depressed when the still image imaging mode is set, the determination key 114 functions as a shutter button.

The cross key 115 is an operation key depressed in changing a selection state of items displayed on a display screen and in moving an object displayed on the display screen in up to down and left to right directions.

The imaging unit 130 images a subject and generates image data. In FIG. 1A, a position on the front side corresponding to the imaging unit 130 shown in FIG. 1B is indicated by a dotted line. Circles in the imaging unit 130 shown in FIG. 1B schematically indicate lenses of plural imaging systems included in the imaging unit 130. In the first embodiment, the imaging unit 130 in which a group of three lenses are arranged side by side in a specific direction is explained as an example. The specific direction can be, for example, the horizontal direction when a longitudinal direction of the first housing 110 is set in the vertical direction.

The second housing 120 includes a display unit 140. The display unit 140 is a display device that displays various images. For example, an image generated by imaging operation is displayed in the display unit 140 as a monitoring image. As the display unit 140, for example, an LCD (Liquid Crystal Display) panel or an organic EL (Electro Luminescence) panel can be used. An aspect ratio of a display device included in a cellular phone apparatus with camera or a general imaging apparatus is often 4:3 or 16:9. Therefore, in an example explained in the first embodiment, an aspect ratio of the display unit 140 is set to 4:3 when a longitudinal direction of the second housing 120 is set in the horizontal direction.

As explained above, the first housing 110 and the second housing 120 are pivotably coupled. Specifically, the second housing 120 can be pivoted with respect to the first housing 110 with the pivoting member 101 (indicated by a dotted line) as a pivotal reference. This makes it possible to change a relative positional relation of the second housing 120 with respect to the first housing 110. For example, a form in which the second housing 120 is pivoted 90 degrees in a direction of an arrow 102 shown in FIGS. 1A and 1B is shown in FIGS. 1C and 1D.

The cellular phone apparatus 100 shown in FIGS. 1C and 1D is the same as the example shown in FIGS. 1A and 1B except that the second housing 120 is rotated 90 degrees with respect to the first housing 110 with the pivoting member 101 as a pivotal reference. When the second housing 120 is further pivoted 90 degrees in a direction of an arrow 103, the cellular phone apparatus 100 changes to an unused state (so-called closed state). By pivoting the second housing 120 with respect to the first housing 110 in this way, at least two or more positional relations can be taken as the relative positional relation of the second housing 120 with respect to the first housing 110. It is also possible to pivot the second housing 120 in a direction opposite to the direction of the arrow 102 with the pivoting member 101 as a pivotal reference. However, in the first embodiment, illustration and explanation of these forms are omitted.

A state in which the longitudinal direction of the first housing 110 and the longitudinal direction of the second housing 120 are set in the same direction and the display unit 140 and the ten key 113 are opposed to each other across the pivoting member 101 as shown in FIGS. 1A and 1B is referred to as portrait state of the second housing 120. Imaging operation performed when the longitudinal directions of the first housing 110 and the second housing 120 is set in the vertical direction in this state is referred to as portrait state imaging operation.

A state in which the longitudinal direction of the first housing 110 and the longitudinal direction of the second housing 120 are substantially orthogonal to each other as shown in FIGS. 1C and 1D is referred to as landscape state of the second housing 120. Imaging operation performed when the longitudinal direction of the first housing 110 is set in the vertical direction and the longitudinal direction of the second housing 120 is set in the horizontal direction in this state is referred to as landscape imaging operation.

[Internal Configuration Example of the Cellular Phone Apparatus]

Figure 2:
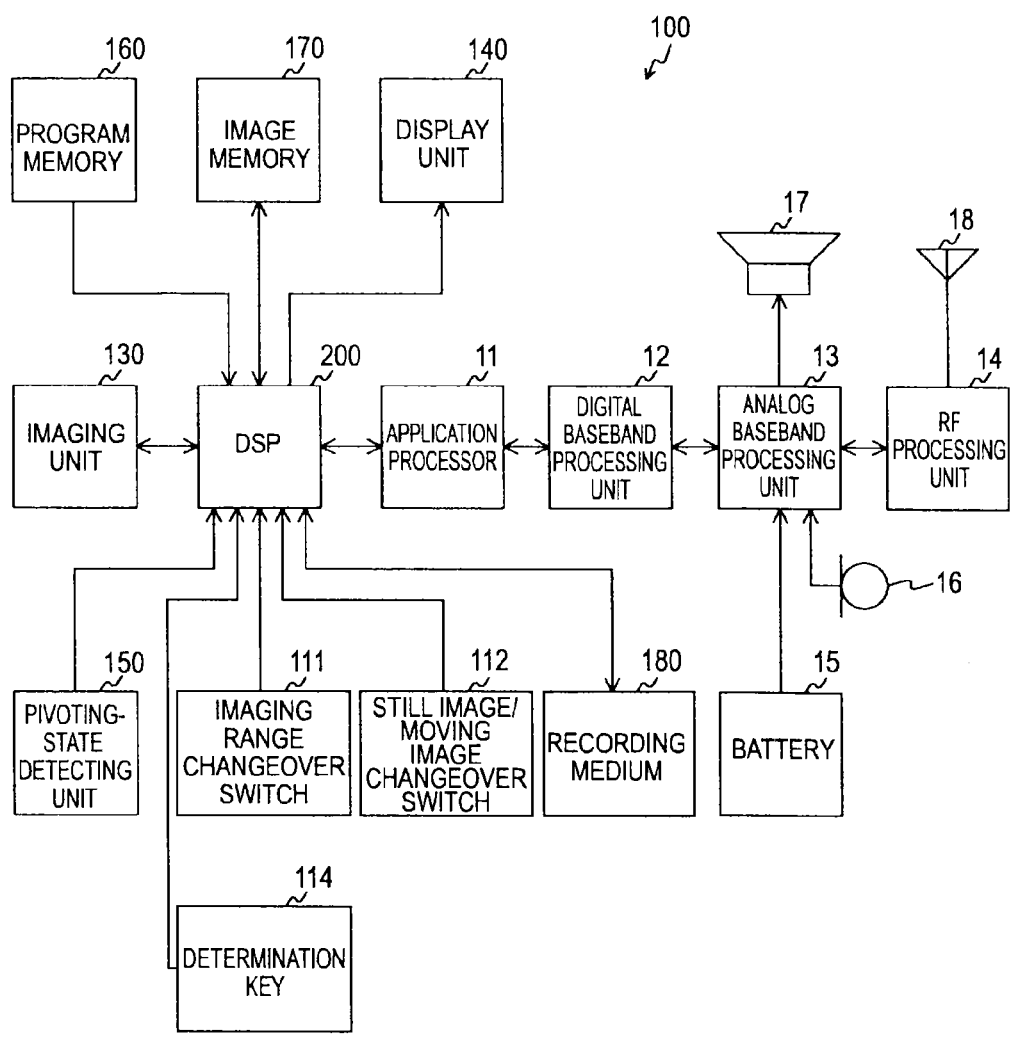
FIG. 2 is a diagram of an internal configuration example of the cellular phone apparatus in the first embodiment.

FIG. 2 is a diagram of an internal configuration example of the cellular phone apparatus 100 in the first embodiment. The cellular phone apparatus 100 includes an application processor 11, a digital baseband processing unit 12, an analog baseband processing unit 13, and an RF (Radio Frequency) processing unit 14. The cellular phone apparatus 100 includes a battery 15, a microphone 16, a speaker 17, an antenna 18, the imaging range changeover switch 111, the still image/moving image changeover switch 112, the determination key 114, the imaging unit 130, and the display unit 140. Further, the cellular phone apparatus 100 includes a pivoting-state detecting unit 150, a program memory 160, the image memory 170, a recording medium 180, and the DSP (Digital Signal Processor) 200. The antenna 18 is provided in the RF processing unit 14. The microphone 16 and the speaker 17 are provided in the analog baseband processing unit 13.

The application processor 11 controls the units of the cellular phone apparatus 100 on the basis of various computer programs stored in a memory incorporated therein. The application processor 11 includes, for example, a CPU (Central Processing Unit), a ROM (Read Only Memory), and a RAM (Random Access Memory).

For example, when speech receiving operation is performed, a radio wave received by the antenna 18 is demodulated by the digital baseband processing unit 12 through the RF processing unit 14 and the analog baseband processing unit 13. A result of the demodulation by the digital baseband processing unit 12 is output from the speaker 17 through the analog baseband processing unit 13.

When speech sending operation is performed, sound input from the microphone 16 is modulated by the digital baseband processing unit 12 through the analog baseband processing unit 13. Demodulated sound data is transmitted from the antenna 18 through the analog baseband processing unit 13 and the RF processing unit 14.

When start instruction operation for imaging operation is performed by the user, the imaging operation is performed in the cellular phone apparatus 100. For example, when the start instruction operation for the imaging operation is performed by the user, the application processor 11 instructs the units related to the imaging operation (the imaging unit 130, the DSP 200, etc.) to start the imaging operation and starts the units. The imaging operation is performed by the started units and a generated image is displayed in the display unit 140. When recording instruction operation for an image is performed by the user, the generated image is recorded in the recording medium 180. When instruction operation for transmitting an image by radio is performed by the user, the generated image is transmitted by radio. For example, generated image data is modulated by the digital baseband processing unit 12 and transmitted from the antenna 18 through the analog baseband processing unit 13 and the RF processing unit 14. The battery 15 is a battery that supplies power to the cellular phone apparatus 100.

The switches 111 and 112, the determination key 114, the imaging unit 130, the display unit 140, the pivoting-state detecting unit 150, the program memory 160, the image memory 170, the recording medium 180, and the DSP 200 are explained in detail later with reference to FIGS. 3, 7, and the like.

[Internal Configuration Example of Imaging Unit]

FIG. 3 is a diagram of an internal configuration example of the imaging unit 130 in the first embodiment. In FIG. 3, a part of the DSP 200 connected to the imaging unit 130 is shown. The overall configuration of the DSP 200 is explained in detail later with reference to FIGS. 7 and 8.

The imaging unit 130 includes three imaging systems (a first to third imaging systems 191 to 193), a power-supply control unit 207, and power supply units 208 and 209. The three imaging systems are arranged side by side in a specific direction. Specifically, the first imaging system 191 is arranged in the center and the second and third imaging systems 192 and 193 are arranged on both sides of the first imaging system 191.

The first imaging system 191 includes an optical system 131, an imaging device 134, and a DSP I/F (interface) 137. The second imaging system 192 includes an optical system 132, an imaging device 135, and a DSP I/F 138. The third imaging system 193 includes an optical system 133, an imaging device 136, and a DSP I/F 139. Since the configurations of the first to third imaging systems 191 to 193 are substantially the same, the configuration of the first imaging system 191 is mainly explained and explanation of the second and third imaging systems 192 and 193 is omitted.

The optical system 131 includes plural lenses (including a zoom lens and a focus lens) that condense light from a subject. An amount of light transmitted through these lenses (i.e., exposure) is adjusted by a stop (not shown). The condensed light from the subject is made incident on the imaging device 134.

The imaging device 134 is an imaging device that focuses a subject image made incident via the optical system 131 and generates an image signal. Specifically, the imaging device 134 receives the light from the subject made incident via the optical system 131 and performs photoelectric conversion to thereby generate an analog image signal corresponding to an amount of the received light. The analog image signal generated by the imaging device 134 in this way is supplied to the DSP 200 via the DSP I/F 137. As the imaging device, for example, a solid-state imaging device of a CCD (Charge Coupled Device) type or a CMOS (Complementary Metal Oxide Semiconductor) type can be used.

The DSP I/F 137 is an interface for connecting the imaging device 134 and the DSP 200.

The power-supply control unit 207 controls the power supply units 208 and 209 on the basis of an instruction for power control from an imaging control unit 201 (shown in FIG. 7) of the DSP 200. Specifically, when the power-supply control unit 207 receives the instruction for power control from the imaging control unit 201, the power-supply control unit 207 creates a signal conforming to the amplitude of a signal and rising speed and falling speed of the signal requested as input specifications of a control signal by the power supply units 208 and 209. The power-supply control unit 207 outputs the created signal to the power supply units 208 and 209 and controls the power supply units 208 and 209. When an output signal of the imaging control unit 201 conforms to the input specifications of the control signal of the power supply units 208 and 209, the output signal of the imaging control unit 201 may be directly input to the power supply units 208 and 209.

The power supply unit 208 supplies power to the first imaging system 191 on the basis of the control by the power-supply control unit 207. The power supply unit 209 supplies power to the second and third imaging systems 192 and 193 on the basis of the control by the power-supply control unit 207. The power supply units 208 and 209 are realized by, for example, a commercially-available power supply IC (Integrated Circuit).

Each of the first to third imaging systems 191 to 193 is connected to the DSP 200 via one data line and seven kinds of signal lines. The one data line for connecting the first imaging system 191 and the DSP 200 is represented as L1 and the seven kinds of signal lines are represented as L2 to L8. Data lines and signal lines of the second and third imaging systems 192 and 193 are substantially the same as the data line and the signal lines of the first imaging system 191. Therefore, the data line and the signal lines of the first imaging system 191 are mainly explained. Explanation of the second and third imaging systems 192 and 193 is omitted.

The data line L1 is a data line for transmitting image data from the imaging device 134 to the DSP 200. The data line L1 desirably includes, for example, plural data lines in order to increase a transmission rate of the image data. It is desirable to use a high-speed data line of a differential transmission system as the data line L1 in order to increase a transmission rate of the image data and increase noise resistance on a transmission line. For example, it is desirable to use LVDS (low voltage differential signaling) as the data line L1.

The signal line L2 is a bidirectional communication line between the imaging device 134 and the DSP 200. For example, a four-line structure serial communication line can be used. For example, the signal line L2 is used in setting, from the DSP 200 side, various setting values necessary for using the imaging device 134. As an example, a setting value for thinning out and outputting image data output from the imaging device 134 to the DSP 200 is written in registers 370 and 380 (shown in FIG. 12) from the DSP 200 via the signal line L2.

The signal line L3 is a clock signal line for supplying a clock from the DSP 200 to the imaging device 134. The imaging device 134 performs imaging operation for one pixel per one clock period using the clock supplied via the signal line L3. It is also possible to provide a multiplier in the imaging device 134, multiply the clock supplied from the DSP 200 in the imaging device 134, and perform imaging operation for one pixel per one clock period after the multiplication.

The signal line L4 is a reset signal line for supplying a reset signal from the DSP 200 to the imaging device 134.

The signal line L5 is a signal line for controlling ON and OFF of the imaging operation of the imaging device 134 from the DSP 200. Specifically, the signal line L5 is a signal line for notifying stop and start of operation from the DSP 200 to the imaging devices. For example, when an imaging mode for using only one imaging device among the three systems is instructed by the user, power consumption can be reduced by stopping imaging operation of the two imaging devices not in use.

The signal line L6 is a vertical synchronization signal line. Specifically, the signal line L6 is a signal line for notifying a synchronization signal indicating imaging timing for each frame from the DSP 200 to the imaging device 134.

The signal line L7 is a horizontal synchronization signal line. Specifically, the signal line L7 is a signal line for notifying a synchronization signal indicating imaging timing for each line in one frame from the DSP 200 to the imaging device 134.

The signal line L8 is a shutter signal line. For example, when an operation member (e.g., the determination key 114) for performing captured image recording is depressed by the user in the cellular phone apparatus 100, a shutter signal corresponding to this depression is notified from the DSP 200 to the imaging device 134 via the signal line L8.

[Arrangement Configuration Example of Imaging Devices]

Figure 4A:
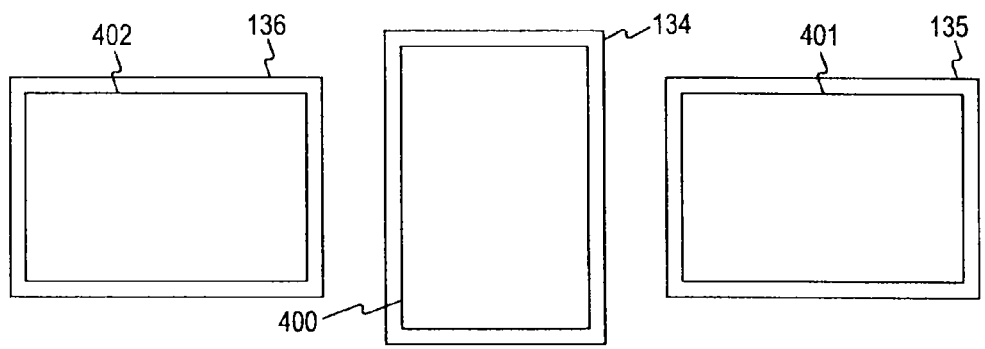
FIGS. 4A to 4C are diagrams of arrangement configuration examples of imaging devices included in the imaging unit in the first embodiment.
Figure 4B:
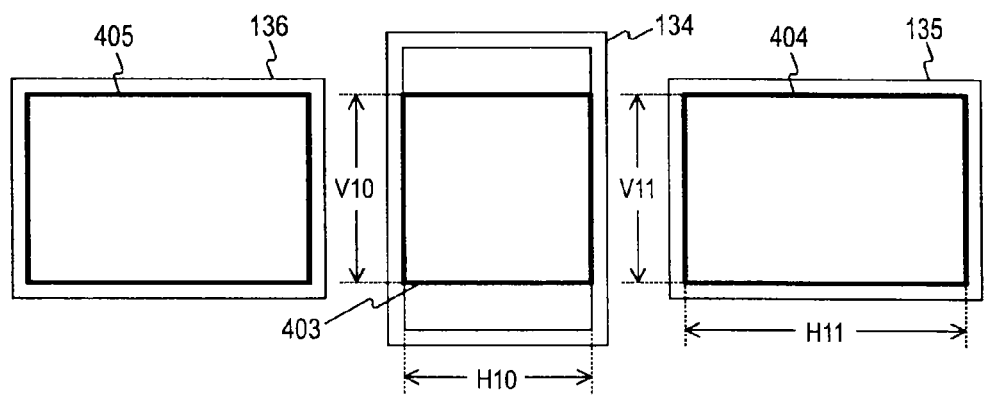
Figure 4C:
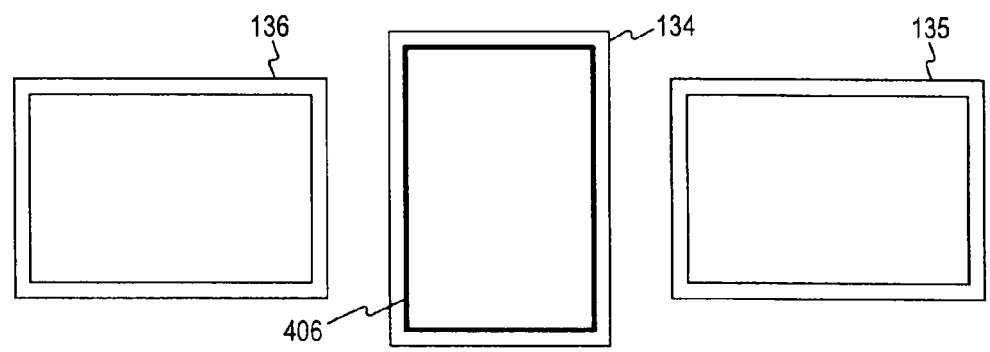

FIGS. 4A to 4C are diagrams of arrangement configuration examples of the imaging devices 134 to 136 included in the imaging unit 130 in the first embodiment. In FIG. 4A, arrangement configurations of the imaging devices 134 to 136 are shown. In general, a shape of an area where pixels are arrayed on a light receiving surface of an imaging device is a substantially rectangular shape. Therefore, in the following explanation, the imaging devices 134 to 136 are schematically represented by rectangles.

In FIG. 4A, an arrangement configuration example in setting the longitudinal direction of the first housing 110 in the vertical direction to set the pivoting member 101 side on the upper side is shown. Specifically, the imaging device 134 is arranged in the center and the imaging devices 135 and 136 are arranged on both sides of the imaging device 134. The imaging device 134 arranged in the center is arranged such that a longitudinal direction thereof coincides with a direction orthogonal to an arraying direction. On the other hand, the imaging devices 135 and 136 arranged on both the sides of the imaging device 134 are arranged such that a longitudinal direction thereof coincides with the arraying direction. The imaging devices 134 to 136 are arranged such that center positions thereof are on the same plane. Specifically, in the arraying direction, the imaging devices 135 and 136 are arranged in landscape and the imaging device 134 is arranged in portrait. In FIG. 4A, pixel data readout possible areas 400 to 402 where pixels can be read out are schematically indicated by rectangles in the imaging devices 134 to 136. For example, a first captured image with a specific direction of a subject set in a longitudinal direction is generated by the imaging device 134. A second captured image with an orthogonal direction orthogonal to the specific direction set in a longitudinal direction and including a subject adjacent to one side of the orthogonal direction of the subject included in the first captured image is generated by the imaging device 135. A third image with the orthogonal direction set in a longitudinal direction and including a subject adjacent to the other side of the orthogonal direction of the subject included in the first captured image is generated by the imaging device 136. In this way, in the first embodiment, an aspect ratio of the imaging device 134 in the center is set smaller than an aspect ratio of the imaging devices 135 and 136 arranged on both the sides of the imaging device 134. Consequently, even when a portrait image is generated by using only the imaging device 134, it is possible to maintain sufficient resolution. On the other hand, concerning a wide-angle image (e.g., a panorama image) generated by using the imaging devices 134 to 136, it is possible to effectively utilize an image frame of the imaging device 134.

In FIG. 4B, an example of a pixel data readout area in which image data is generated when the second housing 120 is in the portrait state is shown. Pixel data readout areas 403 to 405 are examples of areas from which pixels are read out when image data used for display or recording are generated in the pixel data readout possible areas 400 to 402. In FIG. 4B, contours of the pixel data readout areas 403 to 405 are indicated by thick lines. The pixel data readout areas 404 and 405 can be set the same as, for example, the pixel data readout possible areas 401 and 402. In the pixel data readout area 403, length V10 in the vertical direction can be set the same as length V11 in the vertical direction of the pixel data readout possible areas 401 and 402 and length H10 in the horizontal direction can be set the same as length in the horizontal direction of the pixel data readout possible area 400.

In FIG. 4C, an example of a pixel data readout area in which image data is generated when the second housing 120 is in the landscape state. In this example, a pixel data readout area 406 in which image data is generated by only the imaging device 134 among the imaging devices 134 to 136 is shown. The pixel data readout area 406 is an example of an area where pixels are read out in generating a combined image used for display or recording in the pixel data readout possible areas 400 to 402. In FIG. 4C, a contour of the pixel data readout area 406 is indicated by a thick line. The pixel data readout area 406 can be set the same as, for example, the pixel data readout possible area 400. These image generation examples are explained in detail later with reference to FIGS. 28A and 28B to FIGS. 42A to 42C.

For example, an imaging apparatus in which the imaging devices 134 to 136 are arranged such that the longitudinal directions of the imaging devices 134 to 136 coincide with the specific direction is assumed. Specifically, it is assumed that, in a state shown in FIG. 4A, the imaging device 134 is arranged to be rotated 90 degrees and the longitudinal direction and the arraying direction of the imaging devices 134 to 136 are the same. In this case, when a still image having normal longitudinal length is photographed, the number of pixels in the vertical direction is only the number of pixels in a short side direction of the imaging device 134 at the maximum. An angle of view in the vertical direction is limited to an area in which light is made incident in the short side direction of the imaging device 134. Therefore, in order to increase the angle of view in the vertical direction and increase the number of pixels in the vertical direction to perform imaging, the user needs to rotate the imaging apparatus 90 degrees and perform photographing.

On the other hand, according to the first embodiment, even when the still image having the normal longitudinal length is photographed, it is possible to perform photographing with the number of pixels and an angle of view same as the number of pixels and an angle of view with which the user performs photographing with a cellular phone apparatus including one imaging system laid sideways. Therefore, it is possible to reduce labor and time of the user for directing the imaging apparatus sideways.

A readout method for reading out data in one line in the imaging devices 134 to 136 is explained. For example, as a data readout method for reading out data in one line in the imaging devices 134 to 136, two methods explained below can be used.

Figure 6A:
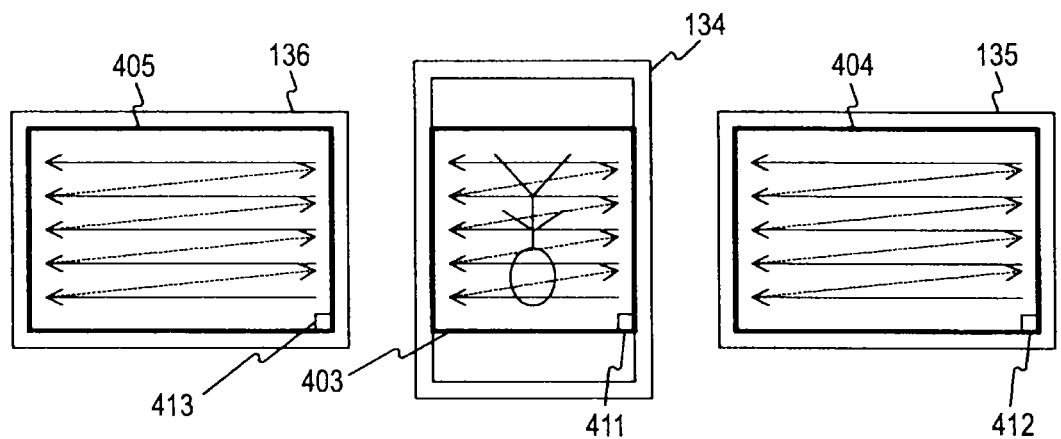
FIGS. 6A to 6C are diagrams of a relation between images focused on the imaging devices and a method of reading out image data in the first embodiment.

A first data readout method is a method in which, when data in one line in the imaging device 134 is read out, a direction of the one line is set in a short side direction of a rectangle corresponding to the imaging device 134. In the first data readout method, when data in one line in the imaging devices 135 and 136 is read out, a direction of the one line is set in a long side direction of a rectangular area corresponding to the imaging devices 135 and 136. An example of this method is shown in FIG. 6A. In the first data readout method, image data read out from the three imaging devices 134 to 136 can be written in the image memory 170 in the order of the readout. Even when the data are read out and image signal processing is performed, since the data can be read out in the same order, writing and readout of the data in and from the memory can be easily performed. However, in general, since a readout line direction is a longitudinal direction in an imaging device, it is necessary to prepare anew an imaging device in which a readout line direction is a short side direction.

A second data readout method is a method in which, when data in one line of the imaging device 134 is read out, a direction of the one line is set in a long side direction as in the imaging devices 135 and 136. In this case, it is unnecessary to prepare anew an imaging device in which a readout direction is a short side direction. However, a readout direction of image data of the imaging device 134 is rotated 90 degrees from a readout direction of image data of the imaging devices 135 and 136. Therefore, when the image signal processing is performed by using the image data read out from the imaging device 134, it is desirable to perform the image signal processing after rotating an image of the image data 90 degrees to set the image in a direction same as the direction of an image generated by the imaging devices 135 and 136. In the first embodiment, an example in which the first data readout method is used is explained. Specifically, in the following explanation, a line direction in reading out pixel data in one line in the imaging device 134 is set in the arraying direction of the imaging devices 134 to 136. Similarly, a line direction in reading out pixel data in one line in the imaging devices 135 and 136 is set in the arraying direction of the imaging devices 134 to 136.

FIG. 5 and FIGS. 6A to 6C are diagrams of a relation between images focused on the imaging devices 134 to 136 and a method of reading out image data in the first embodiment. In general, an inverted image is focused on an imaging device.

Figure 5:
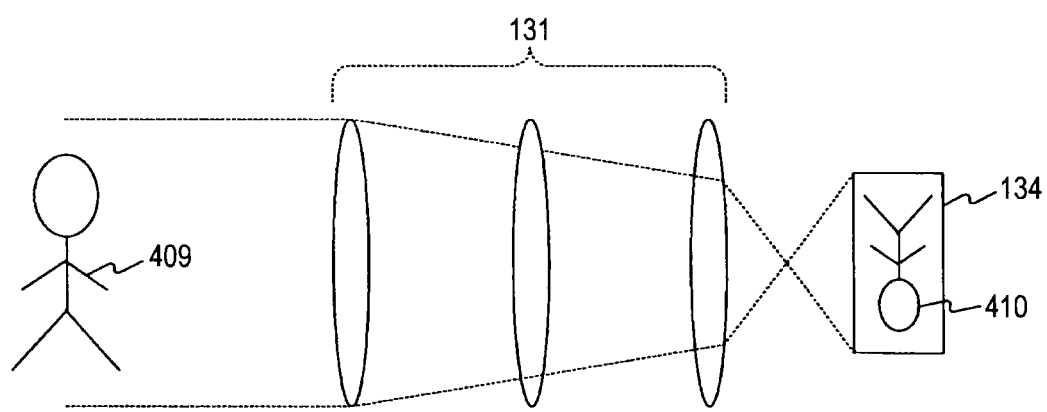
FIG. 5 is a diagram of a relation between images focused on the imaging devices and a method of reading out image data in the first embodiment.

FIG. 5 is a schematic diagram of a relation among the subject 409, the optical system 131, and a captured image 410 focused on the imaging device 134 when an inverted image is generated as an image focused on an imaging device. As shown in FIG. 5, light from the subject 409 made incident via the optical system 131 is focused on the imaging device 134 and the captured image 410 is generated. In this case, an up to down direction of the subject 409 and an up to down direction of the captured image 410 are reversed.

FIG. 6A is a schematic diagram of readout start positions 411 to 413 and a readout direction in reading out pixel data from the imaging devices 134 to 136. In this example, pixel data are read out in the pixel data readout areas 403 to 405 shown in FIG. 4B. In the following explanation, a readout start position in a pixel data readout area is schematically indicated by a rectangle. For example, readout is sequentially started from the readout start positions 411 to 413 at lower right corners of the pixel data readout areas 403 to 405 and pixel data are read out in an arrow direction. For example, in the pixel data readout area 403, readout of pixel data is started from the readout start position 411 and readout of pixel data is sequentially performed while being shifted by one pixel at a time in the arrow direction. When readout of a pixel located at an end in one line in the horizontal direction (the left end in the pixel data readout area 403 shown in FIG. 6A) is performed, read out of a pixel located at the other end is performed while being shifted to an upper side by one pixel in a line as a readout object. Thereafter, readout of pixels is sequentially performed in the same manner. When readout of a pixel located at an end in a line at the upper end in the pixel data readout area 403 is performed, readout processing for the imaging device 134 is completed. Readout processing is simultaneously performed concerning the imaging devices 135 and 136.

Figure 6B:
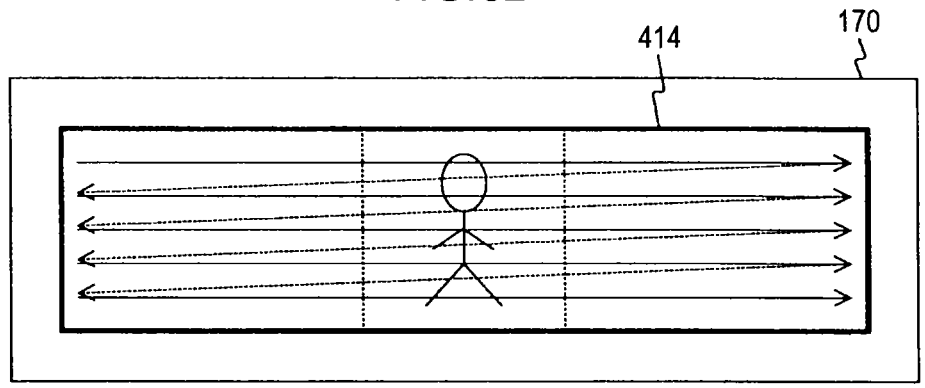

FIG. 6B is a schematic diagram of a combined image 414 on the image memory 170 in which pixel data read out from the imaging devices 134 to 136 are combined. In this example, pixel data read out by the readout method shown in FIG. 6A are combined. It is assumed that an arrow direction in the combined image 414 is an arranging direction of image data on the image memory 170.

Figure 6C:
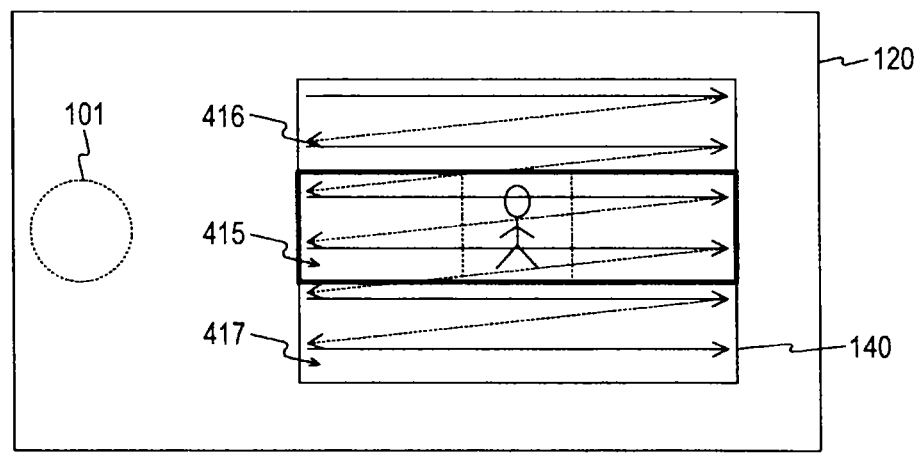

In FIG. 6C, a display example of a combined image obtained when pixel data read out from the imaging devices 134 to 136 are displayed in the display unit 140 is shown. In this example, the combined image 414 shown in FIG. 6B is displayed. For example, the combined image 414 is displayed in a captured image display area 415 and a single-color image (e.g., a black image or a white image) is displayed in margin image display areas 416 and 417 above and below the captured image display area 415. It is assumed that an arrow direction in the display unit 140 is a scanning direction in the display unit 140.

[Configuration Example of DSP]

Figure 7:
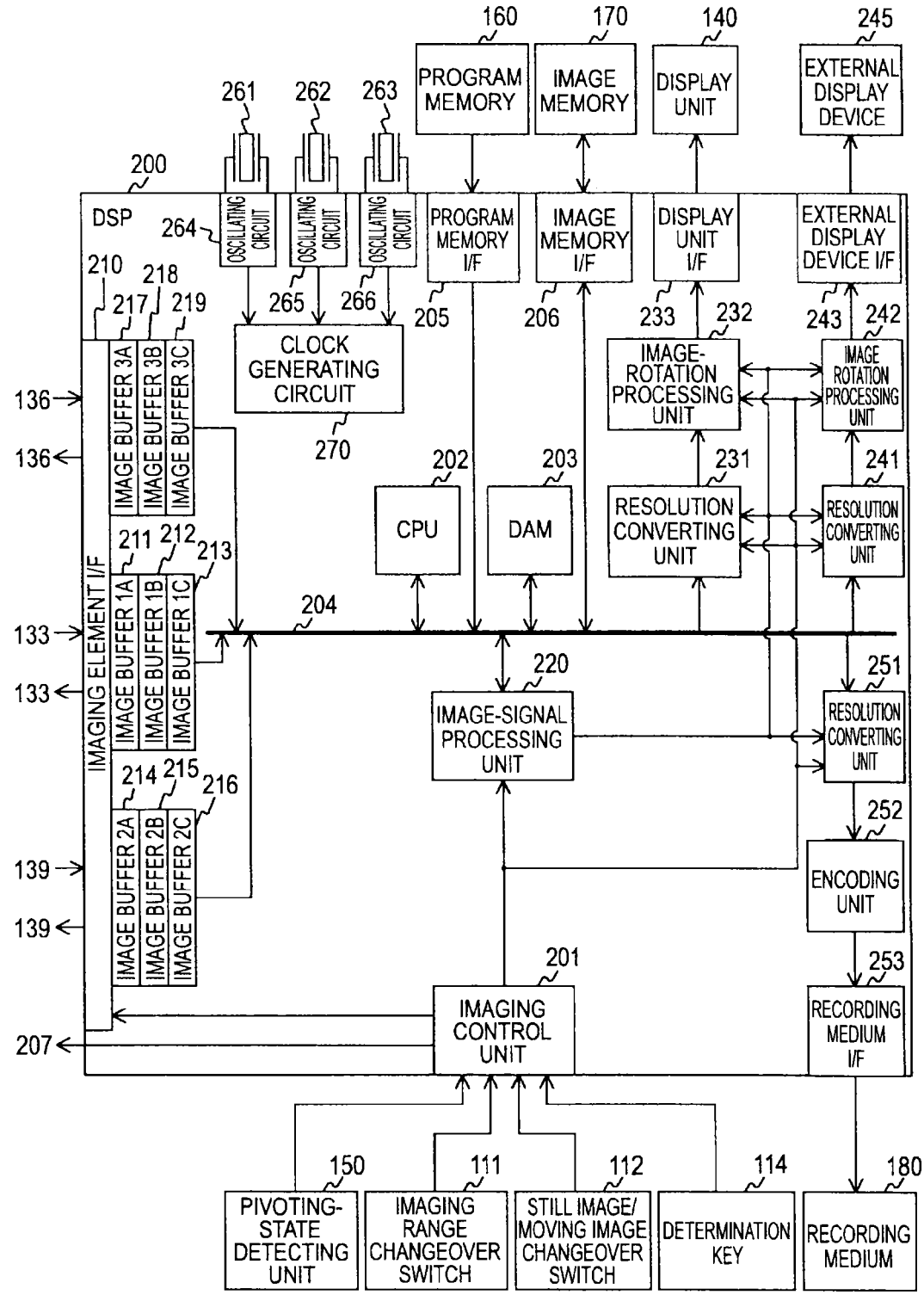
FIG. 7 is a block diagram of an internal configuration example of a DSP in the first embodiment.

FIG. 7 is a block diagram of an internal configuration example of the DSP 200 in the first embodiment. The DSP 200 includes the imaging control unit 201, a CPU 202, a DMA (Direct Memory Access) controller 203, a data bus 204, a program memory I/F 205, and an image memory I/F 206. The DSP 200 includes an imaging device I/F 210, image buffers 211 to 219, an image-signal processing unit 220, resolution converting units 231, 241, and 251, and image rotation processing units 232 and 242. Further, the DSP 200 includes a display unit I/F 233, an external display device I/F 243, an encoding unit 252, a recording medium I/F 253, oscillating circuits 264 to 266, and a clock generating circuit 270. The CPU 202, the DMA controller 203, the image memory I/F 206, the image buffers 211 to 219, the image-signal processing unit 220, and the like are connected to the data bus 204. Signals from the imaging range changeover switch 111, the still image/moving image changeover switch 112, the determination key 114, and the pivoting-state detecting unit 150 are input to the imaging control unit 201.

The pivoting-state detecting unit 150 detects a pivoting state of the second housing 120 with respect to the first housing 110 and outputs a result of the detection to the imaging control unit 201. The pivoting-state detecting unit 150 detects, as the pivoting state of the second housing 120 with respect to the first housing 110, for example, an angle formed by the first housing 110 and the second housing 120 and outputs a result of the detection to the imaging control unit 201. For example, an angle detection switch that is not depressed when a pivoting angle of the second housing 120 with respect to the first housing 110 is smaller than a fixed value and is depressed when the pivoting angle is equal to or larger than the fixed value is provided somewhere in the pivoting member 101. The pivoting-state detecting unit 150 detects, with the angle detection switch, an angle formed by the first housing 110 and the second housing 120. The pivoting-state detecting unit 150 is an example of a detecting unit described in the appended claims.

The imaging control unit 201 controls the units related to imaging processing. For example, the imaging control unit 201 determines, on the basis of a determination result from the pivoting-state detecting unit 150, a pivoting state of the second housing 120 with respect to the first housing 110 and performs imaging control for the units on the basis of a result of the determination. For example, the imaging control unit 201 determines, on the basis of the determination result, a range of a target image as a target of display or recording among the image data generated by the imaging devices 134 to 136. The imaging control unit 201 performs imaging control for the units on the basis of input signals from the imaging range changeover switch 111, the still image/moving image changeover switch 112, and the determination key 114. These kinds of imaging control are explained in detail later with reference to FIGS. 28A and 28B to FIGS. 42A to 42C. The imaging control unit 201 is an example of a control unit described in the appended claims.

In the first embodiment, the user can set in advance an imaging mode (an image size, etc.) in recording an image generated by the imaging unit 130. For example, the imaging control unit 201 causes the display unit 140 to display a menu screen for setting the imaging mode. The user inputs desired setting content using the determination key 114 and the cross key 115 on the menu screen. The imaging mode includes, for example, the number of imaging devices used during imaging and a vertical direction image size and a horizontal direction image size of an image during recording. The imaging mode includes a vertical back porch and a vertical front porch representing an interval between a valid area of an image and a vertical synchronization signal and a horizontal back porch and a horizontal front porch representing an interval between the valid area of the image and a horizontal synchronization signal. The imaging control unit 201, the units in the DSP 200, and the imaging devices 134 to 136 include registers that store the imaging mode.

When the imaging mode is set by the user, the imaging control unit 201 notifies the units in the DSP 200 and the imaging devices 134 to 136 of the set imaging mode and causes the registers included in the units to store the imaging mode. In this way, the setting content of the imaging mode set by the user is stored in the registers included in the units. Consequently, the user can easily switch and use plural photographing conditions.

The imaging control unit 201 notifies, for example, on the basis of the setting content of the imaging mode stored in the register incorporated therein, the units in the DSP 200 and the imaging devices 134 to 136 of a vertical synchronization signal, a horizontal synchronization signal, and a clock signal. The imaging control unit 201 notifies, for example, on the basis of the setting content of the imaging mode stored in the register incorporated therein, the units related to display in the DSP 200 and the display unit 140 of the vertical synchronization signal, the horizontal synchronization signal, and the clock signal. The imaging control unit 201 outputs, for example, to the power-supply control unit 207, a signal for controlling ON and OFF of a power supply.

The CPU 202 controls the entire DSP 200 on the basis of various computer programs stored in the program memory 160.

The DMA controller 203 controls transfer of data among memories on the basis of the control by the CPU 202.

The program memory I/F 205 is an interface for connecting the program memory 160 and the DSP 200.

The image memory I/F 206 is an interface for connecting the image memory 170 and the DSP 200.

The imaging device I/F 210 is an interface for connecting the imaging devices 134 to 136 and the DSP 200. Specifically, image data generated by the imaging devices 134 to 136 are input to the imaging device I/F 210. For example, when the data line L1 for transmitting the image data from the imaging devices 134 to 136 is an LVDS type having micro amplitude, the image data from the imaging devices 134 to 136 is converted into GND potential or power supply potential in the DSP I/Fs 137 to 139. The image buffers 211 to 219 in three systems corresponding to the imaging devices 134 to 136 are provided at a post stage of the imaging device I/F 210.

The image buffers 211 to 219 are image buffers that store the image data output from the imaging devices 134 to 136. The stored image data are written in the image memory 170 via the data bus 204. For example, three image buffers are provided for each of the imaging devices. The image buffers are connected to the data bus 204. For example, three image buffers 211 to 213 are provided for the imaging device 134. Three image buffers 214 to 216 are provided for the imaging device 135. Three image buffers 217 to 219 are provided for the imaging device 136. In the first embodiment, even while the image data are read out from the image buffers 211 to 219 in order to write the image data in the image memory 170, image data input anew from the imaging devices 134 to 136 are sequentially stored in the image buffers 211 to 219. Therefore, it is desirable to provide two or more image buffers for each of the imaging devices 134 to 136 as the image buffers 211 to 219.

It is desirable that a capacity of one of the image buffers 211 to 219 is larger than bit width of the data bus 204. For example, when the data bus 204 has 128-bit width, it is desirable that the image buffers have a capacity equal to or larger than 128 bits. It is desirable that the capacity of one of the image buffers 211 to 219 is equal to or lager than a double of the bit width of the data bus 204. For example, when the data bus 204 has 128-bit width, it is desirable that the image buffers have a capacity equal to or larger than 256 bits.

On the other hand, the capacity of one of the image buffers 211 to 219 can be set to be equal to or smaller than an image data amount of one image generated by one imaging device. For example, it is desirable that the capacity of one of the image buffers 211 to 219 is equal to or smaller than a data amount of image data generated by pixels for one line of the imaging device 134.

In the first embodiment, bit width of a data line connecting the imaging devices 134 to 136 and the DSP 200 is set to, for example, 12 bits. For example, bit width of the data bus 204 of the DSP 200 is set to 128-bit width and the capacity of one of the image buffers 211 to 219 is set to 128 bits.

The image-signal processing unit 220 applies, on the basis of the control by the imaging control unit 201, various kinds of image signal processing to image data input via the image buffers 211 to 219 and the data bus 204. The internal configuration of the image-signal processing unit 220 is explained in detail later with reference to FIG. 8.

The resolution converting unit 231 performs, on the basis of the control by the imaging control unit 201, resolution conversion for causing the display unit 140 to display images and outputs image data subjected to the resolution conversion to the image rotation processing unit 232.

The resolution converting unit 241 performs, on the basis of the control by the imaging control unit 201, resolution conversion for causing an external display device 245 to display images and outputs image data subjected to the resolution conversion to the image rotation processing unit 242.

The image rotation processing unit 232 applies, on the basis of the control by the imaging control unit 201, rotation processing to the image data subjected to the resolution conversion and outputs the image data subjected to the rotation processing to the display unit I/F 233.

The image rotation processing unit 242 applies, on the basis of the control by the imaging control unit 201, rotation processing to the image data subjected to the resolution conversion and outputs the image data subjected to the rotation processing to the external display device I/F 243.

The display unit I/F 233 is an interface for connecting the display unit 140 and the DSP 200.

The external display device I/F 243 is an interface for connecting the external display device 245 and the DSP 200. The external display device 245 is, for example, a television.

The resolution converting unit 251 converts, on the basis of the control by the imaging control unit 201, resolution for recording of images and outputs image data subjected to the resolution conversion to the encoding unit 252. For example, the resolution converting unit 251 performs resolution conversion processing for converting resolution to a recorded image size desired by the user and resolution conversion processing for generating a thumbnail image.

The encoding unit 252 performs encoding for compressing the image data output from the resolution converting unit 251 and outputs the encoded image data to the recording medium I/F 253.

The recording medium I/F 253 is an interface for connecting the recording medium 180 and the DSP 200.

The recording medium 180 is a recording medium that records the image data supplied via the recording medium I/F 253. The recording medium 180 may be incorporated in the cellular phone apparatus 100 or may be detachably attached to the cellular phone apparatus 100. As the recording medium 180, for example, a tape (e.g., a magnetic tape) or an optical disk (e.g., a recordable DVD (Digital Versatile Disc)) can be used. As the recording medium 180, for example, a magnetic disk (e.g., a hard disk), a semiconductor memory (e.g., a memory card), or a magneto-optical disk (e.g., an MD (Mini-Disc)) may be used.

The oscillating circuits 264 to 266 and the clock generating circuit 270 are explained in detail later with reference to FIGS. 9 to 11.

[Internal Configuration Example of Image-Signal Processing Unit 220]

Figure 8:
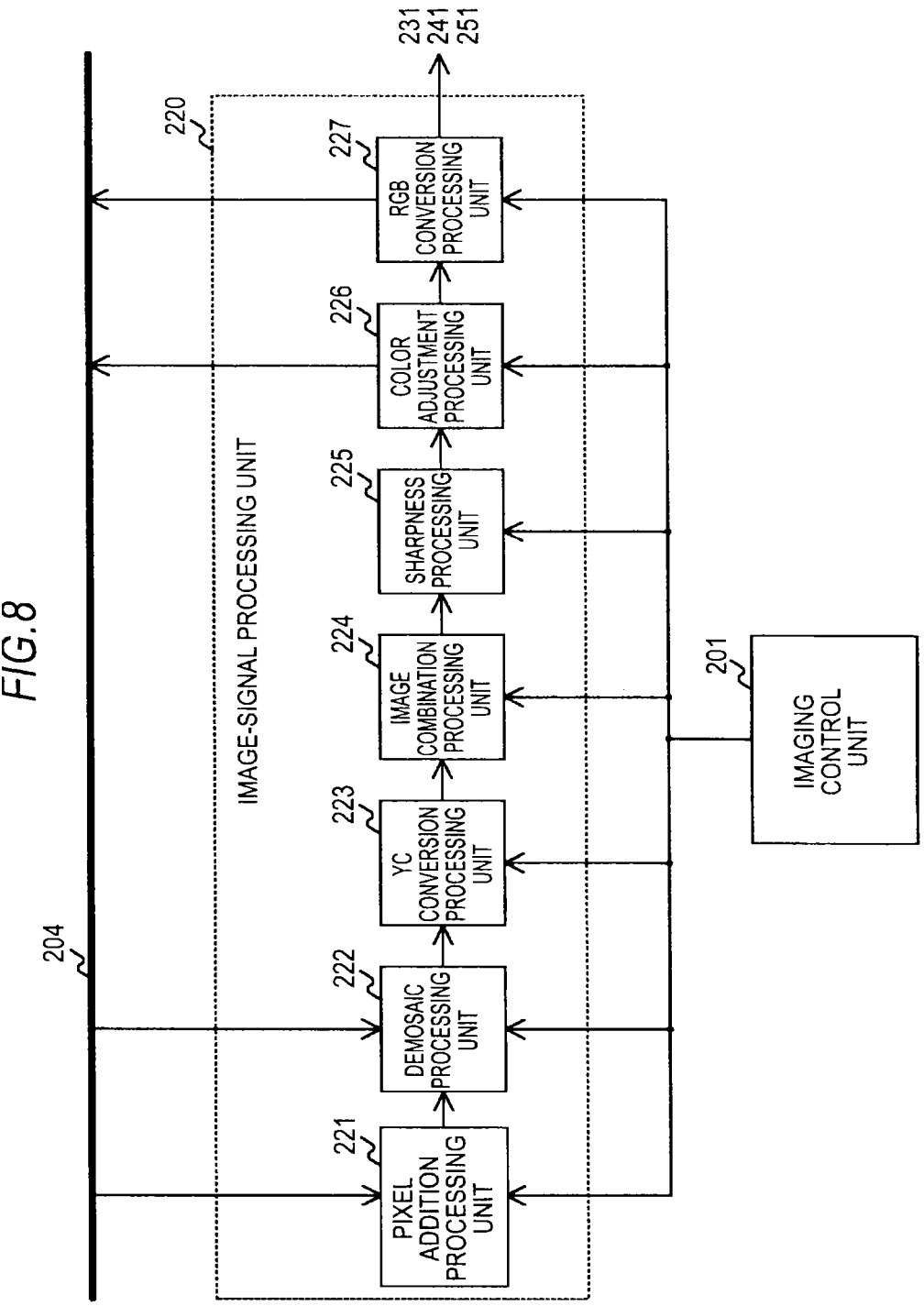
FIG. 8 is a block diagram of an internal configuration example of an image-signal processing unit in the first embodiment.

FIG. 8 is a block diagram of an internal configuration example of the image-signal processing unit 220 in the first embodiment. The image-signal processing unit 220 includes a pixel addition processing unit 221, a demosaic processing unit 222, a YC conversion processing unit 223, an image combination processing unit 224, a sharpness processing unit 225, a color adjustment processing unit 226, and an RGB conversion processing unit 227.

The pixel addition processing unit 221 applies pixel addition processing and pixel thinning-out processing to the image data generated by the imaging devices 134 to 136. The image addition processing unit 221 is explained in detail later with reference to FIG. 43 and the like.

The demosaic processing unit 222 performs demosaic processing (interpolation processing) such that intensities of all channels for R, G, and B are set the same in pixel positions of the image data (mosaic images) generated by the imaging devices 134 to 136. The demosaic processing unit 222 supplies RGB images subjected to the demosaic processing to the YC conversion processing unit 223. Specifically, the demosaic processing unit 222 interpolates Bayer data having only pixel data for one color per one pixel and calculates three pixel data of R, G, and B for one pixel.

The YC conversion processing unit 223 applies YC matrix processing and band limitation for chroma components to the RGB images generated by the demosaic processing unit 222 to thereby generate a luminance signal (Y) and a color difference signal (Cr, Cb). The generated luminance signal (a Y image) and color difference signal (a C image) are supplied to the image combination processing unit 224.

The image combination processing unit 224 applies image combination to the image data generated by the YC conversion processing unit 223 and outputs the combined image data to the sharpness processing unit 225. This image combination processing is explained in detail later with reference to FIG. 18 to FIG. 26 A to 26C. The image combination processing unit 224 is an example of an image combining unit described in the appended claims.

The sharpness processing unit 225 applies sharpness processing (processing for highlighting a contour of a subject) for extracting a portion with a large signal change and highlighting the portion to the image data generated by the image combination processing unit 224. The sharpness processing unit 225 supplies the image data subjected to the sharpness processing to the color adjustment processing unit 226.

The color adjustment processing unit 226 applies adjustment of a hue and chroma to the image data subjected to the sharpness processing by the sharpness processing unit 225.

The RGB conversion processing unit 227 converts the image data subjected to the adjustment of a hue and chroma by the color adjustment processing unit 226 from YCbCr data to RGB data.

A flow of image data of a signal of the image-signal processing unit 220 is explained. For example, it is assumed that each of signal processing units in the image-signal processing unit 220 directly reads image data from the image memory 170 through the data bus 204 and writes the image data after signal processing into the image memory 170 through the data bus 204. This is advantageous in that the image-signal processing unit 220 can read image data in a desired position in the image data at desired timing. However, since a data amount that needs to be transmitted through the data bus 204 increases, it is necessary to increase an operating frequency of the data bus 204. Therefore, it is likely that design of the data bus 204 is difficult and power consumption increases.

For example, it is assumed that each of the signal processing units in the image-signal processing unit 220 receives image data from a signal processing unit at a pre-stage not through the data bus 204 and passes the image data after the signal processing to a signal processing unit at a post-stage not through the data bus 204. In this case, the data bus 204 is not used. This is advantageous in that design of an LSI is easy and power consumption can be reduced. However, it is likely that each of the signal processing units may not be able to read image data in a desired position in the image data at desired timing.

Therefore, in the first embodiment, between the demosaic processing unit 222 and the color adjustment processing unit 226 having a substantially fixed image size, in order to reduce the operating frequency of the data bus 204 and power consumption, image data is directly passed among the signal processing units. At a pre-stage of a signal processing unit that uses a large amount of image data as in resolution conversion, when image data is written in the image memory 170 and the resolution conversion is performed, desired image data is read out from the image memory 170.

[Configuration Example of Clock Generating Circuit]

Figure 9:
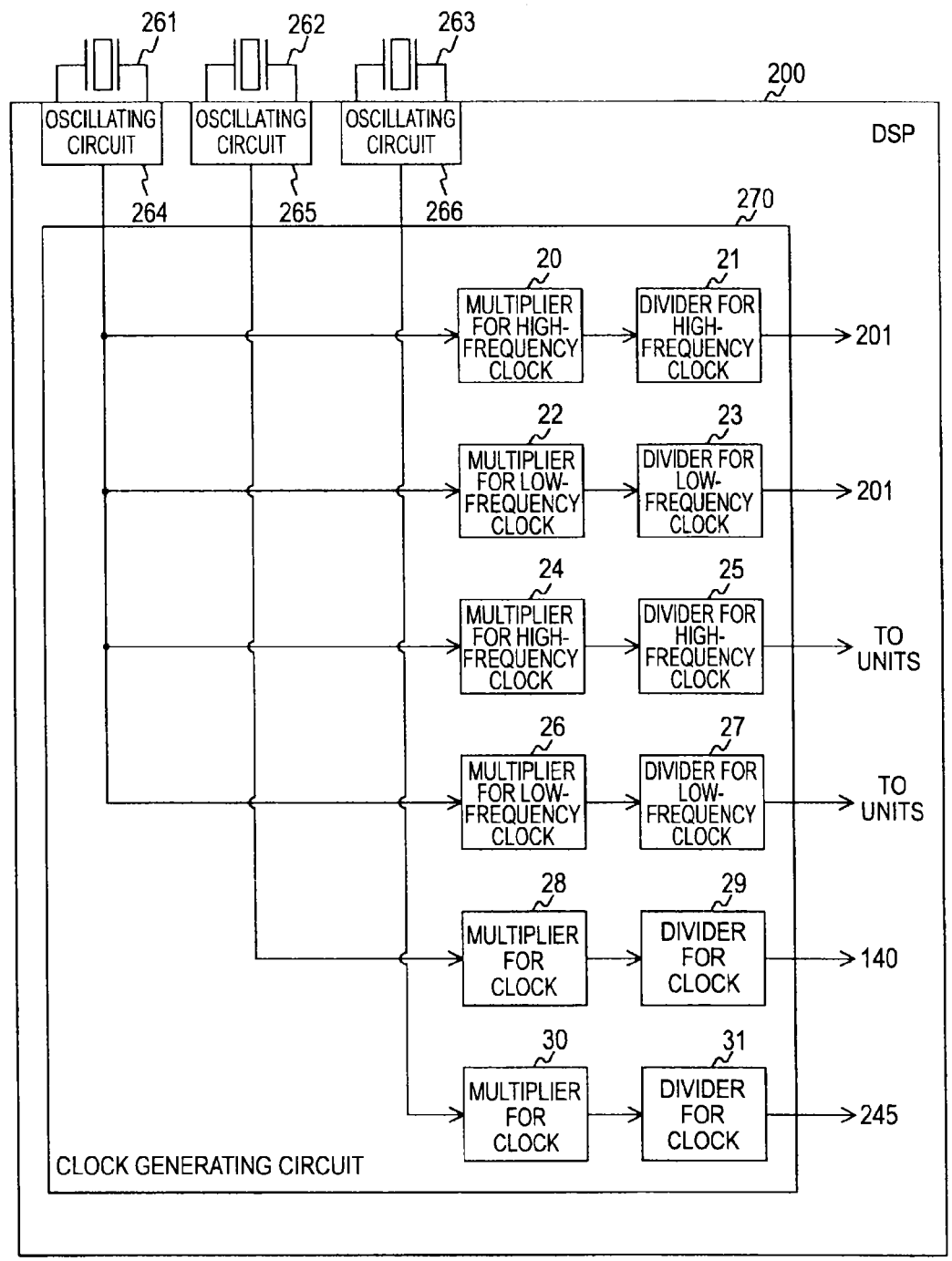
FIG. 9 is a block diagram of an internal configuration example of a clock generating circuit in the first embodiment.

FIG. 9 is a block diagram of an internal configuration example of the clock generating circuit 270 in the first embodiment. The clock generating circuit 270 includes multipliers for high-frequency clock 20 and 24, frequency dividers for high-frequency clock 21 and 25, multipliers for low-frequency clock 22 and 26, and frequency dividers for low-frequency clock 23 and 27. The clock generating circuit 270 includes multipliers for clock 28 and 30 and frequency dividers for clock 29 and 31. The multipliers multiply a frequency of an input clock. The frequency dividers reduce a frequency of an input clock into 1/n (n is an arbitrary integer). In this example, the clock generating circuit 270 generates at least six kinds of clocks according to connection destinations of the units in the DSP 200 shown in FIG. 7.

Oscillators 261 to 263 are oscillation sources for generating clock signals supplied into the DSP 200. For example, quartz oscillators are used.

The oscillating circuits 264 to 266 generate clock signals supplied into the DSP 200 and output the generated clock signals to the clock generating circuit 270.

Two kinds of the six kinds of clocks generated by the clock generating circuit 270 are clocks supplied to the imaging devices 134 to 136. One kind of the clocks supplied to the imaging devices 134 to 136 is a clock having a relatively large frequency for generating an image having a relatively large number of pixels. A clock output from the oscillating circuit 264 is input to the multiplier for high-frequency clock 20 and multiplied and the multiplied clock is input to the frequency divider for high-frequency clock 21 and divided, whereby the clock having the relatively large frequency is generated. The other one kind is a clock having a relatively small frequency for generating an image having a relatively small number of pixels. A clock output from the oscillating circuit 264 is input to the multiplier for low-frequency clock 22 and multiplied and the multiplied clock is input to the frequency divider for low-frequency clock 23 and divided, whereby the clock having the relatively small frequency is generated. The clocks divided by the frequency divider for high-frequency clock 21 and the frequency divider for low-frequency clock 23 are output as clocks generated in the clock generating circuit 270 and supplied to the imaging devices 134 to 136 through the inside of the DSP 200. The clocks supplied to the imaging devices 134 and 136 are not limited to the two kinds explained in this example. It is desirable that a large number of kinds of clocks are generated and used according to the size of an image generated by imaging operation.

The other two kinds among the six kinds of clocks generated by the clock generating circuit 270 are clocks used in the inside of the DSP 200. One kind of the clocks used in the inside of the DSP 200 is a clock having a relatively large frequency for generating an image having a relatively large number of pixels. A clock output from the oscillating circuit 264 is input to the multiplier for high-frequency clock 24 and multiplied and the multiplied clock is input to the frequency divider for high-frequency clock 25 and divided, whereby the clock having the relatively large frequency is generated. The other one kind is a clock having a relatively small frequency for generating an image having a relatively small number of pixels. A clock output from the oscillating circuit 264 is input to the multiplier for low-frequency clock 26 and multiplied and the multiplied clock is input to the frequency divider for low-frequency clock 27 and divided, whereby the clock having the relatively small frequency is generated. The clocks divided by the frequency divider for high-frequency clock 25 and the frequency divider for low-frequency clock 27 are output as clocks generated in the clock generating circuit 270 and supplied to the inside of the DSP 200. The clocks used in the inside of the DSP 200 are not limited to the two kinds explained in this example. It is desirable that a large number of kinds of clocks are generated and used according to the size of an image generated by imaging operation.

The remaining two kinds among the six kinds of clocks generated by the clock generating circuit 270 are a pixel clock for displaying an image in the display unit 140 and a pixel clock for displaying an image in a display device (e.g., the external display device 245) on the outside of the cellular phone apparatus 100. A clock output from the oscillating circuit 265 is input to the multiplier for clock 28 and multiplied and the multiplied clock is input to the frequency divider for clock 29 and divided, whereby the pixel clock for displaying an image in the display unit 140 is generated. A clock output from the oscillating circuit 266 is multiplied by the multiplier for clock 30 and multiplied and the multiplied clock is input to the frequency divider for clock 31 and divided, whereby the pixel clock for displaying an image in the display device on the outside of the cellular phone apparatus 100 is generated. The clock divided by the frequency divider for clock 29 is output as a clock generated in the clock generating circuit 270 and supplied to the display unit 140 through the inside of the DSP 200. The clock divided by the frequency divider for clock 31 is output as a clock generated in the clock generating circuit 270 and supplied to the display device on the outside of the cellular phone apparatus 100 through the inside of the DSP 200. The clocks for image display are not limited to the two kinds explained in this example. It is desirable that a large number of kinds of clocks are generated and used according to specifications of a display device connected to the cellular phone apparatus 100.

Figure 10:
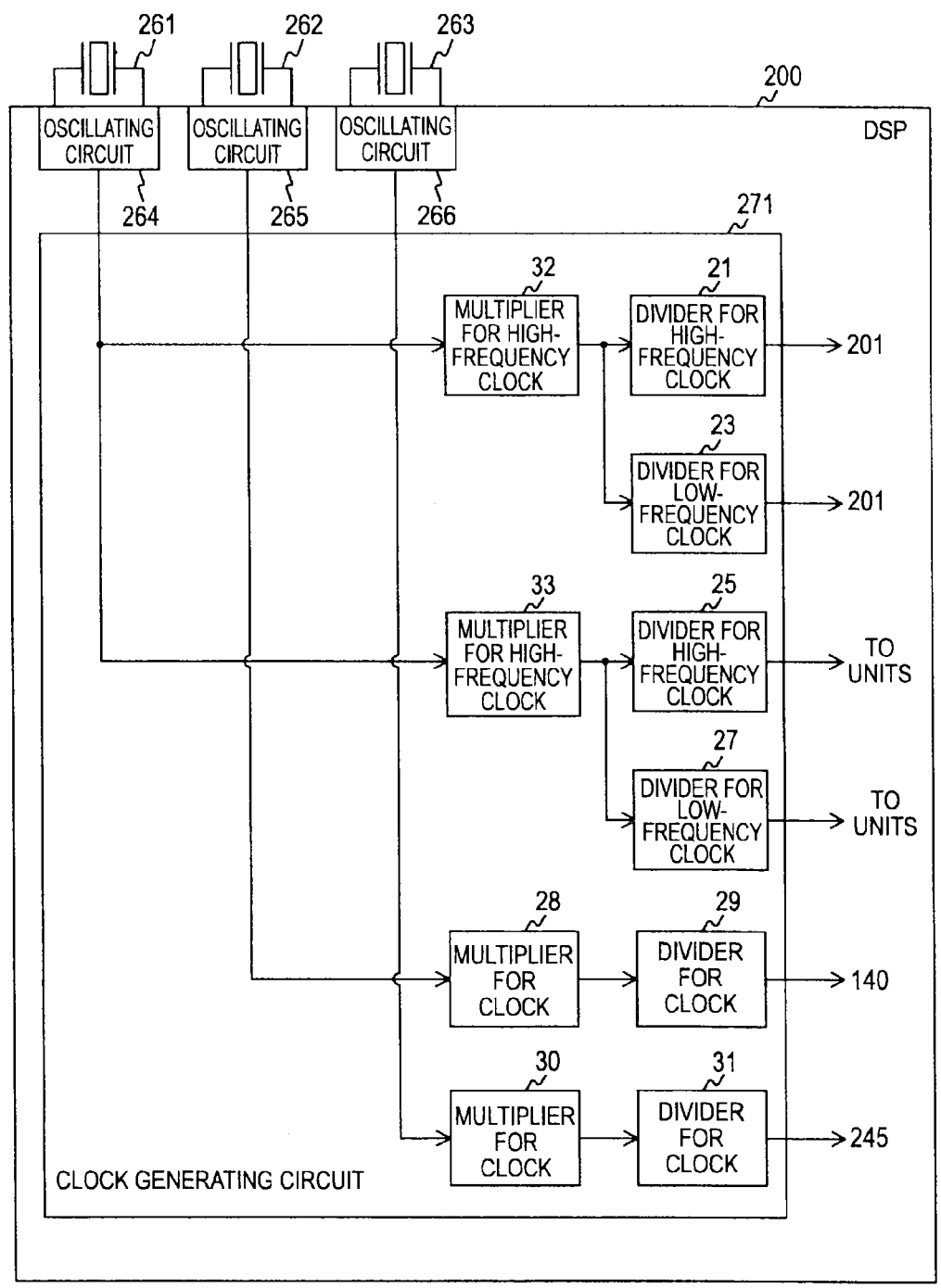
FIG. 10 is a block diagram of a modification of the clock generating circuit in the first embodiment.
Figure 11:
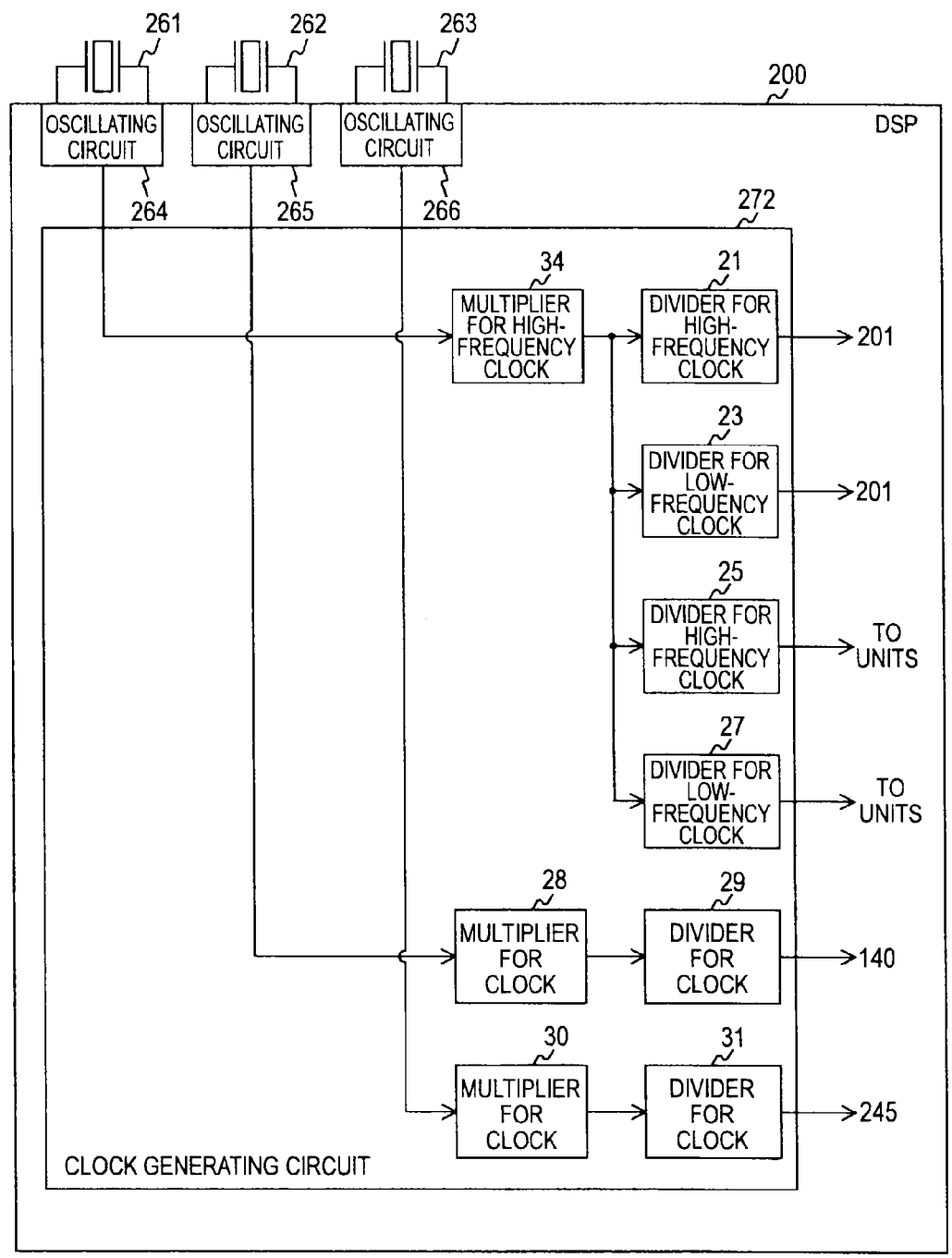
FIG. 11 is a block diagram of a modification of the clock generating circuit in the first embodiment.

FIGS. 10 and 11 are block diagrams of a modification of the clock generating circuit 270 in the first embodiment.

In an example shown in FIG. 10, two kinds of clocks supplied to the imaging devices 134 to 136 share one multiplier (a multiplier for clock 32) and two kinds of clocks supplied to the inside of the DSP 200 share one multiplier (a multiplier for clock 33).

In an example shown in FIG. 11, plural kinds of clocks supplied to the imaging devices 134 to 136 and plural kinds of clocks supplied to the inside of the DSP 200 share one multiplier (a multiplier for clock 34).

[Configuration Example of Imaging Device and Pixel Readout Example]

Figure 12:
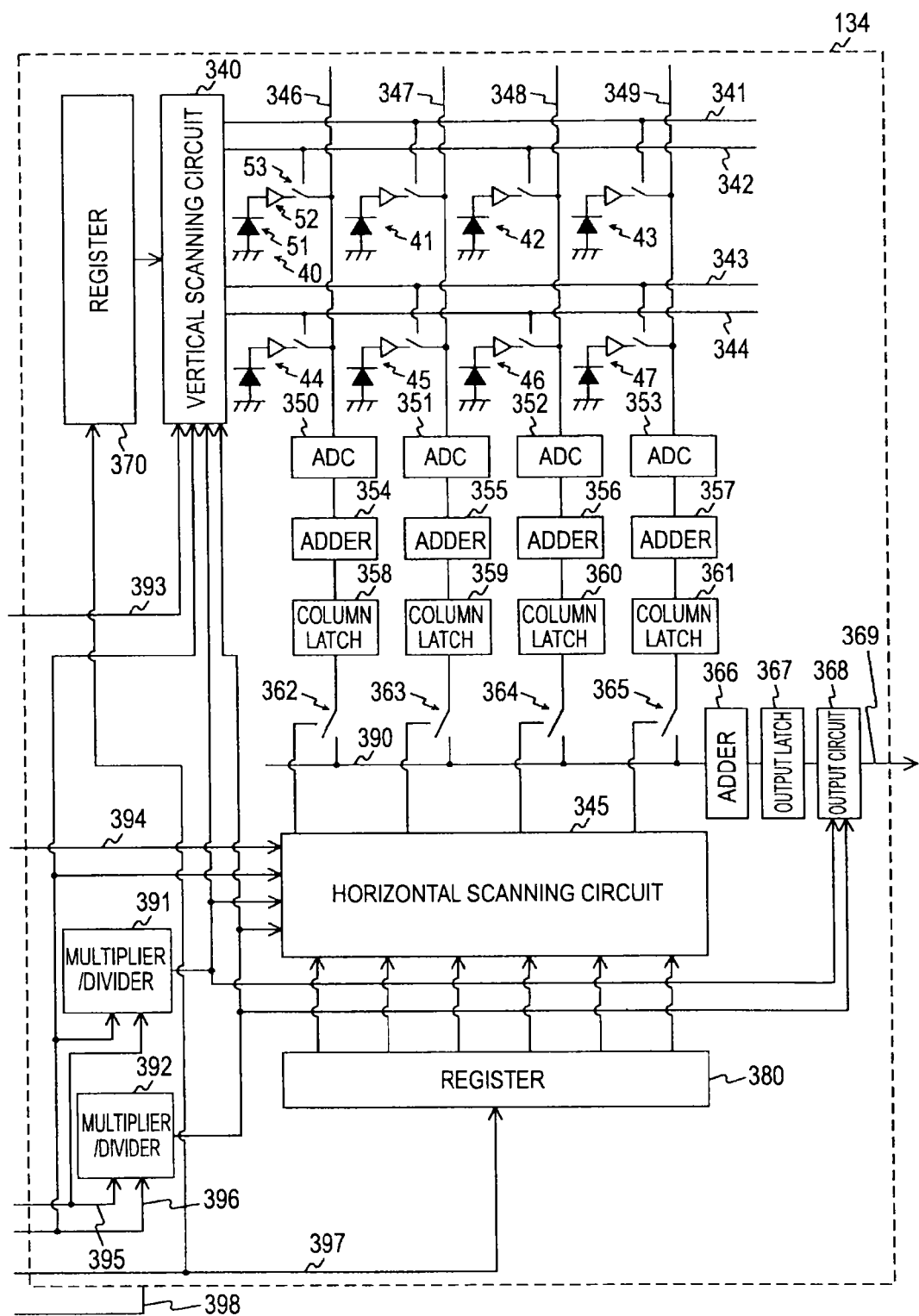
FIG. 12 is a diagram of an internal configuration example of an imaging device in the first embodiment.

FIG. 12 is a diagram of an internal configuration example of an imaging device in the first embodiment. Since the internal configurations of the imaging devices 134 to 136 are substantially the same, in FIG. 12, only the imaging device 134 is shown and illustration and explanation of the other imaging devices are omitted. In FIG. 12, as the imaging device 134, a CMOS imaging device is explained as an example.

The imaging device 134 includes pixels 40 to 47, a vertical scanning circuit 340, and a horizontal scanning circuit 345. The imaging device 134 includes ADCs (A/D (Analog/Digital) converters) 350 to 353, adders 354 to 357 and 366, and column latches 358 to 361. Further, the imaging device 134 includes switches 362 to 365, an output latch 367, an output circuit 368, registers 370 and 380, and multiplier/dividers 391 and 392. In general, an array of imaging devices in a longitudinal direction is referred to as column and an array of imaging devices in a lateral direction is referred to as row. Therefore, in the following explanation, the names "column" and "row" are used as appropriate. In this example, in the imaging device 134, a part of pixels (the pixels 40 to 47) and units related to the pixels are representatively explained. Illustration and explanation of other components are omitted.

In the imaging device 134, vertical control lines 341 to 344 are wired in a row direction and every other pixels present on the same line are connected to the same vertical control line. Data readout lines 346 to 349 are wired in a column direction and pixels present on the same line share one readout line.

The vertical scanning circuit 340 turns on and off switches between the pixels 40 to 47 and the data readout lines 346 to 349 through the vertical control lines 341 to 344 wired in the row direction. Specifically, in the pixels in the row direction, every other pixels among the pixels present on the same line in the row direction are turned on and off in common. Image data of the pixels 40 to 47 are output to the data readout lines 346 to 349 through switches between the pixels and the data readout lines corresponding to the pixels.

The horizontal scanning circuit 345 turns on and off the column latches 358 to 361 and the switches 362 to 365. It is possible to read out signals of all the pixels in a time division manner while sequentially selecting the pixels according to selection of ON and OFF of the switches by the vertical scanning circuit 340 and ON and OFF of the switches 362 to 365 by the horizontal scanning circuit 345. The output data line 369 is output data line for outputting output results of the columns from the imaging devices 134.

In the imaging device 134, the pixels 40 to 47 are arranged in a two-dimensional square lattice shape. Since the configurations of the pixels 40 to 47 are the same, the pixel is explained as an example. The pixel 40 includes a photodiode 51 as a light receiving unit, an amplifier 52, and a switch 53. The photodiode 51 converts light irradiated on the pixel into charges corresponding to an amount of the light. The amplifier 52 is an amplifier that amplifies a signal of the charges converted by the photodiode 51. The switch 53 is a switch that controls charge transfer of the pixel 40 according to ON and OFF of a vertical control line 342.

The columns include the ADCs 350 to 353, the adders 354 to 357, and the column latches 358 to 361. In the following explanation, the ADC 350, the adder 354, and the column latch 358 connected to the data readout line 346 are explained as examples.

The ADC 350 is an AD converter that converts image data from the pixels as analog values into digital data (digital values).

The adder 354 adds, every time image data is converted into digital data by the ADC 350, the new digital data after the conversion to digital data stored in the column latch 358.

The column latch 358 is a column latch that sequentially stores the digital data converted by the ADC 350. The column latch is a name indicating a data storing circuit that stores digital data after AD conversion. As the data storing circuit, besides a latch including a linear circuit, circuits that can store digital data such as a flip-flop including a synchronization circuit can be used.

For example, image data output from the pixel 40 is output to an output data line 390 through the switch 362 connected to the data readout line 346 after passing through the ADC 350, the adder 354, and the column latch 358. In the first embodiment, like the data readout lines of the columns, the output data line 390 includes the adder 366 and the output latch 367 and performs addition and storage of image data. Image data stored in the output latch 367 is output to the output data line 369 through the output circuit 368. Image data from the output data line 369 is output to the data line L1.

The multiplier/dividers 391 and 392 perform, on the basis of the control from the DSP 200, multiplication of a frequency of an input clock and dividing of the frequency of the input clock. The multiplier/dividers 391 and 392 supply a generated clock to the vertical scanning circuit 340, the horizontal scanning circuit 345, and the output circuit 368.

The signal line 393 is a vertical synchronization signal line for supplying a vertical synchronization signal from the DSP 200. The signal line 394 is a horizontal synchronization signal line for supplying a horizontal synchronization signal from the DSP 200.

The signal line 395 is a clock signal line for supplying a clock signal from the DSP 200. The signal line 396 is a signal line for controlling ON and OFF of imaging operation from the DSP 200 and a signal line for controlling pixel thinning-out. The signal line 397 is a bidirectional communication line between the imaging device 134 and the DSP 200. The signal line 398 is a power supply line.

The registers 370 and 380 are registers in which setting values concerning imaging operation are stored. An example of stored contents is shown in FIGS. 13A and 13B.

Figure 13A:
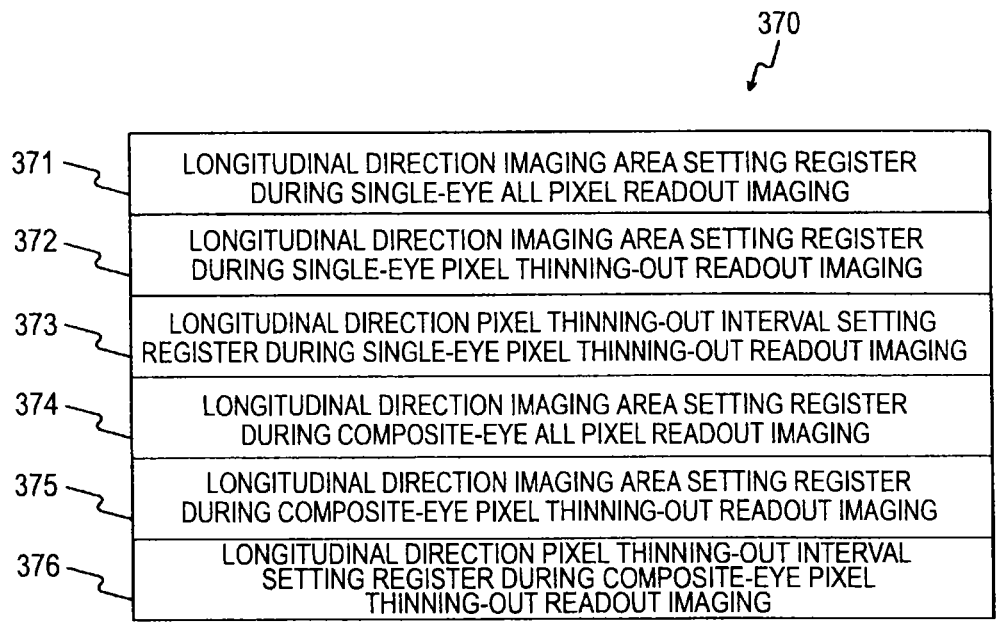
FIGS. 13A and 13B are schematic diagram of stored contents of registers included in the imaging device in the first embodiment.
Figure 13B:
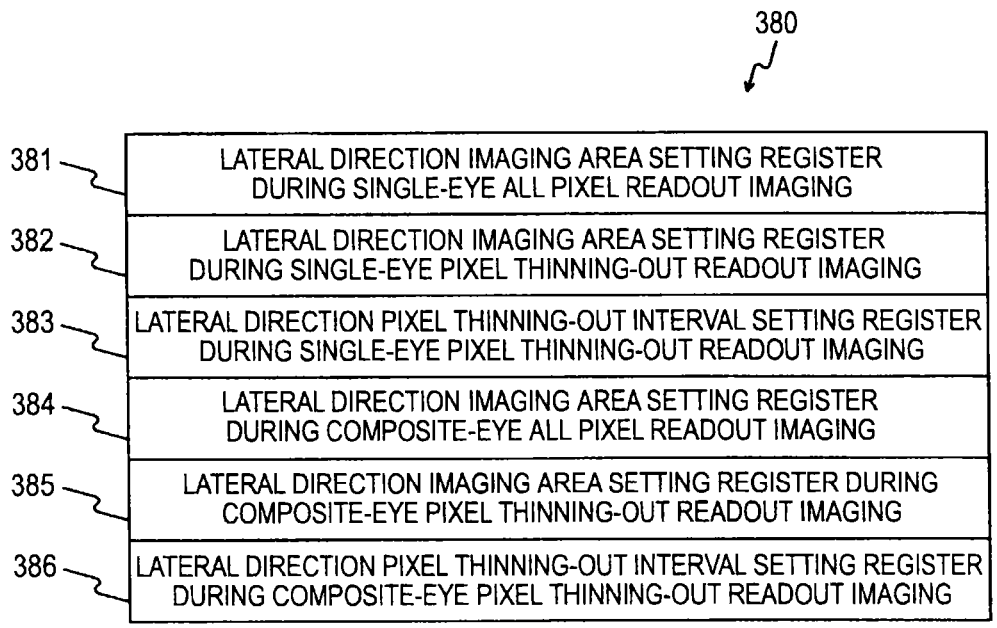

FIGS. 13A and 13B are schematic diagrams of stored contents of the registers 370 and 380 included in the imaging device 134 in the first embodiment. In the registers 370 and 380, setting values concerning imaging operation are stored. The setting values are supplied to the vertical scanning circuit 340 and the horizontal scanning circuit 345. The setting values may be changeable by user operation. The stored contents and the imaging operation performed on the basis of the stored contents are explained in detail later with reference to FIGS. 28A and 28B and FIGS. 42A to 42C.

Figure 16:
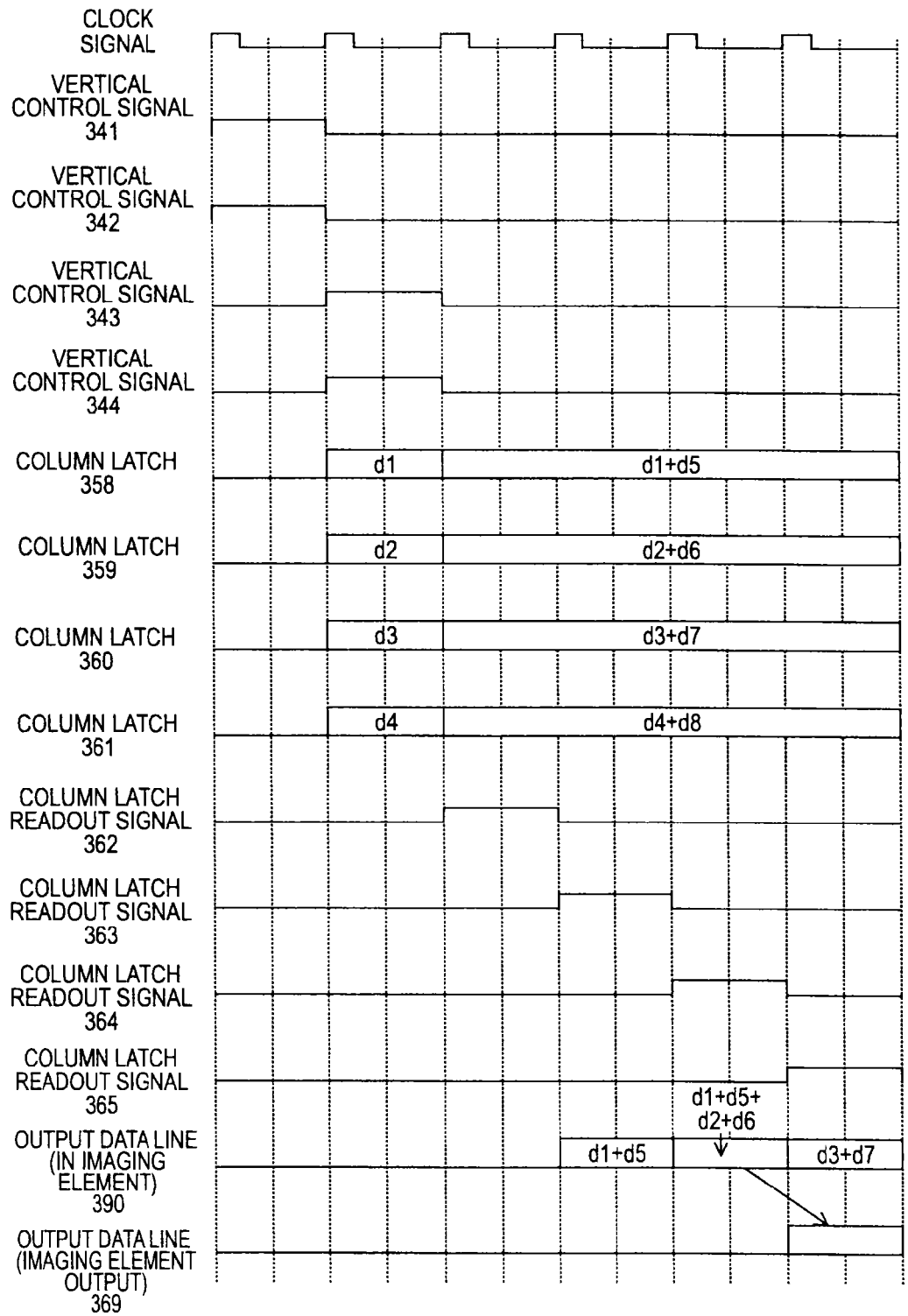
FIG. 16 is a schematic timing chart of states of control signals to the pixels of the imaging device and data output from the pixels in the first embodiment.

FIGS. 14 to 16 are schematic timing charts of states of control signals to the pixels in the imaging device 134 and data output from the pixels in the first embodiment. The abscissa shown in FIGS. 14 to 16 is a time axis. The vertical control lines 341 to 344 and the column latches 358 to 361 shown in FIGS. 14 to 16 are denoted by reference numerals same as those shown in FIG. 12 corresponding thereto. Column latch readout signals shown in FIGS. 14 to 16 are denoted by reference numerals same as those of the switches 362 to 365 shown in FIG. 12 corresponding thereto.

In an example shown in FIG. 14, imaging operation in reading out all the pixels in the imaging device 134 is explained.

Image data of all the imaging devices 134 connected to certain rows (e.g., lines of pixels 40 to 43) are output to the data readout lines 346 to 349 of the columns by using the vertical control lines 341 to 344. Subsequently, the pixel data output to the data readout lines 346 to 349 are AD-converted by the ADCs 350 to 353 of the columns. Subsequently, outputs of the ADCs 350 to 353 are stored in the column latches 348 to 361 of the columns. For example, pixel data d1 to d4 are stored in the column latches 358 to 361 shown in FIG. 14. Subsequently, the horizontal scanning circuit 345 turns on, in order column by column, the readout switches 362 to 365 from the column latches 358 to 361 to the output data line 390. This makes it possible to read out pixel data in one line in order. For example, after the pixel data d1 is output to the output data line 390 shown in FIG. 14, the pixel data d2 and d3 are sequentially output.

Thereafter, similarly, every time readout of one line in the horizontal direction is completed, the vertical scanning circuit 340 turns on the readout switches from the pixels to the vertical signal lines in order row by row. Consequently, pixel data in the rows are input to the ADCs 350 to 353. After the input pixel data are AD-converted by the ADCs 350 to 353, the pixel data are stored in the column latches 358 to 361 of the columns. For example, pixel data d5 to d8 are stored in the column latches 358 to 361 shown in FIG. 14. Subsequently, the horizontal scanning circuit 345 turns on the readout switches 362 to 365 from the column latches 358 to 361 to the output data line 390 in order column by column and reads out the pixel data in one line in order. For example, the pixel data d5 to d8 are sequentially output to the output data line 390 shown in FIG. 14.

In an example shown in FIG. 15, imaging operation in reading the pixels in the imaging device 134 by horizontally thinning out the pixels is explained as an example of pixel thinning-out readout.

The vertical scanning circuit 340 turns on the readout switches from the pixels to the vertical signal lines 346 to 349 only in a desired column. Consequently, only pixel data in a specific row is input to the ADCs 350 to 353 and AD-converted by the ADCs 350 to 353. Outputs of the ADCs 350 to 353 are stored in the column latches 358 to 361 in the columns. For example, the readout switches connected to the vertical control lines 342 and 344 are turned on, whereby the pixel data d1 and d3 are stored in the column latches 358 and 360 shown in FIG. 15. After this readout for one row is completed, for example, the readout switches connected to the vertical control lines 342 and 344 are turned on, whereby pixel data d5 and d7 are stored in the column latches 358 and 360 shown in FIG. 15.

The horizontal scanning circuit 345 turns on the readout switches from the column latches 358 to 361 to the output data line 390 only in a desired column. This makes it possible to read out only specific pixel data in one line in order.

For example, in the horizontal direction, when one piece of pixel data is read out from N pieces of pixel data, 1/N thinning-out readout is performed in the horizontal direction. For example, when one piece of pixel data of two pieces of pixel data is read out, ½ thinning-out readout is performed in the horizontal direction. When one piece of pixel data among four pieces of pixel data is read out, ¼ thinning-out readout is performed in the horizontal direction.

Simultaneously with thinning-out operation in the horizontal direction (i.e., the row direction), thinning-out operation in the vertical direction (i.e., the column direction) can also be performed. For example, when pixel data in one line among M lines is read out in the vertical direction, 1/M thinning-out readout is performed in the vertical direction. For example, when pixel data in one row of two rows is read out, ½ curtaining readout is performed in the vertical direction. When pixel data in one row among four rows is read out, ¼ thinning-out readout is performed in the vertical direction.

In an example shown in FIG. 16, imaging operation in performing pixel addition readout of the pixels in the imaging device 134 is explained. In this example, imaging operation in the case of ½ pixel addition readout in the horizontal direction and ½ pixel addition readout in the vertical direction is explained as pixel addition readout.

As in the case of all pixel readout, data of all the imaging devices 134 connected to a certain row are output to the data readout lines included in the columns by using a vertical control line, AD-converted, and stored in the column latches. Unlike the case of the all pixel readout, data of all the imaging devices 134 connected to another row are output to the data readout lines included in the columns by using another vertical control line and AD-converted. The data are added to the data stored in the column latches by using an adder. Values of pixel data are added up by this method by a desired number of lines in the vertical direction. The data after the addition are stored in the column latches. For example, pixel data d1+d5, d2+d6, d3+d7, and d4+d8 are stored in the column latches 358 to 361. After adding up N pieces of pixel data in the vertical direction, an addition result is output as one piece of pixel data, whereby 1/N pixel addition readout in the vertical direction is performed.

Subsequently, the horizontal scanning circuit 345 sequentially turns on, column by column, the readout switches from the column latches to the output data line 390. In this case, data readout from the column latches to the output data line 390 are added up by the adder 366 of the output data line 390 and stored in the output latch 367. Addition processing is repeated by a desired number of columns in the horizontal direction and data after the addition is output to the imaging device 134. For example, data d1+d5+d2+d6 obtained by adding up the pixel data d1+d5 and the pixel data d2+d6 is output to the imaging device 134 via the output data line 369. The pixel data in M rows are added up in the horizontal direction, whereby 1/M pixel addition readout is performed in the horizontal direction. The processing explained above enables addition processing in the horizontal direction (the row direction) and addition processing in the vertical direction (the column direction).

When the thinning-out readout shown in FIG. 15 and the pixel addition readout shown in FIG. 16 are performed, it is desirable to cause the imaging devices operate according to plural kinds of thinning-out ratios and pixel addition ratios. Therefore, a scanning circuit that causes the imaging devices to operate according to plural kinds of thinning-out ratios and pixel addition ratios is explained below.

Figure 17A:
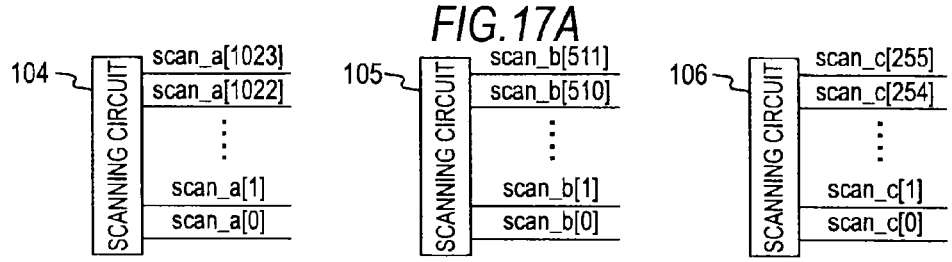
FIGS. 17A and 17B are schematic diagrams of examples of scanning circuits for performing thinning-out of the imaging device in the first embodiment.
Figure 17B:
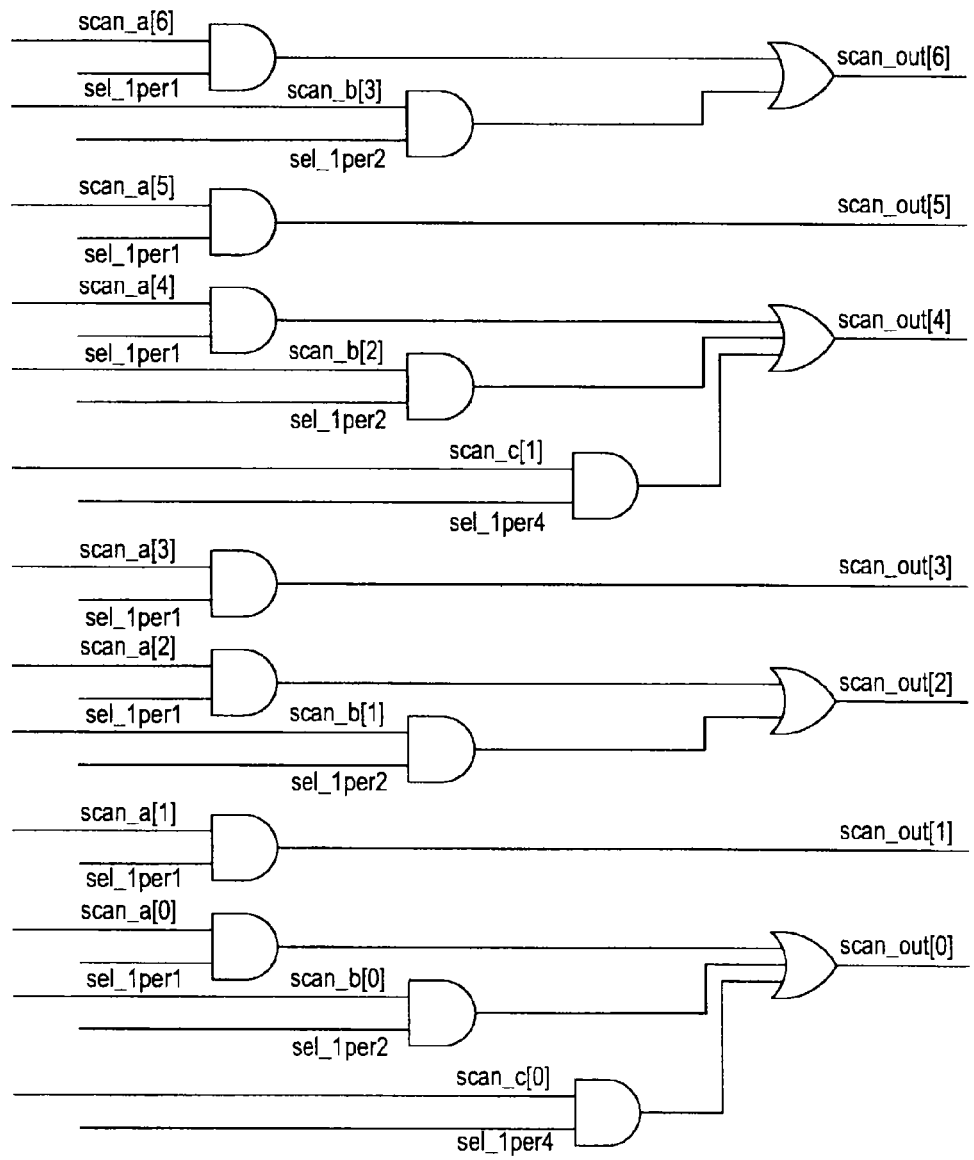

FIGS. 17A and 17B are schematic diagrams of an example of a scanning circuit for performing thinning-out of the imaging device 134 in the first embodiment. In FIG. 17A, three kinds of scanning circuits 104 to 106 are shown. In FIG. 17B, a configuration example of a 1/N curtaining scanning circuit is shown. In the examples shown in FIGS. 17A and 17B, the number of lateral direction pixels of an imaging device is 1024 with respect to scanning circuits of the imaging device corresponding to three kinds of pixel thinning-out ratios for all pixel readout, ½ thinning-out readout, and ¼ thinning-out readout.

As shown in FIG. 17A, the scanning circuit 104 is a 1024-to-1 scanning circuit including 1024 output signal lines (scan_a [n (0≤n≤1023: n is an integer)]). The scanning circuit 104 changes the signal lines to an enable state one by one and then changes the signal lines to a disable state. The scanning circuit 105 is a 512-to-1 scanning circuit including 512 output signal lines (scan_b [n(0≤n≤511: n is an integer)]). The scanning circuit 105 changes the signal lines to the enable state one by one and then changes the signal lines to the disable state. The scanning circuit 106 is a 256-to-1 scanning circuit including 256 output signal lines (scan_c [n (0≤n≤255: n is an integer)]). The scanning circuit 106 changes the signal lines to the enable state one by one and then changes the signal lines to the disable state.

As shown in FIG. 17B, the output signal lines of the scanning circuit 105, the output signal lines of the scanning circuit 106, and control lines indicating which of the three kinds of pixel thinning-out ratios is selected are connected to signal lines having numbers of multiples of 4 among the 1024 output signal lines of the scanning circuit 104. The three kinds of control lines are controls lines corresponding to all pixel readout (sel_1per1), ½ thinning-out readout (sel_1per2), and ¼ thinning-out readout (sel_1per4).

The output signal lines of the scanning circuit 105 and control lines indicating which of the two kinds of pixel thinning-out ratios is selected are connected to signal lines having numbers of multiples of 2 rather than the multiples of 4 among the 1024 output signal lines of the scanning circuit 104. The two kinds of control lines are control lines corresponding to the all pixel readout and the ½ thinning-out readout.

A control line indicating whether the all pixel readout is selected is connected to the signal lines other than the signal lines explained above among the 1024 output signal lines of the scanning circuit 104.

According to outputs (scan_out [n(0≤n≤1023: n is an integer) from the scanning circuits shown in FIG. 17B, in the imaging device 134, it is possible to perform thinning-out processing of each of the all pixel readout, the ½ thinning-out readout, and the ¼ thinning-out readout.

[Arrangement Configuration Example of Imaging Systems]

Figure 18:
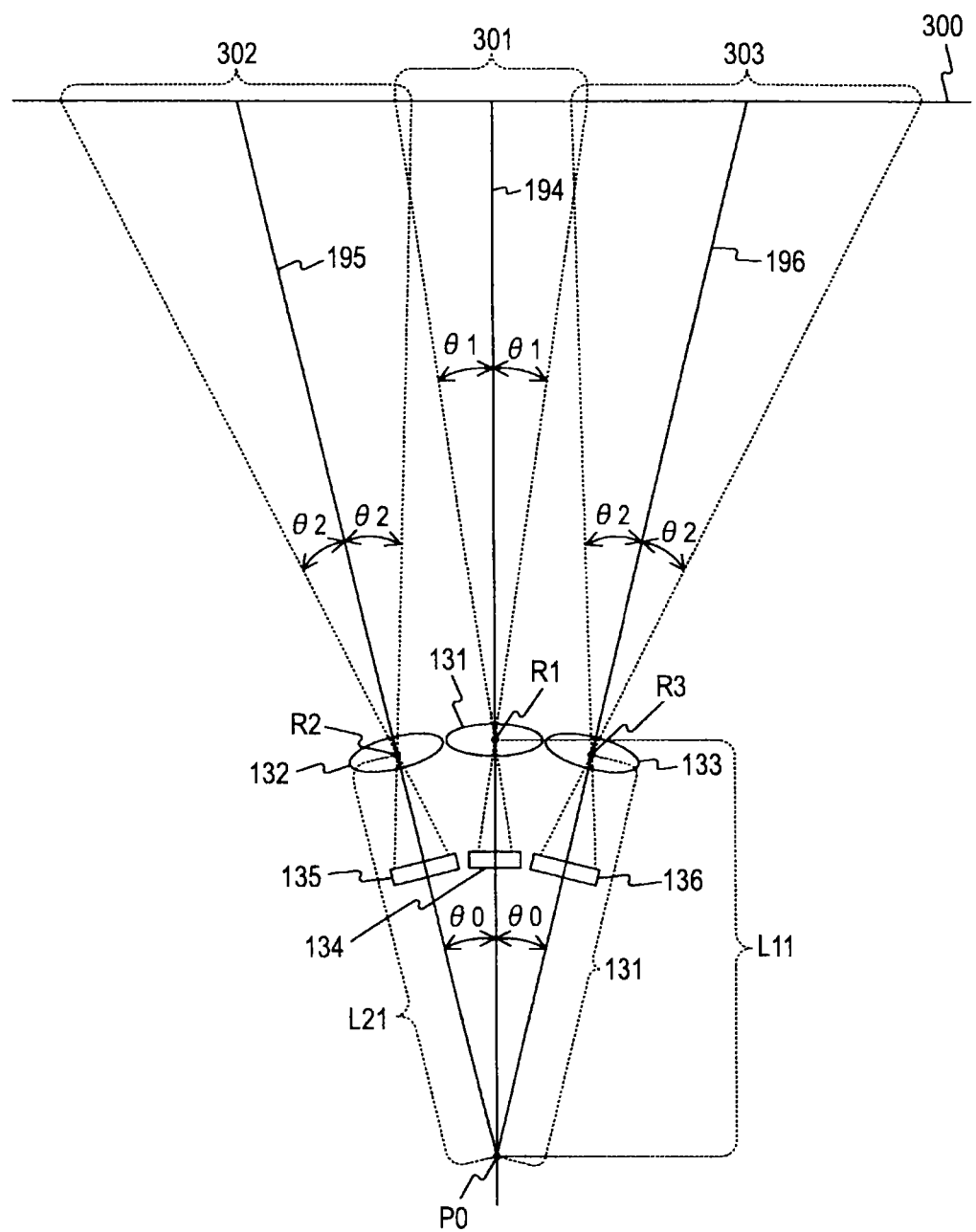
FIG. 18 is a diagram of a relation between the imaging unit and a subject in the first embodiment.

FIG. 18 is a schematic diagram of a relation between the imaging unit 130 and a subject in the first embodiment. In FIG. 18, only the optical systems 131 to 133 and the imaging devices 134 to 136 in the first to third imaging systems 191 to 193 in the imaging unit 130 shown in FIG. 3 are shown and the other components are omitted. In FIG. 18, a subject as an imaging target is represented as subject surface 300. The cellular phone apparatus 100 is arranged such that an optical axis 194 of the first imaging system 191 is orthogonal to the subject surface 300.

In the imaging unit 130, an angle formed by the optical axis 194 of the first imaging system 191 and an optical axis 195 of the second imaging system 192 is represented as θ0. Similarly, an angle formed by the optical axis 194 of the first imaging system 191 and an optical axis 196 of the third imaging system 193 is represented as θ0. The third imaging system 193 is arranged in a position line-symmetrical to the second imaging system 192 across the optical axis 194 of the first imaging system 191.

In the first imaging system 191, an angle formed by a line on the outermost side of an incident light path of light made incident on the imaging device 134 and the optical axis 194 is represented as θ1. In the second imaging system 192, an angle formed by a line on the outermost side of an incident light path of light made incident on the imaging device 135 and the optical axis 195 is represented as θ2. Similarly, in the third imaging system 193, an angle formed by a line on the outermost side of an incident light path of light made incident on the imaging device 136 and the optical axis 196 is represented as θ2. For example, as shown in FIG. 18, the width in the horizontal direction of a light receiving surface is smaller than the width in the horizontal direction of light receiving surfaces in the imaging devices 135 and 136. Therefore, an angle of view 2×θ1 of light made incident on the imaging device 134 is smaller than an angle of view 2×θ2 of light made incident on the imaging devices 135 and 136.

An imaging range 301 on the subject surface 300 is specified by the angle of view 2×θ1 of the light made incident on the imaging device 134. Similarly, an imaging range 302 on the subject surface 300 is specified by the angle of view 2×θ2 of the light made incident on the imaging device 135 and an imaging range 303 on the subject surface 300 is specified by the angle of view 2×θ2 made incident on the imaging device 136. In the first embodiment, images generated by the imaging devices 134 to 136 are combined to generate a panorama image. Therefore, the angles formed by the optical axes are set such that the imaging range 301 on the subject surface 300 and the imaging range 302 on the subject surface 300 partially overlap. Specifically, the angle θ0 formed by the optical axis 194 of the first imaging system 191 and the optical axis 195 of the second imaging system 192 and the angle θ0 formed by the optical axis 194 of the first imaging system 191 and the optical axis 196 of the third imaging system 193 are set such that the imaging ranges 301 and 302 partially overlap. The optical axes 194 to 196 are included in the same plane. The first to third imaging systems 191 to 193 are arranged such that the optical axes 194 to 196 cross at one point (an intersection P0).

A lens center of the first imaging system 191 is represented as R1, a lens center of the second imaging system 192 is represented as R2, and a lens center of the third imaging system 193 is represented as R3. A distance between the lens center R1 and the intersection P0 is represented as L11, a distance between the lens center R2 and the intersection P0 is represented as L21, and a distance between the lens center R3 and the intersection P0 is represented as L31. In this case, it is desirable that the first to third imaging systems 191 to 193 are arranged such that the distances L11, L21, and L31 are equal.

[Correction Example of Trapezoidal Distortion]

Figure 19:
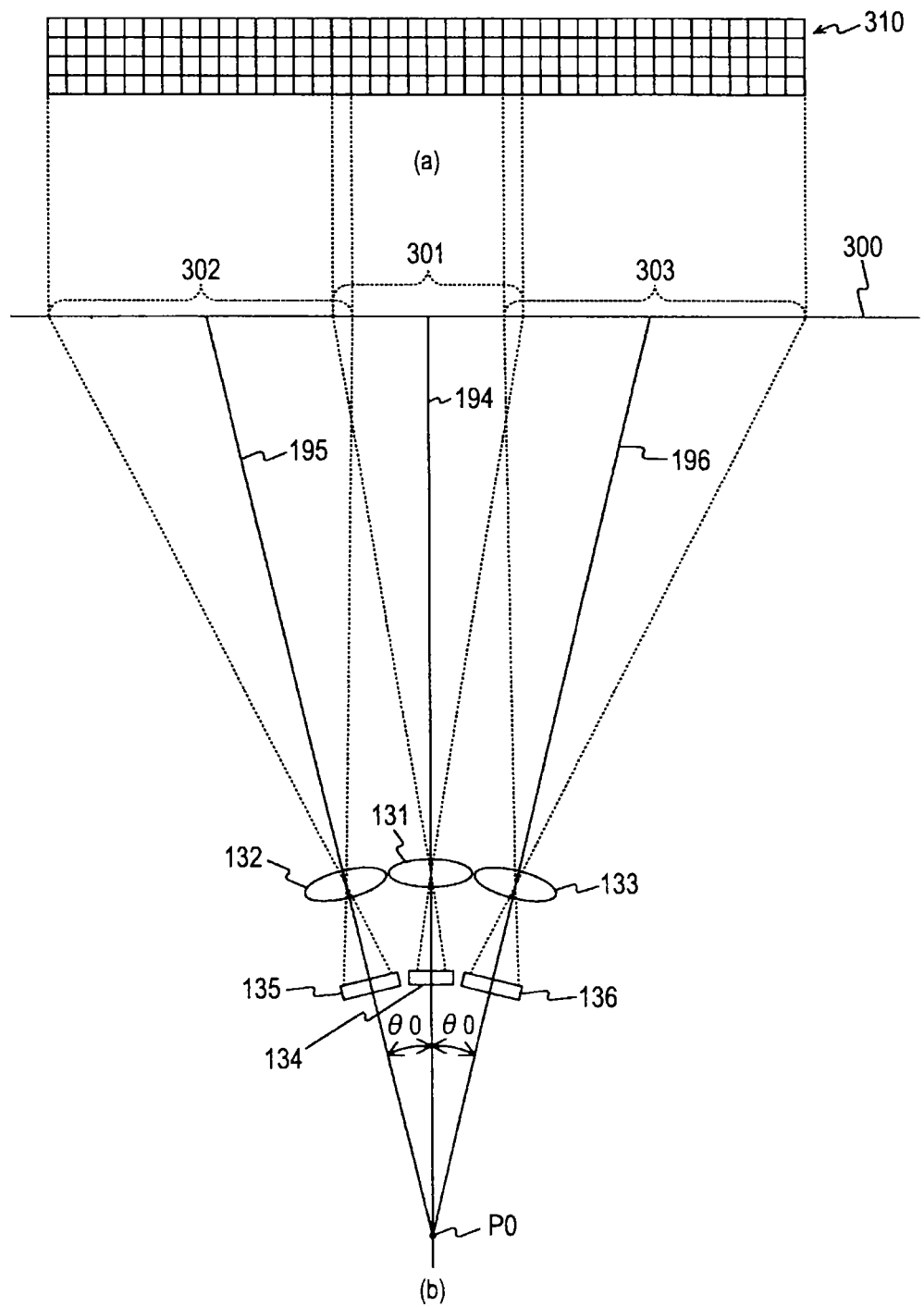
FIG. 19 is a schematic diagram of a relation between imaging systems in the imaging unit and a subject as an imaging target of the imaging systems in the first embodiment.
Figure 20:
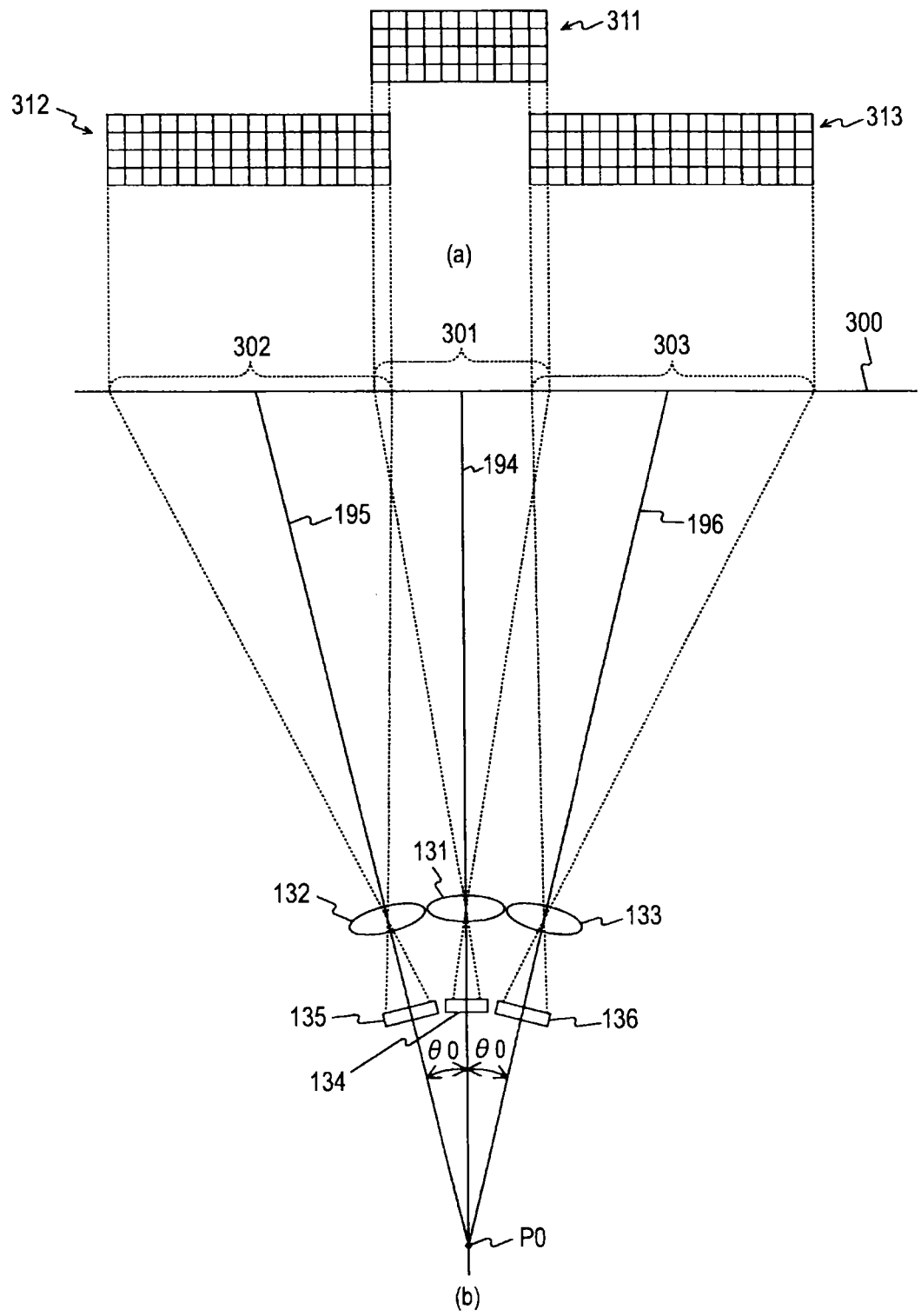
FIG. 20 is a schematic diagram of a relation between the imaging systems in the imaging unit and subjects as imaging targets of the imaging systems in the first embodiment.

FIG. 19 and FIG. 20 are schematic diagrams of a relation between the imaging systems in the imaging unit 130 and a subject as an imaging target of the imaging systems in the first embodiment. In (a) in FIG. 19, a subject 310 as an imaging target of the imaging unit 130 is schematically shown. The subject 310 is a subject corresponding to the subject surface 300 shown in FIG. 18. A range corresponding to the subject 310 is indicated by a rectangle. The inside of the rectangle is schematically shown in a lattice shape.

In (a) in FIG. 20, subjects 311 to 313 as imaging targets by the imaging unit 130 are schematically shown. The subject 311 is a subject corresponding to the first imaging system 191 in the subject 310 shown in (a) in FIG. 19. Similarly, the subject 312 is a subject corresponding to the second imaging system 192 in the subject 310. The subject 313 is a subject corresponding to the third imaging system 193 in the subject 310. Both ends in the horizontal direction of the subject 311 among the subjects 311 to 313 and one ends in the horizontal direction of the subjects 312 and 313 overlap.

In (b) in FIGS. 19 and 20, the imaging systems in the imaging unit 130 are shown. Examples shown in (b) in FIGS. 19 and 20 are the same as the example shown in FIG. 18 except that reference numerals and signs are omitted.

Figure 21:
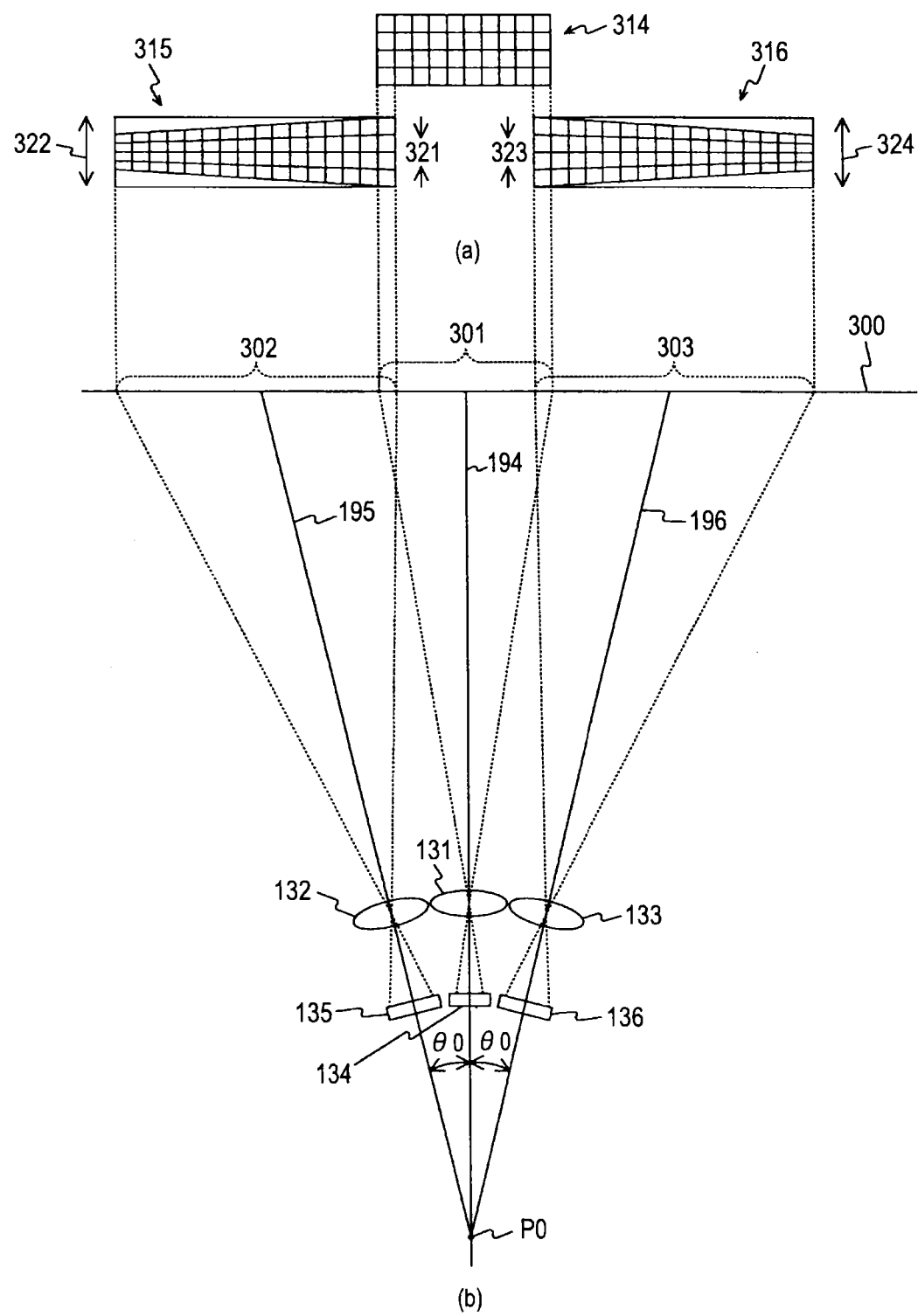
FIG. 21 is a schematic diagram of a relation between the imaging systems in the imaging unit and subjects as imaging targets of the imaging systems in the first embodiment.

FIG. 21 is a schematic diagram of a relation between the imaging systems in the imaging unit 130 and captured images generated by the imaging systems in the first embodiment. In (a) in FIG. 21, captured images 314 to 316 generated by the imaging unit 130 are schematically shown. The captured images 314 to 316 are captured images corresponding to the subjects 311 to 313 shown in (a) in FIG. 20. Rectangles of a lattice shape shown in the subjects 311 to 313 are schematically shown.

As shown in (a) in FIG. 21, the optical axes 195 and 196 of the second and third imaging systems 192 and 193 are not orthogonal to the subject surface 300. Therefore, a trapezoidal distortion occurs in the captured images 315 and 316. The trapezoidal distortion is explained in detail with reference to FIG. 22.

Figure 22:
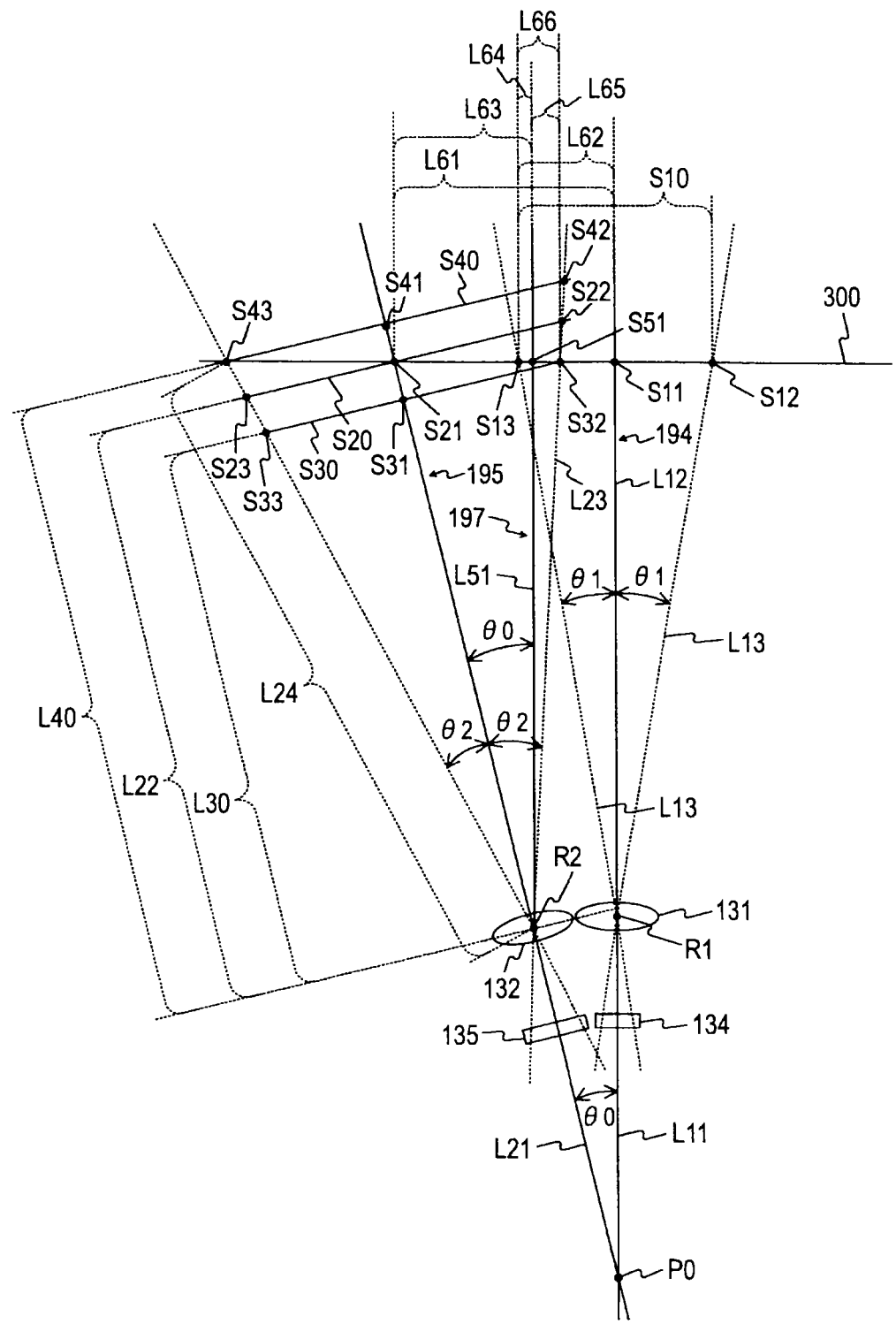
FIG. 22 is a schematic diagram of a relation between the imaging systems in the imaging unit and subjects as imaging targets of the imaging systems in the first embodiment.

FIG. 22 is a schematic diagram of a relation between the imaging systems in the imaging unit 130 and a subject as an imaging target of the imaging systems in the first embodiment. In FIG. 22, for ease of explanation, components related to the third imaging system 193 are omitted and only the first and second imaging systems 191 and 192 are shown. An example shown in FIG. 22 is substantially the same as the example shown in FIG. 18 except that the components related to the third imaging system 193 are omitted. The intersection P0, the angles θ0, θ1, and θ2, the lens centers R1 and R2, and the distance L11 are the same as those in the example shown in FIG. 18 and, therefore, are denoted by the same reference signs.

In FIG. 22, an intersection of the optical axis 194 of the first imaging system 191 and the subject surface 300 is represented as S11. An intersection of a right visible outline of an angle of view of the first imaging system 191 and the subject surface 300 is represented as S12. An intersection of a left visible outline of the angle of view of the first imaging system 191 and the subject surface 300 is represented as S13.

A planar subject area that is a plane including the intersection S11 and orthogonal to the optical axis 194 and is made incident on the first imaging system 191 is represented as subject surface S10.

An intersection of the optical axis 195 of the second imaging system 192 and the subject surface 300 is represented as S21. An intersection of a right visible outline of an angle of view of the second imaging system 192 and the subject surface 300 is represented as S32. An intersection of a left visible outline of the angle of view of the second imaging system 192 and the subject surface 300 is represented as S43.

A planar subject area that is a plane including the intersection S21 and orthogonal to the optical axis 195 and is made incident on the second imaging system 192 is represented as subject surface S20.

A planar subject area that is a plane including the intersection S32 and orthogonal to the optical axis 195 and is made incident on the second imaging system 192 is represented as subject surface S30.

A planar subject area that is a plane including the intersection S43 and orthogonal to the optical axis 195 and is made incident on the second imaging system 192 is represented as subject surface S40.

An intersection of the subject surface S30 and the optical axis 195 is represented as S31. An intersection of the subject surface S40 and the optical axis 195 is represented as S41.

An intersection of the right visible outline of the angle of view of the second imaging system 192 and the subject surface S20 is represented as S22. An intersection of the right visible outline of the angle of view of the second imaging system 192 and the subject surface S40 is represented as S42.

An intersection of the left visible outline of the angle of view of the second imaging system 192 and the subject surface S20 is represented as S23. An intersection of the right visible outline of the angle of view of the second imaging system 192 and the subject surface S30 is represented as S33.

An intersection of a segment 197 passing through the lens center R2 of the second imaging system 192 and perpendicular to the subject surface 300 and the subject surface 300 is represented as S51.

For example, when the subject surface S40 including the point S43 at the left end of the angle of view and the subject surface S30 including the point S32 at the right end of the angle of view are compared, the subject surface S40 is present in a position farther from the lens center R2 than the subject surface S30. Therefore, when the subject surface S40 is imaged, an imaged area is wider than an area imaged when the subject surface S30 is imaged. For example, it is assumed that segments having the same length are arranged as subjects on the subject surface S40 and the subject surface S30. In this case, when a captured image generated for the subject surface S30 and a captured image generated for the subject surface S40 are compared, the segment included in the captured image generated for the subject surface S40 is shorter.

Therefore, for example, when the subject 312 shown in (a) in FIG. 20 is imaged by the second imaging system 192, as in the captured image 315 shown in (a) in FIG. 21, an area corresponding to the subject 312 is formed in a trapezoidal shape. Specifically, in an example shown in (a) in FIG. 21, in the captured image 315, the left side is shorter than the right side in the rectangle corresponding to the subject 312.

Similarly, when the subject 313 shown in (a) in FIG. 20 is imaged by the third imaging system 193, as in the captured image 316 shown in (a) in FIG. 21, an area corresponding to the subject 313 is formed in a trapezoidal shape. In this way, a trapezoidal distortion occurs in the captured images generated by the three-eye imaging unit. Therefore, a trapezoidal distortion correcting method for correcting a trapezoidal distortion of a captured image is explained below.

A distance between the intersection S11 and the lens center R1 is represented as L12. A distance between the intersection S13 and the lens center R1 and a distance between the intersection S12 and the lens center R1 is represented as L13.

A distance between the intersection S21 and the lens center R2 is represented as L22. A distance between the intersection S31 and the lens center R2 is represented as L30. A distance between the intersection S41 and the lens center R2 is represented as L40.

A distance between the intersection S32 and the lens center R2 is represented as L23. A distance between the intersection S43 and the lens center R2 is represented as L24. A distance between the intersection S51 and the lens center R2 is represented as L51. Distances L61 to L66 are explained later with reference to FIGS. 24A to 24C.

The following formula holds according to the formula of the trigonometric function.

$$L21 + L22 = L11 + L22 = (L11 + L12)/\cos\theta0$$

The following Formula 1 is obtained according to this formula.

$$L22 = \{(L11 + L12)/\cos\theta0\} - L11 \quad \text{(Formula 1)}$$

where $L1 = L21$

Concerning the distance L51, the following Formula 2 is obtained according to the formula of the trigonometric function and Formula 1.

$$L51 = L22 \times \cos\theta0 \quad \text{(Formula 2)}$$
$$= [\{(L11 + L12)/\cos\theta0\} - L11] \times \cos\theta0$$

Concerning the distance L23, the following Formula 3 is obtained according to the formula of trigonometric function and Formula 2.

$$L23 = L51/\cos(\theta2 - \theta0) \quad \text{(Formula 3)}$$
$$= (L22 \times \cos\theta0)/\cos(\theta2 - \theta0)$$

Concerning the distance L30, the following Formula 4 is obtained according to the formula of trigonometric function and Formula 3.

$$L30 = L23 \times \cos\theta2 \quad \text{(Formula 4)}$$
$$= \{(L22 \times \cos\theta0)/\cos(\theta2 - \theta0)\} \times \cos\theta2$$
$$= ([\{((L11 + L12)/\cos\theta0\} - L11) \times \cos\theta0]/$$
$$\cos(\theta2 - \theta0)) \times \cos\theta2$$

When the distances L11 and L12 in the optical axis 194 of the first imaging system 191 are determined, the distance L30 can be calculated by using Formula 4. By calculating the distance L30 in this way, it is possible to calculate a value XR(=L12/L30) of a ratio of the distance L30 to the distance L12. XR is smaller than 1.

Concerning the distance L24, the following Formula 5 is obtained according to the formula of the trigonometric function and Formula 2.

$$L24 = L51/\cos(\theta2 + \theta0) \quad \text{(Formula 5)}$$
$$= (L22 \times \cos\theta0)/\cos(\theta2 + \theta0)$$

Concerning the distance L40, the following Formula 6 is obtained according to the formula of trigonometric function, Formula 1, and Formula 5.

$$L40 = L24 \times \cos\theta2 \quad \text{(Formula 6)}$$
$$= \{(L22 \times \cos\theta0)/\cos(\theta2 + \theta0)\} \times \cos\theta2$$
$$= [[\{(L11 + L12)/\cos\theta0 - L11\} \times \cos\theta0]/$$
$$\cos(\theta2 + \theta0)] \times \cos\theta2$$

When the distances L11 and L12 in the optical axis 194 of the first imaging system 191 is determined, the distance L40 can be calculated by using Formula 6. By calculating the distance L40 in this way, a value XR(=L12/L40) of a ratio of the distance L40 to the distance L12 can be calculated. XR is larger than 1.

A correcting method for correcting a trapezoidal distortion is explained by using the values XR and XL of the ratios.

Concerning the captured image 315 shown in (a) in FIG. 21, coordinates are converted such that the length of the right side is multiplied by XR and the length of the left side is multiplied by XL. Specifically, the right side in the captured image 315 is reduced in an arrow 321 direction such that the length of the right side is multiplied by XR. The left side in the captured image 315 is expanded in an arrow 322 direction such that the length of the left side is multiplied by XL. A corrected image 317 corrected in this way is shown in (a) in FIG. 23.

Figure 23:
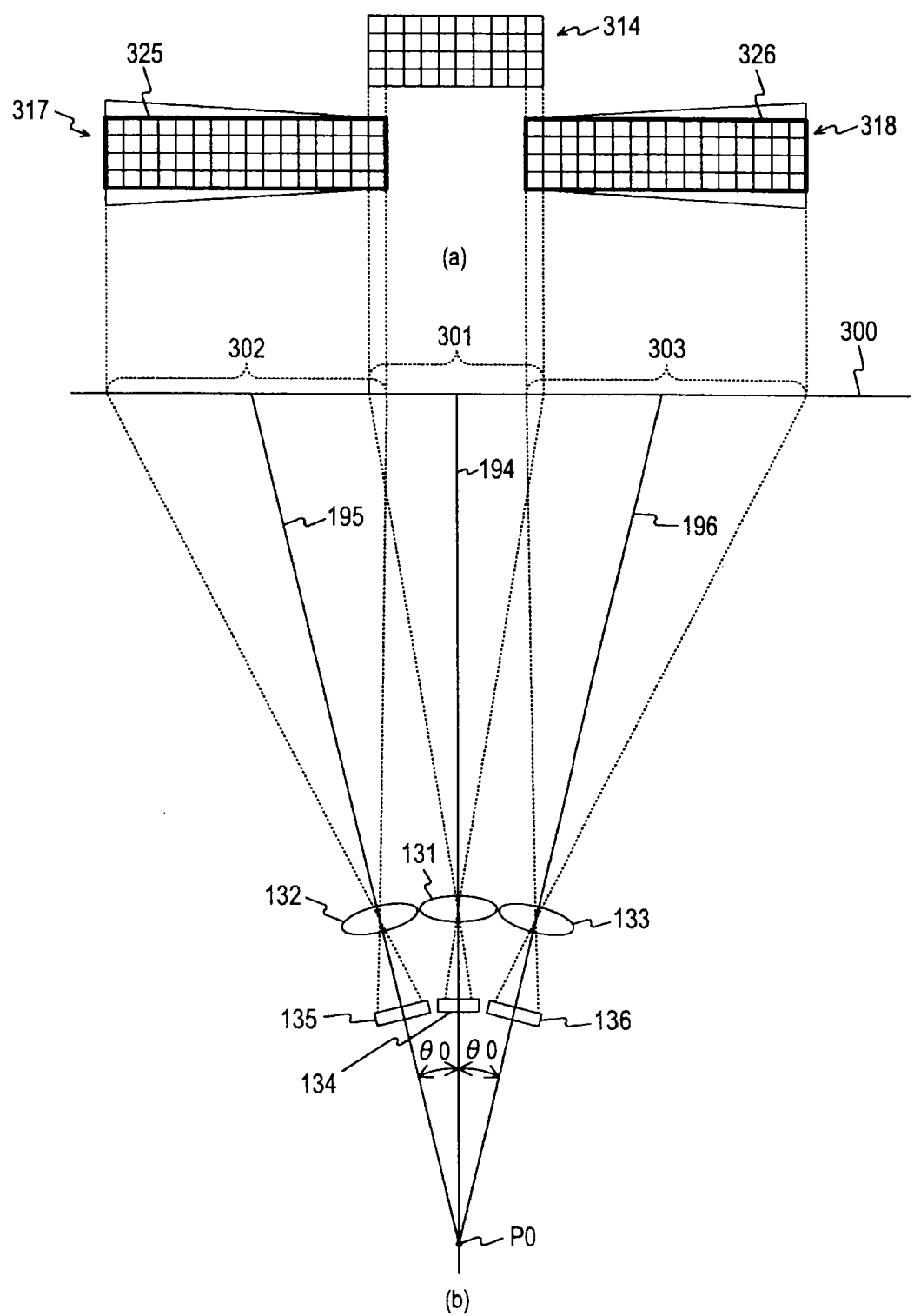
FIG. 23 is a schematic diagram of a relation between the imaging systems in the imaging unit and a captured image generated by the imaging systems and corrected images after correction in the first embodiment.

FIG. 23 is a schematic diagram of a relation between the imaging systems in the imaging unit 130 and captured images generated by the imaging systems and corrected images after correction in the first embodiment. In (a) in FIG. 23, the captured image 314 generated by the imaging unit 130 and corrected images 317 and 318 obtained by correcting the captured images 315 and 316 shown in (a) in FIG. 21 are schematically shown. An example shown in (b) in FIG. 23 is the same as the example shown in FIG. 18 except that reference numerals and signs are omitted.

As explained above, concerning the captured image 315 shown in (a) in FIG. 21, coordinates are converted such that the length of the right side is multiplied by XR and the length of the left side is multiplied by XL, whereby the corrected image 317 shown in (a) in FIG. 23 is generated. The corrected image 317 generated in this way is an image, an external shape of which is a trapezoid. Therefore, it is possible to acquire, by cutting out the center in the corrected image 317 in a rectangular shape, an image 325 (indicated by a thick line) with a trapezoidal distortion corrected.

Similarly, concerning the captured image 316 shown in (a) in FIG. 21, coordinates are converted such that the length of the left side is multiplied by XR and the length of the right side is multiplied by XL, whereby the corrected image 318 shown in (a) in FIG. 23 is generated. It is possible to acquire, by cutting out the center in the corrected image 318 in a rectangular shape, an image 326 (indicated by a thick line) with a trapezoidal distortion corrected. Trapezoidal distortion correction processing for a captured image is performed by the image combination processing unit 224.

When such trapezoidal distortion correction is performed, for example, coordinates of pixels in a captured image distorted in a trapezoidal shape are measured and the values XR and XL of the ratios are calculated in advance. It is possible to perform, using the values XR and XL of the ratios calculated in advance, the trapezoidal distortion correction processing in a software manner with an arithmetic device such as a CPU incorporated in the cellular phone apparatus 100.

An example of the correcting method for correcting a trapezoidal distortion of a captured image caused by three-eye imaging operation is explained above. However, correction may be performed by other trapezoidal distortion correcting methods (see, for example, JP-A-08-307770). Combination example of captured images.

Figure 24A:
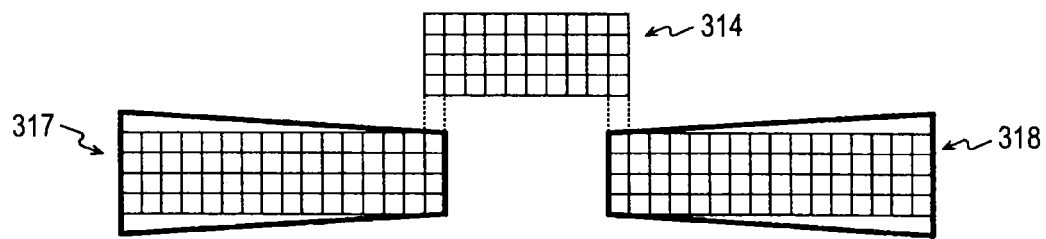
FIGS. 24A to 24C are schematic diagrams of a flow of combination in which an image combination processing unit generates a combined image in the first embodiment.
Figure 24B:
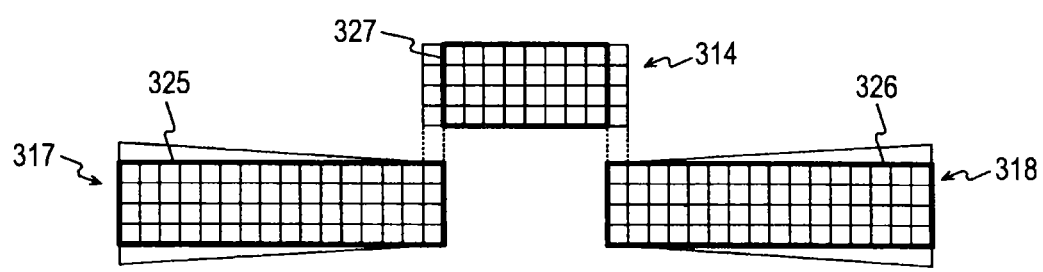
Figure 24C:
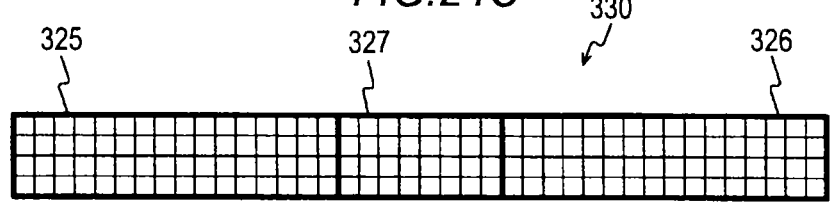

FIGS. 24A to 24C are schematic diagrams of a flow of combination in which the image combination processing unit 224 generates a combined image in the first embodiment. In this example, three captured images generated by three imaging systems are combined on the basis of an angle (a convergence angle) formed by optical axes of the three imaging systems. Specifically, in an overlapping portion of two captured images generated by two imaging systems, one of the captured images is removed and, after the removal, the two captured images are combined.

In FIG. 24A, the captured image 314 and corrected images 317 and 318 generated by the first to third imaging systems 191 to 193 in the imaging unit 130 are shown. The captured image 314 and the corrected images 317 and 318 are the same as those shown in (a) in FIG. 23. As shown in FIG. 24A, the captured image 314 and the corrected images 317 and 318 with trapezoidal distortions corrected by the trapezoidal distortion correction processing are acquired.

As explained above, the same subject is included in the area at the right end of the corrected image 317 and the area at the left end of the captured image 314. The same subject is included in the area at the left end of the corrected image 318 and the area at the right end of the captured image 314.

Therefore, a method of calculating the areas including the same subjects is explained below.

In FIG. 22, a distance between the intersection S11 and the intersection S21 is represented as L61. A distance between the intersection S11 and the intersection S13 is represented as L62. A distance between the intersection S51 and the intersection S21 is represented as L63. A distance between the intersection S13 and the intersection S51 is represented as L64. A distance between the intersection S32 and the intersection S51 is represented as L65. A distance between the intersection S32 and the intersection S13 is represented as L66. The distance L66 is a distance for specifying areas including the same subject in a captured image generated by the first imaging system 191 and a captured image generated by the second imaging system 192. The areas are common areas of an area at the left end of the captured image generated by first imaging system 191 and an area at the right end of the captured image generated by the second imaging system 192.

The following Formulas 7 and 8 hold according to the formula of the trigonometric function.

$$L61 = (L11 + L12) \times \tan\theta 0 \quad \text{(Formula 7)}$$

$$L62 = L12 \times \tan\theta 1 \quad \text{(Formula 8)}$$

The following Formula 9 is obtained according to the formula trigonometric function and Formula 2.

$$L63 = L51 \times \tan\theta 0 \quad \text{(Formula 9)}$$
$$= [\{(L11 + L12)/\cos\theta 0\} - L11] \times \cos\theta 0 \times \tan\theta 0$$

The following Formula 10 is obtained by using Formulas 7 and 8.

$$L64 = L61 - L62 - L63 \quad \text{(Formula 10)}$$
$$= \{(L11 + L12) \times \tan\theta 0\} -$$
$$(L12 \times \tan\theta 1) - \{(L1 + L12)/\cos\theta 0\} - L11) \times$$
$$\cos\theta 0 \times \tan\theta 0$$

The following Formula 11 is obtained according to the formula of the trigonometric function and Formula 2.

$$L65 = L51 \times \tan(\theta 2 - \theta 0) \quad \text{(Formula 11)}$$
$$= [\{(L11 + L12)/\cos\theta 0\} - L11] \times$$
$$\cos\theta 0 \times \tan(\theta 2 - \theta 0)$$

The following Formula 12 is obtained by using Formulas 10 and 11 obtained above.

$$L66 = L65 - L64 \quad \text{(Formula 12)}$$
$$= \{[\{(L11 + L12)/\cos\theta 0\} - L11] \times$$
$$\cos\theta 0 \times \tan(\theta 2 - \theta 0)\} -$$
$$\{\{(L11 + L12) \times \tan\theta 0\} - (L12 \times \tan\theta 1) -$$

-continued $$\{(L11+L12)/\cos\theta 0\} - L11\} \times$$
$$\cos\theta 0 \times \tan\theta 0$$

When the distances L11 and L12 in the optical axis 194 of the first imaging system 191 are determined, the distance L66 can be calculated by using Formula 12. Distances can be calculated in the same manner concerning common areas of an area at the right end of the captured image generated by the first imaging system 191 and an area at the left end of the captured image generated by the third imaging system 193.

In FIG. 24B, areas as combination targets in the captured image 314 and the corrected images 317 and 318 are shown. For example, concerning the captured image 314 generated by the first imaging system 191, areas equivalent to the distance L66 calculated by using Formula 12 are deleted. Similarly, concerning the captured image 314, the common area calculated concerning the right end of the captured image 314 is deleted. In FIG. 24B, an external shape of an image 327 after the common areas at both the ends is indicated by a thick line.

In FIG. 24C, a panorama image 330 generated by using the captured image 314 and the corrected images 317 and 318 is shown. After the images at both the ends are deleted in the captured image 314 as shown in FIG. 24B, a panorama image is generated by using the image 327 after the deletion and the corrected images 317 and 318. For example, the corrected image 317 is coupled to the left end of the image 327 and the corrected image 318 is coupled to the right end of the image 327 to generate the panorama image 330.

Figure 25A:
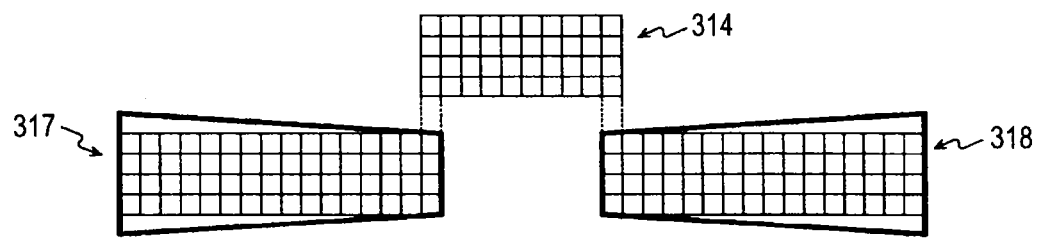
FIGS. 25A to 25C are schematic diagrams of a flow of combination in which the image combination processing unit generates a combined image in the first embodiment.
Figure 25B:
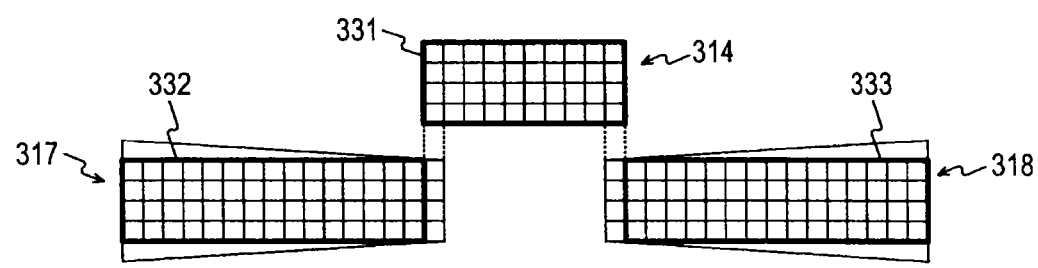
Figure 25C:
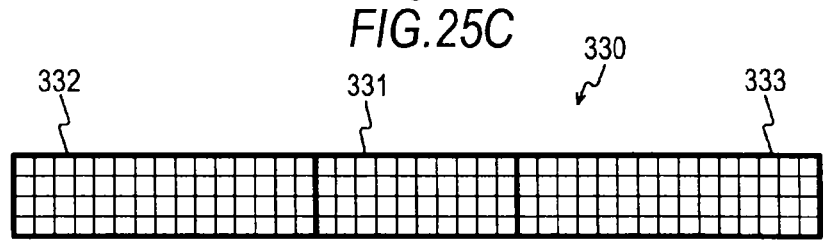

FIGS. 25A to 25C are schematic diagrams of a flow of combination in which the image combination processing unit 224 generates a combined image in the first embodiment. An example shown in FIGS. 25A to 25C is a modification of FIGS. 24A to 24C. An image including areas deleted in image combination is different. Specifically, as shown in FIG. 25B, concerning the corrected image 317 corresponding to the captured image generated by the second imaging system 192, an area (an area at the right end) equivalent to the distance L66 calculated by using Formula 12 is deleted. Similarly, concerning the corrected image 318, a common area calculated concerning the left end is deleted. In FIG. 25B, external shapes of images 332 and 333 after the common areas are deleted are indicated by thick lines.

In FIG. 25C, the panorama image 330 generated by using images 331 to 333 is shown. As shown in FIG. 25B, for example, the image 332 is coupled to the left end of the image 331 and the image 333 is coupled to the right end of the image 331 to generate the panorama image 330.

Figure 26A:
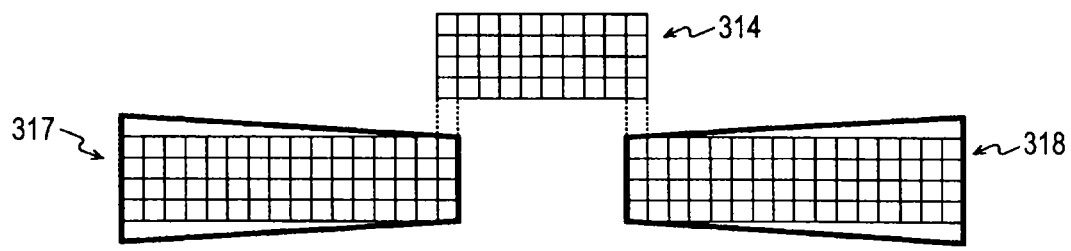
FIGS. 26A to 26C are schematic diagrams of a flow of combination in which the image combination processing unit generates a combined image in the first embodiment.
Figure 26B:
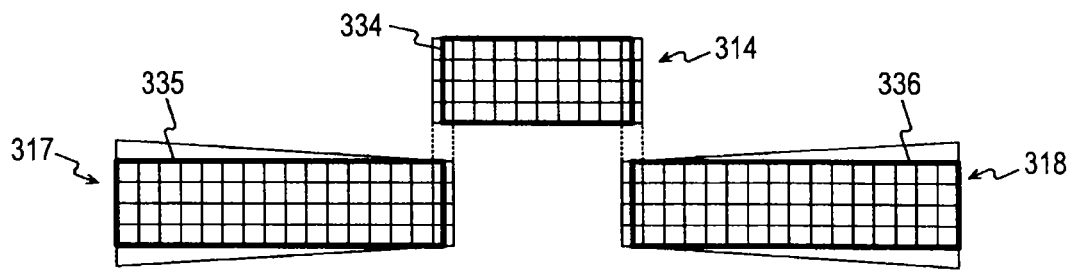
Figure 26C:
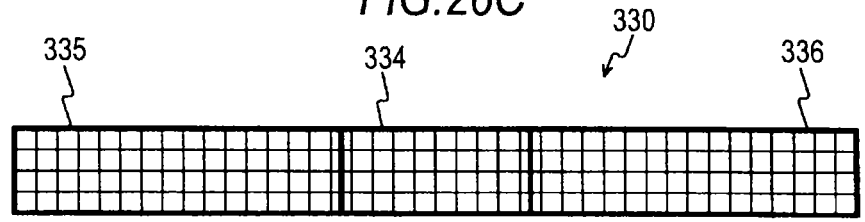

FIGS. 26A to 26C are schematic diagrams of a flow of combination in which the image combination processing unit 224 generates a combined image in the first embodiment. An example shown in FIGS. 26A to 26C is a modification of FIGS. 24A to 24C. An image including areas to be deleted in image combination is different. Specifically, as shown in FIG. 26B, concerning the captured image 314 generated by the first imaging system 191, areas equivalent to a half of the distance L66 calculated by using Formula 12 are deleted. Concerning the corrected image 317 corresponding to the captured image generated by the second imaging system 192, an area (an area at the right end) equivalent to a half of the distance L66 calculated by using Formula 12 is deleted.

Similarly, concerning the captured image 314, a half of the common area calculated concerning the right end of the captured image 314 is deleted. An area (an area at the left end) equivalent to the half of the common area is deleted concerning the corrected image 318 corresponding to the captured image generated by the third imaging system 193. In FIG. 26B, external shapes of the images 334 to 336 after the common areas are deleted are indicated by thick lines.

In FIG. 26C, the panorama image 330 generated by using the images 334 to 336 is shown. As shown in FIG. 26B, for example, the image 335 is coupled to the left end of the image 334 and the image 336 is coupled to the right end of the image 334 to generate the panorama image 330. It is possible to appropriately combine images by deleting parts of images in this way.

These kinds of image combination processing are performed by the image combination processing unit 224. In the example shown in FIG. 8, in the image-signal processing unit 220, the image combination processing unit 224 is arranged at a post-stage of the YC conversion processing unit 223 and at a pre-stage of the sharpness processing unit 225. However, the image combination processing may be performed at other stages of the image-signal processing unit 220. For example, the trapezoidal distortion correction processing and the image combination processing may be performed at a pre-stage of the demosaic processing unit 222. For example, the trapezoidal distortion correction processing and the image combination processing may be performed at a post-stage of the demosaic processing unit 222 and at a pre-stage of the YC conversion processing unit 223. Further, for example, the trapezoidal distortion correction processing and the image combination processing may be performed at a post-stage of the color adjustment processing unit 226.

When such image combination processing is performed, for example, concerning images after trapezoidal distortion correction, overlapping areas of the images are measured in advance. It is possible to perform, using measured values, deletion processing for the overlapping areas of the images in a software manner with an arithmetic device such as a CPU incorporated in the cellular phone apparatus 100.

In this example, the three captured images are combined on the basis of a convergence angle. However, for example, the image combination processing may be performed by using other image combining methods. For example, it is possible to use an image combining method for, concerning an overlapping portion of two captured images generated by two imaging systems, matching patterns of the two images and combining the two images by the pattern matching. It is also possible to use an image combining method for calculating a change in a density level in two images generated by two imaging systems, calculating an overlapping portion on the basis of the change in the density level, and combining the two images.

[Control Example of Imaging Mode]

An example in which image data are read out from the imaging devices 134 to 136 and images of the image data are displayed in the display unit 140 is explained.

Figure 27:
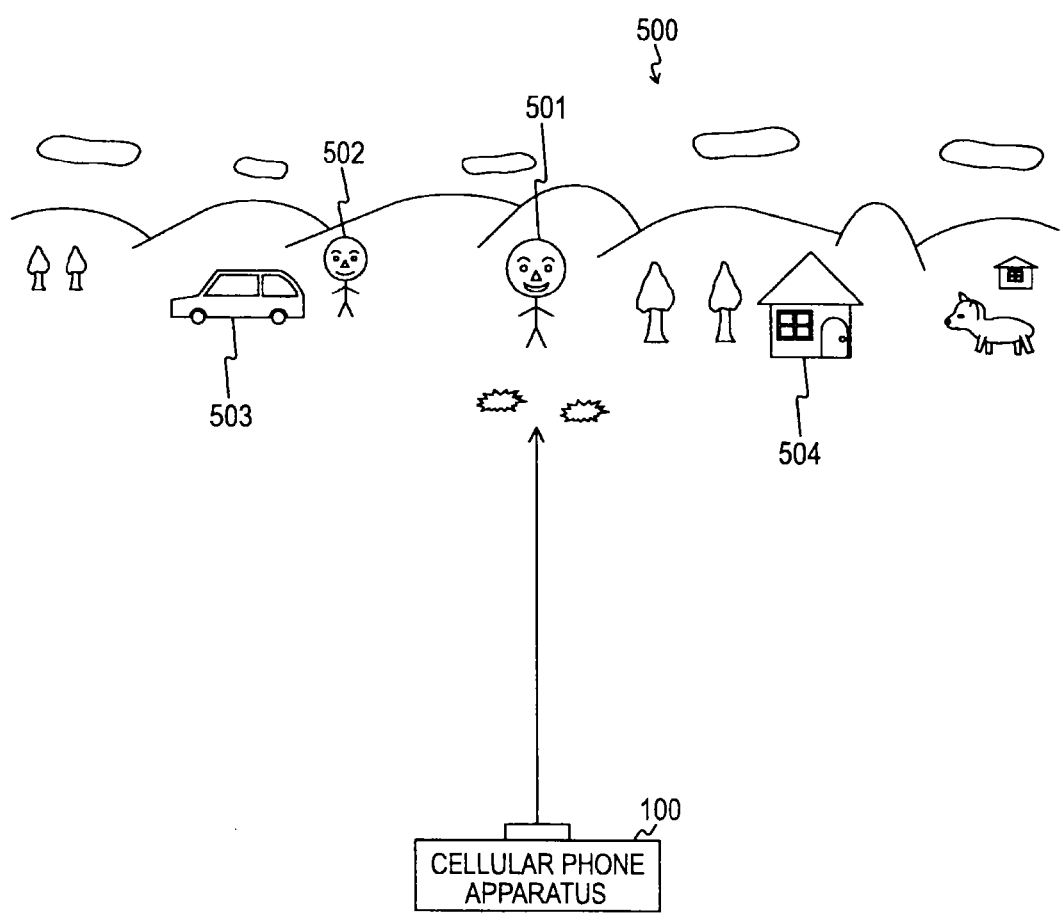
FIG. 27 is a diagram of a subject as an imaging target of imaging processing by the cellular phone apparatus in the first embodiment.

FIG. 27 is a diagram of a subject 500 as an imaging target of imaging processing by the cellular phone apparatus 100 in the first embodiment. The subject 500 is, for example, a subject including persons 501 and 502 standing in the background of mountains and a car 503 and a house 504 around the persons.

[Control Example of Imaging Mode in Landscape State of Second Housing]

First, a method of reading out image data from the imaging devices and a method of displaying the read-out image data when the second housing 120 is set in a landscape state are explained. In the first embodiment, five kinds of imaging modes are explained as imaging modes in the landscape state of the second housing 120.

[Control Example of Three-Eye Landscape Wide-Angle Image Imaging Mode]

Figure 28A:
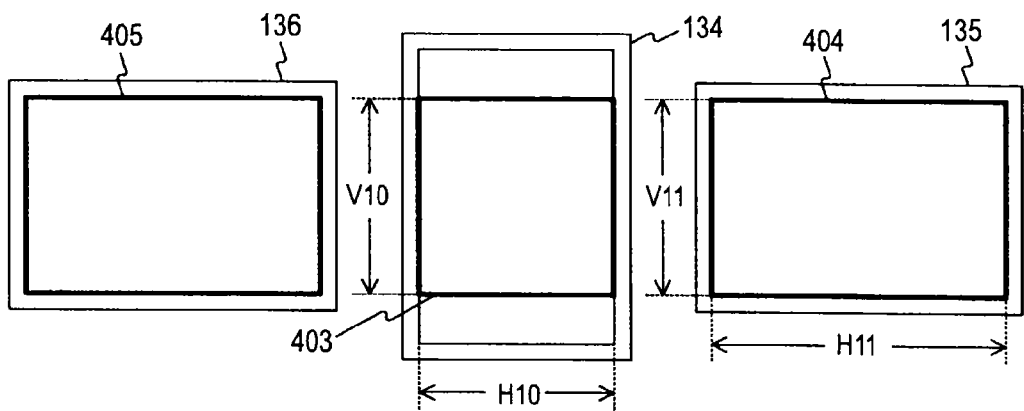
FIGS. 28A and 28B are schematic diagrams of an example of a method of reading image data (a first readout method) in the imaging devices in the first embodiment.
Figure 28B:
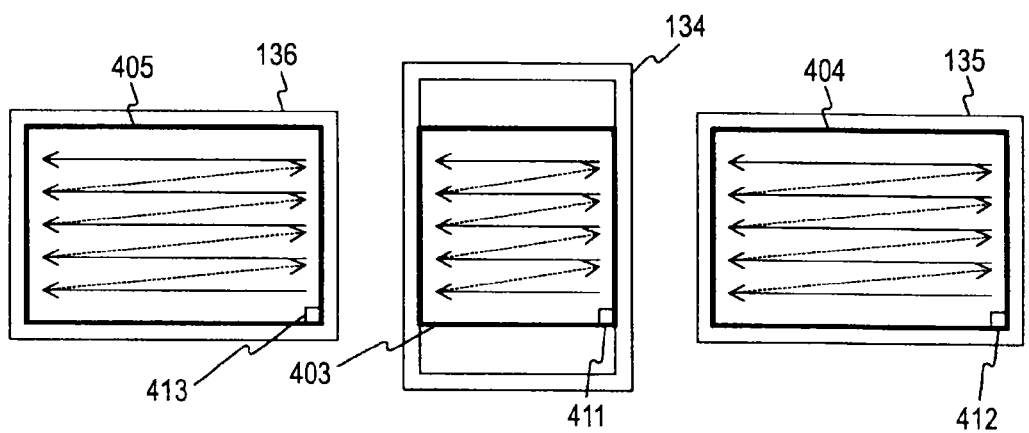

FIGS. 28A and 28B are schematic diagrams of an example of a method of reading out image data in the imaging devices 134 to 136 (a first readout method) in the first embodiment.

In FIG. 28A, pixel data readout areas 403 to 405 in which pixel data are read out in the imaging devices 134 to 136 are shown. The pixel data readout areas 403 to 405 are the same as the pixel data readout areas 403 to 405 shown in FIG. 4B. Therefore, components same as those shown in FIG. 4B are denoted by the same reference numerals and explanation of the components is omitted. Contours of the pixel data readout areas in the imaging devices 134 to 136 are indicated by thick lines. The pixel data readout areas 403 to 405 are areas determined on the basis of setting contents stored in the registers 370 and 380 shown in FIGS. 13A and 13B. In this example, all the pixels of the pixels included in the pixel data readout areas 403 to 405 are read out.

In the first embodiment, for example, as the imaging device 134, an imaging device having the number of pixels 1440×1920 and an aspect ratio 3:4 of the pixels is used. As the imaging devices 135 and 136, an imaging device having the number of pixels 1920×1440 and an aspect ratio 4:3 of pixels is used.

Setting values concerning readout of pixel data of the imaging devices 134 to 136 in performing the readout operation are stored in the registers 370 and 380 shown in FIGS. 13A and 13B. Specifically, setting values (11) to (17) explained below are stored in a longitudinal direction imaging area setting register 374 during composite-eye all pixel readout imaging and a lateral direction imaging area setting register 384 during composite-eye all pixel readout imaging.

(11) The number of pixels H10 in the horizontal direction of an area to be read out in the imaging device 134 (the pixel data readout area 403)

(12) The number of pixels V11 in the vertical direction of the area to be read out in the imaging device 134 (the pixel data readout area 403)

(13) The number of pixels H11 in the horizontal direction of areas to be read out in the imaging devices 135 and 136 (the pixel data readout areas 404 and 405)

(14) The number of pixels V11 in the vertical direction of the areas to be read out in the imaging devices 135 and 136 (the pixel data readout areas 404 and 405)

(15) The number of pixels in the horizontal direction and the number of pixels in the vertical direction from an array end of an array of pixels to a readout start position in the imaging devices 134 to 136

(16) A vertical back porch period from a vertical synchronization signal to pixel readout start in the vertical direction in the imaging devices 134 to 136

(17) A horizontal back porch period from a horizontal synchronization signal to pixel readout start in the horizontal direction in the imaging devices 134 to 136

These setting values may be set in advance or may be set, by user operation, via the signal line L2, in the longitudinal direction imaging area setting register 374 during composite-eye all pixel readout imaging and the lateral direction imaging area setting register 384 during composite-eye all pixel readout imaging.

In FIG. 28B, the readout start positions 411 to 413 and a readout scanning direction in the pixel data readout areas 403 to 405 are shown. The readout start positions 411 to 413 and the readout scanning direction are the same as the readout start positions 411 to 413 and the readout scanning direction shown in FIG. 6A. Therefore, components same as those shown in FIG. 6A are denoted by the same reference numerals and explanation of the component is omitted.

Concerning image data read out from the imaging devices 134 to 136 in this way, as explained above, overlapping portions of images are combined to generate a combined image. However, in the following explanation, for ease of explanation, overlapping areas of images are not taken into account. In this example, from the imaging device 134 having 1440×1920 pixels, image data (1440×1440 pixels) of a part of the pixels is read out. From the imaging devices 135 and 136 having 1920×1440 pixels, image data of all the pixels is read out. When the image data read out in this way are combined, an image having about 7.6 million pixels (5280×1440 pixels) having an aspect ratio 11:3 is generated. A display example of a combined image generated in this way is shown in FIGS. 29A to 29C.

Figure 29A:
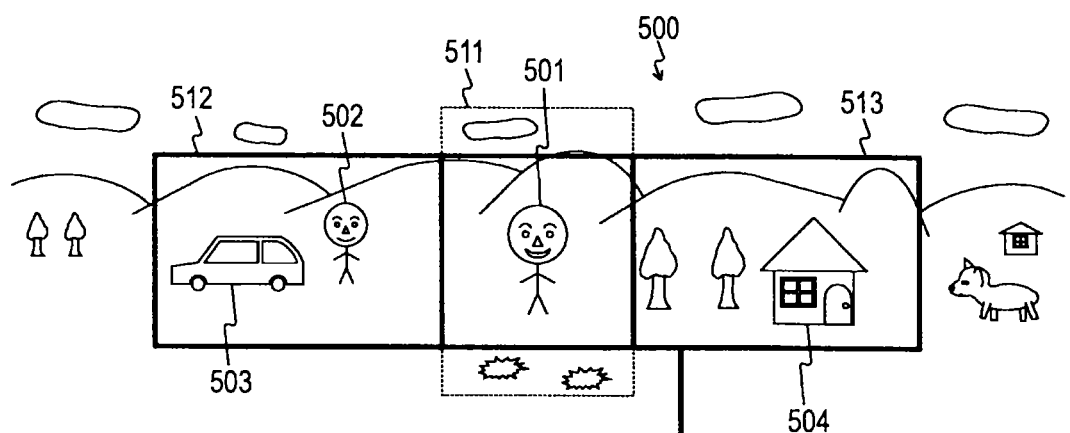
FIGS. 29A to 29C are diagrams of a display example of an image in a display unit in the first embodiment.
Figure 29B:
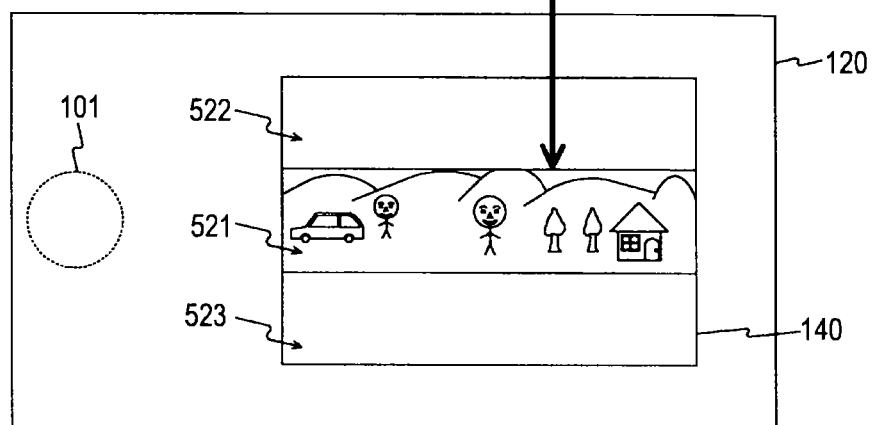
Figure 29C:
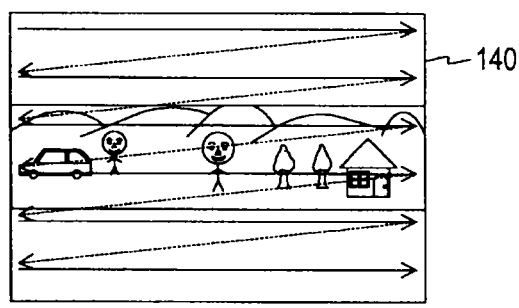

FIGS. 29A to 29C are diagrams of a display example of an image in the display unit 140 in the first embodiment. An example shown in FIGS. 29A to 29C is a display example in which image data read out by the first readout method shown in FIGS. 28A and 28B is displayed.

In FIG. 29A, the subject 500 as an imaging target of the imaging processing by the cellular phone apparatus 100 is shown. The subject 500 is the same as that shown in FIG. 27. Imaging ranges 511 to 513 in the subject 500 are imaging ranges corresponding to the pixel data readout possible areas 400 to 402 of the imaging devices 134 to 136 shown in FIG. 4A. Specifically, the imaging range 511 corresponds to the pixel data readout possible area 400 of the imaging device 134, the imaging range 512 corresponds to the pixel data readout possible area 401 of the imaging device 135, and the imaging range 513 corresponds to the pixel data readout possible area 402 of the imaging device 136. Contours of areas in the imaging ranges 511 to 513 corresponding to the pixel data readout areas 403 and 404 shown in FIGS. 28A and 28B are indicated by thick lines.

In FIG. 29B, a display example in which image data read out by the first readout method shown in FIGS. 28A and 28B when the subject 500 is set as an imaging target is shown. In FIG. 29B, the first housing 110 of the first and second housing 110 and 120 included in the cellular phone apparatus 100 is omitted. In display examples explained below, the first housing 110 is omitted.

Since the aspect ratio of the display unit 140 is 4:3 as explained above, it is difficult to display an image having an aspect ratio of 11:3 on the entire screen of the display unit 140. Therefore, when the pixels in the display unit 140 are arranged in a square lattice shape, for example, an image having an aspect ratio of 11:3 read out and generated by the first readout method shown in FIGS. 28A and 28B is subjected to resolution conversion and displayed. For example, the image is subjected to resolution conversion in the horizontal direction and the vertical direction such that the number of pixels in a lateral direction of the image is substantially the same as the number of pixels in a lateral direction of the display unit 140 and the aspect ratio is 11:3.

As shown in FIG. 29B, a combined image subjected to resolution conversion is displayed in the center in the vertical direction in the display unit 140 (a captured image display area 521). In margin sections (margin image display areas 522 and 523) above and below the displayed image, for example, a single-color image can be displayed.

When the pixels of the display unit 140 are not arranged in a square lattice shape, it is possible to change, such that a shape of an image is not abnormal when displayed in the display unit 140, a scaling factor of the resolution conversion using a ratio of longitudinal and lateral lengths of the pixels of the display unit 140 and display an image subjected to resolution conversion with the changed scaling factor.

In FIG. 29C, a scanning direction in the display unit 140 in displaying pixel data read out from the imaging devices 134 to 136 is shown. The scanning direction is the same as the example shown in FIG. 6C. Therefore, explanation of the scanning direction is omitted.

[Control Example of Three-Eye Landscape Narrow-Angle Image Imaging Mode]

Figure 30A:
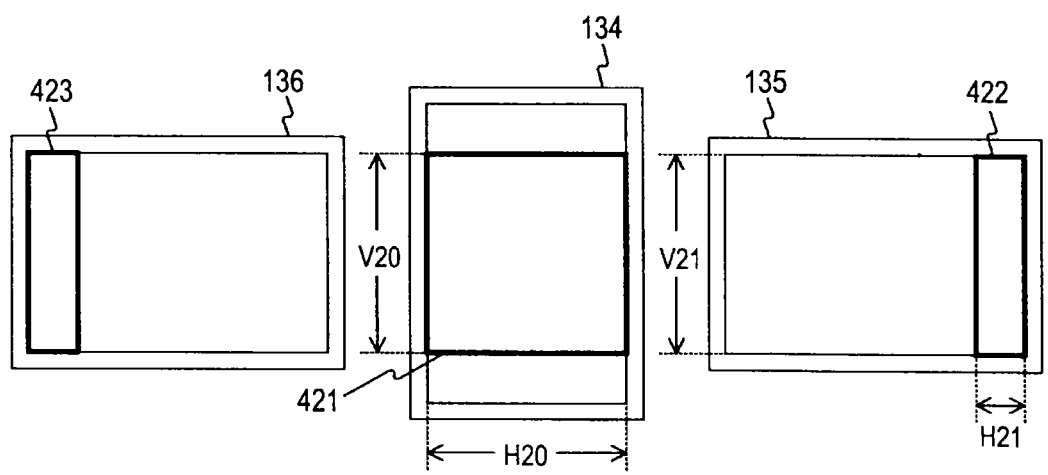
FIGS. 30A and 30B are schematic diagrams of an example of the method of reading out image data (a second readout method) in the imaging devices in the first embodiment.
Figure 30B:
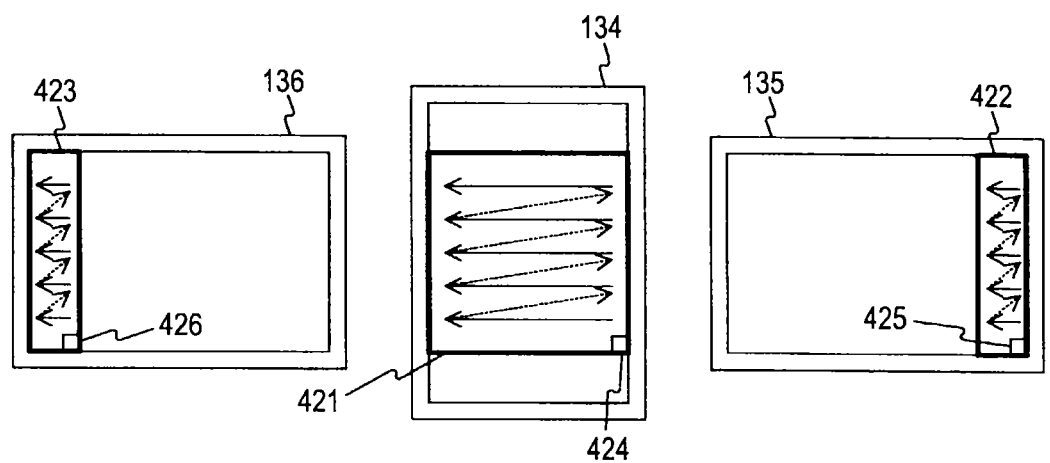

FIGS. 30A and 30B are schematic diagrams of an example of a method of reading out image data (a second readout method) in the imaging devices 134 to 136 in the first embodiment.

In FIG. 30A, pixel data readout areas 421 to 423 in which pixel data are read out in the imaging devices 134 to 136 are shown. The second readout method is a method of reading out a landscape image with which users of imaging apparatuses such as a digital still camera are familiar. For example, an area as a part of the imaging device 134 is read out and areas as parts of the imaging devices 135 and 136 are read out.

The pixel data readout area 421 is the same as, for example, the pixel data readout area 403 shown in FIGS. 28A and 28B (e.g., an area of 1440×1440 pixels). In the pixel data readout areas 422 and 423, for example, length V21 in the vertical direction is the same as length V20 in the vertical direction of the pixel data readout possible areas 401 and 402. In the pixel data readout areas 422 and 423, for example, length H21 in the horizontal direction is ⅙ of the length in the horizontal direction of the pixel data readout possible areas 401 and 402. In other words, the pixel data readout areas 422 and 423 are, for example, areas of 240×1440 pixels. The pixel data readout areas 421 to 423 are areas determined on the basis of the setting contents stored in the registers 370 and 380 shown in FIGS. 13A and 13B. In this example, all the pixels of the pixels included in the pixel data readout areas 421 to 423 are read out. So-called inverted images are focused on the imaging devices 134 to 136. Therefore, the pixel data readout areas 422 and 423 of the imaging devices 135 and 136 are areas on the opposite side of the imaging device 134.

Setting values concerning readout of pixel data of the imaging devices 134 to 136 in performing this readout operation are stored in the registers 370 and 380 shown in FIGS. 13A and 13B. Specifically, setting values (21) to (27) explained below are stored in the longitudinal direction imaging area setting register 374 during composite-eye all pixel readout imaging and the lateral direction imaging area setting register 384 during composite-eye all pixel readout imaging.

(21) The number of pixels H20 in the horizontal direction of an area to be read out in the imaging device 134 (the pixel data readout area 421)

(22) The number of pixels V21 in the vertical direction of the area to be read out in the imaging device 134 (the pixel data readout area 421)

(23) The number of pixels H21 in the horizontal direction of areas to be read out in the imaging devices 135 and 136 (the pixel data readout areas 422 and 423)

(24) The number of pixels V21 in the vertical direction of the areas to be read out in the imaging devices 135 and 136 (the pixel data readout areas 422 and 423)

(25) The number of pixels in the horizontal direction and the number of pixels in the vertical direction from an array end of an array of pixels to a readout start position in the imaging devices 134 to 136

(26) A vertical back porch period from a vertical synchronization signal to pixel readout start in the vertical direction in the imaging devices 134 to 136

(27) A horizontal back porch period from a horizontal synchronization signal to pixel readout start in the horizontal direction in the imaging devices 134 to 136

These setting values may be set in advance or may be set, by user operation, via the signal line L2, in the longitudinal direction imaging area setting register 374 during composite-eye all pixel readout imaging and the lateral direction imaging area setting register 384 during composite-eye all pixel readout imaging.

In FIG. 30B, readout start positions 424 to 426 and a readout scanning direction in the pixel data readout areas 421 to 423 are shown. In this example, from the imaging device 134 having 1440×1920 pixels, image data (1440×1440 pixels) of a part of the pixels is read out. From the imaging devices 135 and 136 having 1920×1440 pixels, image data (240×1440 pixels) of a part of the pixels is read out. When the image data read out in this way are combined, an image having about 2.76 million pixels (1920×1440 pixels) having an aspect ratio 4:3 is generated. A display example of a combined image generated in this way is shown in FIGS. 29A to 29C.

As explained above, in the pixel data readout areas 421 to 423, the sizes of the readout areas in the imaging devices 135 and 136 are set smaller than those in the first readout method. A combined image generated by combining image data read out by the second readout method has an aspect ratio of 4:3 (the aspect ratio may be 16:9 or the like). Therefore, it is possible to generate and display a combined image having an aspect ratio same as an aspect ratio of a recording image in an imaging apparatus commercially available at present.

Figure 31A:
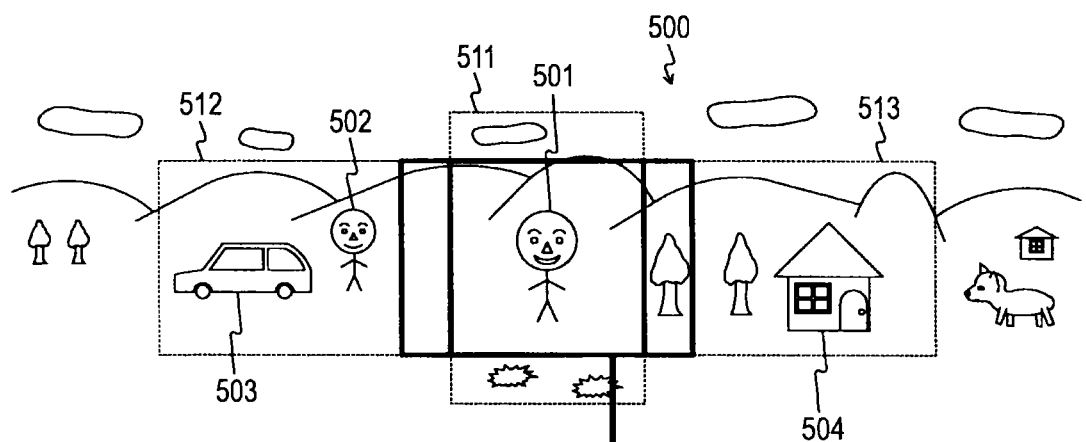
FIGS. 31A to 31C are diagrams of display examples of images in the display unit in the first embodiment.
Figure 31B:
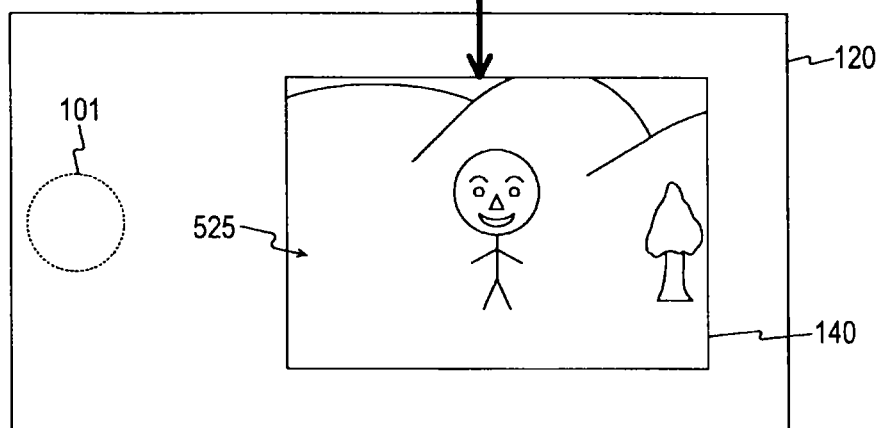
Figure 31C:
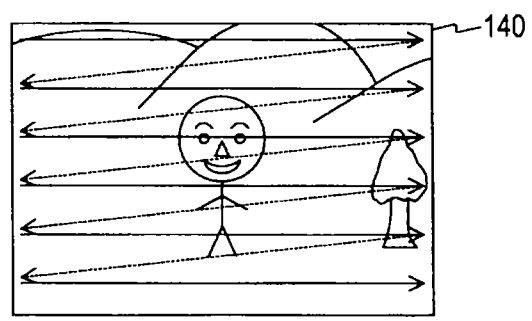

FIGS. 31A to 31C are diagrams of a display example of an image in the display unit 140 in the first embodiment. The example shown in FIGS. 31A and 31B is a display example in which image data readout by the second readout method shown in FIGS. 30A and 30B is displayed.

In FIG. 31A, the subject 500 as an imaging target of the imaging processing by the cellular phone apparatus 100 is shown. An example shown in FIG. 31A is substantially the same as the example shown in FIG. 29A except that the pixel data readout areas are changed. Therefore, components same as those shown in FIG. 29A are denoted by the same reference numerals and explanation of the components is omitted. Contours of areas in the imaging ranges 511 to 513 corresponding to the pixel data readout areas 421 to 423 shown in FIGS. 30A and 30B are indicated by thick lines.

In FIG. 31B, a display example in which image data read out by the second readout method shown in FIGS. 30A and 30B is displayed in the display unit 140 when the subject 500 is set as an imaging target is shown.

Since the aspect ratio of the display unit 140 is 4:3 as explained above and an aspect ratio of a combined image is 4:3, the combined image can be displayed on the entire screen of the display unit 140. For example, the combined image is subjected to resolution conversion to have size the same as the number of pixels of the display unit 140 and displayed in the display unit 140. In this case, the margin image display areas 522 and 523 shown in FIG. 29B are unnecessary.

When an aspect ratio of a combined image read out and generated by the second readout method shown in FIGS. 30A and 30B is not the same as an aspect ratio of a display device, the combined image can be displayed in the same manner as the first readout method. In this case, for example, in margin sections (margin image display areas) above and below the displayed combined image, for example, a single-color is displayed.

In FIG. 31C, a scanning direction in the display unit 140 in displaying pixel data read out from the imaging devices 134 to 136 is shown. The scanning direction is the same as that in the example shown in FIG. 6C. Therefore, explanation of the scanning direction is omitted.

[Control Example of Single-Eye Landscape Image Imaging Mode]

Figure 32A:
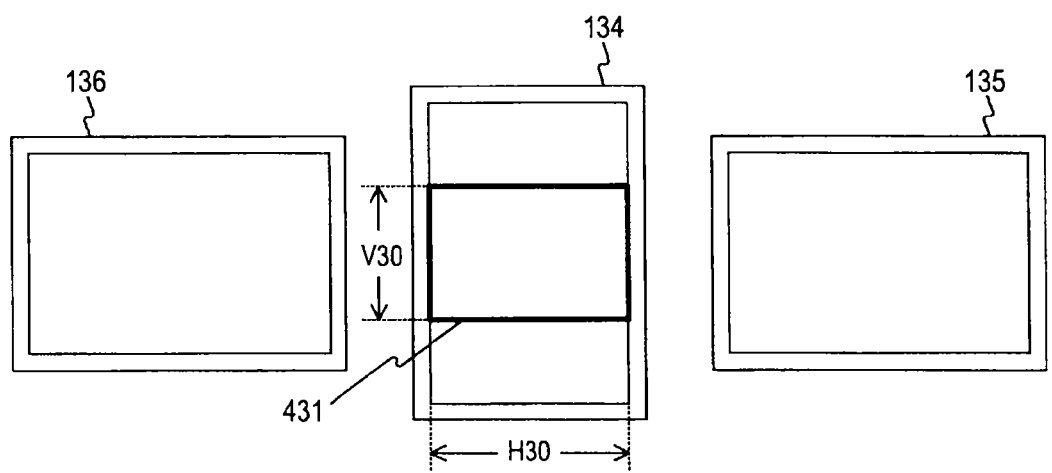
FIGS. 32A and 32B are schematic diagrams of an example of the method of reading out image data (a third readout method) in the imaging devices in the first embodiment.
Figure 32B:
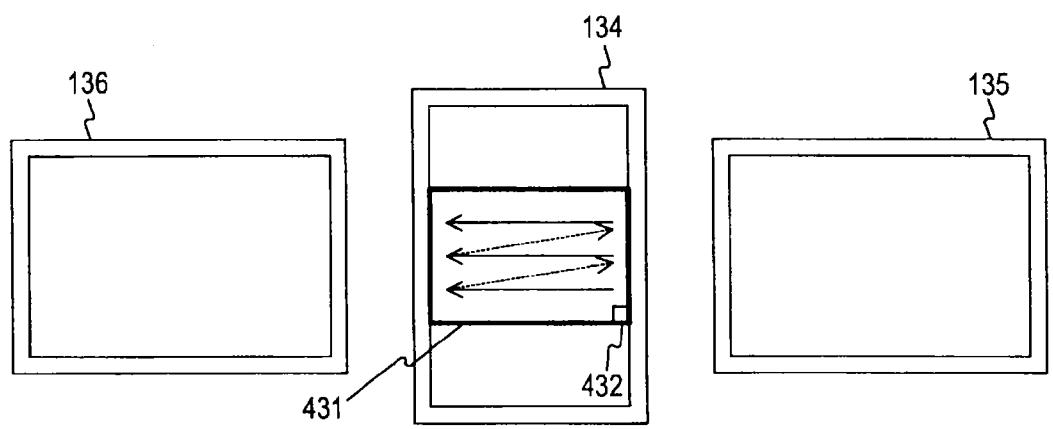

FIGS. 32A and 32B are schematic diagrams of a method of reading out image data (a third readout method) in the imaging devices 134 to 136 in the first embodiment.

In FIG. 32A, a pixel data readout area 431 in which pixel data is read out in the imaging devices 134 to 136 is shown. The third readout method is a method of reading out a landscape image with which users of imaging apparatuses such as a digital still camera are familiar. For example, substantially the entire area in the lateral direction of the imaging device 134 is read out and, in the longitudinal direction, an area of the number of pixels smaller than that in the lateral direction is read out. Readout from the imaging devices 135 and 136 is not performed.

In the pixel data readout area 431, for example, length H30 in the horizontal direction is set the same as the length in the horizontal direction of the pixel data readout possible area 400 and length V30 in the vertical direction is set to about a half of the length in the vertical direction of the pixel data readout possible area 400. The pixel data readout area 431 is, for example, an area of 1440×1080 pixels. The pixel data readout area 431 is an area determined on the basis of the setting contents stored in the registers 370 and 380 shown in FIGS. 13A and 13B. In this example, all the pixels of the pixels included in the pixel data readout area 431 are read out.

Setting values concerning readout of pixel data of the imaging device 134 in performing this readout operation are stored in the registers 370 and 380 shown in FIGS. 13A and 13B. Specifically, setting values (31) to (35) explained below are stored in a longitudinal direction imaging area setting register 371 during single-eye all pixel readout imaging and a lateral direction imaging area setting register 381 during single-eye all pixel readout imaging.

(31) The number of pixels H30 in the horizontal direction of an area to be read out in the imaging device 134 (the pixel data readout area 431)

(32) The number of pixels V30 in the vertical direction of the area to be read out in the imaging device 134 (the pixel data readout area 431)

(33) The number of pixels in the horizontal direction and the number of pixels in the vertical direction from an array end of an array of pixels to a readout start position in the imaging device 134

(34) A vertical back porch period from a vertical synchronization signal to pixel readout start in the vertical direction in the imaging device 134

(35) A horizontal back porch period from a horizontal synchronization signal to pixel readout start in the horizontal direction in the imaging device 134

These setting values may be set in advance or may be set, by user operation, via the signal line L2, in the longitudinal direction imaging area setting register 371 during single-eye all pixel readout imaging and the lateral direction imaging area setting register 381 during single-eye all pixel readout imaging.

In FIG. 32B, a readout start position 432 and a readout scanning direction in the pixel data readout area 431 is shown. In this example, from the imaging device 134 having 1440× 1920 pixels, image data (1440×1080 pixels) of a part of the pixels is read out. Readout from the imaging devices 135 and 136 is not performed. An image having about 1.56 million pixels (1440×1080 pixels) having an aspect ratio 4:3 is generated by using the pixel data read out in this way. A display example of the image generated in this way is shown in FIGS. 33A to 33C.

As explained above, in the pixel data readout area 431, readout is performed only from the imaging device 134 and readout from the imaging devices 135 and 136 is not performed. An image generated on the basis of image data read out by the third readout method has an aspect ratio of 4:3 (the aspect ratio may be 16:9 or the like) as in the second readout method. Therefore, it is possible to generate and display an image having an aspect ratio the same as an aspect ratio of a recording image in an imaging apparatus commercially available at present. Further, for example, it is possible to generate, without causing the imaging devices 135 and 136 to operate, an image higher in definition than a VGA (Video Graphics Array) image (640×480 pixels) that is in wide use. This makes it possible to reduce power consumption.

Figure 33A:
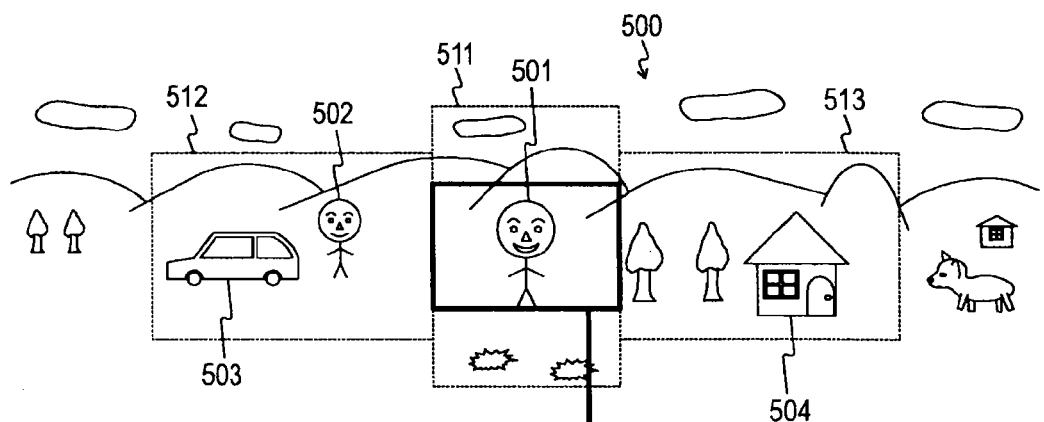
FIGS. 33A to 33C are diagrams of a display example of an image in the display unit in the first embodiment.
Figure 33B:
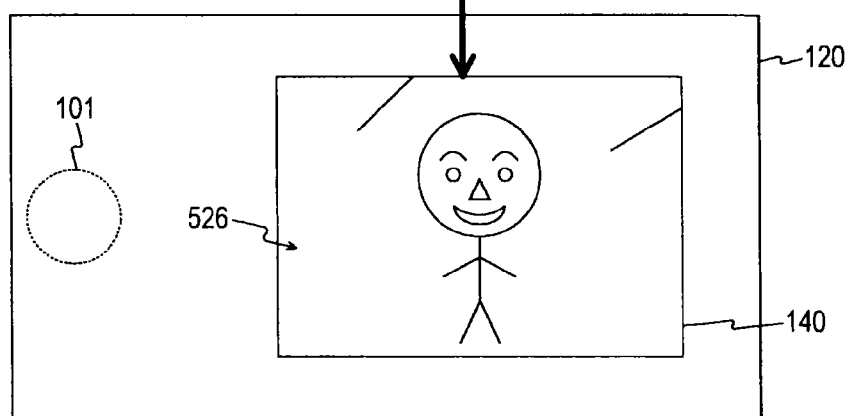
Figure 33C:
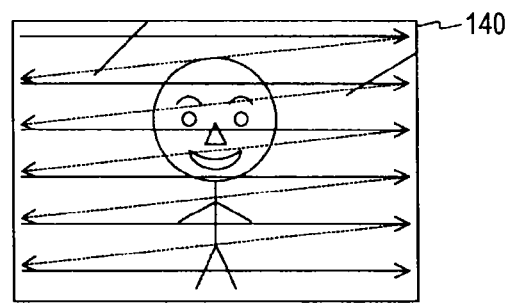

FIGS. 33A to 33C are diagrams of a display example of an image in the display unit 140 in the first embodiment. The example shown in FIGS. 33A to 33C is a display example in which image data read out by the third readout method shown in FIGS. 32A and 32B is displayed.

In FIG. 33A, the subject 500 as an imaging target of the imaging processing by the cellular phone apparatus 100 is shown. An example shown in FIG. 33A is substantially the same as the example shown in FIG. 29A except that the pixel data readout areas are changed. Therefore, components the same as those shown in FIG. 29A are denoted by the same reference numerals and explanation of the components is omitted. A contour of an area in the imaging ranges 511 to 513 corresponding to the pixel data readout area 431 shown in FIGS. 32A and 32B is indicated by a thick line.

In FIG. 33B, a display example in which image data read out by the second readout method shown in FIGS. 30A and 30B is displayed in the display unit 140 when the subject 500 is set as an imaging target is shown.

Since the aspect ratio of the display unit 140 is 4:3 as explained above and an aspect ratio of a generated image is 4:3, the image can be displayed on the entire screen of the display unit 140. For example, the image is subjected to resolution conversion to have size the same as the number of pixels of the display unit 140 and displayed in the display unit 140. In this case, the margin image display areas 522 and 523 shown in FIG. 29B are unnecessary.

When an aspect ratio of an image read out and generated by the third readout method shown in FIGS. 32A and 32B is not the same as an aspect ratio of a display device, the image can be displayed in the same manner as the first readout method. In this case, for example, in margin sections (margin image display areas) above and below the displayed image, for example, a single-color is displayed.

In FIG. 33C, a scanning direction in the display unit 140 in displaying pixel data read out from the imaging devices 134 to 136 is shown. The scanning direction is the same as that in the example shown in FIG. 6C. Therefore, explanation of the scanning direction is omitted.

[Control Example of Single-Eye Portrait Image Imaging Mode]

Figure 34A:
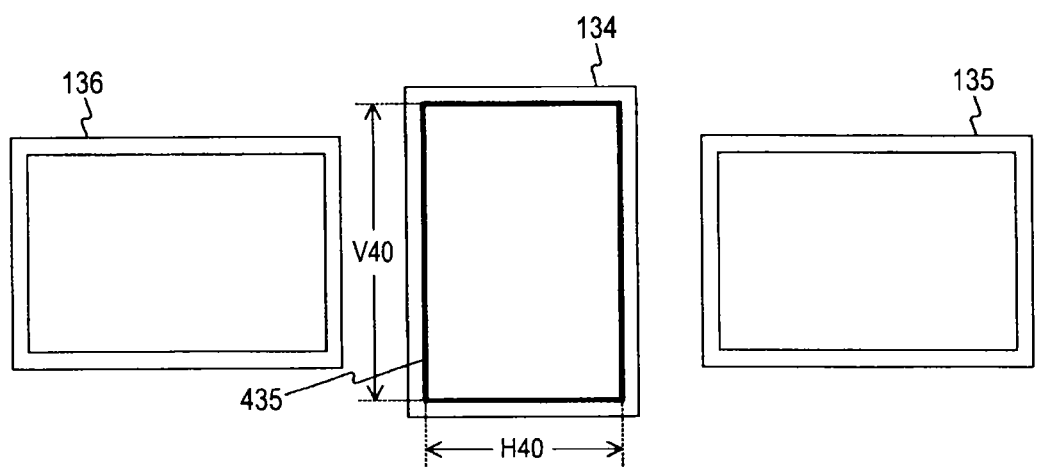
FIGS. 34A and 34B are schematic diagrams of an example of the method of reading out image data (a fourth readout method) in the imaging devices in the first embodiment.
Figure 34B:
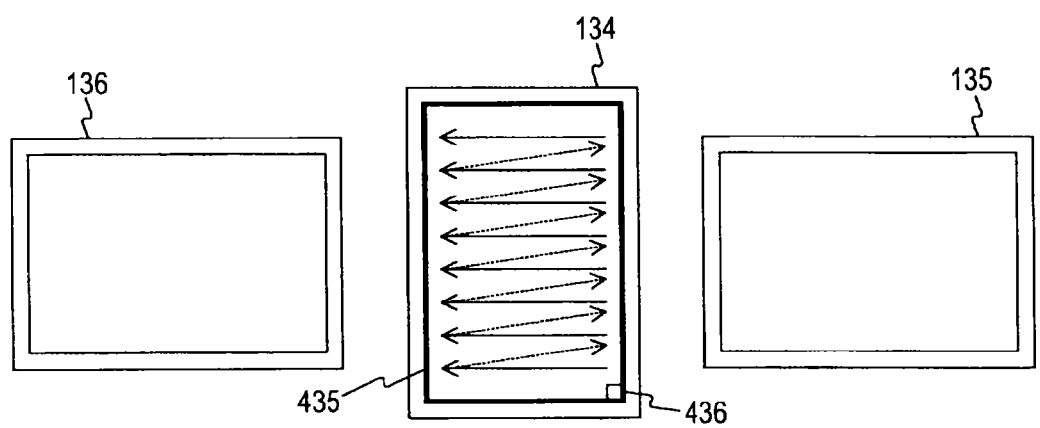

FIGS. 34A and 34B are schematic diagrams of an example of a method of reading out image data (a fourth readout method) in the imaging devices 134 to 136 in the first embodiment.

In FIG. 34A, a pixel data readout area 435 in which pixel data is read out in the imaging devices 134 to 136 is shown. The fourth readout method is a method of reading out a portrait image with which users of cellular phone apparatuses are familiar. For example, the entire area of the imaging device 134 is read out. Readout from the imaging devices 135 and 136 is not performed.

In the pixel data readout area 435, for example, length H40 in the horizontal direction is set the same as the length in the horizontal direction of the pixel data readout possible area 400 and length V40 in the vertical direction is set the same as the length in the vertical direction of the pixel data readout possible area 400. The pixel data readout area 435 is, for example, an area of 1440×1920 pixels. The pixel data readout area 435 is an area determined on the basis of the setting contents stored in the registers 370 and 380 shown in FIGS. 13A and 13B. In this example, all the pixels of the pixels included in the pixel data readout area 435 are read out.

Setting values concerning readout of pixel data of the imaging device 134 in performing this readout operation are stored in the registers 370 and 380 shown in FIGS. 13A and 13B. Specifically, setting values (41) to (45) explained below are stored in the longitudinal direction imaging area setting register 371 during single-eye all pixel readout imaging and the lateral direction imaging area setting register 381 during single-eye all pixel readout imaging.

(41) The number of pixels H40 in the horizontal direction of an area to be read out in the imaging device 134 (the pixel data readout area 435)

(42) The number of pixels V40 in the vertical direction of the area to be read out in the imaging device 134 (the pixel data readout area 435)

(43) The number of pixels in the horizontal direction and the number of pixels in the vertical direction from an array end of an array of pixels to a readout start position in the imaging device 134

(44) A vertical back porch period from a vertical synchronization signal to pixel readout start in the vertical direction in the imaging device 134

(45) A horizontal back porch period from a horizontal synchronization signal to pixel readout start in the horizontal direction in the imaging device 134

These setting values may be set in advance or may be set, by user operation, via the signal line L2, in the longitudinal direction imaging area setting register 371 during single-eye all pixel readout imaging and the lateral direction imaging area setting register 381 during single-eye all pixel readout imaging.

In FIG. 34B, a readout start position 436 and a readout scanning direction in the pixel data readout area 435 is shown. In this example, from the imaging device 134 having 1440× 1920 pixels, image data (1440×1080 pixels) of all the pixels is read out. Readout from the imaging devices 135 and 136 is not performed. An image having about 2.76 million pixels (1440×1920 pixels) having an aspect ratio 3:4 is generated by using the pixel data read out in this way. A display example of the image generated in this way is shown in FIGS. 35A to 35C.

As explained above, in the pixel data readout area 435, readout is performed from the imaging device 134 and readout from the imaging devices 135 and 136 is not performed. An image generated on the basis of image data read out by the fourth readout method has an aspect ratio of 3:4. Therefore, it is possible to generate, without causing the imaging devices 135 and 136 to operate, an image higher in definition than a portrait VGA (640×480 pixels) that is in wide use. This makes it possible to reduce power consumption.

Figure 35A:
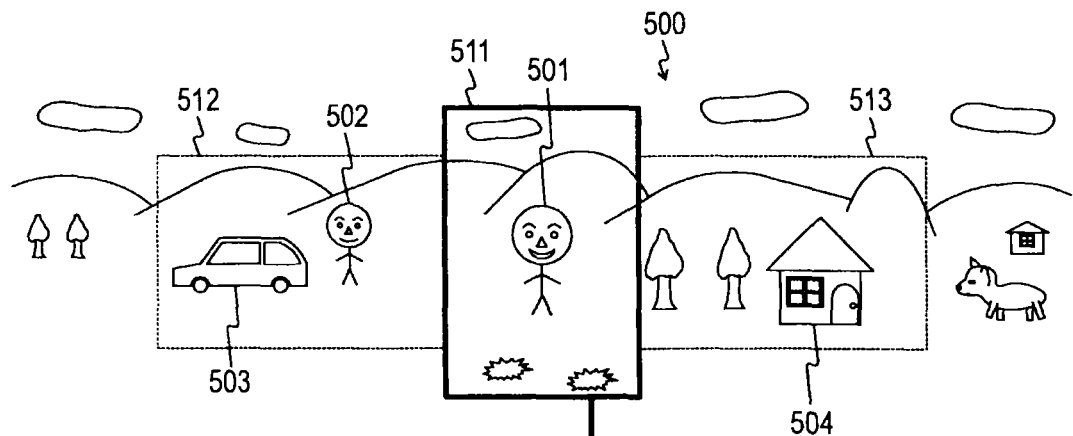
FIGS. 35A to 35C are diagrams of a display example of an image in the display unit in the first embodiment.
Figure 35B:
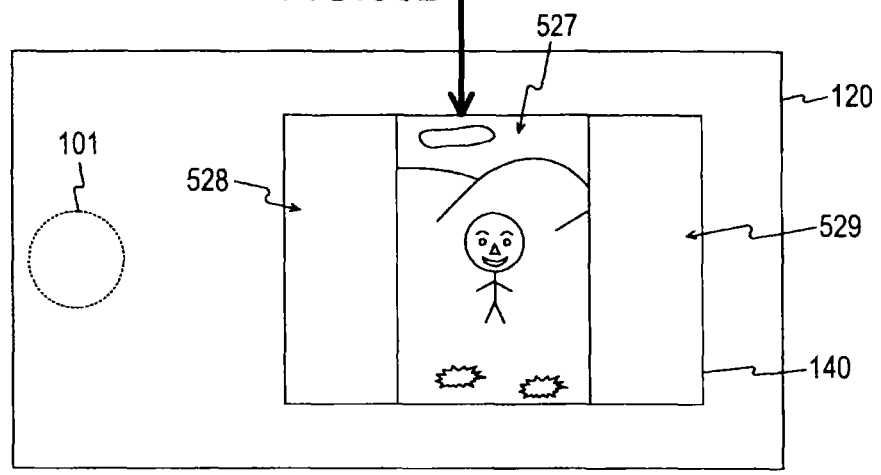
Figure 35C:
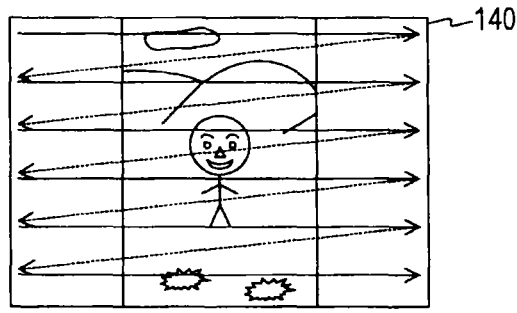

FIGS. 35A to 35C are diagrams of a display example of an image in the display unit 140 in the first embodiment. The example shown in FIGS. 35A to 35C is a display example in which image data read out by the fourth readout method shown in FIGS. 34A and 34B is displayed.

In FIG. 35A, the subject 500 as an imaging target of the imaging processing by the cellular phone apparatus 100 is shown. An example shown in FIG. 35A is substantially the same as the example shown in FIG. 29A except that the pixel data readout areas are changed. Therefore, components same as those shown in FIG. 29A are denoted by the same reference numerals and explanation of the components is omitted. A contour of an area in the imaging ranges 511 to 513 corresponding to the pixel data readout area 435 shown in FIGS. 34A and 34B is indicated by a thick line.

In FIG. 35B, a display example in which image data read out by the fourth readout method shown in FIGS. 34A and 34B is displayed in the display unit 140 when the subject 500 is set as an imaging target is shown.

Since the aspect ratio of the display unit 140 is 4:3 as explained above, it is difficult to display a generated image having an aspect ratio 3:4 on the entire screen of the display unit 140. Therefore, for example, as in the first readout method, the image having the aspect ratio of 3:4 is subjected to resolution conversion and displayed. For example, the image is subjected to resolution conversion in the horizontal and the vertical directions such that the number of pixels in a longitudinal direction of the image is substantially the same as the number of pixels in the longitudinal direction of the display unit 140 and the aspect ratio of the image is 3:4.

As shown in FIG. 35B, the image subjected to resolution conversion is displayed in the center in the horizontal direction in the display unit 140 (a captured image display area 527). In margin sections (margin image display areas 528 and 529) on the left and the right of the displayed image, for example, a single-color image can be displayed.

When an aspect ratio of an image read out and generated by the fourth readout method is not the same as an aspect ratio of a display device, the image can be displayed in the same manner as the first readout method.

In FIG. 35C, a scanning direction in the display unit 140 in displaying pixel data read out from the imaging devices 134 to 136 is shown. The scanning direction is the same as that in the example shown in FIG. 6C. Therefore, explanation of the scanning direction is omitted.

[Control Example of Single-Eye Portrait Small-Area Image Imaging Mode]

Figure 36A:
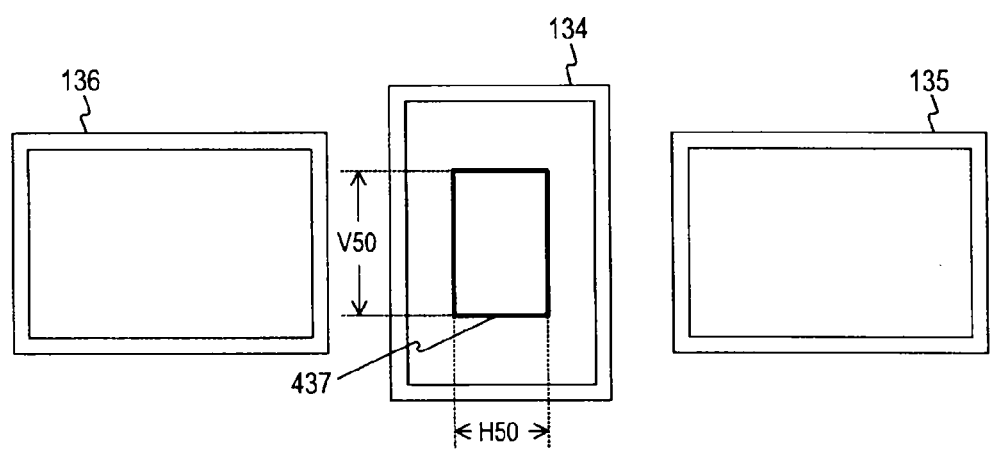
FIGS. 36A and 36B are schematic diagrams of an example of the method of reading out image data (a fifth readout method) in the imaging devices in the first embodiment.
Figure 36B:
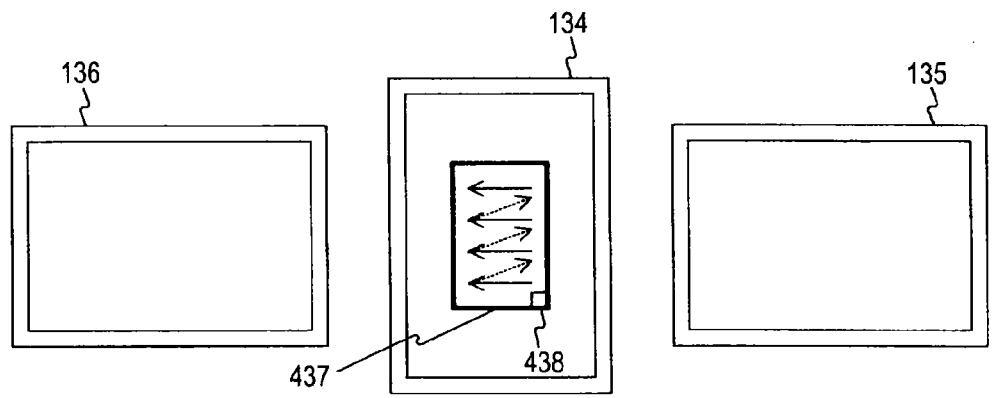

FIGS. 36A and 36B are schematic diagrams of an example of a method of reading out image data (a fifth readout method) in the imaging devices 134 to 136 in the first embodiment.

In FIG. 36A, a pixel data readout area 437 in which pixel data is read out in the imaging devices 134 to 136 is shown. The fifth readout method is a method of reading out a portrait image with which users of cellular phone apparatuses are familiar. For example, an area as a part of the imaging device 134 is read out. Readout from the imaging devices 135 and 136 is not performed.

In the pixel data readout area 437, for example, length H50 in the horizontal direction is set shorter than the length in the horizontal direction of the pixel data readout possible area 400 and length V50 in the vertical direction is set shorter than the length in the vertical direction of the pixel data readout possible area 400. The pixel data readout area 437 is, for example, an area of 480×640 pixels. The pixel data readout area 437 is an area determined on the basis of the setting contents stored in the registers 370 and 380 shown in FIGS.

13A and 13B. In this example, all the pixels of the pixels included in the pixel data readout area 437 are read out.

Setting values concerning readout of pixel data of the imaging device 134 in performing this readout operation are stored in the registers 370 and 380 shown in FIGS. 13A and 13B. Specifically, setting values (51) to (55) explained below are stored in the longitudinal direction imaging area setting register 371 during single-eye all pixel readout imaging and the lateral direction imaging area setting register 381 during single-eye all pixel readout imaging.

(51) The number of pixels H50 in the horizontal direction of an area to be read out in the imaging device 134 (the pixel data readout area 437)

(52) The number of pixels V50 in the vertical direction of the area to be read out in the imaging device 134 (the pixel data readout area 437)

(53) The number of pixels in the horizontal direction and the number of pixels in the vertical direction from an array end of an array of pixels to a readout start position in the imaging device 134

(54) A vertical back porch period from a vertical synchronization signal to pixel readout start in the vertical direction in the imaging device 134

(55) A horizontal back porch period from a horizontal synchronization signal to pixel readout start in the horizontal direction in the imaging device 134

These setting values may be set in advance or may be set, by user operation, via the signal line L2, in the longitudinal direction imaging area setting register 371 during single-eye all pixel readout imaging and the lateral direction imaging area setting register 381 during single-eye all pixel readout imaging.

In FIG. 36B, a readout start position 438 and a readout scanning direction in the pixel data readout area 437 is shown. In this example, from the imaging device 134 having 1440× 1920 pixels, image data (480×640 pixels) of a part of the pixels is read out. Readout from the imaging devices 135 and 136 is not performed. An image having about 310 thousand pixels (480×640 pixels) having an aspect ratio 3:4 is generated by using the pixel data read out in this way. A display example of the image generated in this way is shown in FIGS. 37A to 37C.

As explained above, in the pixel data readout area 437, readout is performed from a part of the imaging device 134 and readout from the imaging devices 135 and 136 is not performed. An image generated on the basis of image data read out by the fifth readout method is an image more suitable for radio transmission (i.e., an image having a smaller data amount) than, for example, an image generated by the fourth readout method.

Figure 37A:
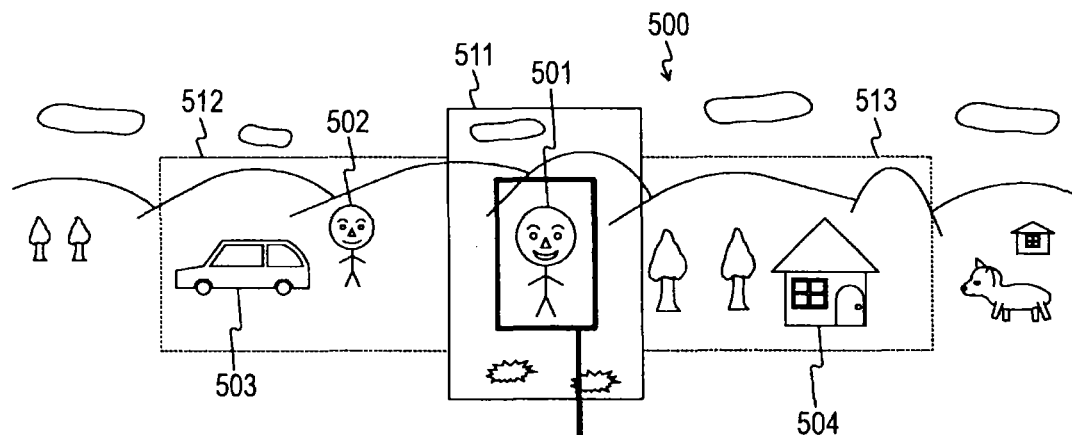
FIGS. 37A to 37C are diagrams of a display example of an image in the display unit in the first embodiment.
Figure 37B:
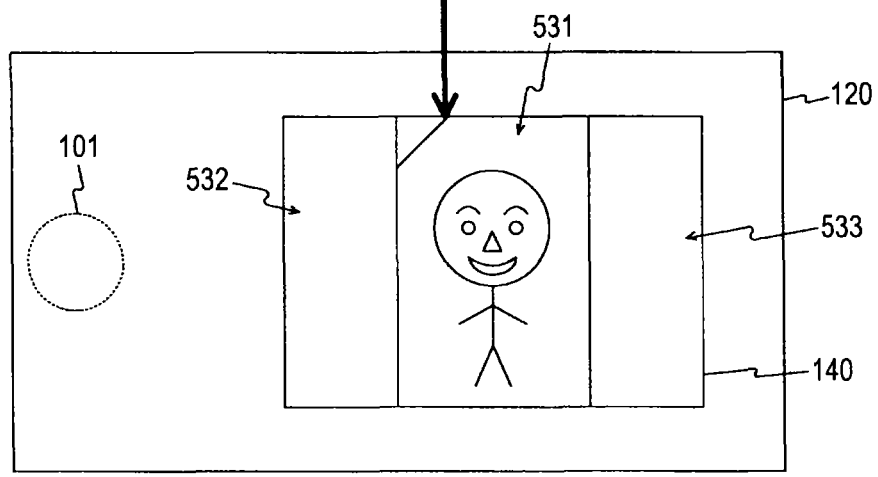
Figure 37C:
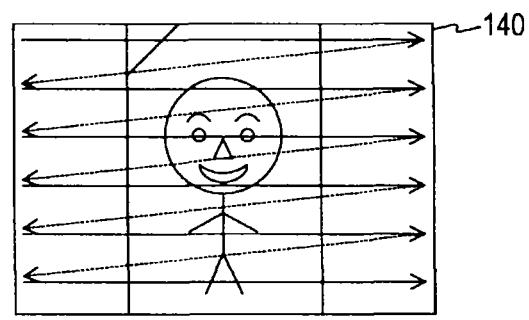

FIGS. 37A to 37C are diagrams of a display example of an image in the display unit 140 in the first embodiment. The example shown in FIGS. 37A to 37C is a display example in which image data read out by the fifth readout method shown in FIGS. 36A and 36B is displayed.

In FIG. 37A, the subject 500 as an imaging target of the imaging processing by the cellular phone apparatus 100 is shown. An example shown in FIG. 37A is substantially the same as the example shown in FIG. 29A except that the pixel data readout areas are changed. Therefore, components the same as those shown in FIG. 29A are denoted by the same reference numerals and explanation of the components is omitted. A contour of an area in the imaging ranges 511 to 513 corresponding to the pixel data readout area 437 shown in FIGS. 36A and 36B is indicated by a thick line.

In FIG. 37B, a display example in which image data read out by the fifth readout method shown in FIGS. 36A and 36B is displayed in the display unit 140 when the subject 500 is set as an imaging target is shown.

Since the aspect ratio of the display unit 140 is 4:3 as explained above, it is difficult to display an image having an aspect ratio 3:4 on the entire screen of the display unit 140. Therefore, for example, as in the fourth readout method, the image having the aspect ratio of 3:4 is subjected to resolution conversion and displayed. For example, the image is subjected to resolution conversion in the horizontal and the vertical directions such that the number of pixels in a longitudinal direction of the image is substantially the same as the number of pixels in the longitudinal direction of the display unit 140 and the aspect ratio of the image is 3:4.

As shown in FIG. 37B, the image subjected to resolution conversion is displayed in the center in the horizontal direction in the display unit 140 (a captured image display area 531). In margin sections (margin image display areas 532 and 533) on the left and the right of the displayed image, for example, a single-color image can be displayed.

When an aspect ratio of an image read out and generated by the fifth readout method is not the same as an aspect ratio of a display device, the image can be displayed in the same manner as the first readout method.

In FIG. 37C, a scanning direction in the display unit 140 in displaying pixel data read out from the imaging devices 134 to 136 is shown. The scanning direction is the same as that in the example shown in FIG. 6C. Therefore, explanation of the scanning direction is omitted.

Setting values concerning read out of the pixel data of the imaging devices 134 to 136 are stored in the registers 370 and 380 shown in FIGS. 13A and 13B and stored in the imaging control unit 201. When the second housing 120 is in the portrait state, every time an imaging range changeover switch 111 shown in FIGS. 1A to 1D and the like is depressed by the user, the first to the fifth readout methods are switched. In this case, every time the imaging range changeover switch 111 is depressed, the imaging control unit 201 detects the depression and sequentially switches the first to the fifth readout methods. For example, immediately after the cellular phone apparatus 100 is started, when the second housing 120 is in the landscape state, the first readout method can be set.

[Example of Pixel Thinning-Out and Pixel Addition]

The examples in which all the pixels included in the pixel data readout area are read out are explained as the first to the fifth readout methods. However, depending on a purpose of use, a high definition image is not necessary. Therefore, an example in which a part of pixels included in a pixel data readout area is read out to reduce power consumption is explained below.

Sixth to tenth readout methods explained below are examples in which a part of pixels included in a pixel data readout area is read out by performing pixel thinning-out processing in the imaging devices 134 to 136. Although not explained below, a part of the pixels included in the pixel data readout area may be read out by performing pixel addition processing in the imaging device 134 to 136.

[Thinning-Out Example of Three-Eye Landscape Wide-Angle Image Imaging Mode]

First, the sixth readout method is explained with reference to FIGS. 28A and 28B and FIGS. 29A to 29C. The sixth readout method corresponds to the first readout method. In the pixel data readout areas 403 to 405 shown in FIGS. 28A and 28B, ½ pixel thinning-out readout is performed in the longitudinal direction and ½ pixel thinning-out readout is performed in the lateral direction. Specifically, image data (720×720 pixels) thinned out to ½ in the longitudinal direction and the lateral direction is read out from the pixel data readout area 403 in the imaging device 134 having 1440×1920 pixels. Image data (960×720 pixels) thinned out to ½ in the longitudinal direction and the lateral direction is read out from the pixel data readout areas 404 and 405 in the imaging devices 135 and 136 having 1920×1440 pixels. When the image data read out in this way are combined, an image having about 1.9 million pixels (2640×720 pixels) having an aspect ratio of 11:3 is generated. The image is an image having a relatively wide-angle of view in the horizontal direction and higher in precision than the VGA image as in the example shown in FIGS. 29A to 29C. The image can be generated with power consumption smaller than that in the first readout method.

Setting values concerning readout of the pixel data of the imaging devices 134 to 136 in performing this readout operation are stored in the registers 370 and 380 shown in FIGS. 13A and 13B. Specifically, the setting values (11) to (27) explained above are stored in a longitudinal direction imaging area setting register 375 during composite-eye pixel thinning-out readout and a lateral direction imaging area setting register 385 during composite-eye pixel thinning-out readout. Thinning-out intervals in the horizontal direction and the vertical direction are stored in a longitudinal direction pixel thinning-out interval setting register 376 during composite-eye pixel thinning-out readout and a lateral direction pixel thinning-out interval setting register 386 during the composite-eye pixel thinning-out readout.

The setting values may be set in advance or may be set by user operation via the signal line L2.

[Thinning-Out Example of Three-Eye Landscape Narrow-Angle Image Imaging Mode]

The seventh readout method is explained with reference to FIGS. 30A and 30B and FIGS. 31A to 31C. The seventh readout method corresponds to the second readout method. In the pixel data readout areas 421 to 423 shown in FIGS. 30A and 30B, ½ pixel thinning-out readout is performed in the longitudinal direction and ½ pixel thinning-out readout is performed in the lateral direction. Specifically, image data (720×720 pixels) thinned out to ½ in the longitudinal direction and the lateral direction is read out from the pixel data readout area 421 in the imaging device 134 having 1440×1920 pixels. Image data (240×720 pixels) thinned out to ½ in the longitudinal direction and the lateral direction is read out from the pixel data readout areas 422 and 423 in the imaging devices 135 and 136 having 1920×1440 pixels. When the image data read out in this way are combined, an image having about 690 thousand pixels (960×720 pixels) having an aspect ratio of 4:3 is generated. The image is an image having a relatively wide-angle of view in the horizontal direction and higher in precision than the VGA image as in the example shown in FIGS. 31A to 31C. The image can be generated with power consumption smaller than that in the second readout method.

Setting values concerning readout of the pixel data of the imaging devices 134 to 136 in performing this readout operation are stored in the registers 370 and 380 shown in FIGS. 13A and 13B. Specifically, the setting values (11) to (27) explained above are stored in the longitudinal direction imaging area setting register 375 during the composite-eye pixel thinning-out readout and the lateral direction imaging area setting register 385 during the composite-eye pixel thinning-out readout. Thinning-out intervals in the horizontal direction and the vertical direction are stored in the longitudinal direction pixel thinning-out interval setting register 376 during the composite-eye pixel thinning-out readout and the lateral direction pixel thinning-out interval setting register 386 during the composite-eye pixel thinning-out readout.

The setting values may be set in advance or may be set by user operation via the signal line L2.

[Thinning-Out Example of Single-Eye Landscape Image Imaging Mode]

The eighth readout method is explained with reference to FIGS. 32A and 32B and FIGS. 33A to 33C. The eighth readout method corresponds to the third readout method. In the pixel data readout area 431 shown in FIGS. 32A and 32B, ½ pixel thinning-out readout is performed in the longitudinal direction and ½ pixel thinning-out readout is performed in the lateral direction. Specifically, image data (720×540 pixels) thinned out to ½ in the longitudinal direction and the lateral direction is read out from the pixel data readout area 431 in the imaging device 134 having 1440×1920 pixels. When the image data read out in this way are combined, an image having about 390 thousand pixels (720×540 pixels) having an aspect ratio of 4:3 is generated. The image is an image having an angle of view same as that in the example shown in FIGS. 33A to 33C and higher in precision than the VGA image. The image can be generated with power consumption smaller than that in the third readout method.

Setting values concerning readout of the pixel data of the imaging device 134 in performing this readout operation are stored in the registers 370 and 380 shown in FIGS. 13A and 13B. Specifically, the setting values (31) to (35) explained above are stored in a longitudinal direction imaging area setting register 372 during single-eye pixel thinning-out readout and a lateral direction imaging area setting register 382 during the single-eye pixel thinning-out readout. Thinning-out intervals in the horizontal direction and the vertical direction are stored in a longitudinal direction pixel thinning-out interval setting register 373 during the single-eye pixel thinning-out readout and a lateral direction pixel thinning-out interval setting register 383 during the single-eye pixel thinning-out readout.

The setting values may be set in advance or may be set by user operation via the signal line L2.

[Thinning-Out Example of Single-Eye Portrait Image Imaging Mode]

The ninth readout method is explained with reference to FIGS. 34A and 34B and FIGS. 35A to 35C. The ninth readout method corresponds to the fourth readout method. In the pixel data readout area 435 shown in FIGS. 34A and 34B, ½ pixel thinning-out readout is performed in the longitudinal direction and ½ pixel thinning-out readout is performed in the lateral direction. Specifically, image data (720×960 pixels) thinned out to ½ in the longitudinal direction and the lateral direction is read out from the pixel data readout area 435 in the imaging device 134 having 1440×1920 pixels. When the image data read out in this way are combined, an image having about 690 thousand pixels (720×960 pixels) having an aspect ratio of 3:4 is generated. The image is an image having an angle of view same as that in the example shown in FIGS. 35A to 35C and higher in precision than the VGA image. The image can be generated with power consumption smaller than that in the fourth readout method.

Setting values concerning readout of the pixel data of the imaging device 134 in performing this readout operation are stored in the registers 370 and 380 shown in FIGS. 13A and 13B. Specifically, the setting values (31) to (35) explained above are stored in the longitudinal direction imaging area setting register 372 during the single-eye pixel thinning-out readout and the lateral direction imaging area setting register 382 during the single-eye pixel thinning-out readout. Thinning-out intervals in the horizontal direction and the vertical direction are stored in the longitudinal direction pixel thinning-out interval setting register 373 during the single-eye pixel thinning-out readout and the lateral direction pixel thinning-out interval setting register 383 during the single-eye pixel thinning-out readout.

The setting values may be set in advance or may be set by user operation via the signal line L2.

[Thinning-Out Example of Single-Eye Portrait Small-Area Image Imaging Mode]

The tenth readout method is explained with reference to FIGS. 36A and 36B and FIGS. 37A to 37C. The tenth readout method corresponds to the fifth readout method. In the pixel data readout area 437 shown in FIGS. 36A and 36B, ½ pixel thinning-out readout is performed in the longitudinal direction and ½ pixel thinning-out readout is performed in the lateral direction. Specifically, image data (240×320 pixels) thinned out to ½ in the longitudinal direction and the lateral direction is read out from the pixel data readout area 437 in the imaging device 134 having 1440×1920 pixels. When the image data read out in this way are combined, an image having about 80 thousand pixels (240×320 pixels) having an aspect ratio of 3:4 is generated. The image is an image having an angle of view same as that in the example shown in FIGS. 37A to 37C. The image can be generated with power consumption smaller than that in the fifth readout method.

Setting values concerning readout of the pixel data of the imaging device 134 in performing this readout operation are stored in the registers 370 and 380 shown in FIGS. 13A and 13B. Specifically, the setting values (51) to (55) explained above are stored in the longitudinal direction imaging area setting register 372 during the single-eye pixel thinning-out readout and the lateral direction imaging area setting register 382 during the single-eye pixel thinning-out readout. Thinning-out intervals in the horizontal direction and the vertical direction are stored in the longitudinal direction pixel thinning-out interval setting register 373 during the single-eye pixel thinning-out readout and the lateral direction pixel thinning-out interval setting register 383 during the single-eye pixel thinning-out readout.

The setting values may be set in advance or may be set by user operation via the signal line L2.

[Control Example of Imaging Mode in Portrait State of Second Housing]

A method of reading out image data from the imaging devices and a method of displaying the read-out image data when the second housing 120 is set in the portrait state are explained. In the first embodiment, four kinds of imaging modes are explained as imaging modes in the portrait state of the second housing 120. For example, when photographing is performed with the second housing 120 set in the portrait state, it is assumed that the user has no intention of photographing a landscape wide-angle image. Therefore, in the first embodiment, an example in which an image in a relatively narrow range in the horizontal direction is generated when the second housing 120 is set in the portrait state is explained.

[Control Example of Three-Eye Landscape Narrow-Angle Image Imaging]

An eleventh readout method is, like the second readout method, a method of reading out a landscape image with which users of imaging apparatuses such as a digital still camera are familiar. For example, an area as a part of the imaging device 134 is read out and areas as parts of the imaging devices 135 and 136 are read out. Therefore, an example in which all the pixels are read out in the pixel data readout areas 421 to 423 (shown in FIGS. 30A and 30B) the same as those in the second readout method is explained as the eleventh readout method.

The pixel data readout areas 421 to 423 and stored contents of the registers 370 and 380 of setting values related to the pixel data readout areas 421 to 423 are the same as those in the example shown in FIG. 30A. Therefore, explanation of the pixel data readout areas 421 to 423 and the stored contents of the registers 370 and 380 is omitted. The readout start positions 424 to 426 and a readout scanning direction in the pixel data readout areas 421 to 423 are the same as those in the example shown in FIG. 30B. Therefore, explanation of the readout start positions 424 to 426 and the readout scanning direction is omitted. A display example of a generated combined image is shown in FIGS. 38A and 38B.

Figure 38A:
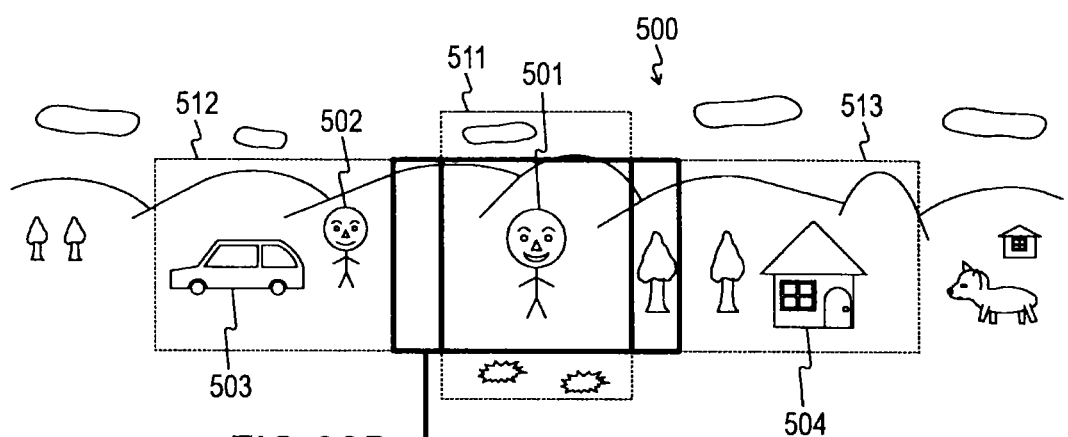
FIGS. 38A to 38C are diagrams of a display example of an image in the display unit in the first embodiment.
Figure 38B:
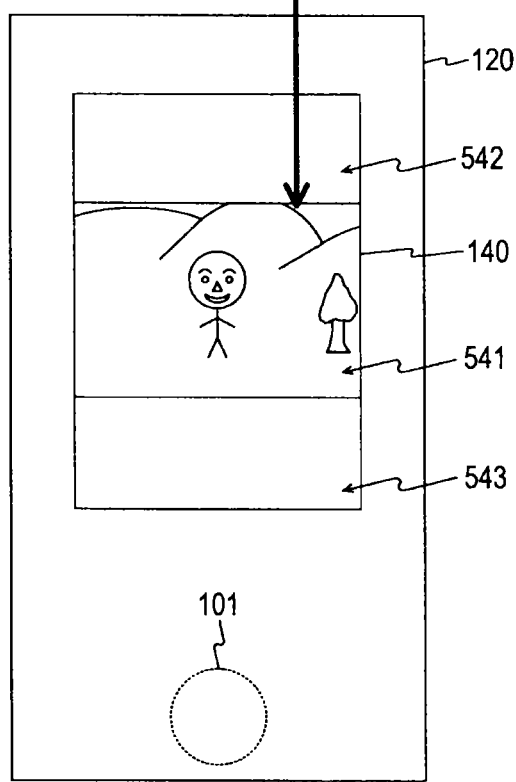

FIGS. 38A and 38B are diagrams of a display example of an image in the display unit 140 in the first embodiment. The example shown in FIGS. 38A and 38B is a display example in which image data read out by the eleventh readout method is displayed.

In FIG. 38A, the subject 500 as an imaging target of the imaging processing by the cellular phone apparatus 100 is shown. An example shown in FIG. 38A is substantially the same as the example shown in FIG. 29A except that the pixel data readout areas are changed. Therefore, components the same as those shown in FIG. 29A are denoted by the same reference numerals and explanation of the components is omitted. Contours of areas in the imaging ranges 511 to 513 corresponding to the pixel data readout areas 421 to 423 shown in FIGS. 30A and 30B are indicated by thick lines.

In FIG. 38B, a display example in which image data read out by the eleventh readout method is displayed in the display unit 140 when the subject 500 is set as an imaging target is shown. In FIG. 38B, the first housing 110 is set in the portrait state. An aspect ratio of the display unit 140 is 3:4 when the first housing 110 is set in the portrait state.

Since the aspect ratio of the display unit 140 is 3:4 as explained above, it is difficult to display a generated image having an aspect ratio of 4:3 on the entire screen of the display unit 140. Therefore, for example, as in the first readout method, the image having an aspect ratio of 4:3 is subjected to resolution conversion and displayed. For example, the image is subjected to resolution conversion in the horizontal and the vertical directions such that the number of pixels in a lateral direction of the image is substantially the same as the number of pixels in the lateral direction of the display unit 140 and the aspect ratio of the image is 4:3.

As shown in FIG. 38B, the image subjected to resolution conversion is displayed in the center in the vertical direction in the display unit 140 (a captured image display area 541). In margin sections (margin image display areas 542 and 543) above and below the displayed image, for example, a single-color image can be displayed.

Figure 38C:
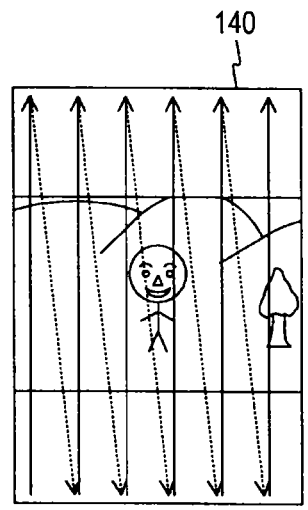

In FIG. 38C, a scanning direction in the display unit 140 in displaying a captured image and margin images written in the image memory 170 is schematically shown.

[Rotation Processing Example of Captured Image]

It is assumed that, when the second housing 120 is in the portrait state, an image read out in an imaging device is displayed in the display unit 140 as in the landscape state of the second housing 120 explained above. In this case, since the second housing 120 is pivoted 90 degrees, the image pivoted 90 degrees with reference to the first housing 110 is displayed in the display unit 140. Specifically, since a subject included in the image displayed in the display unit 140 is also rotated 90 degrees, the user feels a sense of discomfort. Therefore, an example in which an image is rotate 90 degrees in the opposite direction of a pivoting direction of the second housing 120 and displayed is explained below.

FIGS. 39A to 39E are schematic diagrams of rotation processing for rotating an image displayed in the display unit 140 in the first embodiment. In this embodiment, a relation among a direction of a subject during imaging, a scanning direction in an imaging device, a direction during writing and readout of image data in and from the image memory 170, a scanning direction of display in the display unit 140, and a direction of the subject displayed in the display unit 140. The writing and readout of the image data in and from the image memory 170 are performed by the DSP 200.

Figure 39A:
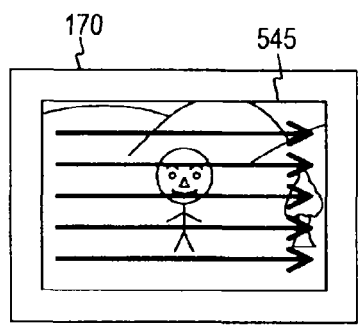
FIGS. 39A to 39E are schematic diagrams of rotation processing for rotating an image displayed in the display unit in the first embodiment.

FIG. 39A is a schematic diagram of a state in which a captured image 545 read out in a scanning direction in the imaging devices 134 to 136 is written in the image memory 170 by the DSP 200 in the scanning direction. In FIG. 39A, the scanning direction in the imaging devices 134 to 136 is indicated by arrows.

Figure 39B:
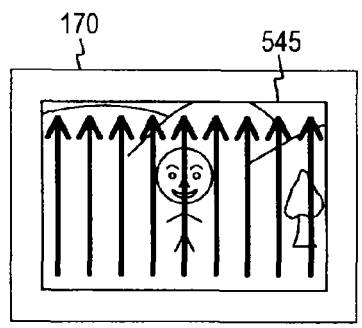

FIG. 39B is a schematic diagram of a state in which the captured image 545 written in the image memory 170 is read out while being scanned in a direction orthogonal to the scanning direction of the imaging devices 134 to 136. In FIG. 39B, the scanning direction of the captured image 545 read out from the image memory 170 is indicated by arrows.

Figure 39C:
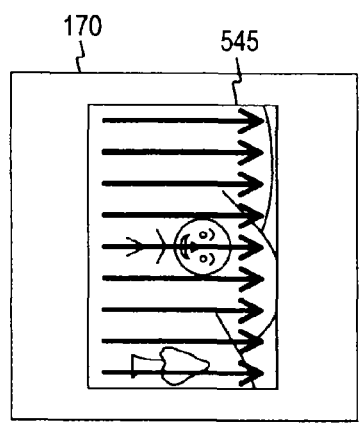

FIG. 39C is a schematic diagram of a state in which the captured image 545 read out from the image memory 170 in the scanning direction shown in FIG. 39B is written back to the image memory 170 while being scanned in the same direction as the direction shown in FIG. 39A. In FIG. 39C, the scanning direction of the captured image 545 written in the image memory 170 is indicated by arrows. In this way, the captured image 545 read out from the image memory 170 while being scanned in the direction orthogonal to the scanning direction of the imaging devices 134 to 136 is written back to the image memory 170 while being scanned in the direction in which the captured image 545 is read out. This makes it possible to store the captured image 545 read out from the imaging devices 134 to 136 in the image memory 170 in a state in which the captured image 545 is rotated 90 degrees.

Figure 39D:
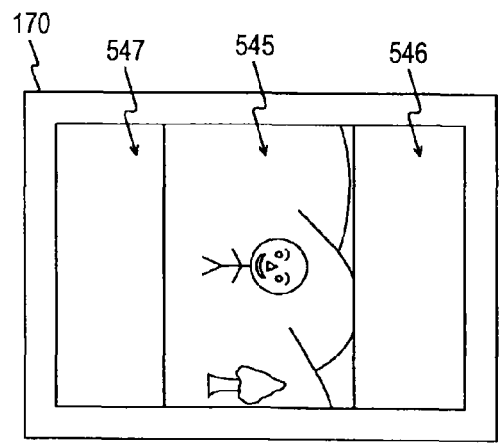

FIG. 39D is a schematic diagram of a state in which margin images 546 and 547 are added to the captured image 545 written in the image memory 170 in the scanning direction shown in FIG. 39C. The margin images 546 and 547 are images displayed in the margin image display areas 542 and 543 shown in FIG. 38B.

Figure 39E:
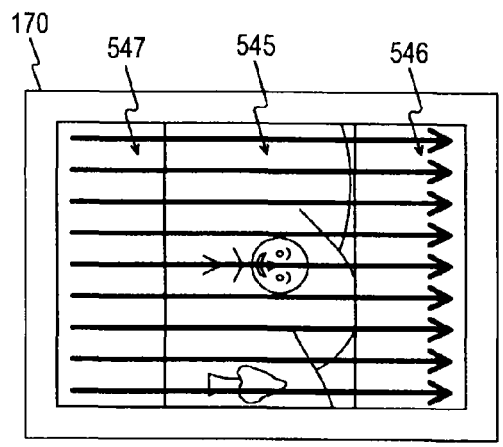

FIG. 39E is a schematic diagram of a state in which the captured image 545 and the margin images 546 and 547 written in the image memory 170 are read out while being scanned in a direction same as the direction during the first writing. An image that does not give a sense of discomfort to the user can be displayed by displaying, in the display unit 140, the captured image 545 and the margin images 546 and 547 read out in the state shown in FIG. 39E. A display example in which the captured image 545 and the margin images 546 and 547 read out in the state shown in FIG. 39E are displayed in the display unit 140 is shown in FIG. 38B.

[Control Example of Single-Eye Landscape Image Imaging Mode]

A twelfth readout method is, like the eleventh readout method, a method of reading out a landscape image with which users of imaging apparatuses such as a digital still camera are familiar. For example, substantially the entire area in the lateral direction of the imaging device 134 is read out and, in the longitudinal direction, an area of the number of pixels smaller than that in the lateral direction is read out. Readout from the imaging devices 135 and 136 is not performed. Therefore, an example in which all the pixels are read out in the pixel data readout area 431 (shown in FIGS. 32A and 32B) the same as that in the third readout method is explained as the twelfth readout method.

The pixel data readout area 431 and stored contents of the registers 370 and 380 of setting values related to the pixel data readout area 431 are the same as those in the example shown in FIG. 32A. Therefore, explanation of the pixel data readout area 431 and the stored contents of the registers 370 and 380 is omitted. The readout start position 432 and a readout scanning direction in the pixel data readout area 431 are the same as those in the example shown in FIG. 32B. Therefore, explanation of the readout start position 432 and the readout scanning direction is omitted. A display example of a generated combined image is shown in FIGS. 40A to 40C.

Figure 40A:
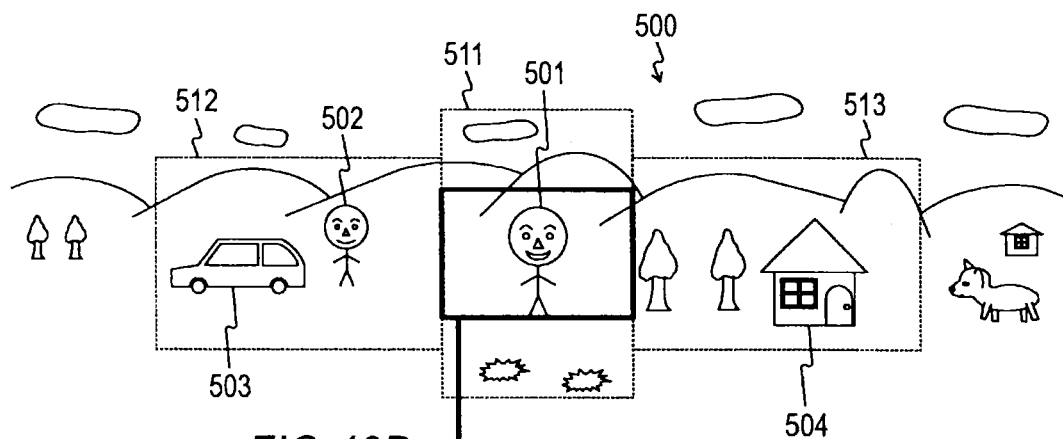
FIGS. 40A to 40C are diagrams of a display example of an image in the display unit in the first embodiment.
Figure 40B:
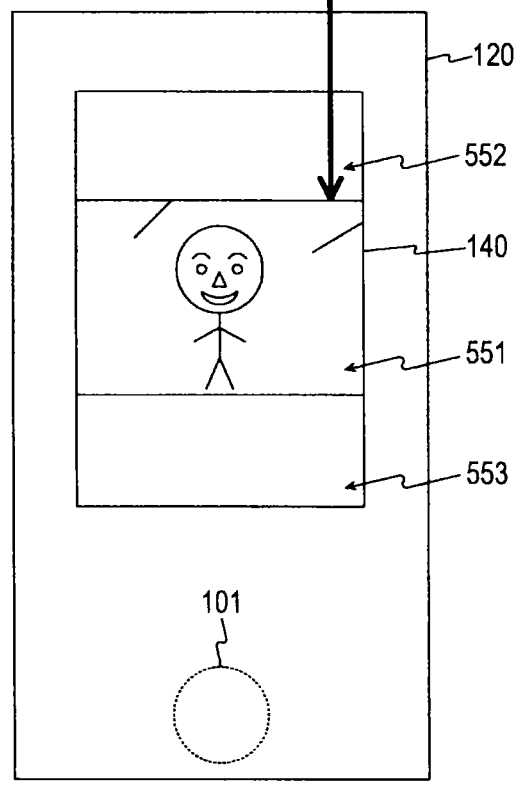
Figure 40C:
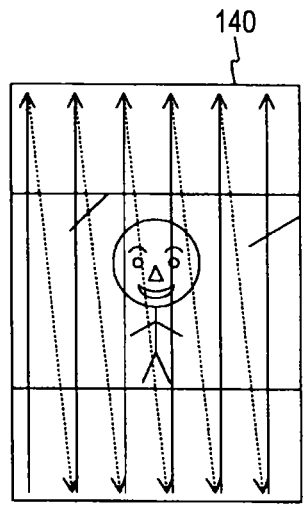

FIGS. 40A to 40C are diagrams of a display example of an image in the display unit 140 in the first embodiment. The example shown in FIGS. 40A to 40B is a display example in which image data read out by the twelfth readout method is displayed.

In FIG. 40A, the subject 500 as an imaging target of the imaging processing by the cellular phone apparatus 100 is shown. An example shown in FIG. 40A is substantially the same as the example shown in FIG. 29A except that the pixel data readout areas are changed. Therefore, components the same as those shown in FIG. 29A are denoted by the same reference numerals and explanation of the components is omitted. A contour of an area in the imaging ranges 511 to 513 corresponding to the pixel data readout area 431 shown in FIGS. 32A and 32B are indicated by a thick line.

In FIG. 40B, a display example in which image data read out by the twelfth readout method is displayed in the display unit 140 when the subject 500 is set as an imaging target is shown. The display example shown in FIG. 40B is a display example of a captured image rotated by the rotation processing shown in FIGS. 39A to 39E.

Since the aspect ratio of the display unit 140 is 3:4 as explained above, it is difficult to display a generated image having an aspect ratio of 4:3 on the entire screen of the display unit 140. Therefore, for example, as in the eleventh readout method, the image having an aspect ratio of 4:3 is subjected to resolution conversion and displayed. For example, the image is subjected to resolution conversion in the horizontal and the vertical directions such that the number of pixels in a lateral direction of the image is substantially the same as the number of pixels in the lateral direction of the display unit 140 and the aspect ratio of the image is 4:3.

As shown in FIG. 40B, the image subjected to resolution conversion is displayed in the center in the vertical direction in the display unit 140 (a captured image display area 551). In margin sections (margin image display areas 552 and 553) above and below the displayed image, for example, a single-color image can be displayed.

In FIG. 40C, a scanning direction in the display unit 140 in displaying image data read out from the imaging device 134 is shown.

[Control Example of Single-Eye Portrait Image Imaging Mode]

A thirteenth readout method is a method of reading out a portrait image with which users of imaging apparatuses such as a digital still camera are familiar. For example, the entire area of the imaging device 134 is read out. Readout from the imaging devices 135 and 136 is not performed. Therefore, an example in which all the pixels are read out in the pixel data readout area 435 (shown in FIGS. 34A and 34B) the same as that in the fourth readout method is explained as the thirteenth readout method.

The pixel data readout area 435 and stored contents of the registers 370 and 380 of setting values related to the pixel data readout area 435 are the same as those in the example shown in FIG. 34A. Therefore, explanation of the pixel data readout area 435 and the stored contents of the registers 370 and 380 is omitted. The readout start position 436 and a readout scanning direction in the pixel data readout area 435 are the same as those in the example shown in FIG. 34B. Therefore, explanation of the readout start position 436 and the readout scanning direction is omitted. A display example of a generated combined image is shown in FIGS. 41A to 41C.

Figure 41A:
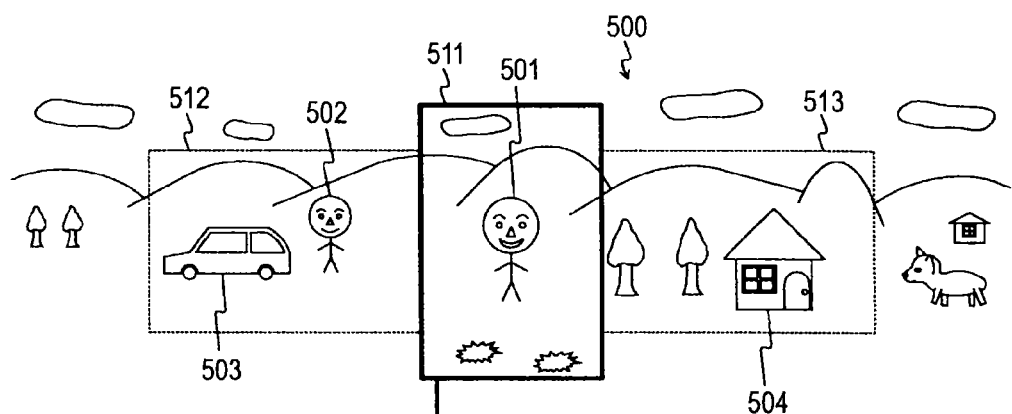
FIGS. 41A to 41C are diagrams of a display example of an image in the display unit in the first embodiment.
Figure 41B:
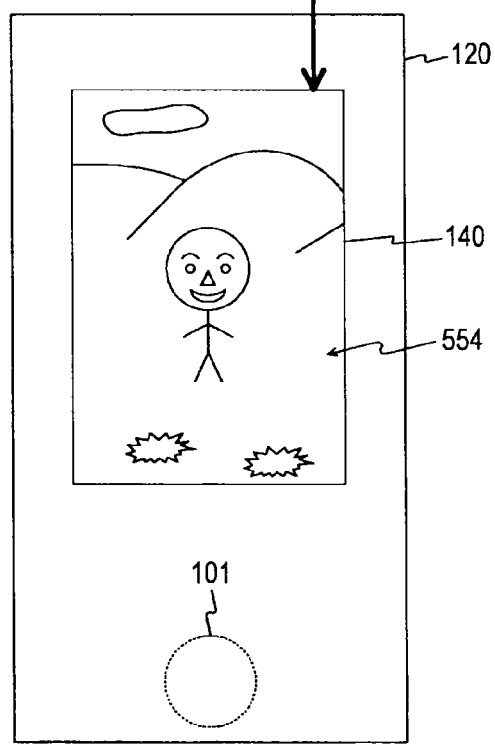
Figure 41C:
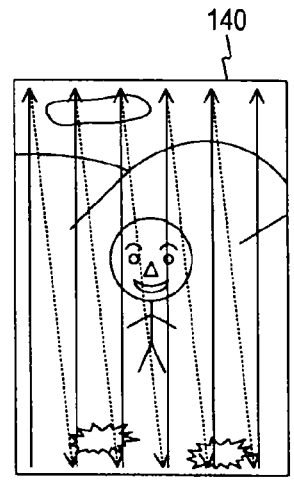

FIGS. 41A to 41C are diagrams of a display example of an image in the display unit 140 in the first embodiment. The example shown in FIGS. 41A to 41C is a display example in which image data read out by the thirteenth readout method is displayed.

In FIG. 41A, the subject 500 as an imaging target of the imaging processing by the cellular phone apparatus 100 is shown. An example shown in FIG. 41A is substantially the same as the example shown in FIG. 29A except that the pixel data readout areas are changed. Therefore, components the same as those shown in FIG. 29A are denoted by the same reference numerals and explanation of the components is omitted. A contour of an area in the imaging ranges 511 to 513 corresponding to the pixel data readout area 435 shown in FIGS. 32A and 32B are indicated by a thick line.

In FIG. 41B, a display example in which image data read out by the thirteenth readout method is displayed in the display unit 140 when the subject 500 is set as an imaging target is shown. The display example shown in FIG. 41B is a display example of a captured image rotated by the rotation processing shown in FIGS. 39A to 39E.

Since the aspect ratio of the display unit 140 is 3:4 as explained above and an aspect ratio of the generated image is 3:4, the image can be displayed on the entire screen of the display unit 140. For example, the image is subjected to resolution conversion to have size the same as the number of pixels of the display unit 140 and displayed in the display unit 140. In this case, the margin image display areas are unnecessary.

When an aspect ratio of an image read out and generated by the thirteenth readout method is not the same as an aspect ratio of a display device, the image can be displayed in the same manner as the twelfth readout method. In this case, for example, in margin sections (margin image display areas) above and below the displayed combined image, for example, a single-color image is displayed.

In FIG. 41C, a scanning direction in the display unit 140 in displaying pixel data read out from the imaging device 134 is shown.

[Control Example of Single-Eye Portrait Small-Area Image Imaging Mode]

A fourteenth readout method is a method of reading out a portrait image with which users of imaging apparatuses such as a digital still camera are familiar. For example, an area as a part of the imaging device 134 is read out. Readout from the imaging devices 135 and 136 is not performed. Therefore, an example in which all the pixels are read out in the pixel data readout area 437 (shown in FIGS. 36A and 36B) the same as that in the fifth readout method is explained as the fourteenth readout method.

The pixel data readout area 437 and stored contents of the registers 370 and 380 of setting values related to the pixel data readout area 437 are the same as those in the example shown in FIG. 36A. Therefore, explanation of the pixel data readout area 437 and the stored contents of the registers 370 and 380 is omitted. The readout start position 438 and a readout scanning direction in the pixel data readout area 437 are the same as those in the example shown in FIG. 36B. Therefore, explanation of the readout start position 438 and the readout scanning direction is omitted. A display example of a generated combined image is shown in FIGS. 42A to 42C.

Figure 42A:
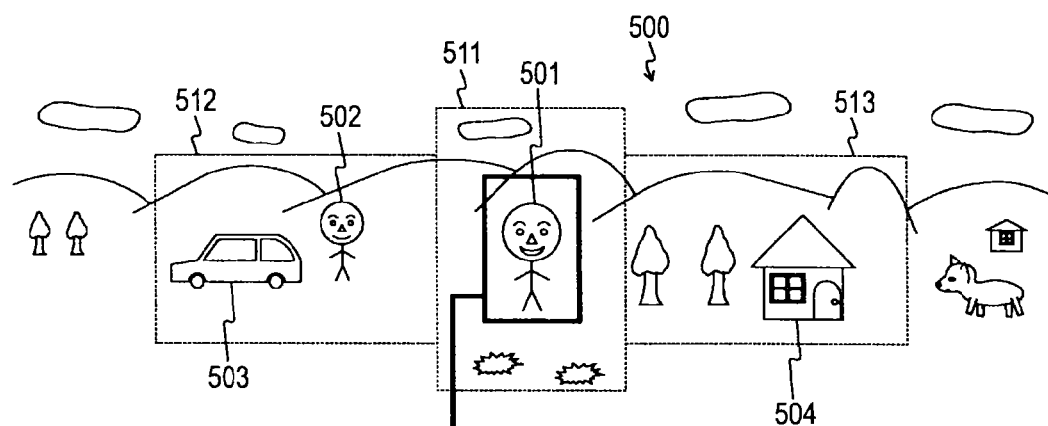
FIGS. 42A to 42C are diagrams of a display example of an image in the display unit in the first embodiment.
Figure 42B:
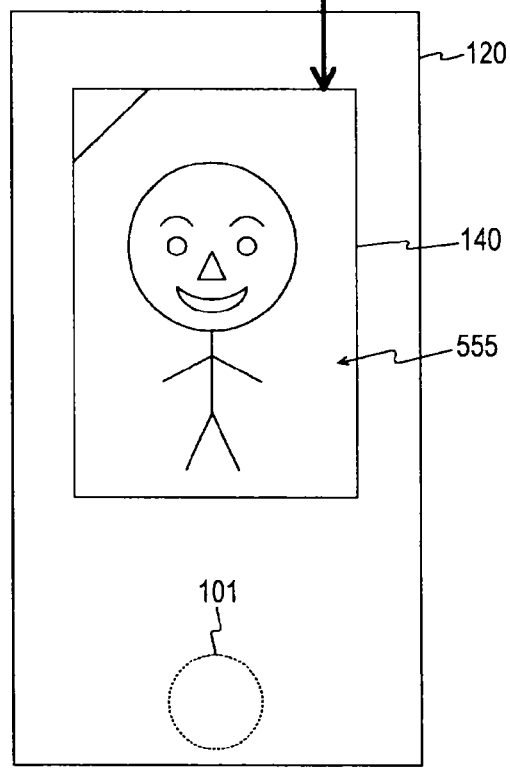
Figure 42C:
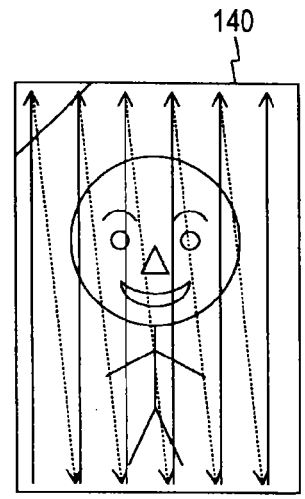

FIGS. 42A to 42C are diagrams of a display example of an image in the display unit 140 in the first embodiment. The example shown in FIGS. 42A to 42C is a display example in which image data read out by the fourteenth readout method is displayed.

In FIG. 42A, the subject 500 as an imaging target of the imaging processing by the cellular phone apparatus 100 is shown. An example shown in FIG. 42A is substantially the same as the example shown in FIG. 29A except that the pixel data readout areas are changed. Therefore, components the same as those shown in FIG. 29A are denoted by the same reference numerals and explanation of the components is omitted. A contour of an area in the imaging ranges 511 to 513 corresponding to the pixel data readout area 437 shown in FIGS. 36A and 36B are indicated by a thick line.

In FIG. 42B, a display example in which image data read out by the fourteenth readout method is displayed in the display unit 140 when the subject 500 is set as an imaging target is shown. The display example shown in FIG. 42B is a display example of a captured image rotated by the rotation processing shown in FIGS. 39A to 39E.

Since the aspect ratio of the display unit 140 is 3:4 as explained above and an aspect ratio of the generated image is 3:4, the image can be displayed on the entire screen of the display unit 140. For example, the image is subjected to resolution conversion to have size the same as the number of pixels of the display unit 140 and displayed in the display unit 140. In this case, the margin image display areas are unnecessary.

When an aspect ratio of an image read out and generated by the fourteenth readout method is not the same as an aspect ratio of a display device, the image can be displayed in the same manner as the twelfth readout method. In this case, for example, in margin sections (margin image display areas) above and below the displayed combined image, for example, a single-color is displayed.

In FIG. 42C, a scanning direction in the display unit 140 in displaying pixel data read out from the imaging device 134 is shown.

Setting values concerning read out of the pixel data of the imaging devices 134 to 136 are stored in the registers 370 and 380 shown in FIGS. 13A and 13B and stored in the imaging control unit 201. When the second housing 120 is in the portrait state, every time the imaging range changeover switch 111 shown in FIGS. 1A to 1D and the like is depressed by the user, the eleventh to the fourteenth readout methods are switched. In this case, every time the imaging range changeover switch 111 is depressed, the imaging control unit 201 detects the depression and sequentially switches the eleventh to fourteenth readout methods. For example, immediately after the cellular phone apparatus 100 is started, when the second housing 120 is in the portrait state, the fourteenth readout method can be set.

[Example of Pixel Thinning-Out and Pixel Addition]

The examples in which all the pixels included in the pixel data readout area are read out are explained as the eleventh to the fourteenth readout methods. However, depending on a purpose of use, a high definition image is not necessary. Therefore, an example in which a part of pixels included in a pixel data readout area is read out to reduce power consumption is explained below.

Fifteenth to eighteenth readout methods explained below are examples in which a part of pixels included in a pixel data readout area is read out by performing the pixel thinning-out processing in the imaging devices 134 to 136. Although not explained below, a part of the pixels included in the pixel data readout area may be read out by performing pixel addition processing in the imaging device 134 to 136.

[Thinning-Out Example of Three-Eye Landscape Narrow-Angle Image Imaging Mode]

First, the fifteenth readout method is explained with reference to FIGS. 38A to 38C. The fifteenth readout method corresponds to the eleventh readout method. In the pixel data readout areas 421 to 423 shown in FIGS. 30A and 30B, ½ pixel thinning-out readout is performed in the longitudinal direction and ½ pixel thinning-out readout is performed in the lateral direction. Since these kinds of thinning-out processing are the same as those in the example explained in the seventh readout method, detailed explanation of the thinning-out processing is omitted. Stored contents of the registers 370 and 380 of setting values concerning readout of pixel data of the imaging devices 134 to 136 in these kinds of thinning-out processing are the same as those in the example explained in the seventh readout method. Therefore, detailed explanation of the stored contents is omitted.

[Thinning-Out Example of Single-Eye Landscape Image Imaging Mode]

The sixteenth readout method is explained with reference to FIGS. 40A to 40C. The sixteenth readout method corresponds to the twelfth readout method. In the pixel data readout area 431 shown in FIGS. 32A and 32B, ½ pixel thinning-out readout is performed in the longitudinal direction and ½ pixel thinning-out readout is performed in the lateral direction. Since these kinds of thinning-out processing are the same as the example explained in the eighth readout method, detailed explanation of the thinning-out processing is explained. Stored contents of the registers 370 and 380 of setting values concerning readout of pixel data of the imaging devices 134 to 136 in these kinds of thinning-out processing are the same as those in the example explained in the eighth readout method. Therefore, detailed explanation of the stored contents is omitted.

[Thinning-Out Example of Single-Eye Portrait Image Imaging Mode]

The seventeenth readout method is explained with reference to FIGS. 41A to 41C. The seventeenth readout method corresponds to the thirteenth readout method. In the pixel data readout area 435 shown in FIGS. 34A and 34B, ½ pixel thinning-out readout is performed in the longitudinal direction and ½ pixel thinning-out readout is performed in the lateral direction. Since these kinds of thinning-out processing are the same as those in the example explained in the ninth readout method, detailed explanation of the thinning-out processing is omitted. Stored contents of the registers 370 and 380 of setting values concerning readout of pixel data of the imaging devices 134 to 136 in these kinds of thinning-out processing are the same as those in the example explained in the ninth readout method. Therefore, detailed explanation of the stored contents is omitted.

[Thinning-Out Example of Single-Eye Portrait Small-Area Image Imaging Mode]

The eighteenth readout method is explained with reference to FIGS. 42A to 42C. The eighteenth readout method corresponds to the fourteenth readout method. In the pixel data readout area 437 shown in FIGS. 36A and 36B, ½ pixel thinning-out readout is performed in the longitudinal direction and ½ pixel thinning-out readout is performed in the lateral direction. Since these kinds of thinning-out processing are the same as those in the example explained in the tenth readout method, detailed explanation of the thinning-out processing is omitted. Stored contents of the registers 370 and 380 of setting values concerning readout of pixel data of the imaging devices 134 to 136 in these kinds of thinning-out processing are the same as those in the example explained in the tenth readout method. Therefore, detailed explanation of the stored contents is omitted.

[Readout Example During Monitoring Operation]

A method of reading out pixel data when monitoring operation is performed is explained. For example, when a still image recording mode for recording a still image is set, the monitoring operation is performed until operation for instructing recording of the still image is performed. The monitoring operation is, for example, operation for causing, before the operation for instructing recording of the still image is performed, the display unit 140 to display a monitoring image for checking whether the direction of the cellular phone apparatus 100 and the size of a subject are appropriate. The monitoring image is an image for the user to check whether the direction of the cellular phone apparatus 100 and the size of the subject are appropriate and is not an image for recording. Therefore, compared with the image for recording, the monitoring image does not have to be a high-definition image.

In general, the number of pixels of a display device included in an imaging apparatus is often one several tenth of the number of pixels of an imaging device included in the imaging apparatus. Therefore, when the monitoring operation is performed, it is possible to reduce the number of pixels readout from the imaging device compared with that during image recording operation. On the other hand, since the monitoring image is the image for checking the direction of the cellular phone apparatus 100 and the size of the subject, it is desirable that an angle of view of the monitoring image is the same as that in the case of recording operation. Therefore, a method of reading out the monitoring image for, when the monitoring operation is performed, setting an angle of view the same as that in the case of the recording operation and reducing the number of pixels to be readout is explained.

For example, when anyone of the first to the fifth readout methods is set and the monitoring operation is performed, the number of pixels to be read out is reduced by performing the pixel thinning-out processing as in the sixth to the tenth readout methods. In this case, a thinning-out ratio can be a thinning-out ratio larger than the thinning-out ratio (1/2) explained in the sixth to the tenth readout methods.

For example, when any one of the sixth to the tenth readout methods is set and the monitoring operation is performed, similarly, the number of pixels to be read out is reduced by performing the pixel thinning-out processing. In this case, a thinning-out ratio can be a thinning-out ratio still larger than the thinning-out ratio (1/2) (e.g., a value obtained by multiplying ½ with 1/M (M>1 (M is an integer)). When any one of the eleventh to the eighteenth readout methods is set and the monitoring operation is performed, similarly, the number of pixels to be read out can be reduced. The number of pixels to be read out may be reduced by performing the pixel addition processing instead of the pixel thinning-out processing. Display of the monitoring image is the same as the display example in the first to the firth readout methods except that the number of read-out pixels is different. Therefore, explanation of the display is omitted.

[Modification of Pixel Thinning-Out and Pixel Addition]

The example in which the number of pixels of image data is reduced by performing the pixel thinning-out and the pixel addition in the imaging devices 134 to 136 is explained above. In this example, an example in which the pixel thinning-out and the pixel addition are performed in the DSP 200 is explained.

The pixel addition processing unit 221 shown in FIG. 8 performs the pixel addition processing and the pixel thinning-out processing. In the inside of the DSP 200, the pixel addition processing unit 221 is arranged in a position at a post-stage of the image buffers 211 to 219 and a position at a pre-stage of the demosaic processing unit 222. The configuration of the pixel addition processing unit 221 can be substantially the same as the adders 354 to 357 and 366 of the imaging devices 134 to 136.

The pixel addition processing unit 221 includes, for example, in order to perform pixel addition in the vertical direction, a data memory that stores a fixed amount of image data included in at least two or more horizontal lines of image data. The pixel addition processing unit 221 performs addition processing for reading out image data located in the same column on the image data from the image memory 170 and adding up the read-out image data with an adder (i.e., addition processing for vertical pixels).

For example, in performing addition processing for horizontal pixels, the pixel addition processing unit 221 performs processing for reading out image data in plural columns and adding up the read-out image data with the adder (i.e., addition processing for horizontal pixels).

For example, in performing both the addition processing for vertical pixels and the addition processing for horizontal pixels, the pixel addition processing unit 221 performs the addition processing for vertical pixels in the plural columns and further performs the addition processing for horizontal pixels concerning image data obtained by the addition processing for vertical pixels.

After these kinds of addition processing, the pixel addition processing unit 221 outputs the image data after the addition processing to the demosaic processing unit 222 at the post-stage. The pixel addition processing unit 221 writes the image data after the addition processing in the image memory 170.

For example, in the pixel addition processing unit 221, a data line for inputting one image data of the two image data, which are input in the addition processing, to the adder includes a selection signal line. An AND result of the data line and the selection signal line are input to the adder. The pixel addition processing unit 221 stores the other one piece of image data. For example, when the selection signal line is selected, a value of the data line is input to the adder and the pixel addition processing is performed. On the other hand, when the selection signal line is not selected, a value input from the data line to the adder is 0 and the pixel addition processing is not performed. In this case, the pixel thinning-out processing is performed and image data input from a data line on a side not including a selection signal line of the adder is output.

[Example of Flow of Image Data in Pixel Thinning-Out and Pixel Addition]

Figure 43:
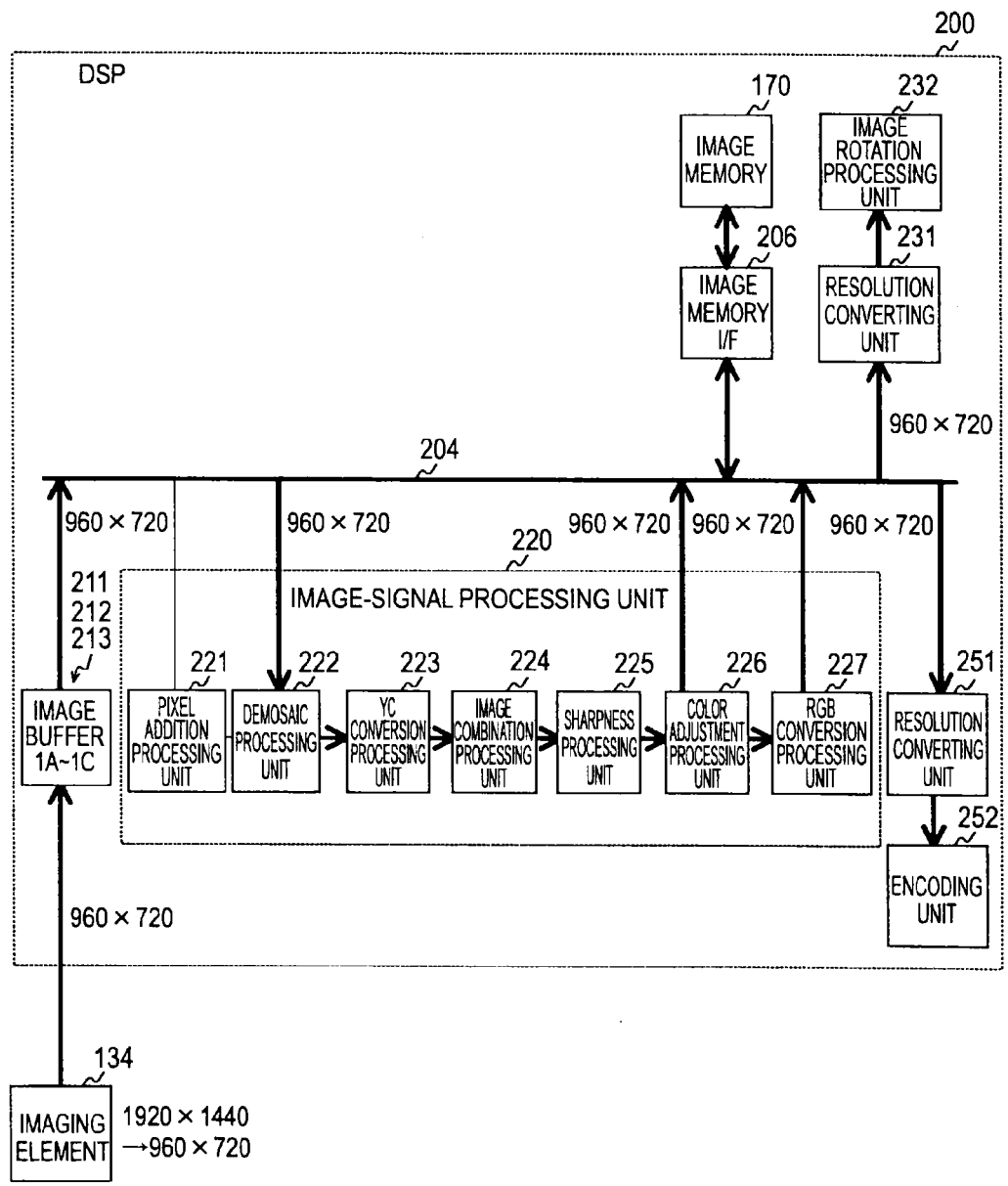
FIG. 43 is a schematic diagram of a flow of image data in which pixel thinning-out and pixel addition are performed by the imaging device in the first embodiment.

FIG. 43 is a schematic diagram of a flow of image data in which the pixel thinning-out and the pixel addition are performed by the imaging device 134 in the first embodiment. Suffixes arranged near arrows of thick lines shown in FIG. 43 represent the numbers of pixels of pixel data. In an example shown in FIG. 43, ½ of the number of pixel data is thinned out in the horizontal direction and ½ is thinned out in the vertical direction by using the imaging device 134 having 1920×1440 pixels. A flow of image data is the same when ½ of the number of pixel data is subjected to the pixel addition in the horizontal direction and ½ is subjected to the pixel addition in the vertical direction. As shown in FIG. 43, the number of pixels (960×720 pixels) of image data output from the imaging device 134 is smaller than the number of pixels (1920×1440 pixels) of the imaging device 134.

Figure 44:
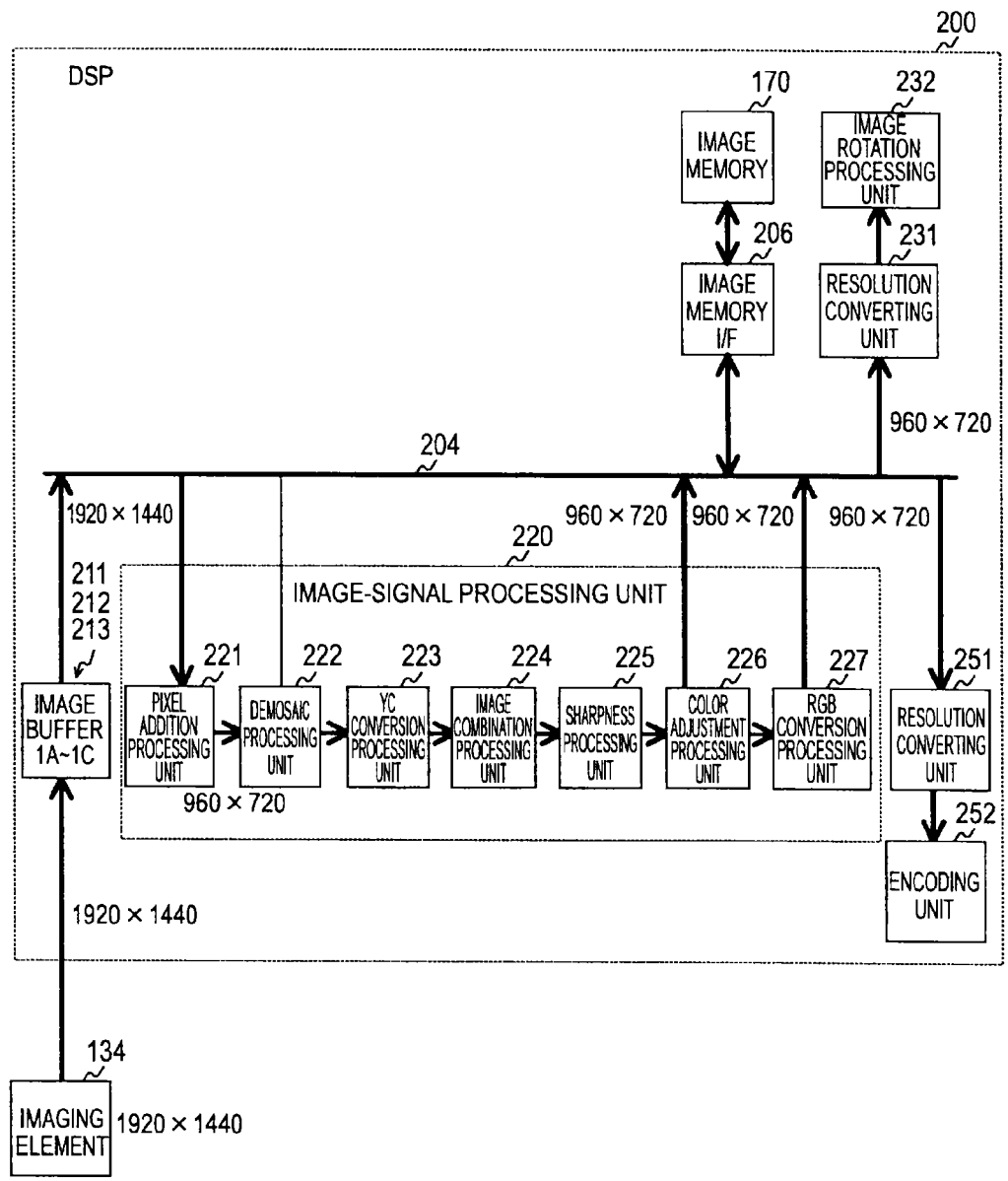
FIG. 44 is a schematic diagram of a flow of image data in which the number of pixels is changed by a pixel addition processing unit in the first embodiment.

FIG. 44 is a schematic diagram of a flow of image data in which the number of pixels is changed by the pixel addition processing unit 221 in the first embodiment. Suffixes arranged near arrows of thick lines shown in FIG. 44 represent the numbers of pixels of the image data. In an example shown in FIG. 44, concerning image data output from the imaging device 134 having 1920×1440 pixels, the pixel addition processing unit 221 reduces the number of pixel data in the horizontal direction to ½ and reduces the number of pixel data in the vertical direction to ½. As shown in FIG. 44, the number of pixels (960×720 pixels) of image data output from the pixel addition processing unit 221 is smaller than the number of pixels of the imaging device 134 and the number of pixels of image data input to the pixel addition processing unit 221.

Figure 45:
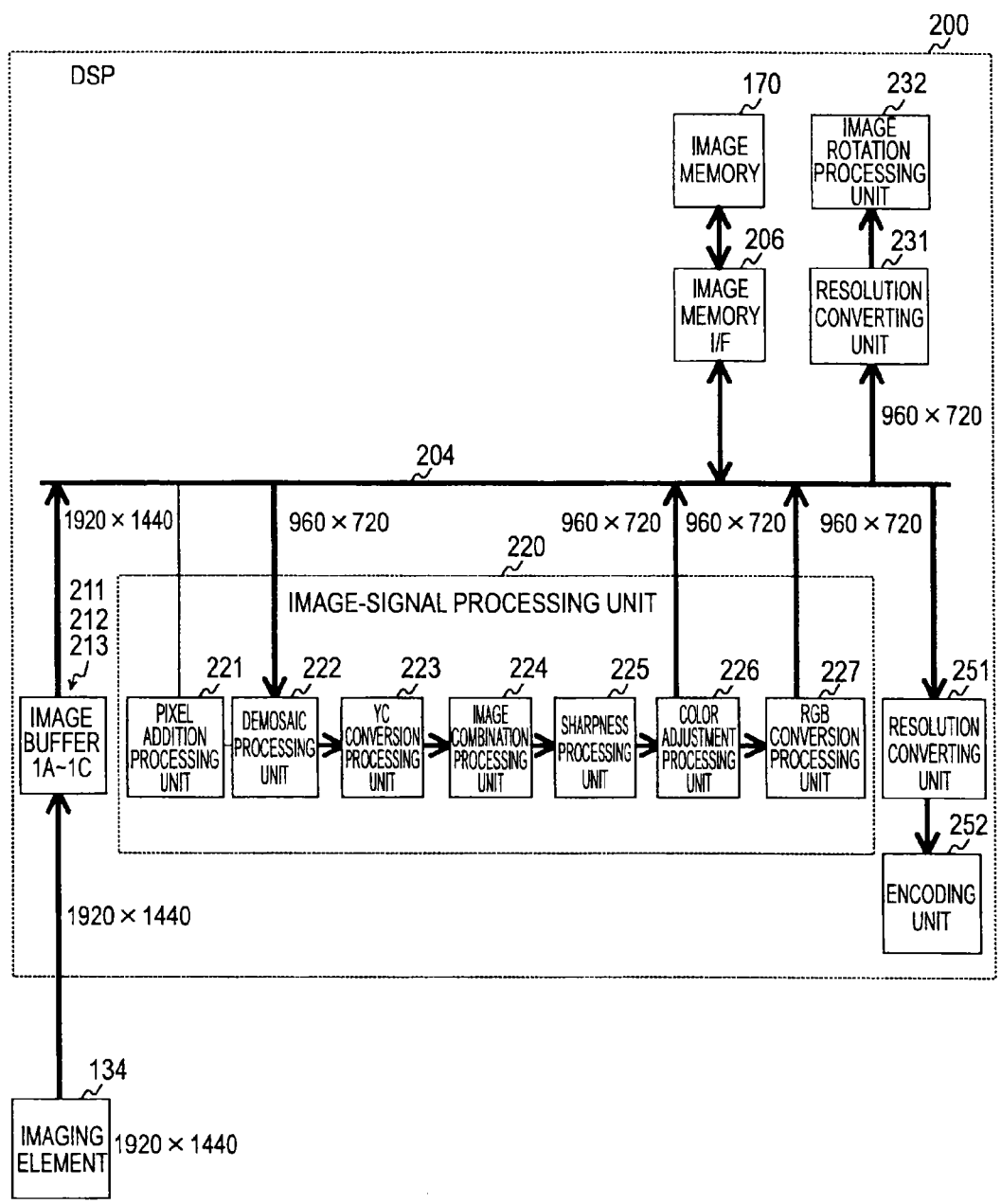
FIG. 45 is a schematic diagram of a flow of image data in which the number of pixels is changed when image data is read out from an image memory in the first embodiment.

FIG. 45 is a schematic diagram of a flow of image data in which the number of pixels is changed when image data is read out from the image memory 170 in the first embodiment. Suffixes arranged near arrows of thick lines shown in FIG. 45 represent the numbers of pixels of the image data. In an example shown in FIG. 45, when image data is read out from the image memory 170, the number of pixels of the image data is reduced by reading out the image data at an interval for each fixed number of pixels on the image data. Specifically, image data output from the imaging device 134 having 1920×1440 pixels is stored in the image memory 170. When the demosaic processing unit 222 reads out the image data stored in the image memory 170, the demosaic processing unit 222 reads out the image data with the number of pixel data in the horizontal direction reduced to ½ and with the number of pixel data in the vertical direction reduced to ½. As shown in FIG. 45, the number of pixels of image data read out from the image memory 170 and input to the demosaic processing unit 222 is smaller than the number of pixels of the imaging device 134 and the number of pixels of image data written in the image memory 170 from the image buffers 211 to 213.

[Modification in which Area of Image Data is Changed]

In this example, an area from which image data is read out by using the DSP 200 is changed and the number of pixels of the image data is reduced.

Figure 46:
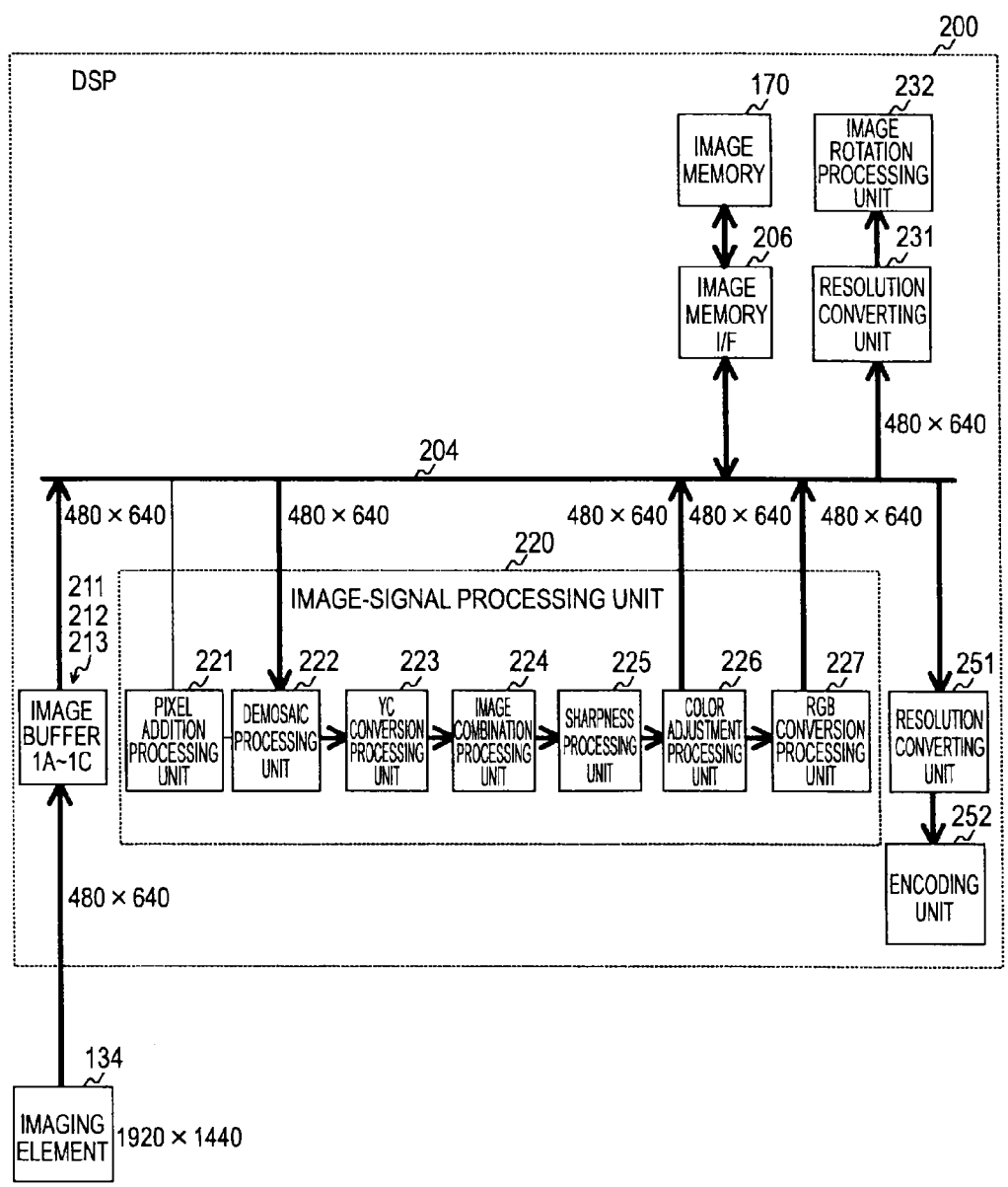
FIG. 46 is a schematic diagram of a flow of image data in which a readout area is changed by the imaging device in the first embodiment.

FIG. 46 is a schematic diagram of a flow of image data in which a readout area is changed by the imaging device 134 in the first embodiment. Suffixes arranged near arrows of thick lines shown in FIG. 46 represent the numbers of pixels of image data. In an example shown in FIG. 46, image data having 480×640 pixels is read out by using the imaging device 134 having 1920×1440 pixels. As shown in FIG. 46, whereas the number of pixels of the imaging device 134 is 1920×1440, the number of pixels of image data output from the imaging device 134 is 480×640.

Figure 47:
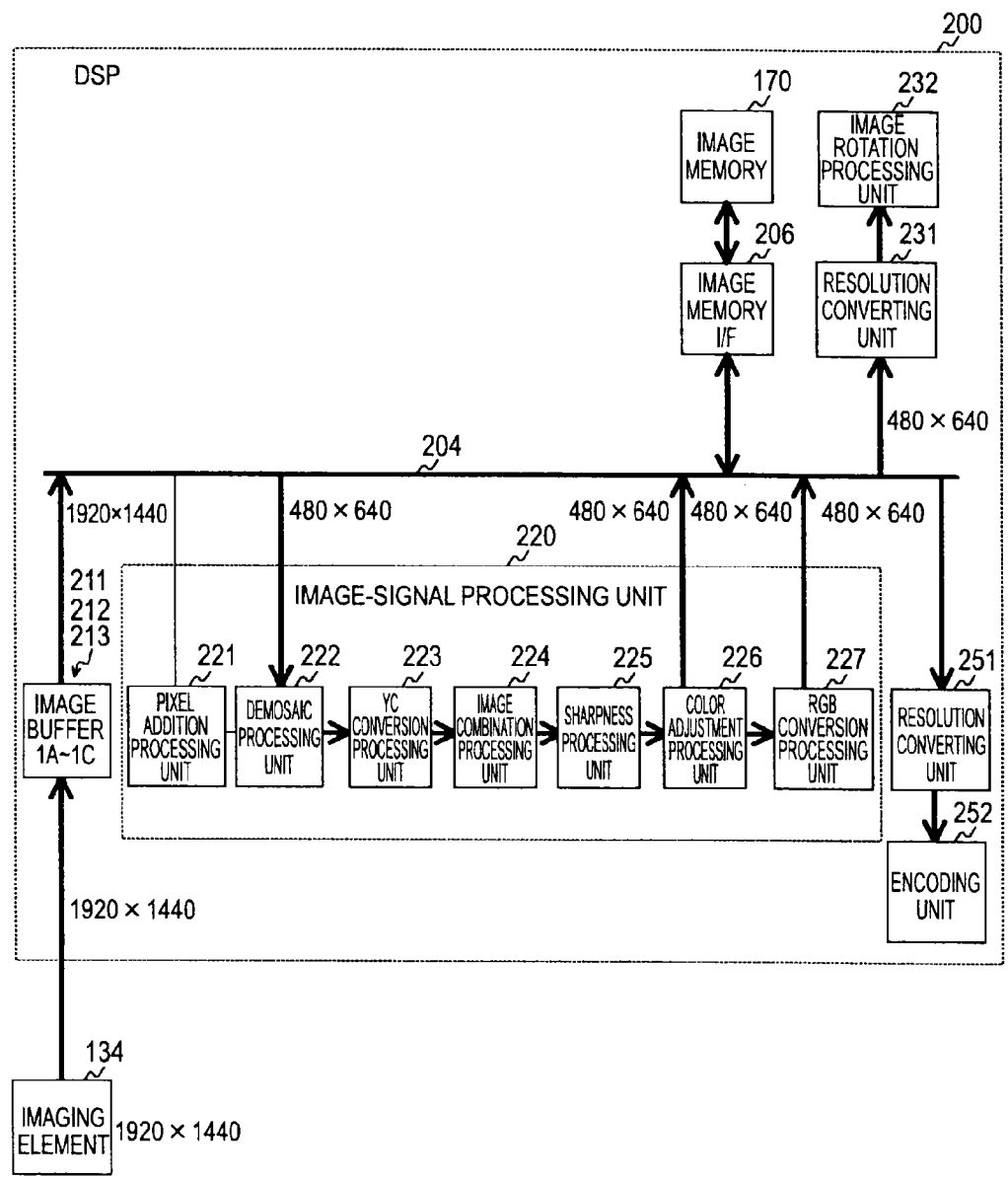
FIG. 47 is a schematic diagram of a flow of image data in which a readout area is changed when image data is read out from the image memory in the first embodiment.

FIG. 47 is a schematic diagram of a flow of image data in which a readout area is changed when image data is read out from the image memory 170 in the first embodiment. Suffixes arranged near arrows of thick lines shown in FIG. 47 represent the numbers of pixels of the image data. In an example shown in FIG. 47, when image data is read out from the image memory 170, an area of the image data is changed to reduce the number of pixels of the image data by reading out image data in an area as a part of the image data. Specifically, image data output from the imaging pixels 134 having 1920×1440 pixels is stored in the image memory 170. When the demosaic processing unit 222 reads out the image data stored in the image memory 170, the demosaic processing unit 222 reads out image data corresponding to an area of 480×640 pixels. As shown in FIG. 47, the number of pixels of the imaging device 134 and the number of pixels of image data written in the image memory 170 from the image buffers 211 to 213 are 1920×1440. On the other hand, the number of pixels of image data read out from the image memory 170 and input to the demosaic processing unit 222 is 480×640.

[Example of Stop of Two Imaging Systems During Single-Eye Imaging Operation]

The example in which a captured image is generated by using at least one imaging system among the three imaging systems is explained. For example, in order to reduce power consumption, it is desirable to stop operation of the imaging systems that do not generate a captured image. Therefore, an example in which, when a captured image is generated, for example, the operation of the imaging systems that do not generate the captured image are stopped is explained below.

[Configuration Example of Cellular Phone Apparatus]

Figure 48:
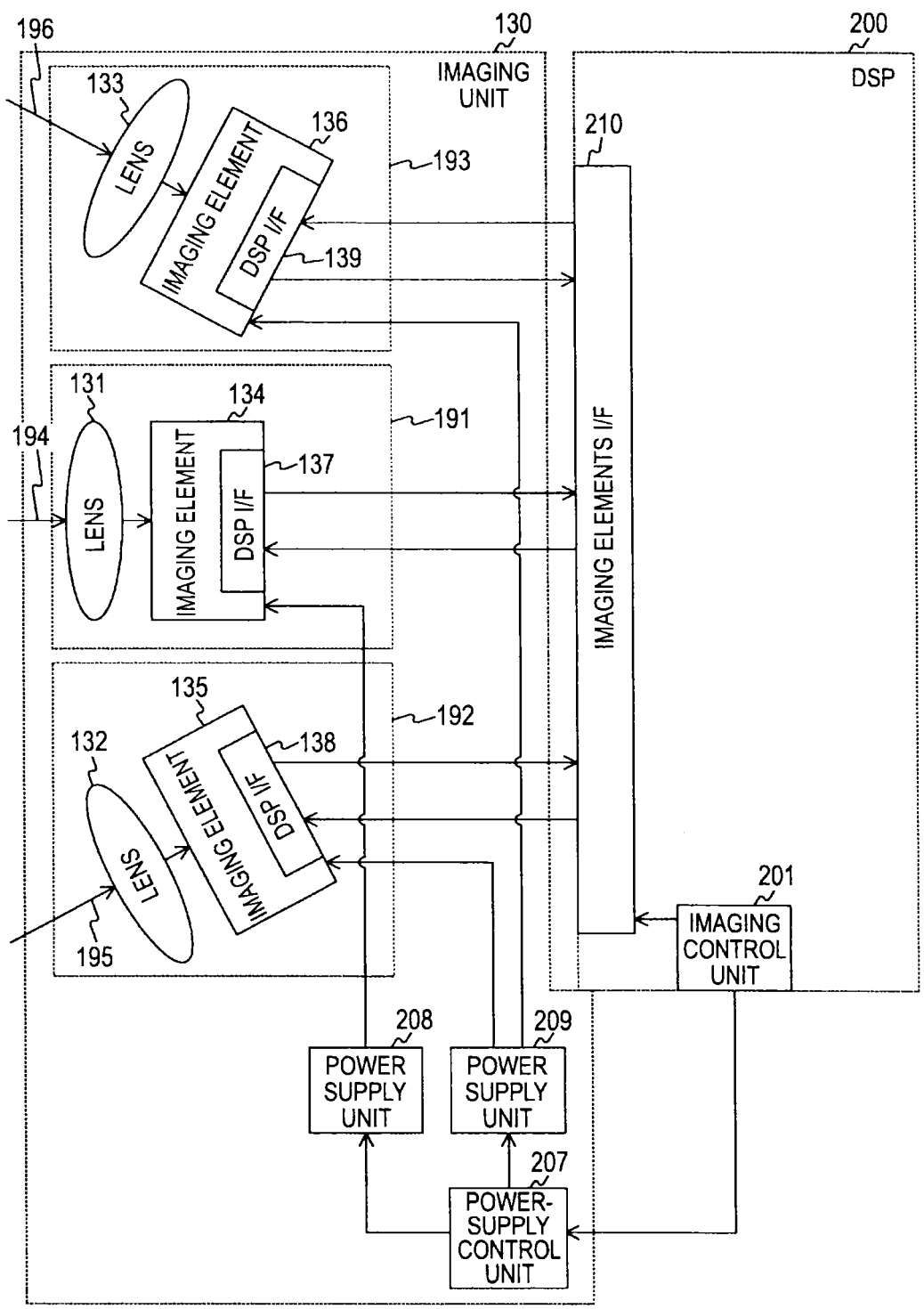
FIG. 48 is a block diagram of a functional configuration example of the cellular phone apparatus in the first embodiment.

FIG. 48 is a block diagram, of a functional configuration example of the cellular phone apparatus 100 in the first embodiment. The configuration example shown in FIG. 48 is an example in which, in the configuration shown in FIG. 3, components other than components related to power supply to the first to the third imaging systems 191 to 193 are omitted and the imaging control unit 201 is added. In this example, the operation of the imaging systems is stopped by interrupting power supply to the imaging systems (a control method 1 shown in FIG. 50). The power-supply control unit 207 and the power supply units 208 and 209 are the same as those shown in FIG. 3. Therefore, components related to stop of operation of the imaging systems are mainly explained below. Explanation of components same as those shown in FIG. 3 is omitted.

For example, when the imaging operation (the single-eye imaging operation) for using only image data generated by the imaging device 134 is selected, the imaging control unit 201 instructs the power supply unit 209 to interrupt power supply to the second and the third imaging systems 192 and 193. This makes it possible to stop, when the single-eye imaging operation is performed, the operation of the second and the third imaging systems 192 and 193 not used for the imaging operation and reduce power consumption. When the power supply to the second and the third imaging systems 192 and 193 is interrupted, it is desirable to stop the output of a clock signal, a vertical synchronization signal, and a horizontal synchronization signal, and the like from the DSP 200 to the second and the third imaging systems 192 and 193. This makes it possible to further reduce power consumption.

Figure 49A:
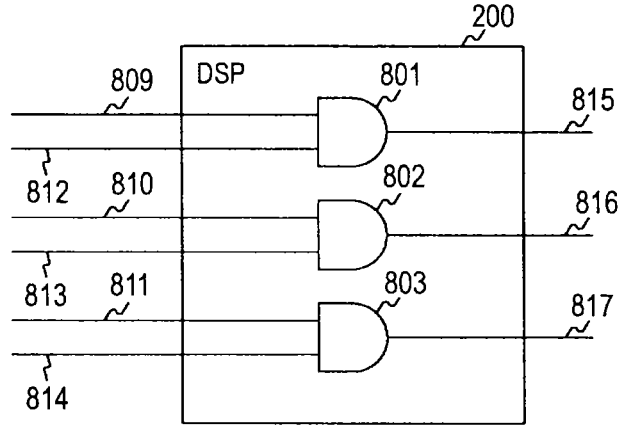
FIGS. 49A to 49C are block diagrams of a functional configuration example of the cellular phone apparatus in the first embodiment.
Figure 49B:
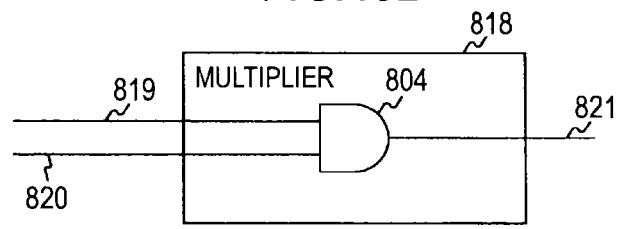
Figure 49C:
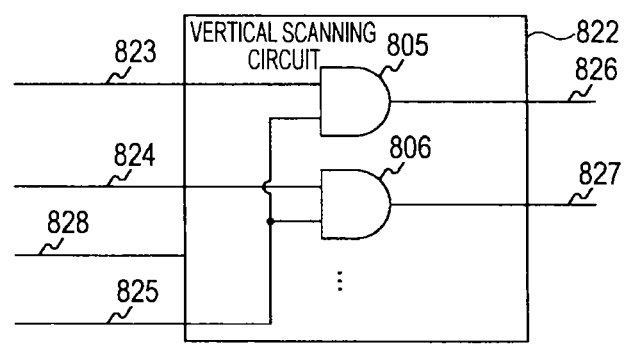

FIGS. 49A to 49C are block diagrams of a functional configuration example of the cellular phone apparatus 100 in the first embodiment. In the configuration example shown in FIGS. 49A to 49C, only components related to processing for stopping the imaging operation are shown in a simplified form. Specifically, only AND circuits 801 to 807 and signal lines are shown. Two input signal lines are connected to each of the AND circuits 801 to 807. When an "H" signal is input from each of the input signal lines, the AND circuit performs AND for outputting the "H" signal to an output signal line. In this example, when the operation of the imaging systems is stopped, clock supply or the like to the imaging systems to be stopped is interrupted without interrupting a power supply to the imaging systems to be stopped.

In FIG. 49A, a circuit configuration example in the DSP 200 for stopping clock supply to the imaging systems is shown. A signal line 809 is a signal line for a clock signal output to the imaging device 134. A signal line 810 is a signal line for a clock signal output to the imaging device 135. A signal line 811 is a signal line for a clock signal output to the imaging device 136. A signal line 812 is a signal line for an ON/OFF control signal output to the imaging device 134. A signal line 813 is a signal line for an ON/OFF control signal output to the imaging device 135. A signal line 814 is a signal line for an ON/OFF control signal output to the imaging device 136. A signal line 815 is a signal line for a clock signal output to the imaging device 134. A signal line 816 is a signal line for a clock signal output to the imaging device 135. A signal line 817 is a signal line for a clock signal output to the imaging device 136. For example, when the single-eye imaging operation is selected, the imaging control unit 201 changes signals of the signal lines 813 and 814 among the signal lines 812 to 814 to "L" signals. Consequently, clock supply to the imaging devices 135 and 136 is stopped (a control method 2 shown in FIG. 50).

In FIG. 49B, a circuit configuration example in stopping the operation of circuits for generating clocks in the imaging devices 134 to 136 without interrupting power supply and clock supply to the imaging systems is shown. In this example, a multiplier 818 of the multiplier/dividers 391 and 392 shown in FIG. 10 is shown as an example. It is assumed that the multiplier 818 shown in this example is a multiplier of the imaging devices 135 and 136. A signal line 819 is a signal line for a clock signal from the DSP 200. A signal line 820 is a signal line for an imaging ON/OFF signal from the DSP 200. A signal line 821 is a signal line for a clock signal after multiplication. For example, when the single-eye imaging operation is selected, the DSP 200 changes a signal of the signal line 820 to an "L" signal. Consequently, multipliers in the imaging devices 135 and 136 are stopped (a control method 3 shown in FIG. 50).

In FIG. 49C, a circuit configuration example in stopping the operation of vertical scanning circuits and horizontal scanning circuits in the imaging devices 134 to 136 without interrupting power supply and clock supply to the imaging systems and interrupting a multiplier for a clock in an imaging device. A signal line 823 is a signal line for a vertical control signal in a first line in the inside of a vertical scanning circuit 822. A signal line 824 is a signal line for a vertical control signal in a second line in the inside of the vertical scanning circuit 822. Signal lines 825 and 831 are signal lines for an imaging ON/OFF signal from the DSP 200. Signal lines 828 and 830 are signal lines for clock signals from the multiplier/dividers in the imaging devices. A signal line 826 is a signal line for a vertical control signal in the first line output to the outside of the vertical scanning circuit 822. A signal line 827 is a signal line for a vertical control signal in the second line output to the outside of the vertical scanning circuit 822. A signal line 832 is a signal line for a clock signal to the inside of a horizontal scanning circuit 829. A signal line 833 is a signal line for a horizontal control signal in the first line output to the outside of the horizontal scanning circuit 829. A signal line 834 is a signal line for a horizontal control signal in the second line output to the outside of the horizontal scanning circuit 829. In this example, only the signal lines in the first line and the second line are shown and signal lines of other lines are omitted. For example, when the single-eye imaging operation is selected, the DSP 200 changes signals of the signal lines 825 and 831 to "L" signals. Consequently, output of vertical scanning signals and horizontal scanning signals is stopped in the vertical scanning circuits and the horizontal scanning circuits in the imaging devices 135 and 136 (a control method 4 shown in FIG. 50). In the example shown in FIG. 49C, compared with the examples explained above, since a larger number of circuits are operating in the inside of the second and the third imaging systems 192 and 193, the effect of a reduction in power consumption is small. However, since clocks are supplied to the imaging devices and the multipliers in the imaging devices are operating, when switching operation from the single-eye imaging operation to the composite-eye imaging operation is performed, it is possible to quickly resume the operation of the second and the third imaging systems 192 and 193.

The operation of the imaging systems may be stopped by fixing the vertical synchronization signals and the horizontal synchronization signals supplied from the DSP 200 to the imaging systems (a control method 5 shown in FIG. 50). In this case, since the synchronization signals are not input, the imaging devices may be unable to perform operation for reading out image data.

FIG. 50 is a diagram of a relation between the control methods for stopping the operation of the imaging systems and the signal lines in the first embodiment. A list shown in FIG. 50 indicates the relation between the control methods and the signal lines. The operation of the imaging systems can be stopped by performing the control methods shown in FIG. 50. It is desirable not to output signals through signal lines in spaces marked with slashes among spaces corresponding to the control method 1. It is desirable to fix signal lines in spaces marked with slashes among spaces corresponding to the control methods 2 and 5 to "L" or "H". Signal lines not described in the table shown in FIG. 50 (signal lines from the DSP 200 to the imaging systems) may be set in any one of states of "H" output, "L" output, insufficient output, and no output. However, it is desirable to set the signal lines in the state of no output in order to reduce power consumption.

[Example of Capturing of Image Data from Imaging System into DSP]

Figure 51:
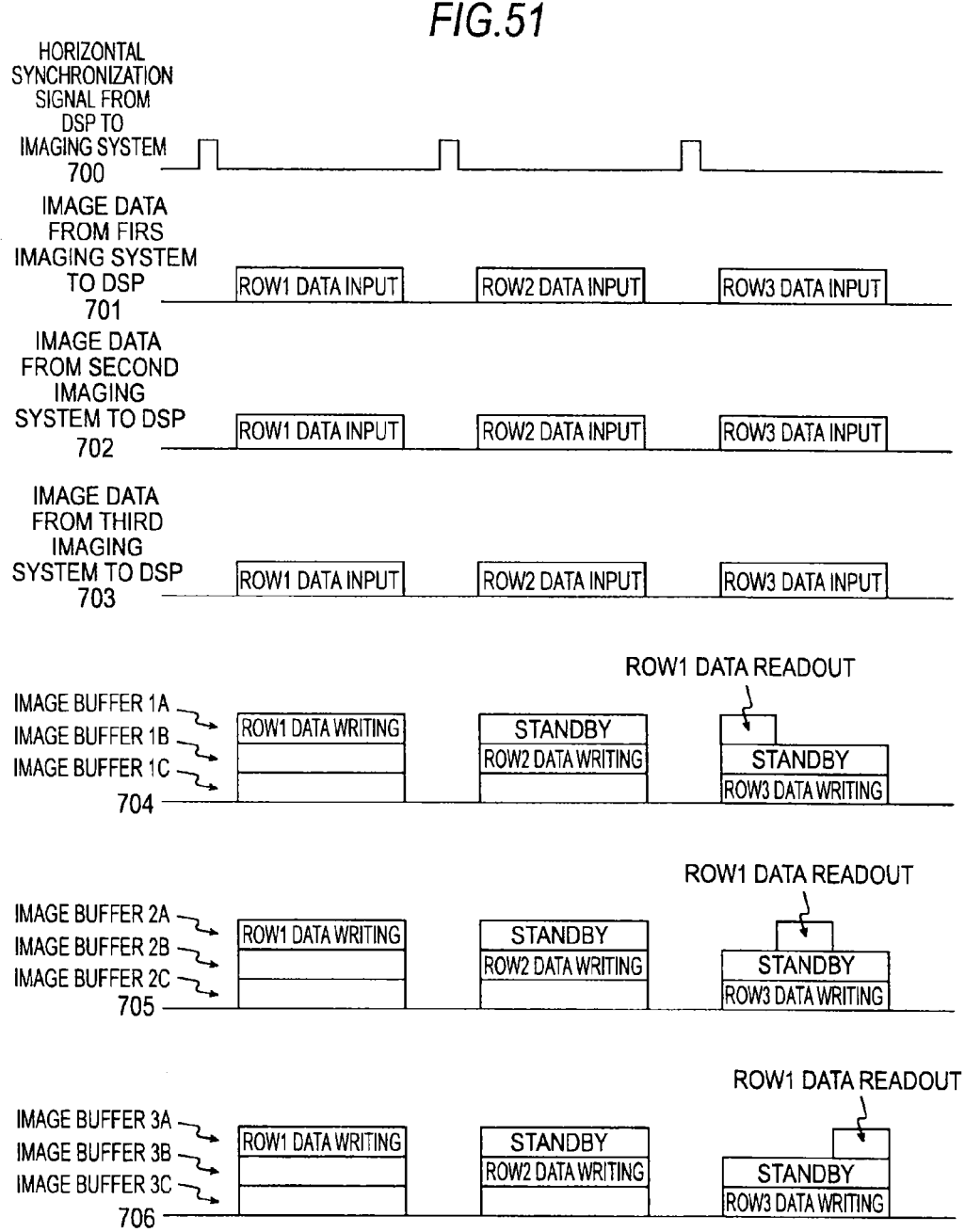
FIG. 51 is a schematic timing chart of output timing from the imaging devices and states of writing in image buffers in the first embodiment.

FIG. 51 is a schematic timing chart of output timing from the imaging devices and states of writing in the image buffers in the first embodiment. The abscissa shown in FIG. 51 represents a time axis. A waveform 700 indicates horizontal synchronization signals from the DSP 200 to the imaging systems. Abscissas 701 to 703 represent time transitions of image data output from the imaging systems to the DSP 200. Abscissas 704 to 706 represent time transitions of writing sates of the image buffers 211 to 219. In an example shown in FIG. 51, writing states of one set of three image buffers corresponding to the imaging systems are shown on the same line.

For example, image buffers 1A, 1B, and 1C opposed to the first imaging system 191 are explained as examples. For example, writing of image data from the imaging device 134 to the first image buffer 1A is completed, the image buffer 1A changes to a standby state for waiting for readout to the inside of the DSP 200. During the standby state of the image buffer 1A, writing of image data in the second image buffer 1B from the imaging device 134 is performed. When the writing of the image data in the second image buffer 1B from the imaging device 134 is completed, the image buffer 1B changes to the standby state for waiting for readout to the inside of the DSP 200. When the writing of the image data in the second image buffer 1B is completed, readout of the image data from the first image buffer 1A to the inside of the DSP 200 is performed. Before writing in the image buffer 1C is completed, readout of the image data from the image buffer 1A is completed and image data can be written in the image buffer 1A. Subsequently, a series of these kinds of operation is repeatedly performed. The operation is performed for image buffers 2A to 2C and image buffers 3A to 3C in the same manner.

When image data written in three image buffers are read out by using one data bus 204, it is necessary to read the image data in the image buffers in time equal to or shorter than ⅓ of time in which the imaging device writes the image data.

A relation between a clock frequency at which the imaging devices read out image data of the pixels and write the image data in the image buffers 211 to 219 and a clock frequency at which the DSP 200 reads out the image data in the image buffers 211 and 219 is explained below. Further, a relation between a clock frequency at which the DSP 200 reads out the image data in the image buffers 211 to 219 in the composite-eye imaging operation and a clock frequency at which the DSP 200 reads out the image data in the image buffer 211 to 219 in the single-eye imaging recording is explained below.

Figure 52A:
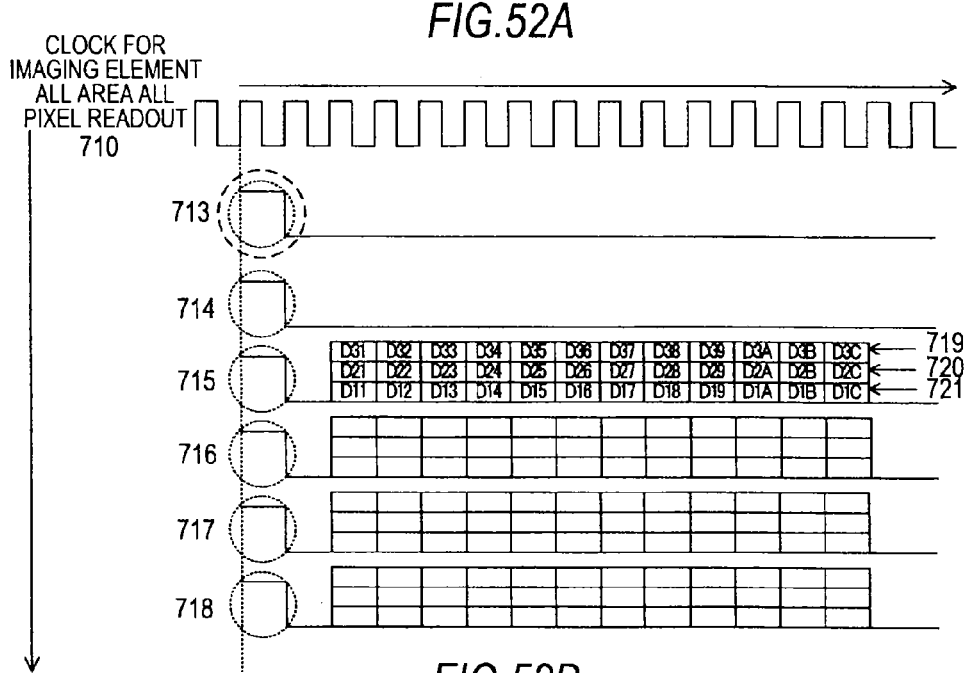
FIGS. 52A and 52B are diagrams of a relation between a clock frequency for readout of pixels in the imaging devices and writing in the image buffers and a clock frequency for reading out image data from the image buffer in the first embodiment.
Figure 52B:
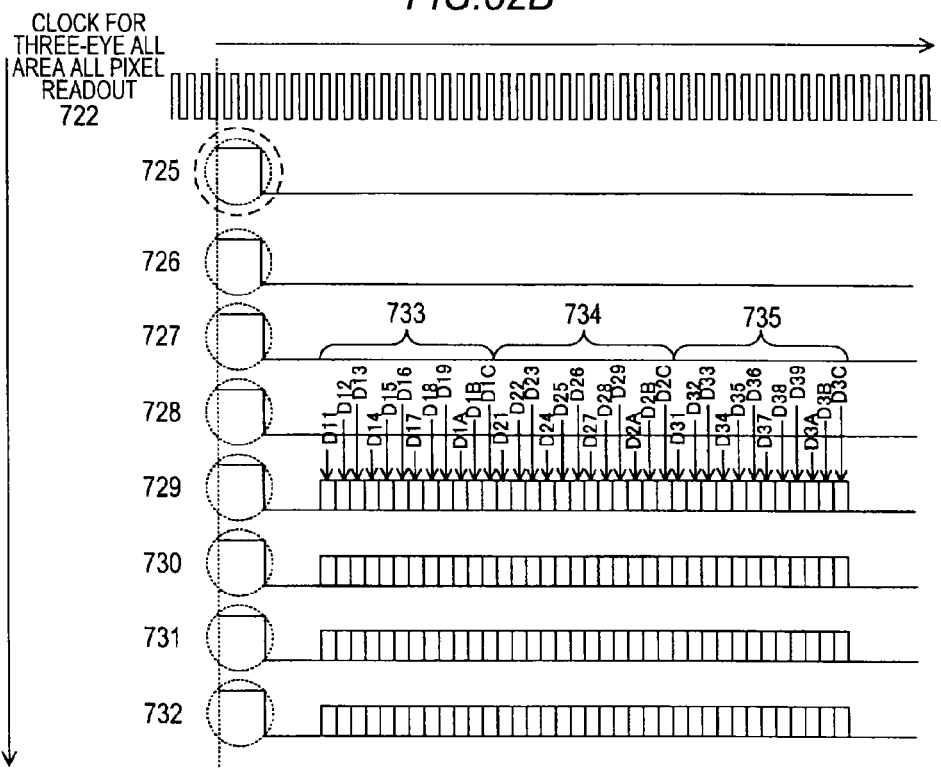

FIGS. 52A and 52B to FIGS. 54A and 54B are diagrams of a relation between a clock frequency for readout of the pixels and writing in the image buffers in the imaging devices in the first embodiment and a clock frequency for reading image data from the image buffers. It is assumed that a relation of the abscissas shown in FIGS. 52A and 52B to FIGS. 54A and 54B indicates elapse of time in one line and a relation of the ordinates indicates elapse of time in each line in one frame. An example shown in FIGS. 52A and 52B is an example corresponding to the first readout method shown in FIGS. 28A and 28B (the three-eye landscape wide-angle image imaging mode). An example shown in FIGS. 53A and 53B is an example corresponding to the third readout method shown in FIGS. 32A and 32B (the single-eye landscape image imaging mode). An example shown in FIGS. 54A and 54B is an example corresponding to the fifth readout method shown in FIGS. 36A and 36B (the single-eye portrait small-area image imaging mode).

In FIG. 52A, a relation between a clock frequency in the imaging devices and output timing of image data from the imaging devices in the three-eye landscape wide-angle image imaging mode is shown. A waveform 710 indicates a clock used in reading out all pixels from all areas in the imaging devices 134 to 136 when the three-eye landscape wide-angle image imaging mode is set. Abscissas 713 to 718 schematically indicate, as rectangles, time transitions of image data read out from the imaging devices 134 to 136 and output to the image buffers 211 to 219. In a line 719, the image data output to the image buffer 211 is shown. In a line 720, the image data output to the image buffer 212 is shown. In a line 721, the image data output to the image buffer 213 is shown. In this example, different signs (D11 to D1C, etc.) are affixed in the rectangles only on the abscissa 715 and signs are omitted in the rectangles in the other abscissas. A large broken line circle shown on the abscissa 713 indicates timing of vertical synchronization signals. Small dotted line circles shown on the abscissas 713 to 718 indicate timing of horizontal synchronization signals. On the abscissas shown in FIG. 52B to FIGS. 54A and 54B explained below, similarly, large broken circles and small dotted line circles are shown to indicate timing of vertical synchronization signals and timing of horizontal synchronization signals.

In FIG. 52B, a relation between a clock frequency in the DSP 200 and timing for readout of image data from the image buffers in the three-eye landscape wide-angle image imaging mode is shown. A waveform 722 indicates a clock used by the DSP 200 in reading out image data from the image buffers 211 to 219 when the three-eye landscape wide-angle image imaging mode is set. Abscissas 725 to 732 schematically represents, as rectangles, time transitions of image data read out from the image buffers 211 to 219. In this example, different signs (D11 to D1C, etc.) are associated with rectangles by arrows only on the abscissa 729. Sings in rectangles are omitted on the other abscissas. These signs correspond to the signs shown in FIG. 52A. A section 733 is a readout section of the imaging device 134, a section 734 is a readout section of the imaging device 135, and a section 735 is a readout section of the imaging device 136.

When three image data are input from the three imaging devices 134 to 136 to the DSP 200, the input image data are written in the image buffers 211 to 219. The image data written in the image buffers 211 to 219 are read out via one data bus 204 in the DSP 200 and written in the image memory 170 via the I/F 206 with the image memory. For example, it is assumed that the three-eye landscape wide-angle image imaging mode is set. In this case, as shown in FIGS. 52A and 52B, it is necessary to read out the image data in the image buffers 211 to 219 in time equal to or shorter than ⅓ of time in which the imaging devices 134 to 136 write the image data in the image buffers 211 to 219.

Figure 53A:
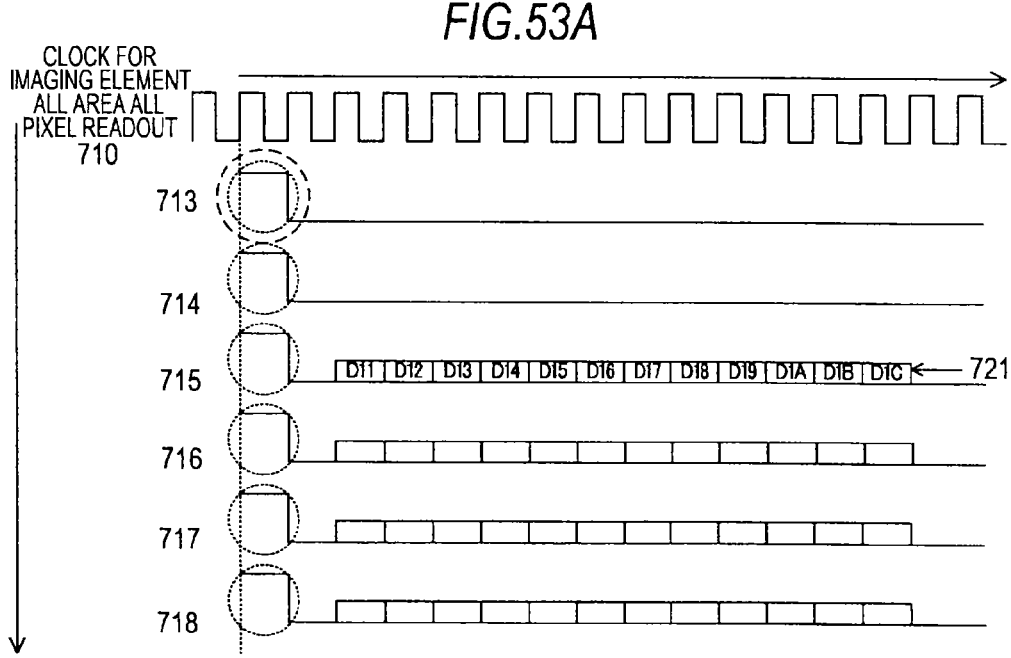
FIGS. 53A and 53B are diagrams of a relation between a clock frequency for readout of pixels in the imaging devices and writing in the image buffers and a clock frequency for reading out image data from the image buffer in the first embodiment.
Figure 53B:
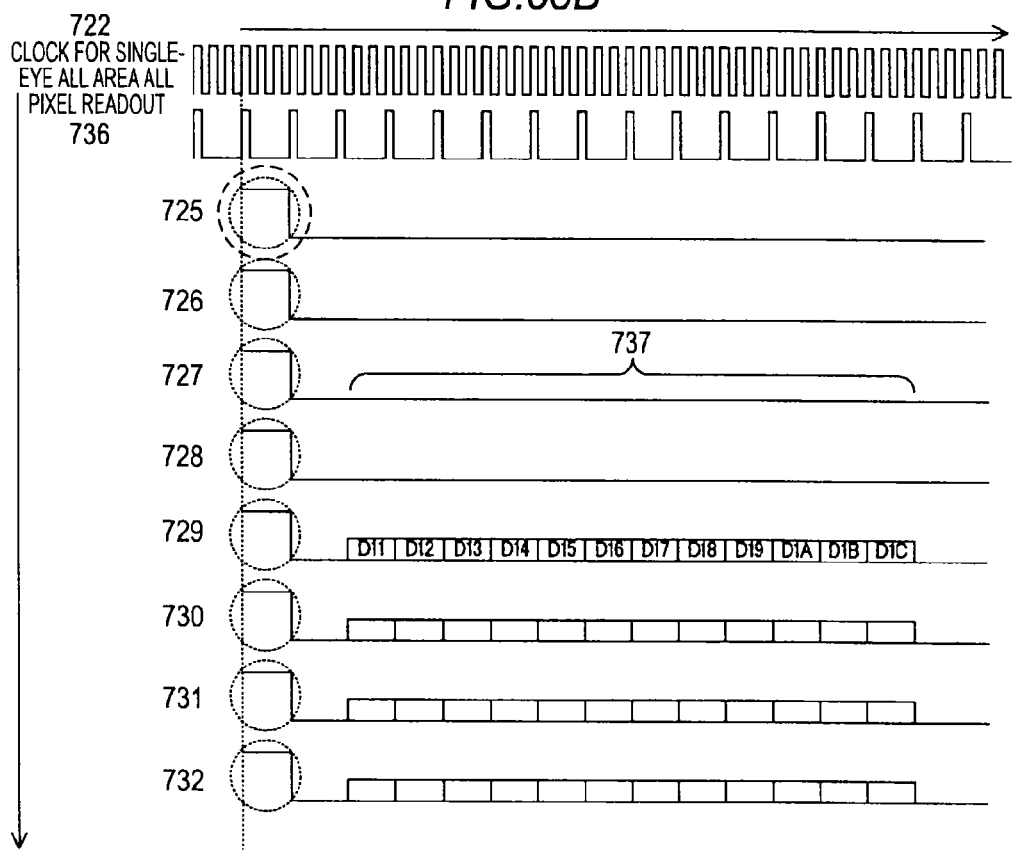

In FIG. 53A, a relation between a clock frequency in the imaging devices and timing for output of image data from the imaging devices in the single-eye landscape image imaging mode is shown. In FIG. 53B, a relation between a clock frequency in the DSP 200 and timing for readout of image data from the image buffers in the single-eye landscape image imaging mode is shown. A waveform 736 indicates a clock used by the DSP 200 in reading out image data from the image buffers 211 to 219 when the single-eye landscape image imaging mode is set. A section 737 is a readout section of the imaging device 134. Components the same as those in the example shown in FIGS. 52A and 52B are denoted by the same reference numerals and signs.

When FIGS. 52A and 52B and FIGS. 53A and 53B are compared, it can be understood that, when the three-eye landscape wide-angle image imaging mode is set, an amount of image data is three times as an amount of image data in the single-eye landscape image imaging mode. Therefore, when the three-eye landscape wide-angle image imaging mode is set, a clock frequency three times as high as a clock frequency in the three-eye landscape imaging operation is necessary as a clock frequency for reading out the image data of the image buffers 211 to 219. Similarly, when the three-eye landscape wide-angle image imaging mode is set and signal processing in the inside of the DSP 200 is performed, a clock frequency three times as high as a clock frequency in the single-eye landscape image imaging mode is necessary.

In FIG. 54A, a relation between a clock frequency in the imaging devices and timing for output of image data from the imaging devices in the single-eye portrait small-area image imaging mode is shown. A waveform 738 indicates a clock used in reading out all pixels from a specific area in the imaging devices 134 to 136 when the single-eye portrait small-area image imaging mode is set. In FIG. 54B, a relation between a clock frequency in the DSP 200 and timing for readout of image data from the image buffers in the single-eye portrait small-area image imaging mode is shown. A waveform 739 indicates a clock used by the DSP 200 in reading out image data from the image buffers 211 to 219 when the single-eye portrait small-area image imaging mode is set. A section 740 is a readout section of the imaging device 134. Components the same as those in the example shown in FIGS. 52A and 52B are denoted by the same reference numerals and signs.

When FIGS. 53A and 53B and FIGS. 54A and 54B are compared, it can be understood that, when the single-eye portrait small-area image imaging mode is set, a data amount of image data is small compared with a data mount in reading out all pixels of a light receiving surface. Therefore, when the single-eye portrait small-area image imaging mode is set, a small clock frequency compared with a clock frequency in reading out all the pixels is necessary as a clock frequency for reading out image data of the image buffer 211. Similarly, when the image signal processing in the inside of the DSP 200 is performed, a clock frequency can be small compared with the clock frequency in reading out all the pixels.

[Example of Operating Frequency Requested to Data Bus of DSP]

Figure 55:
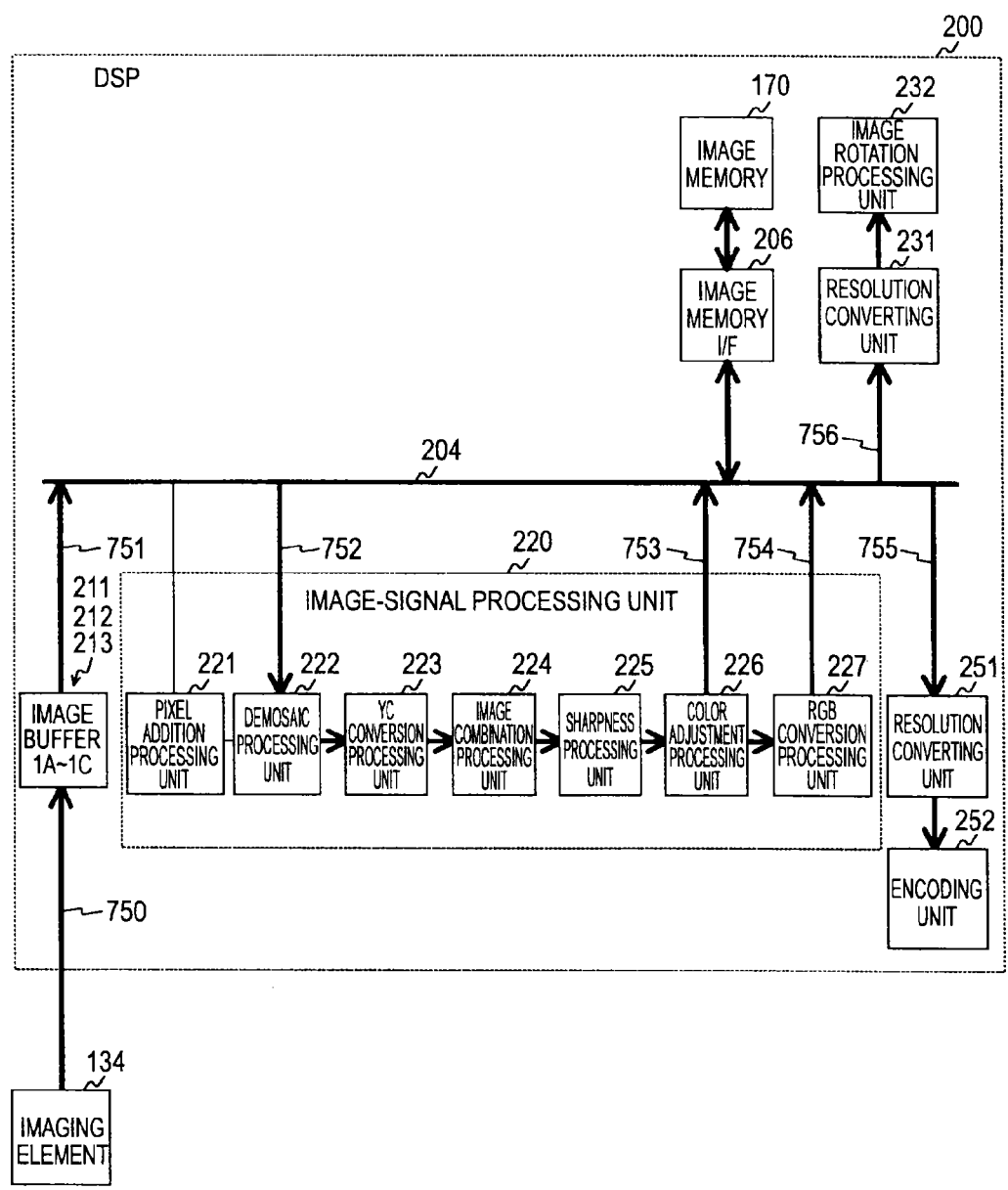
FIG. 55 is a schematic diagram of a flow of image data generated by the imaging device in the first embodiment.

FIG. 55 is a schematic diagram of a flow of image data generated by the imaging device 134 in the first embodiment. A configuration shown in FIG. 55 is substantially the same as the configuration example shown in FIG. 43 and is different only in that a data format of image data transmitted by the units through the data bus 204 is added. In this example, it is assumed that the pixel addition processing unit 221 in the DSP 200 is not used, an image output is only an output to the display unit 140, and an output to an external display device is not performed.

Image data written in the image buffers 211 to 213 from the imaging device 134 is Bayer data 750. Image data input to the DSP 200 is transmitted in a Bayer data format up to a pre-stage of the demosaic processing unit 222 that interpolates RGB (R (Red), G (Green), and B (Blue)) data with Bayer data. Specifically, concerning writing of image data in the image memory 170 from the image buffers 211 to 213 and readout of image data to the demosaic processing unit 222, the image data is transmitted in the Bayer data format.

The image data subjected to the demosaic processing by the demosaic processing unit 222 is directly passed among the processing units before the resolution conversion processing is performed. In resolution conversion with a large amount data treated in signal processing, image data is written in the image memory 170 in advance through the data bus 204 such that desired image data can be easily input at desired timing. The resolution converting units 231 and 251 read image data necessary for the resolution conversion processing from the image memory 170.

Consequently, image data of an RGB data format is written in the image memory 170 through the data bus 204 before resolution conversion for a recording image. When resolution conversion for image recording is performed, image data of an RGB data format is read out from the image memory 170 through the data bus 204.

When the display unit 140 is caused to display an image, in general, image data is requested by the display unit 140 in a YCbCr format. Therefore, Image data of the YCbCr data format is written in the image memory 170 through the data bus 204 before resolution conversion for a display device. When resolution conversion for image display is performed, the image data of the YCbCr data format is read out from the image memory 170 through the data bus 204.

A data amount of one piece of image data transmitted through the data bus 204 is explained. For example, it is assumed that, when one piece of image data is input to the DSP 200 from the imaging device 134, the input image data is recorded in the recording medium 180 as one image file and the display unit 140 is caused to display the image data. In this case, two pieces of image data as Bayer data, two pieces of image data as YCbCr data, and two pieces of image data as RGB data are transmitted through the data bus 204. In other words, two pieces of image data between the image buffers 211 to 213 and the demosaic processing unit 222 are transmitted in the Bayer data format (Bayer 751 and Bayer 752). Two pieces of image data between the color adjustment processing unit 226 and the resolution converting unit 231 are transmitted in the YCbCr data format (YCbCr 753 and YCbCr 756). Two pieces of image data between the RGB conversion processing unit 227 and the resolution converting unit 251 are transmitted in the RGB data format (RGB 754 and RGB 755).

A data amount for one piece of image data in the YCbCr data format is about twice as large as a data amount of image data in the Bayer format having the same image size. A data amount for one piece of image data in the RGB data format is about three times as large as a data amount of image data in the Bayer format having the same image size. For example, when one piece of image data is recorded in the recording medium 180 as one image file and the display unit 140 is caused to display the image data, it is necessary to transmit about twelve pieces of image data in terms of the Bayer data format through the data bus 204. Processing concerning the transmission of the image data is shown in FIGS. 56A and 56B.

FIGS. 56A and 56B are schematic diagrams of a relation between processing for occupying the data bus 204 and time in the first embodiment. In FIG. 56A, a relation between processing for occupying the data bus 204 and time in recording one piece of image data, which is input to the DSP 200 from the imaging device 134, in the recording medium 180 as one image file and causing the display unit 140 to display the image data is shown. In FIGS. 56A and 56B, the abscissa is a time axis and a relation in processing one frame is shown. Kinds of processing corresponding to those in the example shown in FIG. 55 are denoted by the same reference numerals.

In FIG. 56B, a relation between processing for occupying the data bus 204 and time in causing the display unit 140 to display one piece of image data input to DSP 200 from the imaging device 134 without recording the image data in the recording medium 180. This example is an example in which display operation for a so-called monitoring image is performed. When the display operation for the monitoring image is performed, an image is displayed in the display unit 140 but image data for recording is not generated. Specifically, the processing 754 for writing RGB data in the image memory 170 and the processing 755 for reading out the RGB data from the image memory 170 in the resolution conversion for a recording image are unnecessary at a pre-stage of the resolution conversion for the recording image. Therefore, in the display operation for the monitoring image, when the display unit 140 is caused to display one piece of image data input to the DSP 200 from the imaging unit 130, about six image data in terms of the Bayer data format only has to be transmitted through the data bus 204.

As explained above, a data amount of the image data transmitted through the data bus 204 can be calculated. An operating frequency requested to the data bus 204 is explained below.

Variables used for calculation of the operating frequency requested to the data bus 204 are explained below.

H: The number of pixels in the lateral direction in an area where the pixel data readout is performed in the imaging devices V: The number of pixels in the longitudinal direction in the area where the pixel data readout is performed in the imaging devices R: A thinning-out ratio in performing the pixel thinning-out readout is performed when the pixel data readout is performed in the imaging devices B: Bit width of pixel data of an image F: The number of images input from the imaging device that can be subjected to the image signal processing in one second in the DSP 200

Kb: The number of images that need to be transmitted on the data bus 204 of the DSP 200 in the Bayer data format until one image input from the imaging devices is recorded in the recording medium 180 and displayed in the display unit 140

Ky: The number of images that need to be transmitted on the data bus 204 of the DSP 200 in the YCbCr data format until one image input from the imaging devices is recorded in the recording medium 180 and displayed in the display unit 140

Kr: The number of images that need to be transmitted on the data bus 204 of the DSP 200 in the RGB data format until one image input from the imaging devices is recorded in the recording medium 180 and displayed in the display unit 140

K: A value in terms of Bayer image data of the number of images transmitted on the data bus 204 of the DSP 200 until one image input from the imaging devices is recorded in the recording medium 180 and displayed in the display unit 140

K is calculated by the following formula.

$$K = Kb \times 1 + Ky \times 2 + Kr \times 3$$

D: Bit width of the data bus 204 of the DSP 200

An amount of data (unit: bit) DD1 input to the DSP 200 in one second is calculated by the following Formula 13 using these variables.

$$DD1 = H \times V \times R \times B \times F \quad \text{(Formula 13)}$$

An amount of data (unit: bit) DD2 that should be transmitted on the data bus 204 in one second is calculated by the following Formula 14.

$$DD2 = H \times V \times R \times B \times F \times K \quad \text{(Formula 14)}$$

A clock frequency (unit: Hz) of the data bus 204 necessary to transmit image data is calculated by the following Formula 15.

$$Fclk = H \times V \times R \times B \times F \times K / (D - D \bmod B) \quad \text{(Formula 15)}$$

A lower limit Fclk min in a preferred range of the clock frequency Fclk can be calculated by the following Formula 16.

$$Fclk\ min = (H \times V \times R \times B \times F \times K \times 0.1) / (D - D \bmod B) \quad \text{(Formula 16)}$$

On the data bus 204, data are not always transmitted without any interval among data. Therefore, it is well-known among those skilled in the art that, when an operating frequency of the data bus 204 is calculated on the basis of an amount of data that needs to be transmitted by using the data bus 204, a margin of several ten % is given to a transfer ability of the data bus 204.

For example, when a margin of several % is given, it is likely that an amount of the given margin is too small. On the other hand, when a margin of hundred and several ten % is given, the margin is too large. This is also well-known among those skilled in the art. For example, data transmission on the data bus 204 is performed at some interval and a transmission amount of the data bus 204 falls when the margin is several ten %. Therefore, if a maximum margin of 100% is given the transmission ability of the data bus 204 is sufficient. Therefore, an upper limit Fclk max in the preferred range of the clock frequency Fclk is as explained below.

The upper limit Fclk max in the preferred range of the clock frequency Fclk can be calculated by the following Formula 17.

$$Fclk\ max = (H \times V \times R \times B \times F \times K \times 2.0) / (D - D \bmod B) \quad \text{(Formula 17)}$$

In this way, the lower limit Fclk min and the upper limit Fclk max in the preferred range of the clock frequency Fclk can be calculated. Therefore, the preferred range of the clock frequency Fclk of the data bus 204 can be defined by the following Formula 18.

$$(H \times V \times R \times B \times F \times K \times 1.0)/(D - D \bmod B) \leq F\text{clk} \leq (H \times V \times R \times B \times F \times K \times 2.0)/(D - D \bmod B) \quad \text{(Formula 18)}$$

"D−DmodB" in Formulas 16 to 18 is explained.

When the bit width of the data bus 204 is not integer times as large as the bit width of the pixels of the imaging devices, waste occurs in writing operation in the image memory 170. For example, when the bit width of the data bus 204 is 128 bits and the bit width of the pixels of the imaging devices is 12 bits, it is difficult to transfer 12-bit pixel data equivalent to eleven pixels and only the pixel data equivalent to ten pixels can be transferred. Therefore, waste of 8 bits occurs in the writing operation. An amount indicating the waste is DmodB. Specifically, a value obtained by subtracting the amount indicating the waste from the bit width of the data bus 204 (effective data bus width) is "D−DmodB".

As indicated by Formulas 16 to 18, a preferred range of an operating frequency of the data bus 204 can be calculated from H, V, R, B, F, K, and D. However, values of H, V, R, B, F, K, and D change according to content of imaging operation performed by the cellular phone apparatus 100. Therefore, it is desirable to change the operating frequency of the data bus 204 according to the values of H, V, R, B, F, K, and D set in respective kinds of imaging operation. By changing the operating frequency of the data bus 204 in this way, in the DSP 200, it is possible to reduce the operating frequency of the data bus 204 to a necessary and sufficient value and reduce power consumption.

FIG. 57 is a diagram of parameters for determining operating frequencies of the data bus 204 concerning respective kinds of imaging operation of the cellular phone apparatus 100 in the first embodiment. By setting parameters (H1sr, V1sr, etc.) shown in FIG. 57, it is possible to determine the operation frequencies of the data bus 204 concerning the respective kinds of imaging operation of the cellular phone apparatus 100. An example of the parameters is shown in FIG. 58.

FIG. 58 is a diagram of the parameters for determining the operation frequencies of the data bus 204 concerning the respective kinds of imaging operation of the cellular phone apparatus 100 in the first embodiment. In this example, still image recording operation is performed. The lower limit Fclk min and the upper limit Fclk max of the operation frequency of the data bus 204 can be calculated in advance on the basis of the parameters. In the example shown in FIG. 58, the number of images to be subjected to still image recording processing in one second and the number of images to be subjected to monitoring operation in one second are set to thirty.

[Example of Time Division Processing of Still Image Recording Operation]

Time division processing concerning the still image recording operation is explained. The time division processing means that, for example, imaging and recording processing for a still image is not completed within a period of one frame (i.e. within one period of a vertical synchronization signal supplied to the image-signal processing unit 220) and is performed for a period of several frames.

For example, in recent years, even when a user photographs a relatively large number of still images using a cellular phone apparatus with camera in wide use, only one still image is often photographed in one second. Therefore, when the still image recording operation is performed, convenience for the user is less likely to be spoiled even if, for example, the image signal processing, recording processing, and the like for one still image is performed in about one second. By performing the image signal processing, the recording processing, and the like for one still image in this way, it is possible to reduce the operating frequency of the data bus 204 of the DSP 200 and reduce power consumption.

Until the image signal processing, the recording processing, and the like are completed after one still image is recorded, it is possible to display a message such as "please wait for a while" in the display unit 140 to notify that still image imaging processing is being executed. Besides the message, an icon or a sign indicating that the still image imaging processing is being executed may be displayed or the monitoring operation may be performed in parallel to display a monitoring image.

FIG. 59 and FIGS. 60A and 60B are schematic diagrams of the time division processing performed by the image-signal processing unit 220 in the first embodiment. An example shown in FIG. 59 and FIGS. 60A and 60B indicate the time division processing performed when recording instruction operation for a still image is performed while the monitoring operation is performed. The abscissa shown in FIG. 59 represents a time axis. A waveform 760 indicates a vertical synchronization signal. An abscissa 795 represents a relation between processing for occupying the data bus 204 and time. White rectangles shown on the abscissa 795 represent processing for occupying the data bus 204 necessary for monitoring processing for respective frames. Rectangles with hatching shown on the abscissa 795 represent processing for occupying the data bus 204 necessary for recording processing for as still image (time division processing).

As explained above, when the monitoring operation is performed, compared with imaging operation for a still image, an amount of data that needs to be transmitted through the data bus 204 is small. It is assumed that, for example, at any time in a section 796, the recording instruction operation for a still image is performed. In this case, recording operation for the still image is performed concerning a frame 3 indicated by an arrow 797. For example, when the recording instruction operation is received from the user, the DSP 200 performs the image signal processing and the recording processing for a frame (e.g., the frame 3) corresponding to timing of the recording instruction operation and plural frames (e.g., frames 4 to 8) following the frame. While the image signal processing and the recording processing are performed, the imaging devices and the DSP 200 perform the monitoring operation in parallel. When the recording operation is completed (e.g., at time indicated by an arrow 798), the imaging devices and the DSP 200 perform only the monitoring operation.

When the time division processing of the recording processing for the still image is performed, while the time division processing is performed, it is also possible to display a single-color image or an image prepared in advance without performing the monitoring operation. It is also possible to display the image and a message or the like for informing the user that the image recording processing is performed.

In FIGS. 60A and 60B, an amount of data that needs to be transmitted through the data bus 204 of the DSP 200 in order to perform the monitoring operation and the time division processing of the recording processing within a period of a vertical synchronization signal is shown. An example shown in FIGS. 60A and 60B is an example in which a part of the example shown in FIGS. 56A and 56B is modified. The example is different from the example shown in FIGS. 56A and 56B in that recording operation time division processing

759 is added. Components the same as those in the example shown in FIGS. 59A and 59B are denoted by the same reference numerals.

For example, the recording processing shown in FIG. 60A is divided into twelve. As shown in FIG. 60B, in the monitoring operation, respective kinds of signal processing (e.g., the recording operation time division processing 759) are performed by an amount involving data transmission for two Bayer images per one frame. After a frame in which the recording processing is started, the signal processing for the recording processing is performed while the monitoring operation after the start of the recording operation is performed. However, first processing is typically performed by an amount equal to or larger than one Bayer image is typically performed in order to complete writing of image data in the image memory 170. Rectangles 751 to 753 and 756 shown in FIG. 60B correspond to the white rectangles on the abscissa 795 shown in FIG. 59. A rectangle 759 shown in FIG. 60B correspond to the rectangles with hatching on the abscissa 795 shown in FIG. 59.

FIG. 61 is a diagram of an example of parameters for determining operating frequencies of the data bus 204 concerning the still image recording operation of the cellular phone apparatus 100 in the first embodiment. The example shown in FIG. 61 is the same as the example shown in FIG. 58 except that the number of images to be subjected to the still image recording processing in one second is one and values related to the number of images are changed. By setting the number of images to be subjected to still image recording processing in one second to one, it is possible to reduce the lower limit Fclk min and the upper limit Fclk max of the operating frequency of the data bus 204 and reduce power consumption of the DSP 200.

As explained above, since the image generated in the monitoring operation is not an image for enjoyment, it is desirable to thin out the pixel data to reduce power consumption. Therefore, in the examples shown in FIGS. 58 and 61, in the case of the monitoring operation, a value smaller than 1 is used as a thinning-out ratio for the pixel data. This makes it possible to set an operation frequency necessary for the data bus 204 of the DSP 200 smaller than an operation frequency necessary for the data bus 204 in the still image recording operation shown in FIGS. 58 and 61 and reduce power consumption.

FIG. 62 is a diagram of an example of parameters for determining operating frequencies of the data bus 204 concerning the moving image recording operation of the cellular phone 100 in the first embodiment. In the example shown in FIG. 62, an example of the moving image recording operation is shown as the parameters shown in FIG. 57.

When the three-eye landscape wide-angle image imaging mode is set, an amount of image data is about three times as large as an amount of image data in the single-eye landscape image imaging mode. Therefore, for example, when the still image recording operation is performed, signal processing for a large image can be performed in time for several vertical synchronization signals (i.e., time for several frames). This makes it possible to suppress an operation frequency necessary for the data bus 204 from becoming excessively large. However, when the moving image recording operation is performed, since anew image is input for each frame, it is necessary to subject three-eye image data to signal processing in a period of one frame. Therefore, in order to suppress the operating frequency necessary for the data bus 204 from becoming excessively large, it is desirable to perform thinning-out processing for an image and reduce a data amount as shown in FIG. 62.

[Example of Measures Against Delay in Capturing Image Data]

In the first embodiment, the three pieces of image data simultaneously input to the DSP 200 from the three imaging devices are temporarily stored in an image buffer having a ring buffer structure. By using the image buffer of the ring buffer structure, it is possible to write the three pieces of image data simultaneously input to the DSP 200 from the three imaging devices in the minimum one image memory 170 via one data bus 204 and the image memory I/F 206. However, when the image buffers 211 to 219 having the ring buffer structure are used, as explained below, a delay in the image data occurs until the image data is read out from the image buffers 211 to 219 and captured into the DSP 200. Therefore, it is necessary to perform processing for the delay that occurs in this way.

Figure 63:
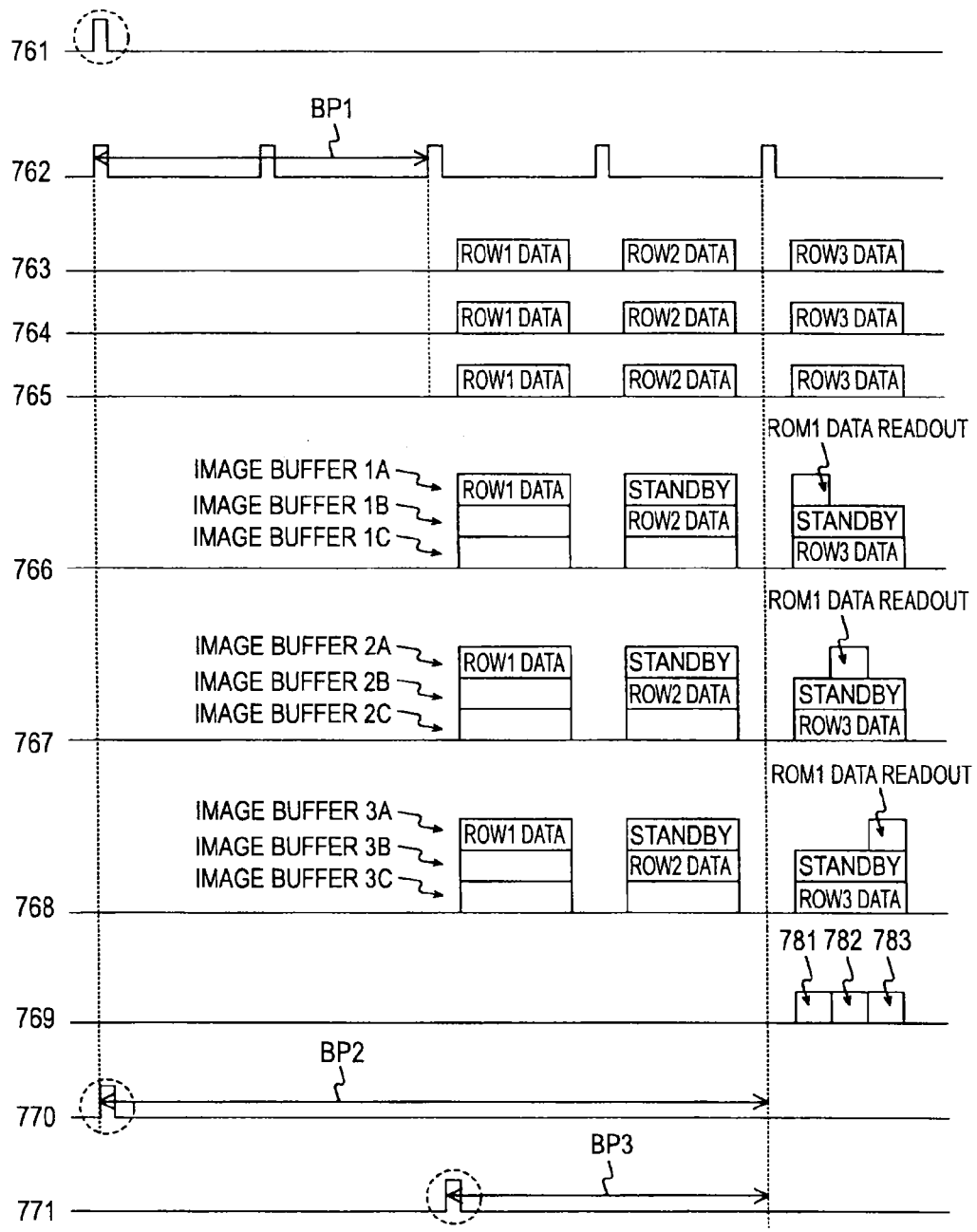
FIG. 63 is a schematic timing chart of states of timing for writing in image buffers and timing for capturing into the DSP in the first embodiment.

FIG. 63 is a schematic timing chart of timing for writing in the image buffers 211 to 219 and timing for capturing into the DSP 200 in the first embodiment. The abscissa shown in FIG. 63 represents a time axis. A waveform 761 indicates vertical synchronization signals from the DSP 200 to the imaging systems. A waveform 762 indicates horizontal synchronization signal from the DSP 200 to the imaging systems. BP1 in the waveform 762 indicates a vertical back porch for two lines. In an example shown in FIG. 63, it is assumed that a capacity of one of the image buffers 211 to 219 is the same as a data amount for one line of image data input to the DSP 200 from the imaging devices 134 to 136.

On an abscissa 763, time transition of image data input to the DSP 200 from the first imaging system 191 is shown. On an abscissa 764, time transition of image data input to the DSP 200 from the second imaging system 192 is shown. On an abscissa 765, time transition of image data input to the DSP 200 from the third imaging system 193 is shown.

On an abscissa 766, time transition of writing states of the image buffers 211 to 213 is shown. On an abscissa 767, time transition of writing states of the image buffers 214 to 216 is shown. On an abscissa 768, time transition of writing states of the image buffers 217 to 219 is shown. In the example shown in FIG. 63, writing states of one set of three image buffers corresponding to the imaging systems are shown on the same line.

On an abscissa 769, image data as targets of data readout from the image buffers 211 to 219 of the DSP 200 and data transmission to the inside of the DSP 200 are shown.

A waveform 770 indicates a vertical synchronization signal at the same timing as the vertical synchronization signals input to the imaging systems from the DSP 200. A waveform 771 indicates a vertical synchronization signal delayed to be supplied to the inside of the DSP 200. BP2 in the waveform 770 indicates a vertical back porch for four lines. BP3 in the waveform 771 indicates a vertical back porch for two lines.

As shown in FIG. 63, a delay for two lines occurs after writing of valid data of an image to the image buffers 211 to 219 is started until the data is readout from the image buffers and captured into the DSP 200.

Figure 64:
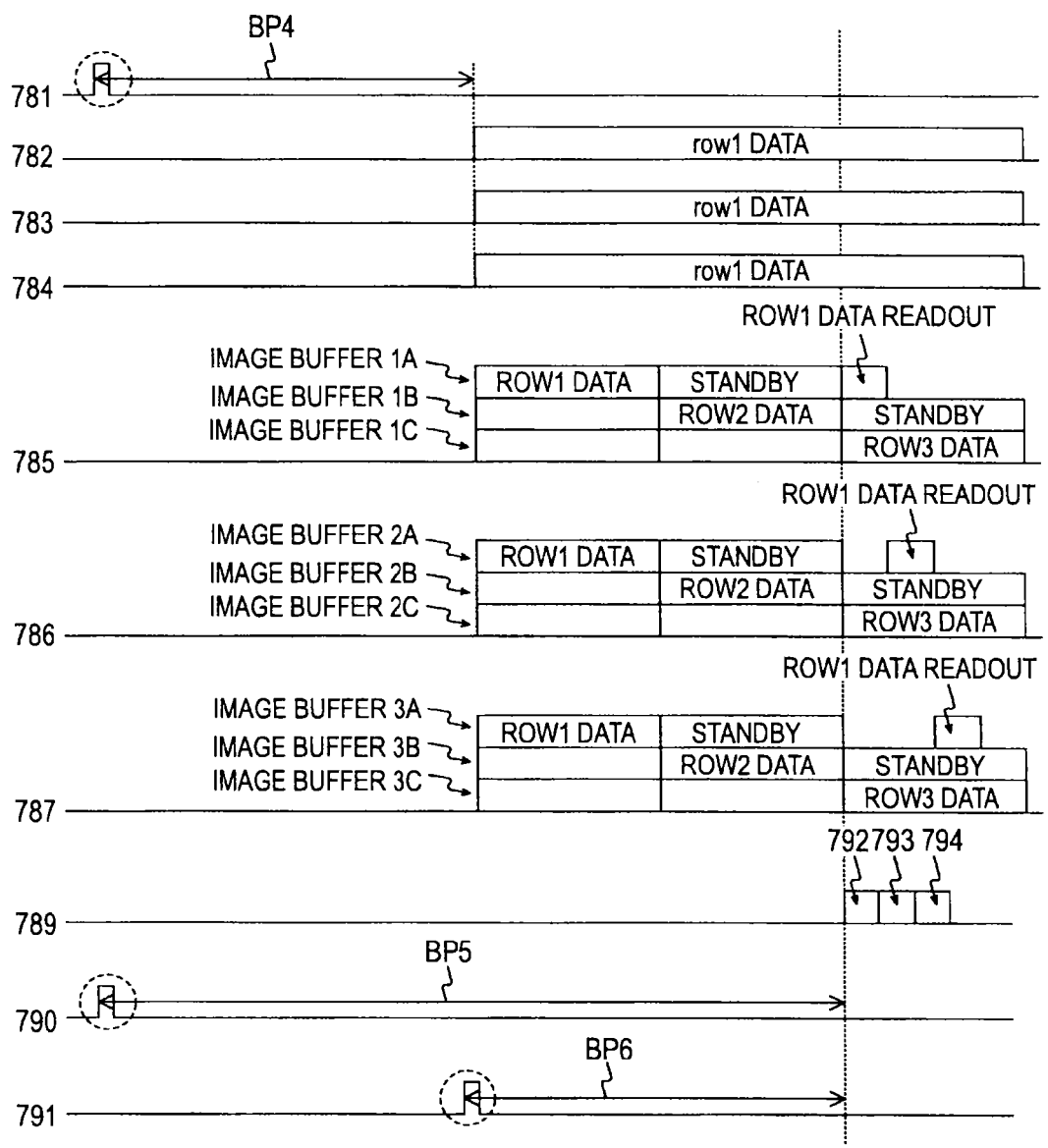
FIG. 64 is a schematic timing chart of states of timing for writing in the image buffers and timing for capturing into the DSP in the first embodiment.

FIG. 64 is a schematic timing chart of timing for writing in the image buffers 211 to 219 and timing for capturing into the DSP 200 in the first embodiment. The abscissa shown in FIG. 64 represents a time axis. A waveform 781 indicates horizontal synchronization signals from the DSP 200 to the imaging systems. BP4 in the waveform 781 indicates a horizontal back porch in an image generated by the imaging devices 134 to 136. In an example shown in FIG. 64, it is assumed that a capacity of one of the image buffers 211 to 219 is the same as ⅓ of a data amount for one line of image data input to the DSP 200 from the imaging devices 134 to 136.

On an abscissa 782, time transition of image data input to the DSP 200 from the first imaging system 191 is shown. On an abscissa 783, time transition of image data input to the DSP 200 from the second imaging system 192 is shown. On an abscissa 784, time transition of image data input to the DSP 200 from the third imaging system 193 is shown.

On an abscissa 785, time transition of writing states of the image buffers 211 to 213 is shown. On an abscissa 786, time transition of writing states of the image buffers 214 to 216 is shown. On an abscissa 787, time transition of writing states of the image buffers 217 to 219 is shown. In the example shown in FIG. 64, writing states of one set of three image buffers corresponding to the imaging systems are shown on the same line.

On an abscissa 789, image data as targets of data readout from the image buffers 211 to 219 of the DSP 200 and data transmission to the inside of the DSP 200 are shown.

A waveform 790 indicates a horizontal synchronization signal at the same timing as the horizontal synchronization signals input to the imaging systems from the DSP 200. A waveform 791 indicates a horizontal synchronization signal delayed to be supplied to the inside of the DSP 200. BP5 in the waveform 790 indicates a horizontal back porch. BP6 in the waveform 791 indicates a horizontal back porch.

As shown in FIG. 64, a delay for ⅔ line in a valid data area of an image occurs after writing of valid data of the image to the image buffers 211 to 219 is started until the data is read out from the image buffers and captured into the DSP 200.

It is necessary to remove these delays and set an interval between the vertical synchronization signals and the valid data of the image and an interval between the horizontal synchronization signals and the valid data of the image to be the same as an interval of generation of the image data in the imaging devices 134 to 136. Therefore, in the first embodiment, a signal having the same period as synchronization signals input to the imaging devices 134 to 136 from the DSP 200 and a delayed phase is used at least in a part of the image-signal processing unit 220 in the inside of the DSP 200. The imaging control unit 201 of the DSP 200 generates the synchronization signals input to the imaging devices 134 to 136 from the DSP 200 and also generates the signal having the same period as the synchronization signals input to the imaging devices 134 to 136 and a delayed phase. The imaging control unit 201 supplies the generated synchronization signals to the units in the DSP 200.

[Operation Example of Imaging Apparatus]

Figure 65:
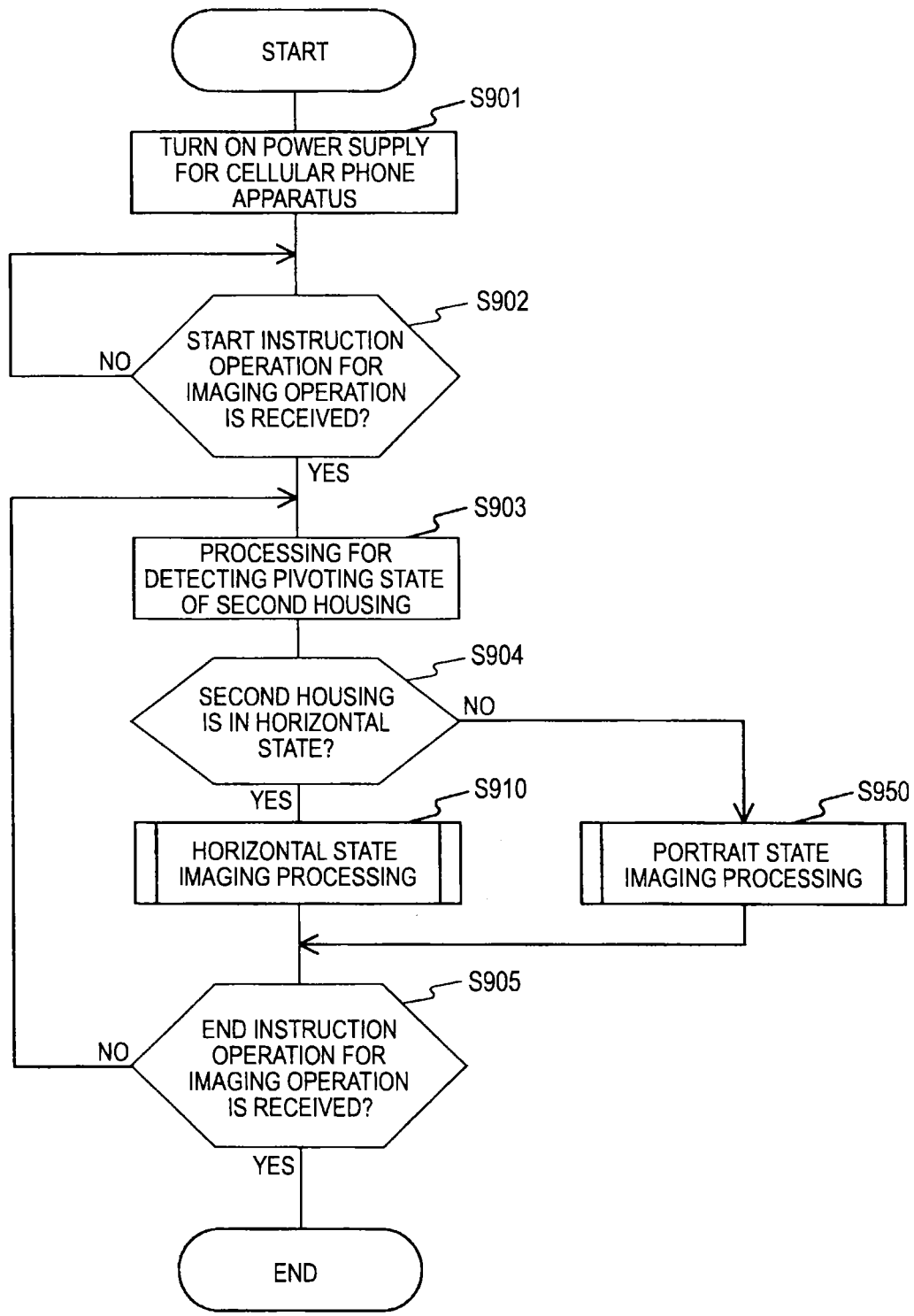
FIG. 65 is a flowchart of a processing procedure of imaging control processing by the cellular phone apparatus in the first embodiment.

FIG. 65 is a flowchart of a processing procedure of the imaging control processing by the cellular phone apparatus 100 in the first embodiment.

First, a power supply is turned on in the cellular phone apparatus 100 (step S901). Subsequently, it is determined whether start instruction operation for the imaging operation is received (step S902). For example, the user can start the imaging operation by performing instruction operation for instructing the start of the imaging operation on a menu screen in the display unit 140. When the start instruction operation for the imaging operation is not received (step S902), monitoring is continued until the start instruction operation for the imaging operation is received.

When the start instruction operation for the imaging operation is received (step S902), the pivoting-state detecting unit 150 detects a pivoting state of the second housing 120 (step S903). Step S903 is an example of a detection procedure described in the appended claims. Subsequently, the imaging control unit 201 determines whether the pivoting state of the second housing 120 is the landscape state (step S904). When the pivoting state of the second housing 120 is the landscape state, landscape state imaging processing is performed (step S910). The landscape state imaging processing is explained in detail later with reference to FIG. 66. On the other hand, when the pivoting state of the second housing 120 is the portrait state, portrait state imaging processing is performed (step S950). The portrait state imaging processing is explained in detail later with reference to FIG. 69. Steps S904, S910, and S950 are examples of a control procedure described in the appended claims.

Subsequently, it is determined whether end instruction operation for the imaging operation is received (step S905). When the end instruction operation for the imaging operation is received (step S905), the imaging control processing returns to step S903. On the other hand, when the end instruction operation for the imaging operation is received (step S905), the operation of the imaging control processing is completed.

Figure 66:
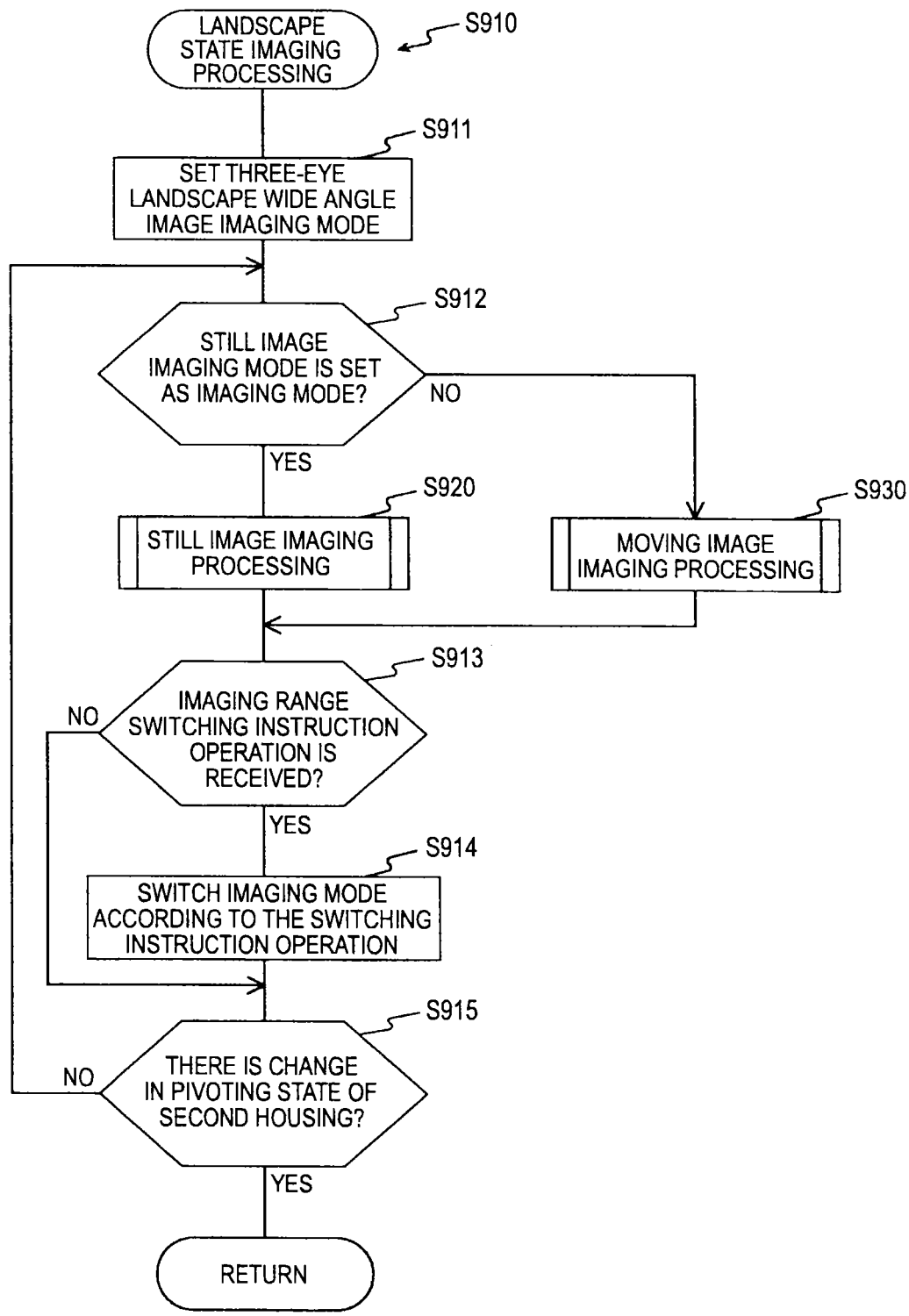
FIG. 66 is a flowchart of landscape state imaging processing in the processing procedure of the imaging control processing by the cellular phone apparatus in the first embodiment.

FIG. 66 is a flowchart of the landscape state imaging processing (a processing procedure of step S910 shown in FIG. 65) in the processing procedure of the imaging control processing by the cellular phone apparatus 100 in the first embodiment.

First, the imaging control unit 201 sets the three-eye landscape wide-angle image imaging mode as initial setting (step S911). Subsequently, the imaging control unit 201 determines whether which imaging mode of the still image imaging mode and the moving image imaging mode is set (step S912). When the still image imaging mode is set (step S912), still image imaging processing is performed (step S920). The still image imaging processing is explained in detail later with reference to FIG. 67. On the other hand, when the moving image imaging mode is set (step S912), moving image imaging processing is performed (step S930). The moving image imaging processing is explained in detail later with reference to FIG. 68.

Subsequently, it is determined whether imaging range switching instruction operation is received (step S913). For example, it is determined whether the imaging range changeover switch 111 shown in FIGS. 1A to 19 and the like is depressed. When the imaging range switching instruction operation is not received (step S913), the landscape state imaging processing proceeds to step S915. On the other hand, when the imaging range switching instruction operation is received (step S913), the imaging control unit 201 switches the imaging mode according to the received imaging range switching instruction operation (step S914). For example, every time the imaging range changeover switch 111 is depressed, the imaging mode is switched in order of (1) the three-eye landscape wide-angle image imaging mode, (2) the three-eye landscape narrow-angle image imaging mode, (3) the single-eye landscape image imaging mode, (4) the single-eye portrait image imaging mode, and (5) the single-eye portrait small-area image imaging mode.

Subsequently, it is determined whether there is a change in the pivoting state of the second housing 120 (step S915). When there is no change in the pivoting state of the second housing 120, the landscape state imaging processing returns to step S912. On the other hand, when there is a change in the pivoting state of the second hosing 120 (step S915), the operation of the landscape state imaging processing is completed.

Figure 67:
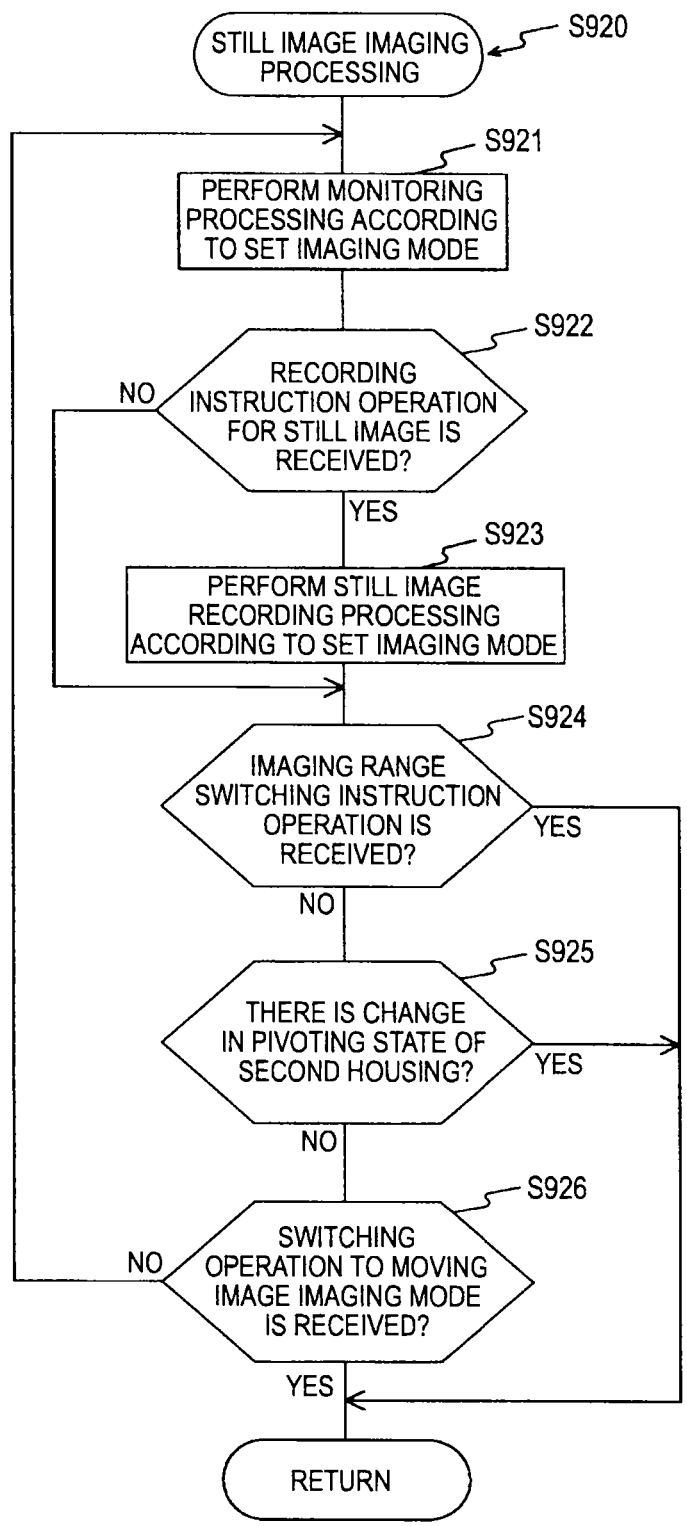
FIG. 67 is a flowchart of still image imaging processing in the processing procedure of the imaging control processing by the cellular phone apparatus in the first embodiment.

FIG. 67 is a flowchart of the still image imaging processing (a processing procedure in step S920 shown in FIG. 66) in the processing procedure of the imaging control processing by the cellular phone apparatus 100 in the first embodiment.

First, the monitoring processing is performed according to a set imaging mode (step S921). For example, when the three-eye landscape wide-angle image imaging mode is set, an image in the range of the thick line shown in FIG. 29A is displayed in the display unit 140 as a monitoring image as shown in FIG. 29B. As explained above, during the monitoring processing, the pixel thinning-out processing or the pixel addition processing may be performed.

Subsequently, it is determined whether recording instruction operation for a still image is received (step S922). For example, it is determined whether the determination key 114 is depressed in a state in which the monitoring image is displayed in the display unit 140. When the recording instruction operation for a still image is not received (step S922), the still image imaging processing proceeds to step S924. On the other hand, when the recording instruction operation for a still image is received (step S922), the still image recording processing is performed according to a set imaging mode (step S923). For example, when the three-eye landscape wide-angle image imaging mode is set, an image in the range of the thick line shown in FIG. 29A is recorded in the recording medium 180.

Subsequently, it is determined whether the imaging range switching instruction operation is received (step S924). When the imaging range switching instruction operation is not received (step S924), it is determined whether there is a change in the pivoting state of the second housing 120 (step S925). When there is no change in the pivoting state of the second housing 120 (step S925), it is determined whether switching operation from the still image imaging mode to the moving image imaging mode is received (step S926). For example, it is determined whether the still image/moving image changeover switch 112 is depressed in a state in which the still image imaging mode is set. When the imaging range switching instruction operation is received, there is a change in the pivoting state of the second housing 120, or the switching operation from the still image imaging mode to the moving image imaging mode is received (steps S924 to S926), the operation of the still image imaging processing is completed. On the other hand, when the imaging range switching instruction operation is not received, there is no change in the pivoting state of the second housing 120, and the switching operation from the still image imaging mode to the moving image imaging mode is not received (steps S924 to S926), the still image imaging processing returns to step S921.

Figure 68:
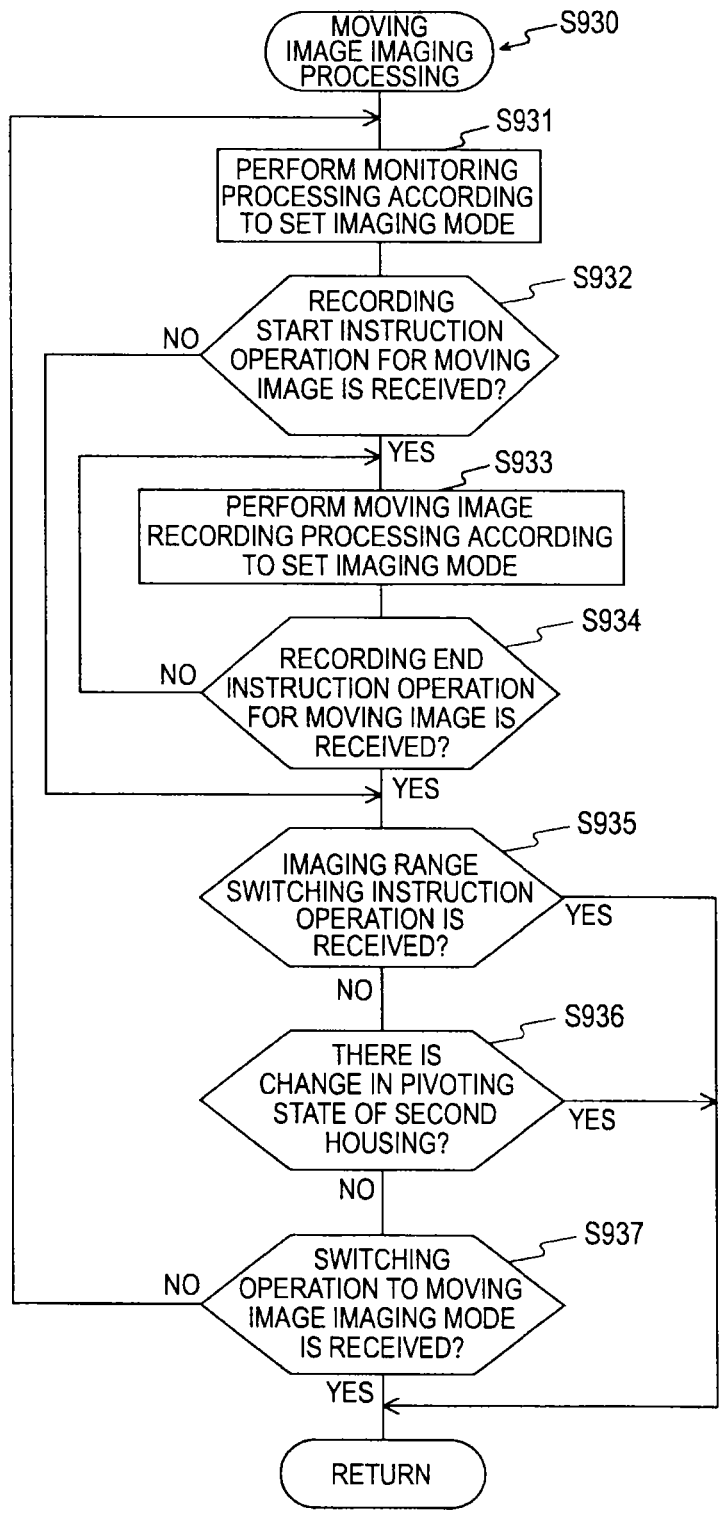
FIG. 68 is a flowchart of moving image imaging processing in the processing procedure of the imaging control processing by the cellular phone apparatus in the first embodiment.

FIG. 68 is a flowchart of the moving image imaging processing (a processing procedure in step S930 shown in FIG. 66) in the processing procedure of the imaging control processing by the cellular phone apparatus 100 in the first embodiment.

First, the monitoring processing is performed according to a set mode (step S931).

Subsequently, it is determined whether recording start instruction operation for a moving image is received (step S932). For example, it is determined whether the determination key 114 is depressed in a state in which monitoring image is displayed in the display unit 140. When the recording start instruction operation for a moving image is not received (step S932), the moving image imaging processing proceeds to step S935. On the other hand, when the recording start instruction operation for a moving image is received (step S932), the moving image recording processing is performed according to the set imaging mode (step S933). Subsequently, it is determined whether recording end instruction operation for a moving image is received (step S934). For example, it is determined whether the determination key 114 is depressed again in a state in which the moving image recording processing is performed. When the recording end instruction operation for a moving image is not received (step S934), the moving image recording processing is continuously performed (step S933). On the other hand, when the recording end instruction operation for a moving image is received (step S934), the moving image recording processing is completed and the moving image imaging processing proceeds to step S935.

Subsequently, it is determined whether the imaging range switching instruction operation is received (step S935). When the imaging range switching instruction operation is not received (step S935), it is determined whether there is a change in the pivoting state of the second housing 120 (step S936). When there is no change in the pivoting state of the second housing 120 (step S936), it is determined whether switching operation from the moving image imaging mode to the still image imaging mode is received (step S937). When the imaging range switching instruction operation is received, there is a change in the pivoting state of the second housing 120, or the switching operation from the moving image imaging mode to the still image imaging mode is received (steps S935 to S937), the operation of the moving image imaging processing is completed. On the other hand, when the imaging range switching instruction operation is not received, there is no change in the pivoting state of the second housing 120, and the switching operation from the moving image imaging mode to the still image imaging mode is not received (step S935 to S937), the moving image imaging processing returns to step S931. When the moving image imaging mode is set, the moving image recording processing may be performed with a thinning-out ratio set higher than that in the still image imaging mode.

Figure 69:
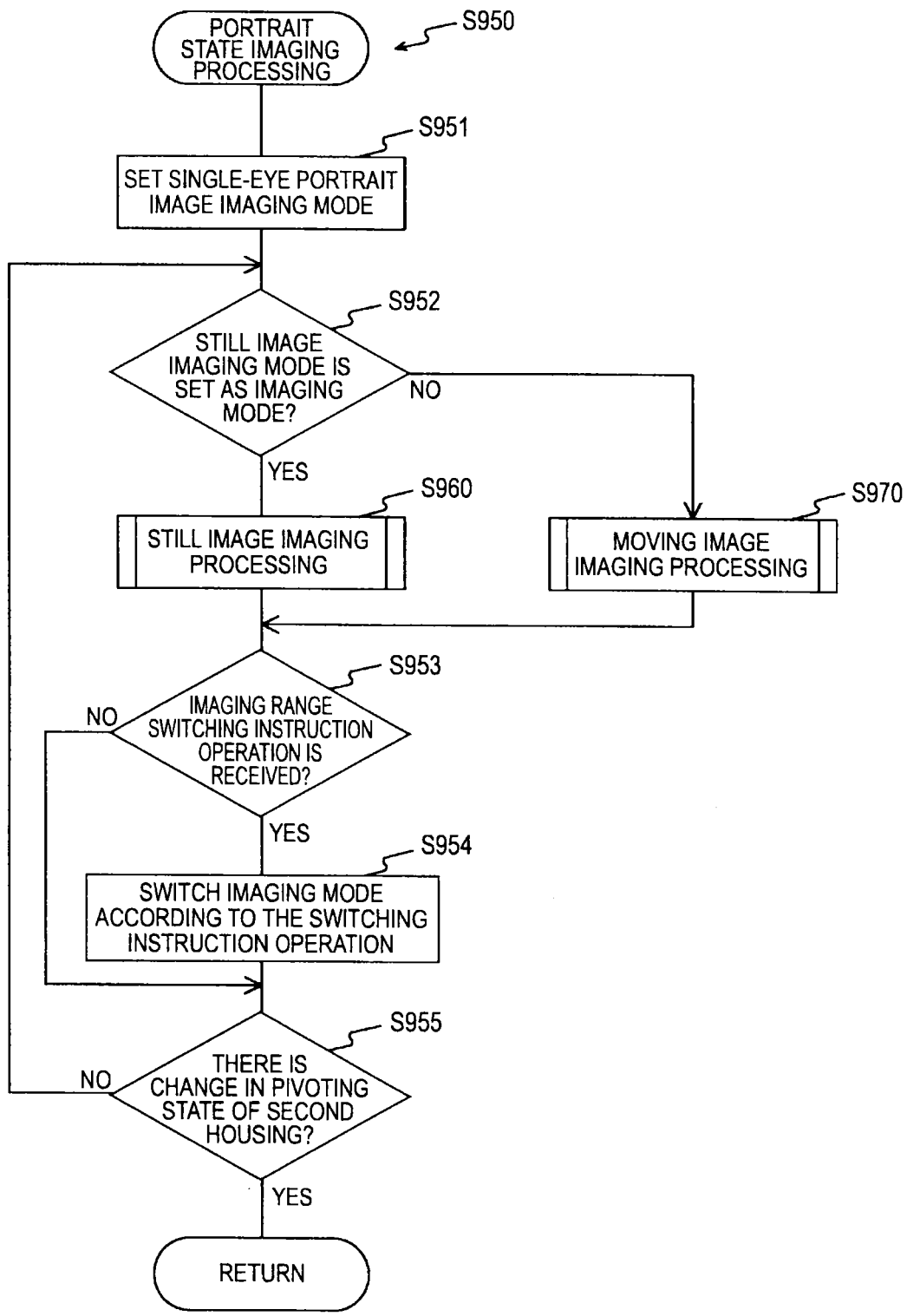
FIG. 69 is a flowchart of portrait state imaging processing in the processing procedure of the imaging control processing by the cellular phone apparatus in the first embodiment.

FIG. 69 is a flowchart of portrait state imaging processing (a processing procedure in step S950 shown in FIG. 65) in the processing procedure of the imaging control processing by the cellular phone apparatus 100 in the first embodiment.

First, the imaging control unit 201 sets the single-eye portrait image imaging mode as initial setting (step S951). Subsequently, the imaging control unit 201 determines whether which imaging mode of the still image imaging mode and the moving image imaging mode is set (step S952). When the still image imaging mode is set (step S952), the still image imaging processing is performed (step S960). The still image imaging processing is substantially the same as the processing procedure shown in FIG. 67 except that an image displayed in the display unit 140 is different. Therefore, explanation of the still image imaging processing is omitted. On the other hand, when the moving image imaging mode is set (step S952), the moving image imaging processing is performed (step S970). The moving image imaging processing is substantially the same as the processing procedure shown in FIG. 68 except that an image displayed in the display unit 140 is different. Therefore, explanation of the moving image imaging processing is omitted.

Subsequently, it is determined whether the imaging range switching instruction operation is received (step S953). When the imaging range switching instruction operation is not received (step S953), the portrait state imaging processing proceeds to step S955. On the other hand, when the imaging range switching instruction operation is received (step S953), the imaging control unit 201 switches the imaging mode according to the received imaging range switching instruction operation (step S954). For example, every time the imaging range changeover switch 111 is depressed, the imaging mode is switched in order of (1) the single-eye portrait image imaging mode, (2) the single-eye portrait small-area image imaging mode, (3) the single-eye landscape image imaging mode, and (4) the three-eye landscape narrow-angle image imaging mode.

Subsequently, it is determined whether there is a change in the pivoting state of the second housing 120 (step S955). When there is no change in the pivoting state of the second housing 120, the portrait state imaging processing returns to step S952. On the other hand, when there is a change in the pivoting state of the second hosing 120 (step S955), the operation of the portrait state imaging processing is completed.

As explained above, in the first embodiment, switching of the plural imaging modes can be easily performed. For example, when call operation of a cellular phone apparatus or operation such as creation of a sentence of electronic mail or reading of a sentence, a housing of the cellular phone apparatus is often used in portrait. Therefore, for example, even when photographing is performed by using a cellular phone apparatus with camera, a housing and a display device of the cellular phone apparatus are often set in a portrait state to perform photographing and record a portrait image. The portrait image recorded in this way is often, for example, reproduced or transmitted among users of cellular phone apparatuses.

However, the human field of vision is wider in the lateral direction. Therefore, it is assumed that, by recording an image having a large aspect ratio, it is possible to record an image in an imaging range close to an area in the human field of vision and reduce a sense of discomfort for the user. Therefore, in the first embodiment, switching of a portrait image with which users of cellular phones with camera are familiar and an image (e.g., a panorama image) having a large angle of view relatively close to the human field of vision can be performed only by the pivoting operation of the second housing 120. In this way, the portrait image and the image having a large angle of view can be switched. Therefore, it is possible to prevent the user from missing photographing timing and easily photograph a user's favorite image.

The portrait image with which users of cellular phone apparatuses with camera are familiar can be displayed or recorded in the single-eye portrait image imaging mode or the single-eye portrait small-area image imaging mode. The image (e.g., a panorama image) having a large angle of view relatively close to the human field of vision can be displayed or recorded in the three-eye landscape wide-angle imaging mode, the three-eye landscape narrow-angle imaging mode, and the single-eye portrait image imaging mode. These kinds of switching can also be easily performed by the imaging range changeover switch 111. In this way, the plural kinds of images can be switched by relatively easy operation. Therefore, it is possible to prevent the user from missing photographing timing and easily photograph a user's favorite image.

[Modifications of Cellular Phone Apparatus]

FIGS. 70A to 71C are diagrams of modifications of the cellular phone apparatus 100 in the first embodiment.

In FIGS. 70A to 70D, a cellular phone apparatus 1040 in which a display unit and an imaging unit are included in the same housing is shown. In FIG. 70A, a front side of a form in using the cellular phone apparatus 1040 is shown. In FIG. 70B, a rear side in the form is shown. In FIG. 70C, a front side of another form in using the cellular phone apparatus 1040 is shown. In FIG. 70D, a rear side in the form is shown.

The cellular phone apparatus 1040 includes the first housing 110 and the second housing 120. The second housing 120 includes the display unit 140 and an imaging unit 1041. The cellular phone apparatus 1040 is substantially the same as the cellular phone apparatus 100 except that the display unit and the imaging unit are included in the same housing. Therefore, components same as those of the cellular phone apparatus 100 are denoted by the same reference numerals and explanation of the components is omitted.

The imaging unit 1041 is substantially the same as the imaging unit 130 included in the cellular phone apparatus 100 except that an arrangement position thereof is different. Specifically, in the imaging unit 1041, three imaging systems are arranged side by side according to a predetermined rule, an imaging device in the center is arranged in a portrait state, and imaging devices on the left and right area arranged in a landscape state.

Figure 71A:
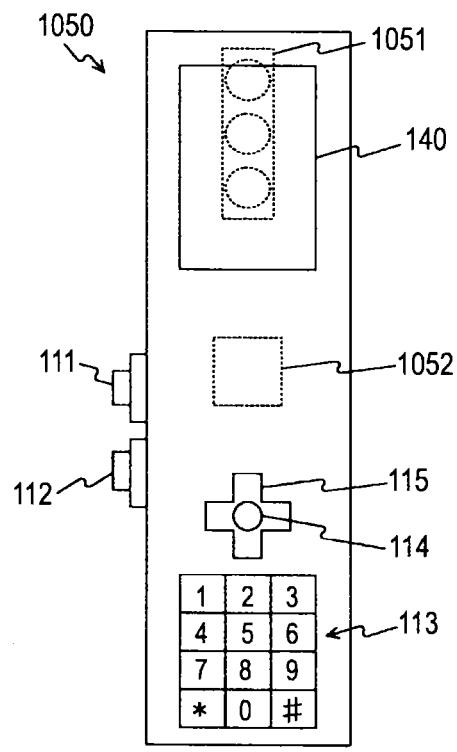
FIGS. 71A to 71C are diagrams of a modification of the cellular phone apparatus in the first embodiment.
Figure 71B:
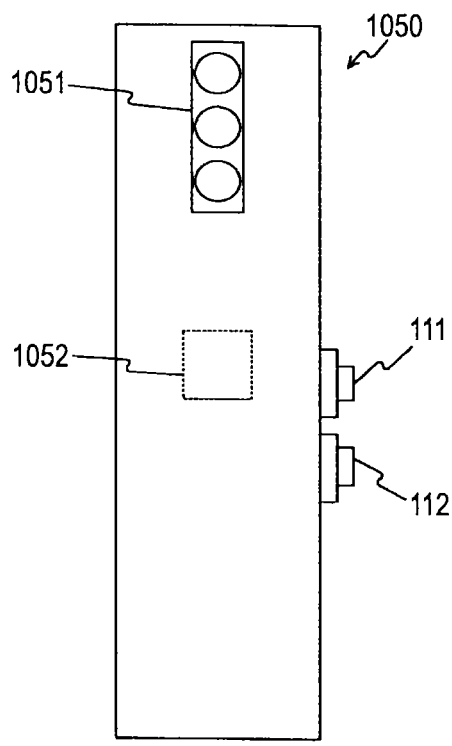
Figure 71C:
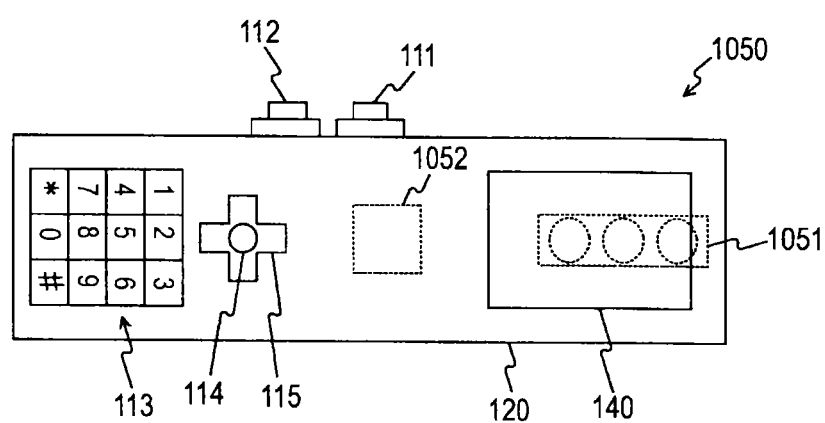

In FIGS. 71A to 71C, a cellular phone apparatus 1050 including one housing is shown. In FIG. 71A, a front side of a form in using the cellular phone apparatus 1050 is shown. In FIG. 71B, a rear side in the form is shown. In FIG. 71C, a front side of another form in using the cellular phone apparatus 1050 is shown.

The cellular phone apparatus 1050 includes one housing and includes the display unit 140, an imaging unit 1051, and a posture detecting unit 1052. The cellular phone apparatus 1050 is substantially the same as the cellular phone apparatus 100 except that the cellular phone apparatus 1050 includes one housing, the cellular phone apparatus 1050 includes the posture detecting unit 1052 instead of the pivoting-state detecting unit 150, and the arrangement position of the imaging unit is different. Therefore, components same as those of the cellular phone apparatus 100 are denoted by the same reference numerals and explanation of the components is omitted.

The imaging unit 1051 is substantially the same as the imaging unit 130 included in the cellular phone apparatus 100 except that the arrangement position thereof is different. Specifically, in the imaging unit 1051, three imaging systems are arranged side by side according to a predetermined rule, an imaging device in the center is arranged in a portrait state, and imaging devices on the left and right area arranged in a landscape state.

The posture detecting unit 1052 is incorporated in the cellular phone apparatus 1050 instead of the pivoting-state detecting unit 150. The posture detecting unit 1052 detects acceleration, motion, tilt, and the like applied to the cellular phone apparatus 1050. The posture detecting unit 1052 is realized by, for example, a gyro sensor, a tumble sensor, or a gravity sensor. The posture detecting unit 1052 outputs detected information to the imaging control unit 201 as posture information. The imaging control unit 201 detects, on the basis of the detected posture information, whether the cellular phone apparatus 1050 is in the landscape state or the portrait state. The imaging control unit 201 performs control of the imaging operation on the basis of the detected state. For example, the imaging control unit 201 can perform imaging control the same as the control performed according to whether the second housing of the cellular phone apparatus 100 is in the landscape sate or the portrait state. The imaging control unit 201 may perform imaging control for changing an imaging range according to operation input performed by using a predetermined operation member. As the operation input, it is possible to assume operation input by an operation button or a touch panel. The posture detecting unit 1052 is an example of the detecting unit described in the appended claims.

In this way, the first embodiment can be applied to cellular phone apparatuses of various forms.

2. Second Embodiment

In the first embodiment, the cellular phone apparatus including the plural imaging systems is explained as an example. In a second embodiment of the present invention, an imaging apparatus such as a digital still camera or a digital video camera is explained.

[External Configuration Example of Imaging Apparatus]

Figure 72A:
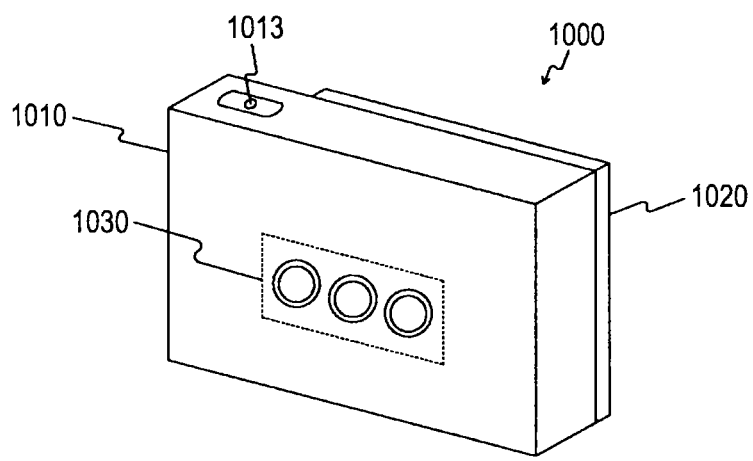
FIGS. 72A to 72C are diagrams of the external configuration of an imaging apparatus in a second embodiment of the present invention.
Figure 72B:
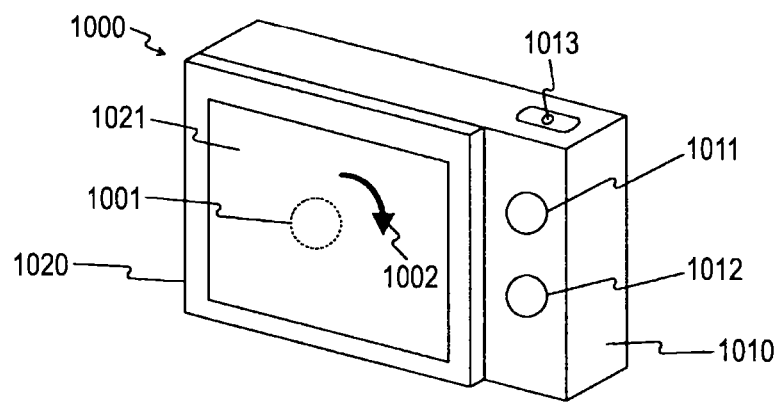
Figure 72C:
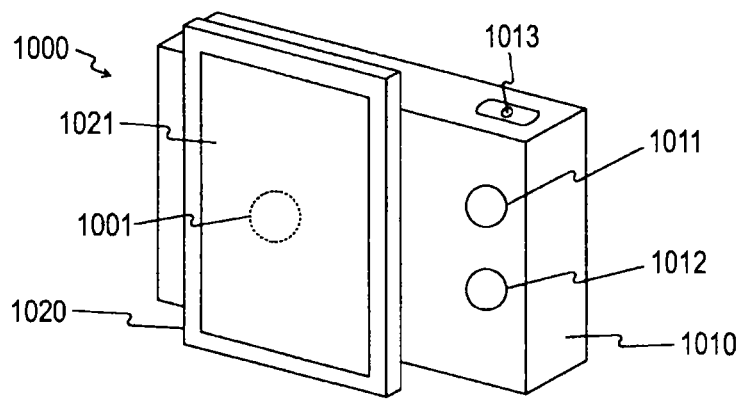

FIGS. 72A to 72C are diagrams of the external configuration of an imaging apparatus 1000 in the second embodiment. In FIG. 72A, a perspective view of a front side (a subject side) of the imaging apparatus 1000 is shown. In FIGS. 72B and 72C, perspective views on a rear side (a photographer side) of the imaging apparatus 1000 are shown. In the imaging apparatus 1000, a first housing 1010 and a second housing 1020 are pivotably coupled by a pivoting member 1001. The imaging apparatus 1000 is realized by, for example, a digital still camera including three imaging systems. In FIGS. 72A to 72C, for easy of explanation, the imaging apparatus 1000 is shown in a simplified form. Illustration of a power switch and the like provided on the outer surface of the imaging apparatus 1000 is omitted.

The first housing 1010 includes an imaging range changeover switch 1011, a still image/moving image changeover switch 1012, a shutter button 1013, and an imaging unit 1030. The imaging range changeover switch 1011, the still image/moving image changeover switch 1012, and the imaging unit 1030 are substantially the same as the imaging range changeover switch 111, the still image/moving image changeover switch 112, and the imaging unit 130 shown in FIGS. 1A to 11D and the like. Therefore, explanation of the components is omitted. The imaging range changeover switch 1011 is an example of the operation receiving unit described in the appended claims.

The shutter button 1013 is an operation member for instructing the start of recording of an image. For example, when the still image imaging mode is set, the shutter button 1013 is depressed in recording image data generated by the imaging unit 1030 in a recording medium as a still image file.

The second housing 1020 includes a display unit 1021. Since the display unit 1021 is substantially the same as the display unit 140 shown in FIGS. 1A to 1D and the like, explanation of the display unit 1021 is omitted. In the imaging apparatus 1000, the first housing 1010 and the second housing 1020 are pivotably connected. Specifically, the second housing 1020 can be pivoted with respect to the first housing 1010 with the pivoting member 1001 (indicated by a dotted line) as a pivotal reference. This makes it possible to change a relative positional relation of the second housing 1020 with respect to the first housing 1010. For example, a form in which the second housing 1020 is pivoted 90 degrees in a direction of an arrow 1002 shown in FIG. 72B is shown in FIG. 72C. As in the first embodiment, control for imaging operation is performed on the basis of whether the second housing 1020 is in the landscape state or the portrait state.

In the embodiments, the cellular phone apparatus and the imaging apparatus including the three imaging systems are explained as examples. However, the embodiments can be applied to a cellular phone apparatus, an imaging apparatus, and the like including five or more odd number of imaging systems. Specifically, the embodiments can be applied by arranging the five or more odd number of imaging systems side by side according to a fixed rule, setting an imaging device in the center in a portrait state, and setting other imaging devices on the left and right in a landscape state.

The embodiments indicate examples for embodying the present invention. As clearly explained in the embodiments, the elements in the embodiments and claimed elements in the appended claims respectively have correspondence relations. Similarly, the claimed elements in the appended claims and the elements in the embodiments having names same as the claimed elements respectively have correspondence relations. However, the present invention is not limited to the embodiments and can be embodied by applying various modifications to the embodiments without departing from the spirit of the present invention.

The processing procedures explained in the embodiment may be understood as a method having a series of procedures or can be understood as a computer program for causing a computer to execute the series of procedures and a recording medium that stores the computer program. As the recording medium, for example, a CD (Compact Disc), an MF (Mini-Disc), a DVD (Digital Versatile Disk), a memory card, or a Blu-ray Disc (registered trademark) can be used.

The present application contains subject matter related to that disclosed in Japanese Priority Patent Application JP 2009-190659 filed in the Japan Patent Office on Aug. 20, 2009, the entire contents of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An imaging apparatus comprising:
   an output unit including a first output unit being a display unit configured to display images, and a second output unit configured to record or transmit images;
   a first imaging system including a first lens and a first imaging device configured to generate a first captured image;
   a second imaging system including a second lens and a second imaging device configured to generate a second captured image;
   an imaging unit including the first and second imaging systems;
   an image combining unit configured to combine at least parts from the first and second captured images in order to generate a combined image;
   a housing including said imaging unit and said display unit;
   a detecting unit configured to detect whether the housing is set in a horizontal direction or a vertical direction as a state of the imaging apparatus; and
   a control unit configured to control a size of an output image output by said output unit on the basis of said detected state, wherein
   the control unit is configured to switch, on the basis of the detected state, a compound-eye imaging operation performed by using the plural imaging devices and a single-eye imaging operation performed by using the first imaging device, and
   the control unit is configured to determine that, when the single-eye imaging operation is switched to the compound-eye imaging operation, a clock of a predetermined frequency is used for the compound-eye imaging operation and, when the compound-eye imaging operation is switched to the single-eye imaging operation, a clock of a frequency lower than the predetermined frequency is used for the single-eye imaging operation.

2. The imaging apparatus according to claim 1, wherein the detecting unit is configured to detect, as the state of the imaging apparatus, a first specific state in which the housing, that includes said display unit, is set in the vertical direction, and the control unit configured to determine an output range of the output image within a captured range of the first captured image, when the first specific state is detected.

3. The imaging apparatus according to claim 2, wherein the control unit is configured to determine an output range of the output image as an entire captured range of the first captured image, when the first specific state is detected.

4. The imaging apparatus according to claim 1, wherein the detecting unit is configured to detect, as the state of the imaging apparatus, a second specific state in which the housing, that includes said display unit, is set in the horizontal direction, and the control unit is configured to determine an output range of the output image within a range of the combined image, when the second specific state is detected.

5. The imaging apparatus according to claim 4, wherein the control unit is configured to determine the output image to have a wider aspect ratio than the first and second captured images, when the second specific state is detected.

6. The imaging apparatus according to claim 1, wherein lenses respectively corresponding to the imaging devices included in the imaging unit are arranged side by side on one surface of the housing, and the display unit is provided on a surface on the opposite side of the one surface of the housing.

7. The imaging apparatus according to claim 1, wherein the control unit is configured to stop operation of the second imaging device, when the compound-eye imaging operation is switched to the single-eye imaging operation.

8. The imaging apparatus according to claim 1, further comprising a third imaging system including a third lens and a third imaging device configured to generate a third captured image.

* * * * *